(12) United States Patent
Matsuo

(10) Patent No.: US 9,442,890 B2
(45) Date of Patent: Sep. 13, 2016

(54) DISTRIBUTION APPARATUS, RESTORATION APPARATUS, DISTRIBUTION METHOD, RESTORATION METHOD, AND DISTRIBUTION AND RESTORATION SYSTEM

(71) Applicant: PANASONIC CORPORATION, Osaka (JP)

(72) Inventor: Masakatsu Matsuo, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 382 days.

(21) Appl. No.: 13/866,590

(22) Filed: Apr. 19, 2013

(65) Prior Publication Data
US 2013/0282782 A1 Oct. 24, 2013

(30) Foreign Application Priority Data
Apr. 23, 2012 (JP) .................................. 2012-098145

(51) Int. Cl.
H04L 29/06 (2006.01)
G06F 17/10 (2006.01)
H04L 9/06 (2006.01)
(Continued)

(52) U.S. Cl.
CPC ............. *G06F 17/10* (2013.01); *G06F 9/5027* (2013.01); *H04L 9/0618* (2013.01); *H04L 9/085* (2013.01)

(58) Field of Classification Search
CPC .................................................... H04L 9/0618
USPC .......................................................... 713/180
See application file for complete search history.

(56) References Cited

U.S. PATENT DOCUMENTS

| 8,934,630 | B2 * | 1/2015 | Hazay et al. ................. 380/269 |
| 2007/0253548 | A1 | 11/2007 | Kameyama | |
| 2008/0205637 | A1 * | 8/2008 | Kurihara ................. H04L 9/085 380/28 |

(Continued)

FOREIGN PATENT DOCUMENTS

| JP | 9-8797 | 1/1997 |
| JP | 2005-63374 | 3/2005 |

(Continued)

OTHER PUBLICATIONS

International Search Report and Written Opinion of the International Searching Authority dated Aug. 14, 2013.

(Continued)

*Primary Examiner* — Jason K Gee
(74) *Attorney, Agent, or Firm* — Dickinson Wright PLLC

(57) ABSTRACT

Processing for generating a plurality of pieces of distributed data from original data or processing for restoring original data from a plurality of pieces of distributed data is performed safely and quickly. A distribution and restoration apparatus 200 generates a plurality of pieces of distributed data SD1 to SD3 by dividing original data OD into a plurality of divided blocks DB1 to DB16 and performing an operation of exclusive OR using divided blocks of different combinations. A combination including divided blocks used in common in a plurality of pieces of distributed data and a combination including divided blocks used only in specific distributed data are present in combinations of divided blocks in each piece of distributed data. Therefore, the distribution and restoration apparatus 200 can generate a plurality of pieces of safe distributed data having high information entropy at high speed.

17 Claims, 57 Drawing Sheets

(51) Int. Cl.
  *H04L 9/08* (2006.01)
  *G06F 9/50* (2006.01)

(56) References Cited

U.S. PATENT DOCUMENTS

2012/0255030 A1 10/2012 Matsuo
2013/0182836 A1 7/2013 Hamada

FOREIGN PATENT DOCUMENTS

| JP | 2005-229489 | 8/2005 |
| JP | 2006-311383 | 1/2006 |
| JP | 2006-39794 | 2/2006 |
| JP | 2006-345160 | 12/2006 |
| JP | 2007-299088 | 11/2007 |
| JP | 2008-98894 | 4/2008 |
| JP | 2008-288750 | 11/2008 |
| JP | 2009-182375 | 8/2009 |
| JP | 2009-203720 | 9/2009 |
| JP | 2009-288338 | 12/2009 |
| JP | 5685735 | 1/2015 |
| WO | 2007/111086 | 10/2007 |
| WO | 2012/046692 | 4/2012 |

OTHER PUBLICATIONS

C. Lv, et al., "Efficient Ideal Threshold Secret Sharing Schemes Based on Exclusive-OR Operations," IEEE 2010 Fourth International Conference on Network and System Security, XP031801826, Sep. 1, 2010, pp. 136-143.
R. Rivest, "All-Or-Nothing Encryption and the Package Transform," FSE '97 Proceedings of the 4th International Workshop on Fast Software Encryption, XP007907068, Jan. 20, 1997, pp. 210-218.
Japanese Notification of Reasons for Refusal dated May 17, 2016 with English machine translation.

* cited by examiner

DISTRIBUTION APPARATUS, RESTORATION APPARATUS, DISTRIBUTION METHOD, RESTORATION METHOD, AND DISTRIBUTION AND RESTORATION SYSTEM

BACKGROUND OF THE INVENTION

The present invention relates to a distribution apparatus, a restoration apparatus, a distribution method, a restoration method, and a distribution and restoration system to perform processing for distributing or restoring original data.

Conventionally, an AONT (All or Nothing Transform) method is known as a secret sharing scheme to generate a plurality of pieces of distributed data, which have asymmetric data sizes, from original data (for example, refer to Patent Reference 1). The asymmetric data sizes indicate that the data sizes of respective pieces of generated distributed data are different.

PRIOR ART REFERENCE

Patent Reference

[Patent Reference 1] JP-A-2006-311383

In the secret sharing scheme used in PTL 1, however, since a plurality of pieces of distributed data are generated after dividing the encrypted data, there is a problem that it takes a long time to generate distributed data. In addition, it is difficult to assume that the safety of the secret sharing scheme used in PTL 1 is high in terms of information theory since the information entropy of each piece of distributed data is low as in data division processing in RAID (Redundant Arrays of Inexpensive Disks). For example, even if encryption processing is performed on each piece of distributed data generated by the secret sharing scheme disclosed in PTL 1, the information entropy of each piece of the encrypted distributed data is not increased. Accordingly, it is difficult to assume that safety in terms of information theory becomes high.

SUMMARY

The present invention has been made in view of the conventional circumstances described above, and it is an object of the present invention to provide a distribution apparatus, a distribution method, and a distribution and restoration system to generate distributed data from the original data safely and quickly.

In addition, the present invention has been made in view of the conventional circumstances described above, and it is another object of the present invention to provide a restoration apparatus, a restoration method, and a distribution and restoration system to restore the original data from the distributed data safely and quickly.

According to one aspect of the present invention, there is provided a distribution apparatus configured to generate a plurality of pieces of distributed data including a plurality of divided blocks from original data, comprising:

an arithmetic processing unit configured to perform arithmetic processing for operation between a predetermined divided block and other divided blocks, wherein the arithmetic processing is arithmetic processing that, when arithmetic processing is performed on the predetermined divided block multiple times using the other divided blocks, the operation result is returned to the predetermined divided block, the arithmetic processing unit is configured to generate at least first distributed data and second distributed data, of which combinations of the divided blocks are different, by performing the arithmetic processing by combining a predetermined number of divided blocks from the plurality of divided blocks, a combination of divided blocks in the first distributed data includes divided blocks used in the first distributed data and the second distributed data, and a combination of divided blocks in the second distributed data includes divided blocks used in the first distributed data and the second distributed data and divided blocks used only in the second distributed data.

According to another aspect of the present invention, there is provided a restoration apparatus configured to restore original data using a plurality of pieces of distributed data including a plurality of divided blocks, comprising:

an arithmetic processing unit configured to perform arithmetic processing for operation between a predetermined divided block and other divided blocks, wherein the arithmetic processing is arithmetic processing that, when arithmetic processing is performed on the predetermined divided block multiple times using the other divided blocks, the operation result is returned to the predetermined divided block, the arithmetic processing unit is configured to acquire all of the divided blocks by performing the arithmetic processing between at least first distributed data and second distributed data, which are generated by the arithmetic processing on the basis of a combination of a predetermined number of divided blocks selected from the plurality of divided blocks, and configured to connect all of the acquired divided blocks in order to restore the original data, a combination of divided blocks in the first distributed data includes divided blocks used in the first distributed data and the second distributed data, and a combination of divided blocks in the second distributed data includes divided blocks used in the first distributed data and the second distributed data and divided blocks used only in the second distributed data.

According to still another aspect of the present invention, there is provided a distribution method in a distribution apparatus configured to generate a plurality of pieces of distributed data including a plurality of divided blocks from original data, comprising:

dividing the original data to the plurality of divided blocks;

performing arithmetic processing between a predetermined divided block and other divided blocks of the plurality of divided blocks, the arithmetic processing being arithmetic processing that, when arithmetic processing is performed on the predetermined divided block multiple times using the other divided blocks, the operation result is returned to the predetermined divided block; and generating at least first distributed data and second distributed data, of which combinations of the divided blocks are different, by performing the arithmetic processing by combining a predetermined number of divided blocks from the plurality of divided blocks, wherein a combination of divided blocks in the first distributed data includes divided blocks used in the first distributed data and the second distributed data, and a combination of divided blocks in the second distributed data includes divided blocks used in the first distributed data and the second distributed data and divided blocks used only in the second distributed data.

According to still another aspect of the present invention, there is provided a restoration method in a restoration apparatus configured to restore original data using a plurality of pieces of distributed data including a plurality of divided blocks, comprising:

acquiring at least first distributed data and second distributed data, which are generated on the basis of a combination of a predetermined number of divided blocks selected from the plurality of divided blocks;

performing arithmetic processing between a predetermined divided block and other divided blocks, the arithmetic processing being arithmetic processing that, when arithmetic processing is performed on the predetermined divided block multiple times using the other divided blocks, the operation result is returned to the predetermined divided block;

acquiring all of the divided blocks by performing the arithmetic processing between at least the first distributed data and the second distributed data; and restoring the original data by connecting all of the acquired divided blocks, wherein a combination of divided blocks in the first distributed data includes divided blocks used in the first distributed data and the second distributed data, and a combination of divided blocks in the second distributed data includes divided blocks used in the first distributed data and the second distributed data and divided blocks used only in the second distributed data.

According to yet another aspect of the present invention, there is provided a distribution and restoration system, comprising:

a distribution unit configured to generate a plurality of pieces of distributed data including a plurality of divided blocks from original data; and a restoration unit configured to restore the original data using the plurality of pieces of distributed data including the plurality of divided blocks, wherein each of the distribution unit and the restoration unit has an arithmetic processing unit configured to perform arithmetic processing between a predetermined divided block and other divided blocks, the arithmetic processing being arithmetic processing that, when arithmetic processing is performed on the predetermined divided block multiple times using the other divided blocks, the operation result is returned to the predetermined divided block, the arithmetic processing unit of the distribution unit is configured to generate at least first distributed data and second distributed data, of which combinations of the divided blocks are different, by performing the arithmetic processing by combining a predetermined number of divided blocks from the plurality of divided blocks, the arithmetic processing unit of the restoration unit is configured to acquire all of the divided blocks by performing the arithmetic processing between at least first distributed data and second distributed data, which are generated by the arithmetic processing on the basis of a combination of a predetermined number of divided blocks selected from the plurality of divided blocks, and configured to connect all of the acquired divided blocks in order to restore the original data, a combination of divided blocks in the first distributed data includes divided blocks used in the first distributed data and the second distributed data, and a combination of divided blocks in the second distributed data includes divided blocks used in the first distributed data and the second distributed data and divided blocks used only in the second distributed data.

Advantageous Effects of Invention

According to the present invention, it is possible to safely and quickly process the generation of a plurality of pieces of distributed data having asymmetric data sizes from original data and the restoration of original data from a plurality of pieces of distributed data having asymmetric data sizes.

BRIEF DESCRIPTION OF THE DRAWINGS

FIG. 57A is basic distribution condition information for distributed data SD1, SD2, and SD3 shown in FIG. 2, FIG. 57B is distribution condition information when the distributed data shown in FIG. 10 is generated using a divided block and a random number, and FIG. 57C is distribution condition information when the information of the number of divided blocks used to generate the distributed data shown in FIG. 10 is included.

Figure 1:
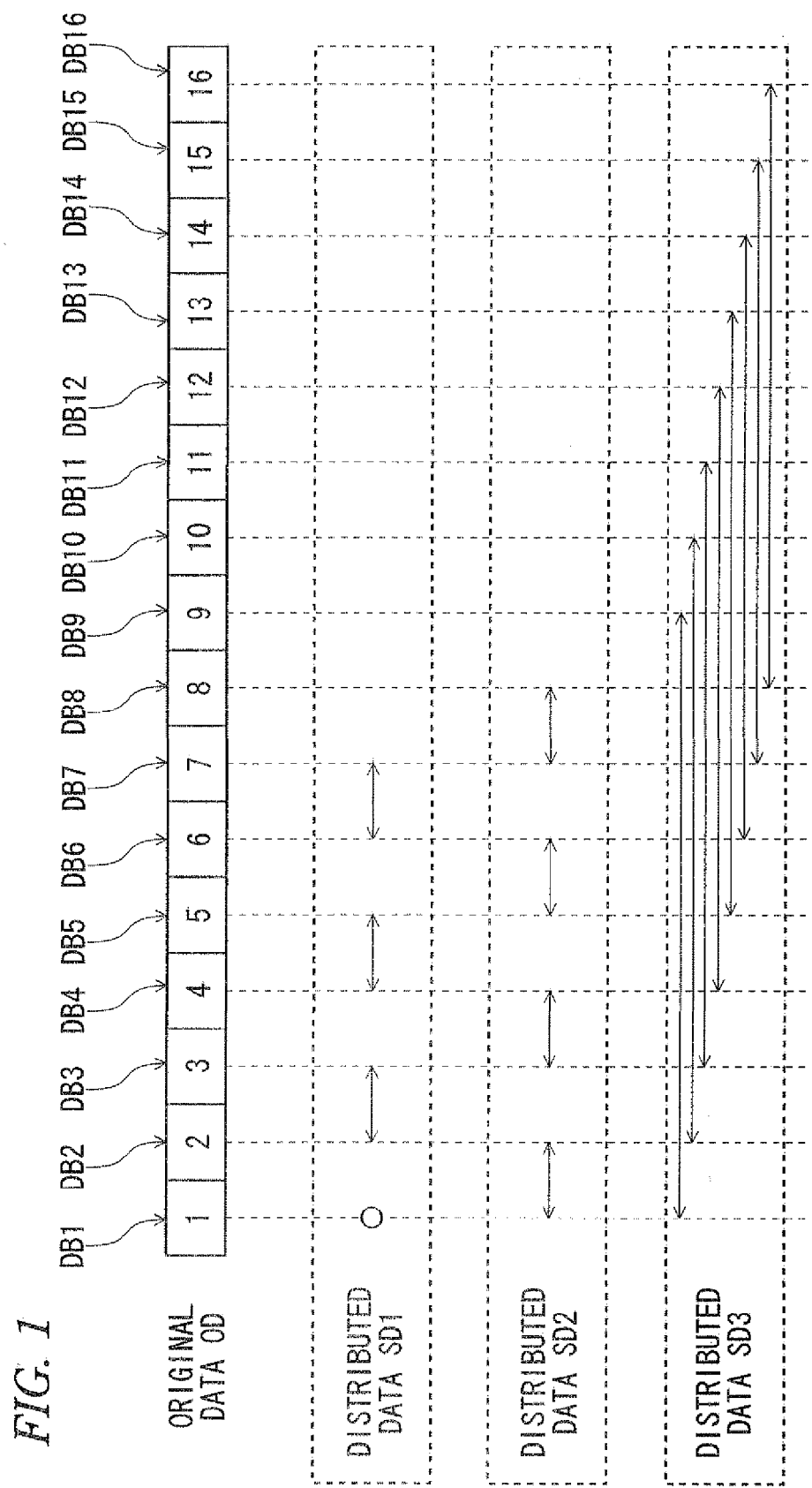
FIG. 1 is an explanatory view showing an example of a method of generating the distributed data in a first embodiment.

DETAILED DESCRIPTION OF EMBODIMENTS (Explanation of terms or notation) In the following explanation, "division" is an operation to simply divide the data into two or more pieces of data, and is a concept including "distribution" in secret sharing. In the following explanation, "distribution" is used as an example of "division", and the terms of "division" and "distribution" are differently used.

In addition, "original data" is data including the data that should be kept secret to a third party. In addition, all pieces of original data may be kept secret, or some of the original data may be kept secret. In the following explanation, the original data is formed by connecting the pieces of data of a plurality of blocks in order, and the data of each block is called a "divided block".

In addition, "distributed data" is the data that a distribution apparatus according to the present invention generates from the original data according to a distribution method to be described later.

In addition, the processing of exclusive OR as arithmetic processing executed by an arithmetic processing unit 100, which will be described later, is simply referred to as "XOR processing".

In addition, the arithmetic processing executed by the arithmetic processing unit 100 to be described later is, for example, arithmetic processing for obtaining a predetermined divided block by performing an operation of the predetermined divided block and another divided block multiple times. Here, a specific example of the arithmetic processing of the arithmetic processing unit 100 will be briefly described.

Assuming that the value of the predetermined divided block is BA and the value of another divided block is BB, the arithmetic processing unit 100 performs first arithmetic processing of BA XOR BB and performs second arithmetic processing of (BA XOR BB) XOR BB=BA through the arithmetic processing of exclusive OR.

In this manner, the arithmetic processing unit 100 can obtain the predetermined divided block BA by performing arithmetic processing multiple times (for example, twice). Accordingly, the arithmetic processing of exclusive OR is an example of arithmetic processing executed by the arithmetic processing unit 100.

In addition, the arithmetic processing unit 100 may perform the following arithmetic processing in addition to the arithmetic processing of exclusive OR. Specifically, assuming that the value of the predetermined divided block is BA and the value of another divided block is BB similarly and the prime is NN, the arithmetic processing unit 100 performs the following processing, that is, performs first arithmetic processing of BA×BB mod(NN)=CC and performs second arithmetic processing of CC×BB^(−1) mod(NN)=BA.

In this manner, the arithmetic processing unit 100 can obtain the predetermined divided block BA by performing arithmetic processing multiple times (for example, twice). Accordingly, without being limited to the arithmetic processing of exclusive OR, the arithmetic processing using the operator mod is also an example of arithmetic processing executed by the arithmetic processing unit 100. Thus, there are a plurality of kinds of arithmetic processing executed by the arithmetic processing unit 100, that is, arithmetic processing for obtaining a predetermined divided block by performing an operation of the predetermined divided block and another divided block multiple times.

Figure 2:
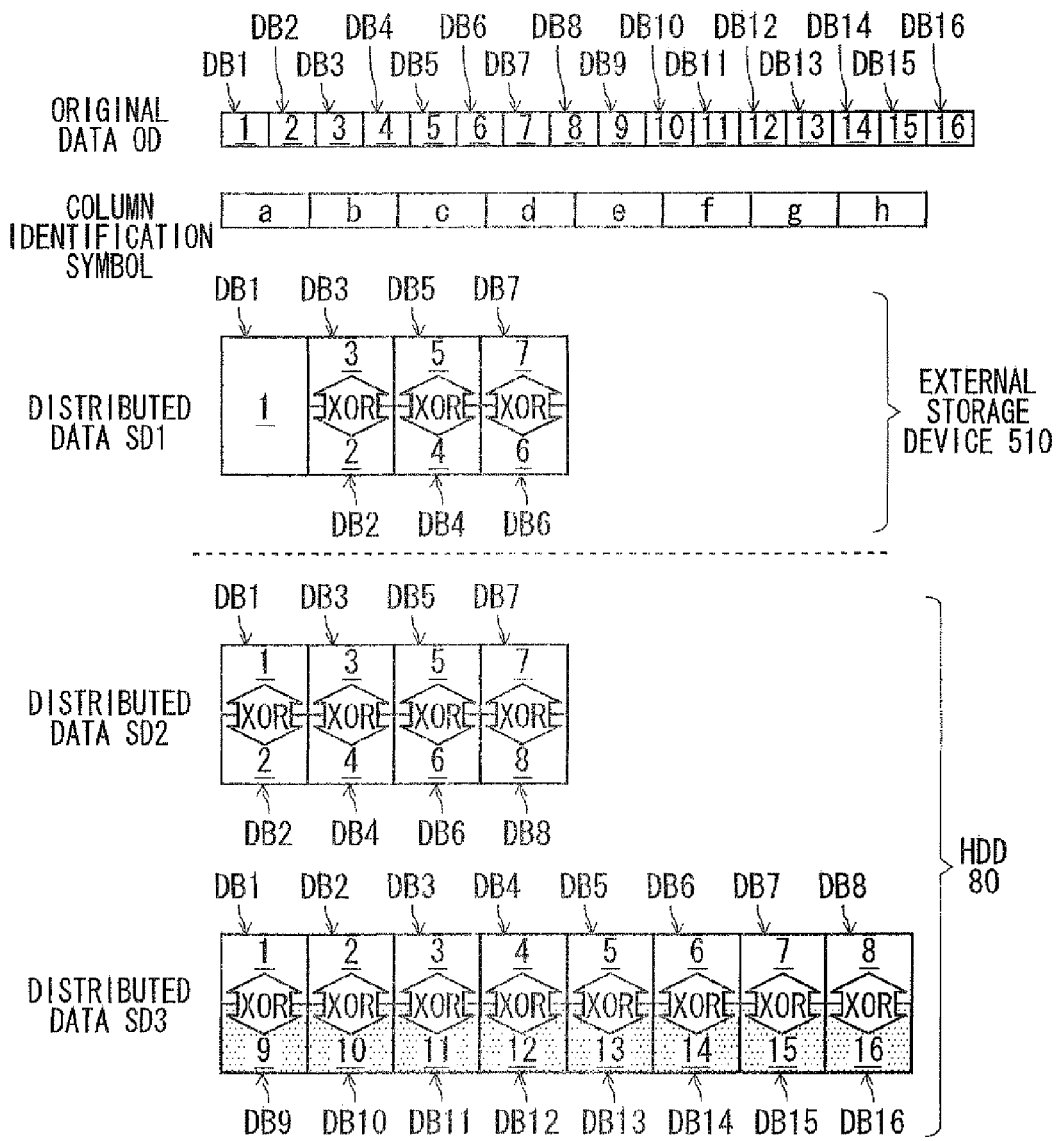
FIG. 2 is an explanatory view showing the content of the distributed data in the first embodiment.

For example, distributed data SD1 shown in FIG. 2 is configured to include a divided block DB1, an XOR-processed block of divided blocks DB2 and DB3, an XOR-processed block of divided blocks DB4 and DB5, and an XOR-processed block of divided blocks DB6 and DB7, which are connected in order, of the original data OD configured to include a total of 16 divided blocks.

In the following explanation, for example, divided blocks DB1, DB2, DB16 of the original data OD shown in FIG. 2 are identified by denoting the first divided block (column) of the original data OD as "column 1" and denoting subsequent blocks as "column 2", "column 3", "column 16" in order in other drawings including FIG. 2. The data size of each divided block can be set to any data size in units of 1 bit. In addition, although the original data OD is divided into, for example, a total of 16 divided blocks in FIG. 2, the number of divided blocks is not particularly limited in practice if it is 2 or more.

For example, each divided block of the distributed data SD1 shown in FIG. 2 is identified by denoting the first block (column), that is, the divided block DB1 as "column a" and denoting subsequent blocks as "column b", "column c", . . . , in order in the distributed data SD1 shown in FIG. 2.

In addition, in the following explanation, the column y of the distributed data SD1 is denoted as [distribution (1) y]. For example, the column c of the distributed data SD1 shown in FIG. 2 is denoted as [distribution (1) c], and the column f of the distributed data D3 shown in the same drawing is denoted as [distribution (3) f].

Figure 54:
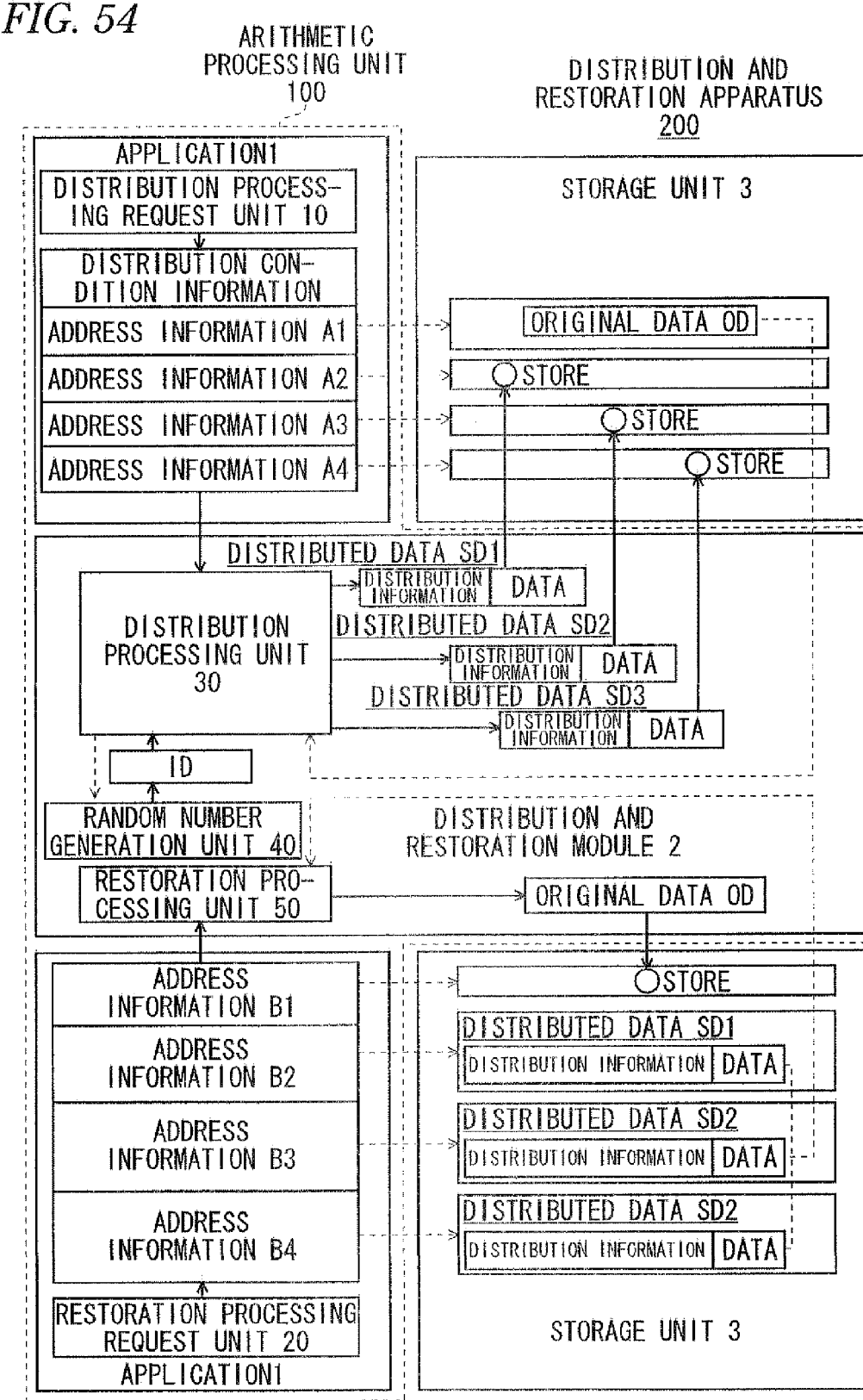
FIG. 54 is a block diagram showing an example of the functional configuration of a distribution and restoration apparatus.

Functional Configuration of a Distribution and Restoration Apparatus Common to Each Embodiment First, the configuration of a distribution and restoration apparatus common to each embodiment will be described with reference to FIG. 54 to 57C. FIG. 54 is a block diagram showing an example of the functional configuration of a distribution and restoration apparatus 200. The distribution and restoration apparatus 200 shown in FIG. 54 illustrates a functional configuration for performing a distribution method and a restoration method of a first embodiment (see below) as an example of the functional configuration. Similarly, the distribution and restoration apparatus 200 can also perform a distribution method and a restoration method of each of second to thirteenth embodiments, which will be described later.

Figure 55:
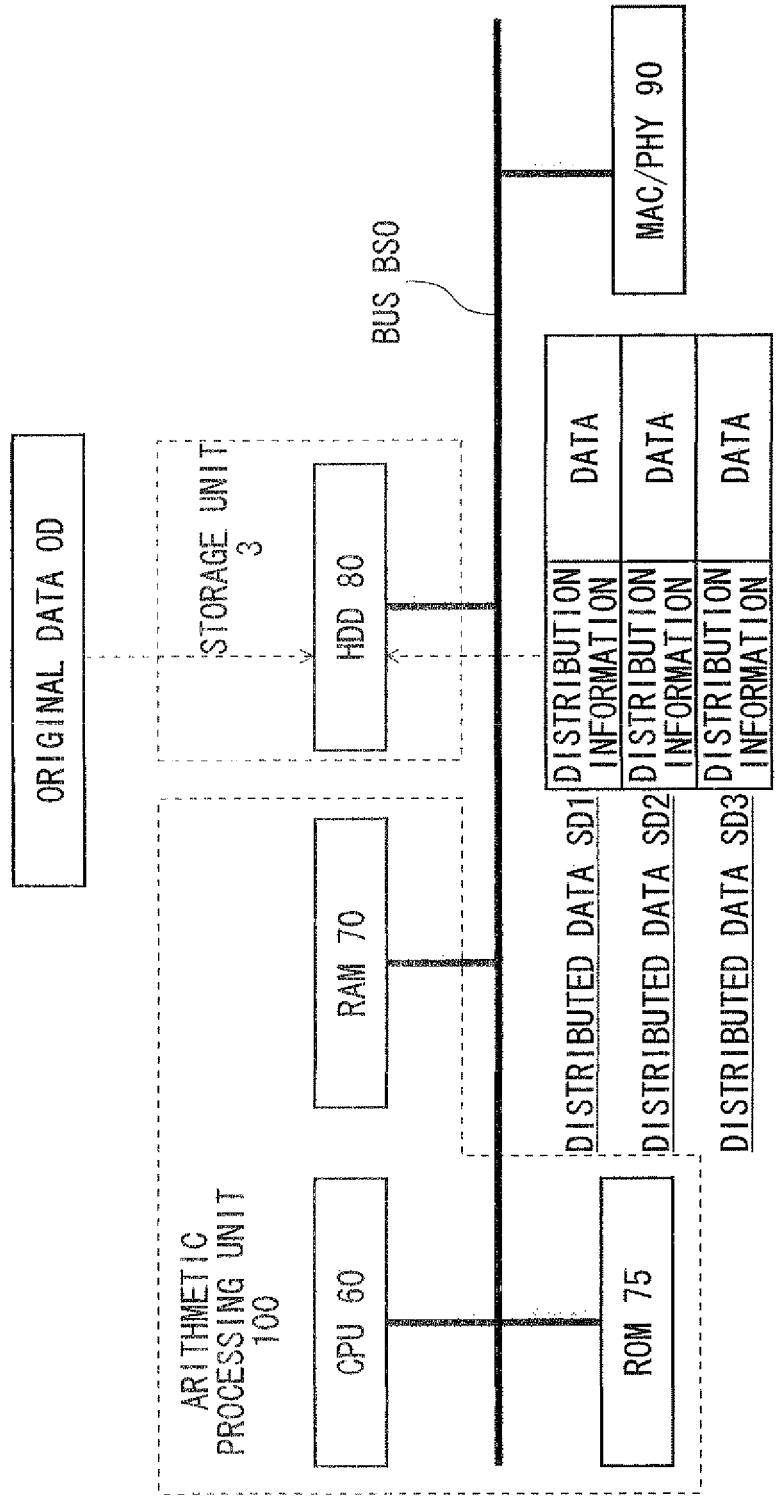
FIG. 55 is a block diagram showing the hardware configuration of a distribution and restoration apparatus.

The distribution and restoration apparatus 200 shown in FIG. 54 includes an arithmetic processing unit 100 (refer to a dotted portion) and a storage unit 3. The arithmetic processing unit 100 includes an application 1 and a distribution and restoration module 2. In addition, in FIG. 54, a MAC/PHY 90 as a communication control unit shown in FIG. 55 is not shown.

The application 1 deals with distribution condition information (see below) and address information A1, A2, A3, and A4 in distribution processing and address information B1, B2, B3, and B4 in restoration processing, including a distribution processing request unit 10 and a restoration processing request unit 20.

In response to the user's input operation (for example, an operation to generate a plurality of pieces of distributed data from the original data OD), the distribution processing request unit 10 outputs a distribution processing execution instruction including the distribution condition information and the address information A1, A2, A3, and A4 to a distribution processing unit 30 of the distribution and restoration module 2 to be described later. In addition, an auxiliary line indicating the user's input operation is not shown in FIG. 54 to 56.

In response to the user's input operation (for example, an operation to restore the original data OD from a plurality of pieces of distributed data), the restoration processing request unit 20 outputs a restoration processing execution instruction including the address information B1, B2, B3, and B4 to a restoration processing unit 50 of the distribution and restoration module 2 to be described later.

The distribution and restoration module 2 includes the distribution processing unit 30, a random number generation unit 40, and the restoration processing unit 50.

The distribution processing unit 30 performs processing for generating the distributed data on the basis of the distribution processing execution instruction output from the distribution processing request unit 10. The distribution processing unit 30 outputs a random number generation instruction for requesting the generation of a random number to the random number generation unit 40 when necessary.

The random number generation unit 40 generates a random number on the basis of the random number generation instruction output from the distribution processing unit 30, and outputs the generated random number to the distribution processing unit 30 as an ID (Identification) of distributed data. In addition, the random number is temporarily stored in a RAM 70 shown in FIG. 55, or stored in an HDD 80 shown in FIG. 55.

The restoration processing unit 50 performs processing for restoring the original data OD on the basis of the restoration processing execution instruction output from the restoration processing request unit 20. The restoration processing unit 50 stores the restored original data OD in the address of the storage unit 3 indicated by the address information B1 (see below).

In addition, although the distribution and restoration apparatus 200 shown in FIG. 54 is configured to include the application 1, for example, the application 1 may be installed in other apparatuses without being installed in the distribution and restoration apparatus 200. In this case, the distribution and restoration apparatus 200 may perform the processing for generating the distributed data or the processing for restoring the original data OD on the basis of the distribution processing execution instruction or the restoration processing execution instruction transmitted from other apparatuses (for example, external storage devices 510, 520, and 530 shown in FIG. 56) connected through the network.

The storage unit 3 is formed using a hard disk or a flash memory built in the distribution and restoration apparatus 200, and stores the data acquired or generated by the distribution and restoration apparatus 200. The storage unit 3 stores the original data OD and the distributed data, for example. In addition, the application 1 is stored in the storage unit 3. For example, the storage unit 3 may also be formed using, an external storage medium (for example, a USB memory) connected through a USB (Universal Serial Bus) terminal, instead of a hard disk or a flash memory.

Figure 56:
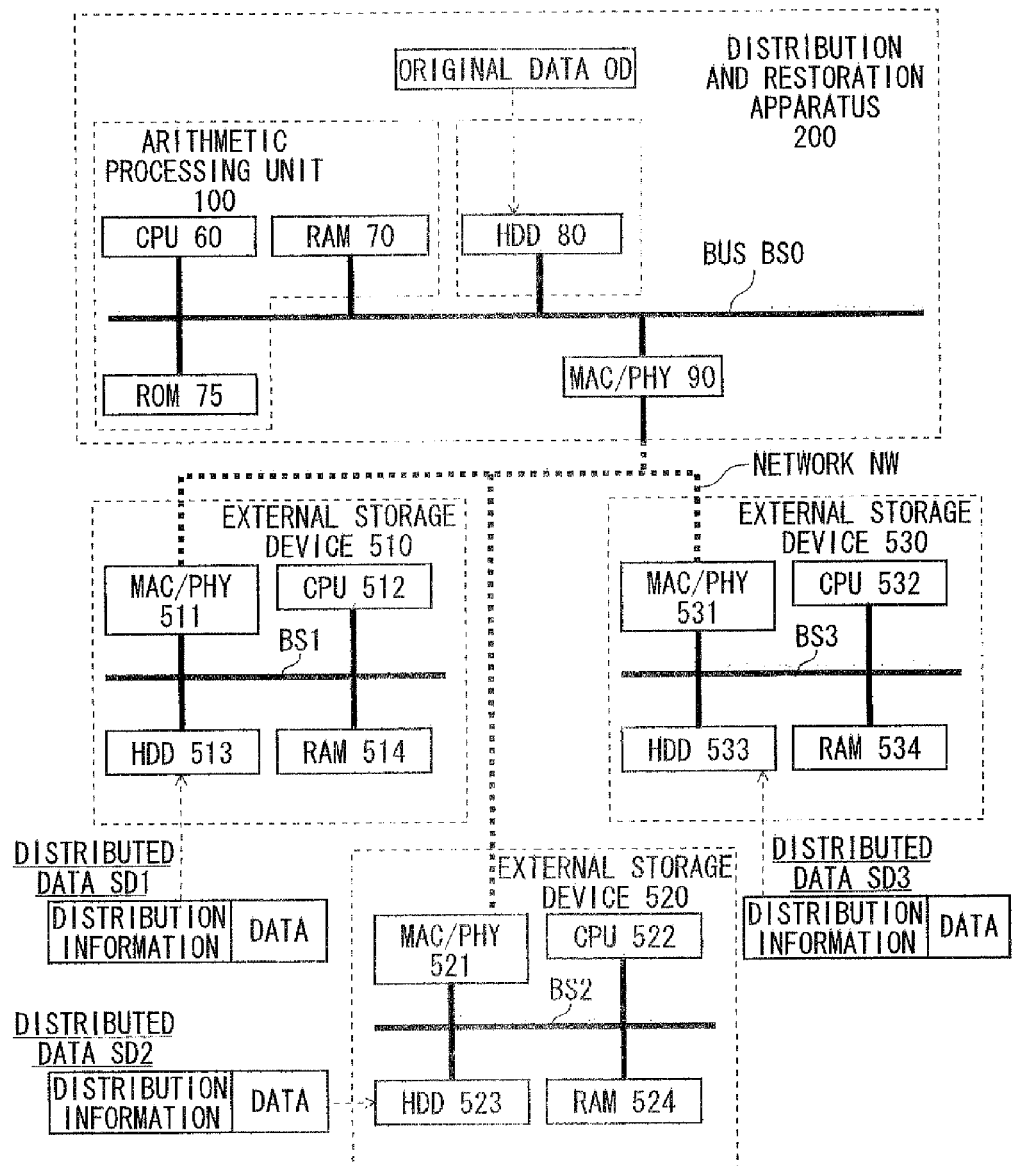
FIG. 56 is a block diagram showing the hardware configuration of a distribution and restoration system including a distribution and restoration apparatus.

In addition, although the distribution and restoration apparatus 200 shown in FIG. 54 is configured to include the storage unit 3, for example, the storage unit 3 may be provided in other apparatuses (for example, the external storage devices 510, 520, and 530 shown in FIG. 56) connected to the distribution and restoration apparatus 200 through the network, instead of being provided in the distribution and restoration apparatus 200.

In the following explanation, even if the application 1, the distribution and restoration module 2, and the storage unit 3 are provided in different apparatuses, explanation regarding the method of communication between apparatuses will be omitted in order to avoid complicating each operation.

In addition, in FIG. 54, the application 1 and the storage unit 3 shown above the distribution and restoration module 2 are shown to describe the method of generating the distributed data, and the application 1 and the storage unit 3 shown below the distribution and restoration module 2 are shown to describe the method of restoring the original data OD. However, the applications 1 and the storage units 3 shown above and below the distribution and restoration module 2 may be the same application and the same storage unit or may be different applications and different storage units.

(Outline of the Method of Generating Distributed Data)

First, the outline of the method of generating the distributed data will be described. In response to the user's input operation, the application 1 acquires the original data OD, which is an object of distribution processing, and stores it in the storage unit 3. In addition, the original data OD may be stored in the storage unit 3 in advance.

The distribution processing request unit 10 outputs to the distribution processing unit 30 the distribution condition information (see below) indicating the distribution conditions in distribution processing, the address information A1 indicating the address of the storage unit 3 in which the original data OD is stored, and the address information A2, A3, and A4 indicating the storage destination address of the generated distributed data. The distribution processing request unit 10 may generate the address information A1, A2, A3, and A4, or may acquire the address information A1, A2, A3, and A4 in response to the user's input operation.

The distribution condition information is information indicating the distribution condition used for the distribution and restoration apparatus 200 to perform distribution processing. For example, the distribution condition information is condition information of asymmetric distribution processing common to the first to thirteenth embodiments (see below). Here, as shown in FIGS. 1 and 2, as an example of distribution condition information, distribution condition information corresponding to the case of asymmetric distribution processing of one piece of original data OD to three pieces of distributed data will be described.

In addition, in FIG. 54, corresponding to the case where three pieces of distributed data are generated, the distribution processing request unit 10 generates or acquires the address information A1 indicating the storage destination of the original data OD and the address information A2, A3, and A4 indicating the storage destination of three pieces of distributed data. In addition, when the distribution and restoration apparatus 200 generates at least four or more pieces of distributed data, the distribution processing request unit 10 generates or acquires at least five or more pieces of address information including the address information A1 indicating the storage destinations of the original data OD.

The distribution processing unit 30 reads the original data OD from the storage destination address of the address information A1 output from the distribution processing request unit 10, and generates, for example, three pieces of distributed data SD1, SD2, and SD3 according to the distribution condition information.

Figure 57A:
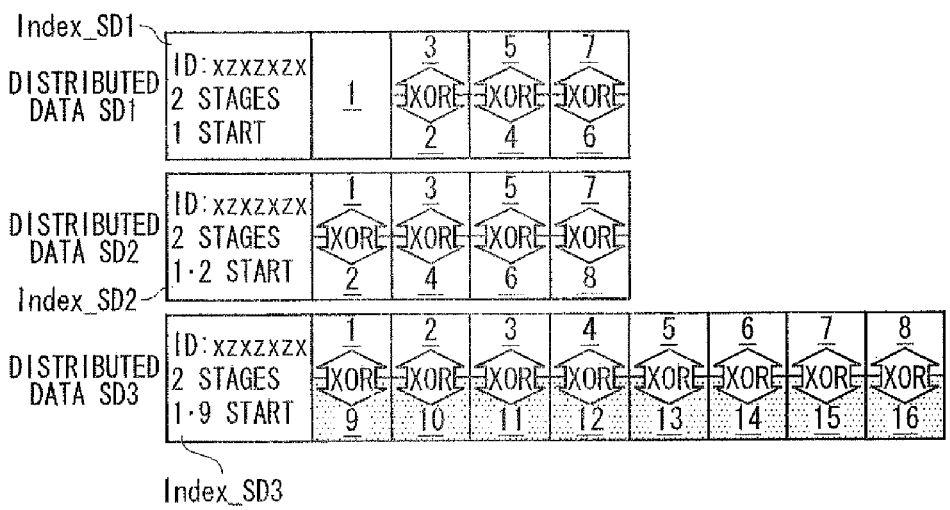
FIGS. 57A to 57C are explanatory views showing the content of distribution condition information for each piece of distributed data shown in FIG. 2 or 10, where
Figure 57B:
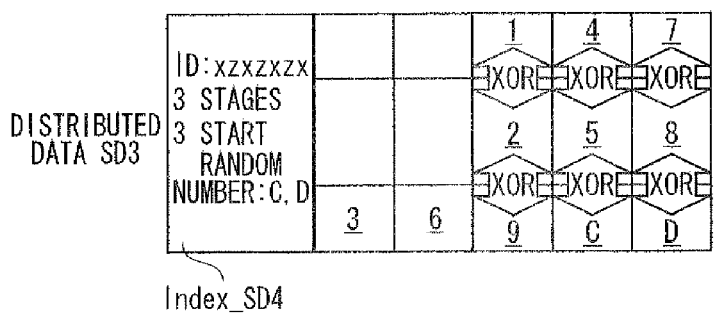
Figure 57C:
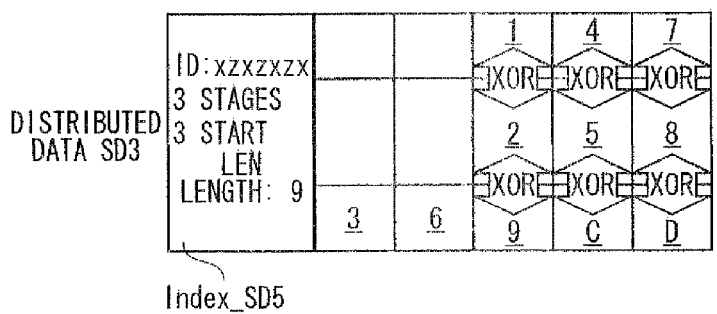

The distribution processing unit 30 makes the random number generation unit 40 generate a random number, which is to be used as an ID of each piece of distributed data, and adds the generated random number as an ID to the header of each piece of distributed data in the distribution condition information (refer to FIGS. 57A to 57C). The ID functions as an identification number of distributed data.

The distribution processing unit 30 stores the generated distributed data SD1, SD2, and SD3 in the storage destination address of the address information A2, A3, and A4 output from the distribution processing request unit 10. Here, in order to simplify explanation, all pieces of distributed data SD1, SD2, and SD3 are stored in the storage unit 3. However, in the actual use of the distribution and restoration apparatus 200, it is preferable to store the distributed data SD1 separately from the distributed data SD2 and SD3 (refer to FIG. 1).

(Outline of the Method of Restoring the Original Data OD)

Next, the outline of the method of restoring the original data OD will be described. In response to the user's input operation, the application 1 stores the plurality of pieces of distributed data SD1, SD2, and SD3, which are objects of distribution processing, in the storage unit 3. In addition, the distributed data SD1, SD2, and SD3 may be stored in the storage unit 3 in advance.

The restoration processing request unit 20 outputs to the restoration processing unit 50 the address information B1 indicating the storage destination address of the storage unit 3, in which the restored original data OD is stored, and the address information B2, B3, and B4 indicating the storage destination address of each piece of distributed data in the storage unit 3. The restoration processing request unit 20 may acquire the distribution condition information according to the user's input operation or set in advance, for example, from the storage unit 3 and generate the address information B1, B2, B3, and B4, or may acquire the address information B1, B2, B3, and B4 in response to the user's input operation.

The restoration processing unit 50 reads the distributed data from the storage destination address of the address information B2, B3, and B4 output from the restoration processing request unit 20, and restores, for example, one piece of original data OD according to the distribution condition information. The restoration processing unit 50 stores the restored original data OD in the storage destination address of the address information B1 output from the restoration processing request unit 20.

Hardware Configuration of the Distribution and Restoration Apparatus Common to Each Embodiment FIG. 55 is a block diagram showing the hardware configuration of the distribution and restoration apparatus 200. Here, an example will be described in which the application 1, the distribution and restoration module 2, and the storage unit 3 shown in FIG. 54 operate in the same distribution and restoration apparatus 200.

The distribution and restoration apparatus 200 shown in FIG. 55 is configured to include a CPU (Central Processing Unit) 60, a RAM (Random Access Memory) 70 as a work memory of the CPU 60, a ROM (Read Only Memory) 75 which is a non-rewritable nonvolatile memory, an HDD (hard disk) 80 which is a rewritable nonvolatile memory, and a MAC/PHY (Media Access Control/Physical Layer) 90 as a communication control unit.

In the distribution and restoration apparatus 200 shown in FIG. 55, the CPU 60, the RAM 70, the ROM 75, the HDD 80, and the MAC/PHY 90 are connected to each other through a bus BS0 so that the input and output of data therebetween are possible.

The arithmetic processing unit 100 shown in FIG. 54 corresponds to the CPU 60, the RAM 70, and the ROM 75 shown in FIG. 55. The storage unit 3 shown in FIG. 54 corresponds to the HDD 80 shown in FIG. 55. For this reason, the pieces of address information A1, A2, A3, A4, B1, B2, B3, and B4 may be called folder names or file names. In addition, for example, the original data OD may be stored in ROM 75 instead of the HDD 80.

The MAC/PHY 90 functions as a communication control unit in the distribution and restoration apparatus 200. For example, the MAC/PHY 90 transmits the distributed data generated by the CPU 60 to other apparatuses (for example, the external storage devices 510, 520, and 530 shown in FIG. 56) connected to the distribution and restoration apparatus 200 through a network NW.

Hardware Configuration of the Distribution and Restoration System Including the Distribution and Restoration Apparatus Common to Each Embodiment FIG. 56 is a block diagram showing the hardware configuration of a distribution and restoration system 1000 including the distribution and restoration apparatus 200. Here, an example will be described in which the distribution and restoration apparatus 200, in which the application 1 and the distribution and restoration module 2 shown in FIG. 54 operate, and an apparatus, in which the storage unit 3 shown in FIG. 54 is provided, are different. In addition, in the distribution and restoration system 1000 shown in FIG. 56, it is assumed that the original data OD is stored in the HDD 80 of the distribution and restoration apparatus 200 in which the distribution and restoration module 2 operates.

The distribution and restoration system 1000 shown in FIG. 56 includes the distribution and restoration apparatus 200 and the external storage devices 510, 520, and 530 connected to the distribution and restoration apparatus 200 through the network NW. For example, the external storage devices 510, 520, and 530 are server devices, and store the distributed data SD1, SD2, and SD3, respectively. That is, in the distribution and restoration system 1000 shown in FIG. 56, the distribution and restoration apparatus 200 stores the distributed data SD1 in the external storage device 510, stores the distributed data SD2 in the external storage device 520, and stores the distributed data SD3 in the external storage device 530.

However, the external storage device 510 may store the distributed data SD1 and SD2. The external storage device 520 may store the distributed data SD2 and SD3. Similarly, the external storage device 530 may store the distributed data SD1 and SD3. In this manner, since one external storage device that stores distributed data can be omitted in the distribution and restoration system 1000, the management of distributed data can be simplified.

The reason why the respective pieces of distributed data SD1, SD2, and SD3 are stored in the different external storage devices 510, 520, and 530 as described above is to prevent unauthorized restoration processing on original data by third parties. For example, if the administrators of the external storage devices 510, 520, and 530 are different persons, the management of original data is also safe since the original data cannot be restored with only one administrator's authority.

For example, when the distribution and restoration apparatus 200 uses a cloud computing technology, if all pieces of distributed data are stored in a specific external storage device (for example, the external storage device 510) of one company, there is a possibility that the original data will be restored in response to the input operation of the administrator of the external storage device 510. Hereinafter, the computer using a cloud computing technology is called a "cloud computer". It is possible to reduce the possibility of restoration of original data by using the distribution and restoration system 1000 shown in FIG. 56.

Currently, the cloud computer is highly evaluated due to its cheapness and ease, but the content of data may be intercepted. In particular, in the security-requested business, the use of the cloud computer does not progress. Therefore, the cloud computer can be safely used by using the distribution and restoration system 1000 shown in FIG. 56.

The distribution and restoration apparatus 200 in which that application 1 and the distribution and restoration module 2 operate includes the CPU 60, the RAM 70, the ROM 75, the HDD 80, and the MAC/PHY 90. In the distribution and restoration apparatus 200 shown in FIG. 56, the CPU 60, the RAM 70, the ROM 75, the HDD 80, and the MAC/PHY 90 are connected to each other through the bus BS0 so that the input and output of data therebetween are possible.

The arithmetic processing unit 100 shown in FIG. 54 corresponds to the CPU 60, the RAM 70, and the ROM 75 shown in FIG. 56. The storage destination of the original data OD is the HDD 80. For this reason, the pieces of address information A1 and B1 may be called folder names or file names.

The MAC/PHY 90 is formed using a wired or wireless communication circuit, and controls communication between the distribution and restoration apparatus 200 and the external storage devices 510, 520, and 530 connected to the distribution and restoration apparatus 200 through the network NW.

The external storage device 510 includes a MAC/PHY 511, a CPU 512, an HDD 513, and a RAM 514. In the external storage device 510, the MAC/PHY 511, the CPU 512, the HDD 513, and the RAM 514 are connected to each other through a bus BS1 so that the input and output of data therebetween are possible.

The CPU 512 performs access to the MAC/PHY 511 or the HDD 513, and performs overall control of the external storage device 510. The MAC/PHY 511 controls communication between the CPU 512 and the distribution and restoration apparatus 200 through the network NW. The HDD 513 stores the distributed data SD1 generated by the distribution and restoration apparatus 200.

The external storage device 520 includes a MAC/PHY 521, a CPU 522, an HDD 523, and a RAM 524. In the external storage device 520, the MAC/PHY 521, the CPU 522, the HDD 523, and the RAM 524 are connected to each other through a bus BS2 so that the input and output of data therebetween are possible.

The CPU 522 performs access to the MAC/PHY 521 or the HDD 523, and performs overall control of the external storage device 520. The MAC/PHY 521 controls communication between the CPU 522 and the distribution and restoration apparatus 200 through the network NW. The HDD 523 stores the distributed data SD2 generated by the distribution and restoration apparatus 200.

The external storage device 530 includes a MAC/PHY 531, a CPU 532, ID an HDD 533, and a RAM 534. In the external storage device 530, the MAC/PHY 531, the CPU 532, the HDD 533, and the RAM 534 are connected to each other through a bus BS3 so that the input and output of data therebetween are possible.

The CPU 532 performs access to the MAC/PHY 531 or the HDD 533, and performs overall control of the external storage device 530. The MAC/PHY 531 controls communication between the CPU 532 and the distribution and restoration apparatus 200 through the network NW. The HDD 533 stores the distributed data SD3 generated by the distribution and restoration apparatus 200.

Thus, the storage destinations of the distributed data SD1, SD2, and SD3 are the HDDs 513, 523, and 533 of the external storage devices 510, 520, and 530 that are different from those in the distribution and restoration apparatus 200 in which the distribution and restoration module 2 operates. For this reason, the pieces of address information A2, A3, A4, B2, B3, and B4 may be called folder names, file names, or URL (Uniform Resource Locator) in the network NW.

In addition, although the distributed data SD1, SD2, and SD3 is stored in the HDDs 513, 523, and 533 in the external storage devices 510, 520, and 530, they may be stored in a flash memory, the RAMs 514, 524, and 534, or a ROM (not shown), for example.

In FIG. 56, the MAC/PHY 90 calculates and acquires the communication speed of communication between the distribution and restoration apparatus 200 and the other external storage devices 510, 520, and 530, and outputs the information of the calculated communication speed to the CPU 60.

The CPU 60 (for example, the distribution processing unit 30) calculates and acquires the reading speed or writing speed of data with respect to the HDD 80 (storage unit 3), and compares the calculated reading speed or writing speed with the communication speed.

When it is determined that the value of the reading speed or writing speed is larger than the value of communication speed, the CPU 60 (for example, the distribution processing unit 30) determines that distributed data having a small data size (for example, the distributed data SD1) among the pieces of distributed data SD1, SD2, and SD3 is to be stored in one of the other external storage devices 510, 520, and 530, and determines that distributed data having a large data size (for example, the distributed data SD2 and SD3) is to be stored in the HDD 80 (storage unit 3).

The CPU 60 (for example, the distribution processing unit 30) outputs the distributed data having a small data size (for example, the distributed data SD1) to the MAC/PHY 90. The MAC/PHY 90 transmits the distributed data (for example, the distributed data SD1) output from the CPU 60 to another external storage device (for example, the external storage device 510) so that the distributed data is stored therein.

The CPU 60 (for example, the distribution processing unit 30) stores the distributed data having a large data size (for example, the distributed data SD2 and SD3) in the HDD 80 (storage unit 3).

Therefore, since the distribution and restoration apparatus 200 can generate the pieces of distributed data having asymmetric data sizes, distributed data having a small data size is stored in the HDD (for example, the HDD 513) of the external storage device (for example, the external storage device 510) having a small value in communication speed, that is, slow communication time, and distributed data having a large data size is stored in the HDD 80 of the distribution and restoration apparatus 200 having a large value in reading speed or writing speed.

In this manner, the distribution and restoration system 1000 can improve the processing speed in the distribution and restoration system 1000. In addition, as an example of actual use, it is preferable to store the distributed data having a large data size in the HDD 80 of the distribution and restoration apparatus 200 and store the distributed data having a small data size in the HDD of the external storage device (for example, the external storage device 510) in that it is possible to reduce the occurrence of communication delay between the distribution and restoration apparatus 200 and other external storage devices 510, 520, and 530.

(Distribution Condition Information)

Figure 10:
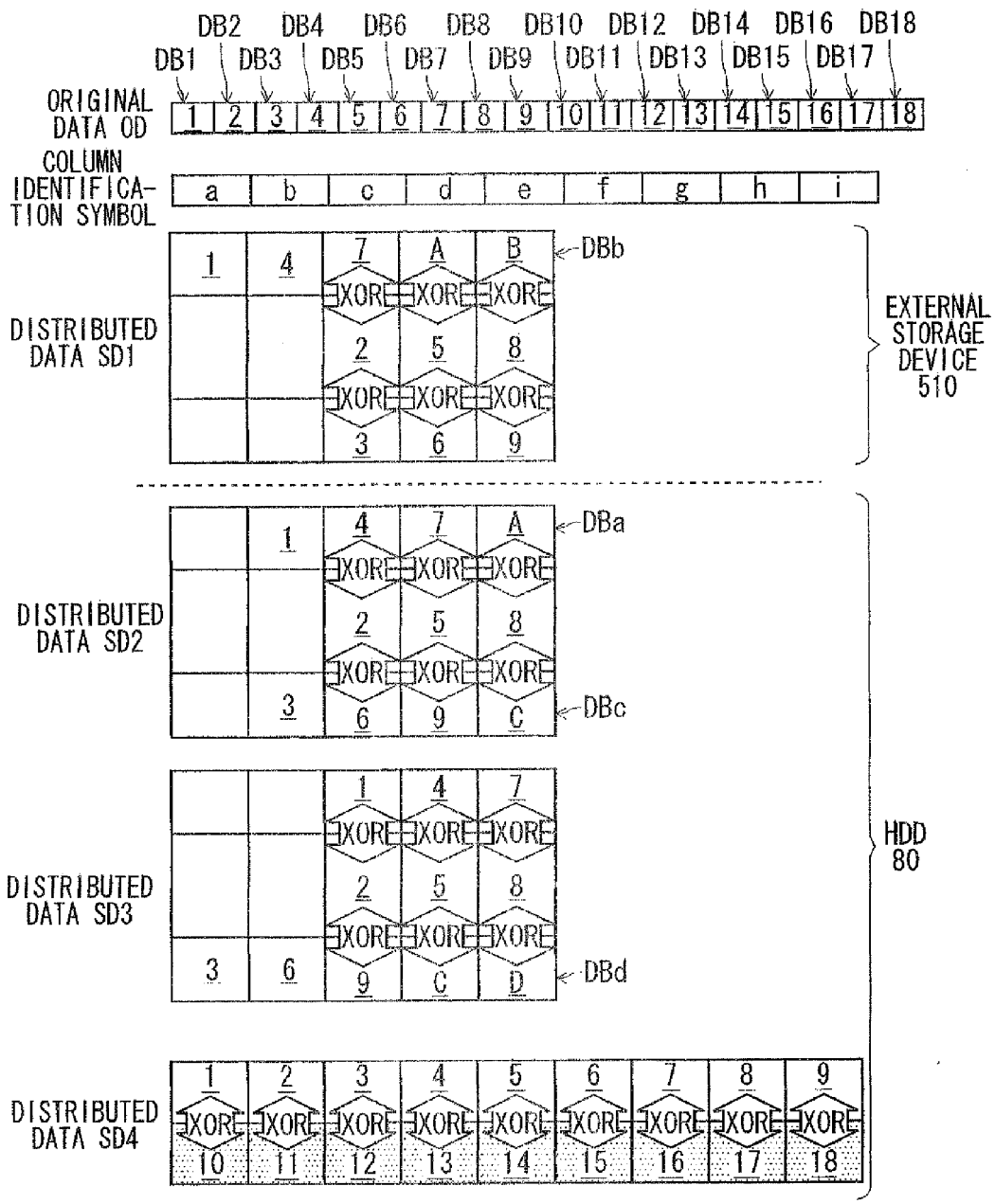
FIG. 10 is an explanatory view showing the content of the distributed data in the third embodiment.

FIGS. 57A to 57C are explanatory views showing the content of distribution condition information Index_SD1, Index_SD2, Index_SD3, Index_SD4, and Index_SD5 for each piece of distributed data SD1, SD2, and SD3 shown in FIG. 2 or 10. FIG. 57A is basic distribution condition information for the distributed data SD1, SD2, and SD3 shown in FIG. 2. FIG. 57B is the distribution condition information Index_SD4 when the distributed data SD3 shown in FIG. 10 is generated using a divided block and a random number. FIG. 57C is the distribution condition information Index_SD5 when the information of the number of divided blocks used to generate the distributed data SD3 shown in FIG. 10 is included. In each explanation of FIGS. 57A, 57B, and 57C, explanation of the configuration of each piece of distributed data will be omitted, and details thereof will be described later.

The distribution processing unit 30 generates, for example, three pieces of distributed data SD1, SD2, and SD3 and then adds the distribution condition information to each header unit of the pieces of distributed data SD1, SD2, and SD3. Here, the distribution condition information included in the distribution processing execution instruction output from the distribution processing request unit 10 is information indicating that the distributed data has been generated using which kind of distribution method or information indicating that restoration processing is to be performed using which kind of restoration method, and explanation of the specific distribution processing and restoration processing in each embodiment will be described later. In addition, the distribution condition information includes attribution information of distributed data. The attribution information is the number of stages corresponding to the combination of the ID of distributed data and divided blocks used when generating the distributed data, for example.

For example, in the generation of [distribution (2) a] of the distributed data SD2 (refer to FIG. 2) shown in FIG. 57A, columns 1 and 2 of the original data OD are used, and a 2-stage (2-row) convolution operation on the original data OD is performed. For this reason, the distribution condition information Index_SD2 includes "2 stages (rows)" and "1·2 start" as conditions for generating the distributed data SD2 shown in FIG. 57A. "1·2 start" indicates that [distribution (2) a] corresponding to the first column a of the distributed data SD2 is a data block subjected to XOR processing of the columns 1 and 2.

Similarly, only the column 1 of the original data OD is used in the generation of [distribution (1) a] of the distributed data SD1 (refer to FIG. 2) shown in FIG. 57A, and columns 2 and 3 of the original data OD are used and a 2-stage (2-row) convolution operation on the original data OD is performed in the generation of [distribution (1) b]. For this reason, the distribution condition information Index_SD1 includes "2 stages (rows)" and "1 start" as conditions for generating the distributed data SD1 shown in FIG. 57A.

Similarly, in the generation of [distribution (1) a] of the distributed data SD3 (refer to FIG. 2) shown in FIG. 57A, columns 1 and 9 of the original data OD are used, and a 2-stage (2-row) convolution operation on the original data OD is performed. For this reason, the distribution condition information Index_SD3 includes "2 stages (rows)" and "1·9 start" as conditions for generating the distributed data SD3 shown in FIG. 57A.

By adding such distribution condition information, the restoration processing unit 50 can see which kind of restoration processing is to be selected when restoring the original data OD.

In addition, an ID as identification information may also be added to the distribution condition information. In this case, when restoring the original data OD, the restoration processing unit 50 can select the correct distributed data to restore the original data OD without selecting the wrong distributed data.

For example, when the common ID is given to all pieces of distributed data generated from the same original data OD, the restoration processing unit 50 can determine whether or not the original data OD can be restored before the start of restoration processing by determining the ID of the distribution condition information when restoring the original data OD. When the restoration processing unit 50 determines that at least one ID of the distribution condition information in all pieces of distributed data is different, the restoration processing is not possible. Accordingly, it is not necessary to perform restoration processing uselessly. In addition, the restoration processing unit 50 can guarantee that the restoration processing result is the correct original data OD by using the ID for the distribution condition information.

In addition, a serial number generated whenever distributed data is generated or a random number generated by the random number generation unit 40 may be used as the ID.

In addition, although the case has been described in which a common ID is given to all pieces of distributed data generated from the same original data OD, the method for indicating the distributed data generated from the same original data is not limited to this. For example, the distribution processing unit 30 may use a point on the straight line of an appropriate linear function as an ID. For example, the distribution processing unit 30 may use a function value (y value), which is obtained by operation between the specific linear function (which is not limited to the linear function) and an appropriate random number (X value), as an ID instead of the common ID.

In addition, although the restoration processing unit 50 determines whether or not the original data OD can be restored on the basis of the ID included in the distribution condition information, it is also possible to determine whether or not correct restoration processing is possible, for example, according to whether or not the presence of additional information (for example, a mark) provided in the original data OD can be confirmed as a result of restoration processing by the restoration processing unit 50.

In addition, although the distribution condition information is added to the header unit in the explanation of FIGS. 57A to 57C, the distribution condition information may be added to any location of distributed data (for example, an end portion of distributed data), or the distribution condition information and the distributed data may be stored as separate files such that the file of the distributed data and the file of the distribution condition information are associated with each other.

In addition, for example, the distribution condition information Index_SD1 is "ID: xzxzxzx, 2 stages, 1 start". However, there are various description methods of distribution condition information, and the description method is not limited to the description method shown in FIG. 57A. For example, the distribution condition information may be described using an ASCII character string, or may be described using a special command or a special identifier.

In addition, for example, only the column 3 of the original data OD is used in the generation of [distribution (3) a] of the distributed data SD3 (refer to FIG. 3) shown in FIG. 57B, only the column 6 of the original data OD is used in the generation of [distribution (3) b], and columns 1, 2, and 9 of the original data OD is used and a 3-stage (3-row) convolution operation on the original data OD is performed in the generation of [distribution (3)].

In addition, in the generation of [distribution (3) d] of the distributed data SD3 (refer to FIG. 3) shown in FIG. 57B, columns 4 and 5 of the original data OD and a random number C (for example, generated by the random number generation unit 40) are used. In addition, in the generation of [distribution (3) e] of the distributed data SD3 (refer to FIG. 3) shown in the same drawing, columns 7 and 8 of the original data OD and a random number D (for example, generated by the random number generation unit 40) are used. In addition, since the distribution processing unit 30 generates distributed data using the random numbers C and D generated by the random number generation unit 40, it is possible to improve the security of the distributed data SD3 shown in FIG. 57B.

For this reason, the distribution condition information Index_SD4 includes "3 stages (rows)", "3 start", and "random numbers C and D" as conditions for generating the distributed data SD3 shown in FIG. 57B.

In addition, the distribution condition information may also include the LEN length that is the information of the total number of divided blocks used to generate distributed data. For example, in the distributed data SD3 shown in FIG. 57C, the total number of divided blocks used to generate the distributed data SD3 is "9". Accordingly, the distribution condition information Index_SD5 includes "3 stages (rows)", "3 start", and "LEN length: 9" as conditions for generating the distributed data S03 shown in FIG. 57C. In addition, the distribution condition information Index_SD5 shown in FIG. 57C may also include the information of "random number: C, D" including the random numbers C and D used to generate the distributed data SD3 shown in the same drawing.

Hereinafter, various embodiments of the above-described distribution and restoration apparatus 200 will be described with reference to the drawings. In addition, the present invention may also be expressed as a distribution apparatus and a restoration apparatus corresponding to the distribution and restoration apparatus 200 as an apparatus or expressed as a program causing the distribution and restoration apparatus 200 to operate as a computer. In addition, the present invention may also be expressed as each distribution method or restoration method performed by the distribution and restoration apparatus 200. In addition, the present invention may also be expressed as the distribution and restoration system 1000 shown in FIG. 56. That is, the present invention can be expressed in any category of an apparatus, a method, a program, and a system.

In each embodiment below, distribution processing for generating a plurality of pieces of distributed data from the original data OD and restoration processing for restoring the original data OD from all of the plurality of pieces of distributed data, which are performed by the distribution and restoration apparatus 200 having the functional configuration shown in FIG. 54, will be described.

First Embodiment

Figure 3:
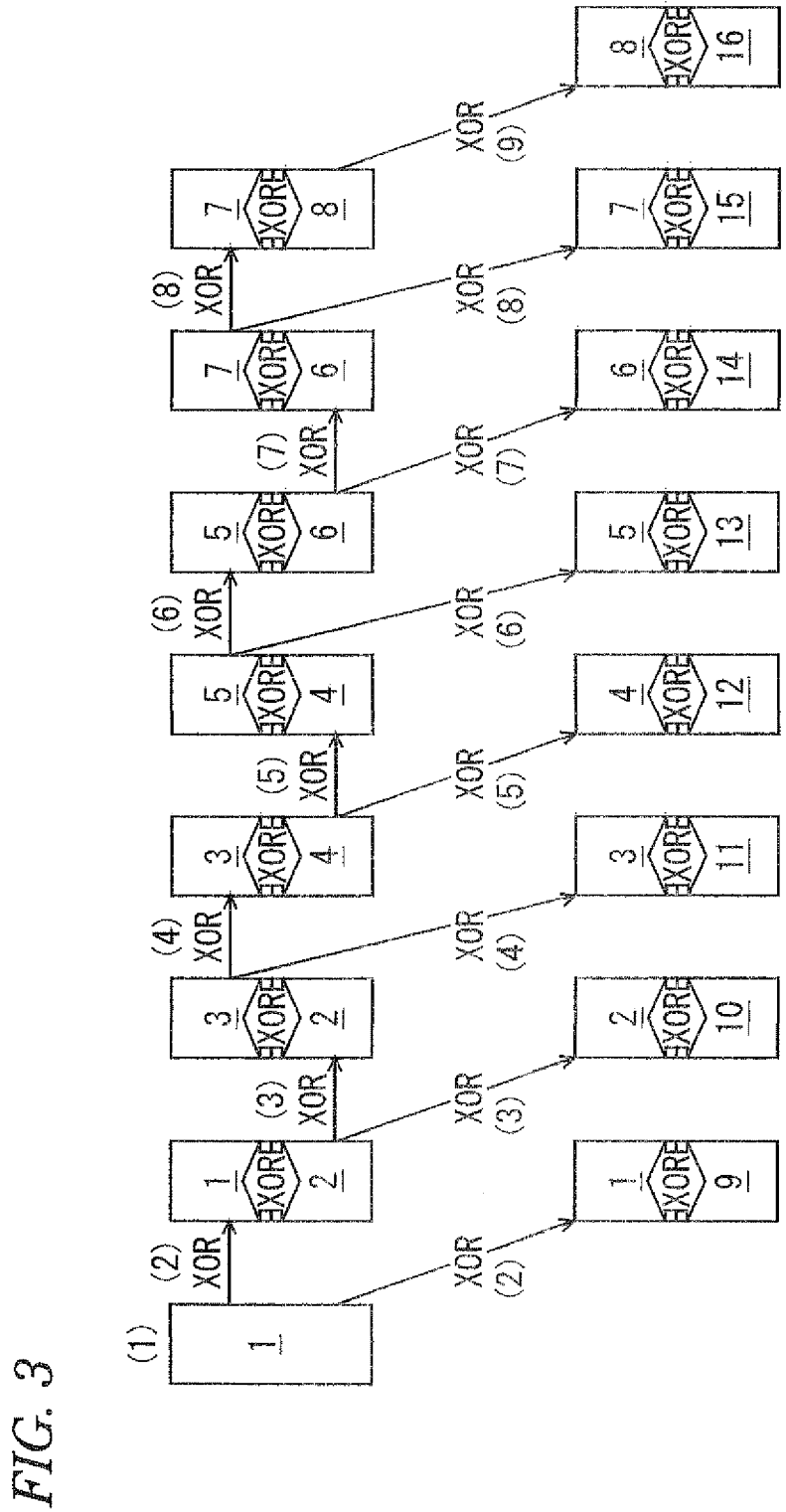
FIG. 3 is an explanatory view showing the flow to obtain each divided block of original data by XOR processing between pieces of distributed data in the first embodiment.
Figure 4:
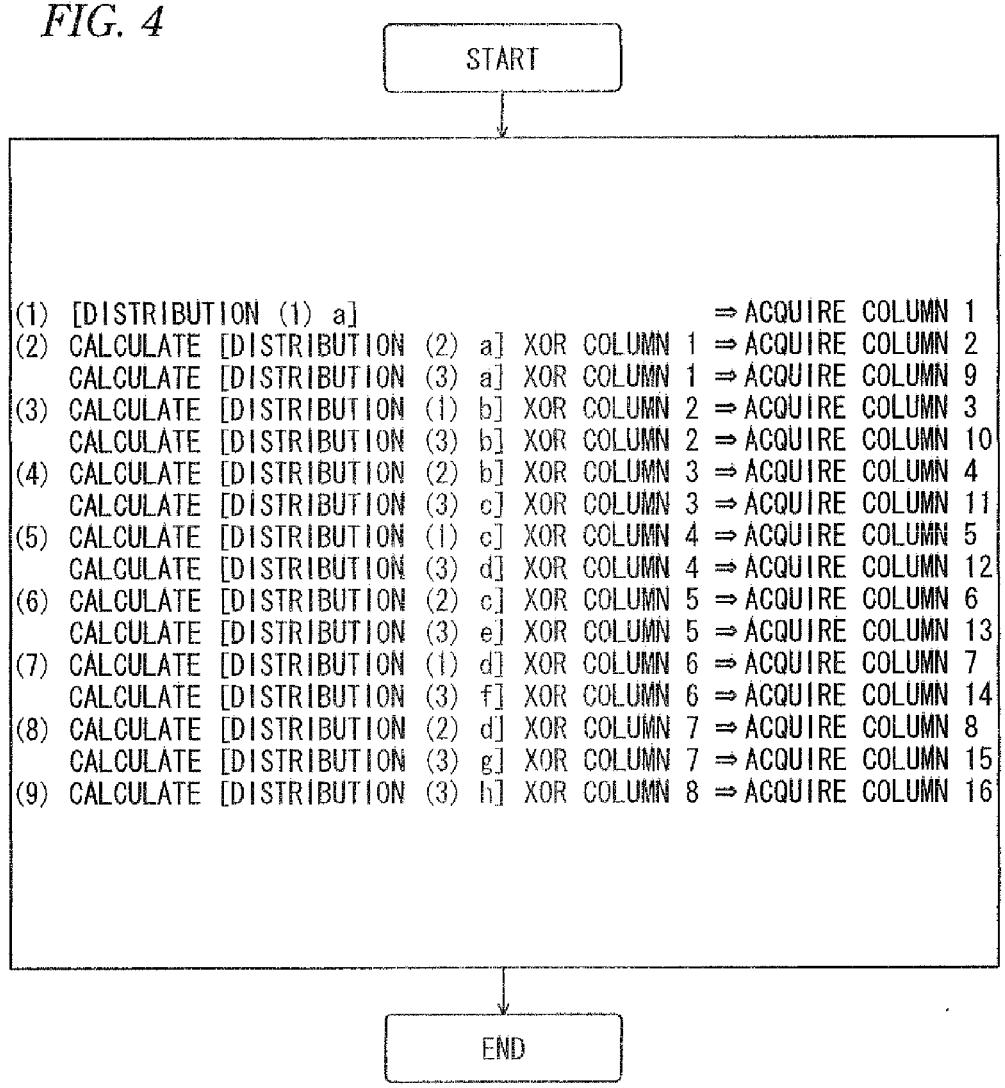
FIG. 4 is a flow chart illustrating the operation procedure in the first embodiment.

First, a first embodiment of the distribution and restoration apparatus 200 will be described with reference to FIG. 1 to 4. FIG. 1 is an explanatory view showing an example of a method of generating the distributed data in the first embodiment. FIG. 2 is an explanatory view showing the content of distributed data in the first embodiment. FIG. 3 is an explanatory view showing the flow to obtain each divided block of original data by XOR processing of pieces of distributed data in the first embodiment. FIG. 4 is a flow chart illustrating the operation procedure in the first embodiment.

In the first embodiment, a method of generating a total of three pieces of distributed data SD1, SD2, and SD3, each of which has a smaller data size than the data size of the original data OR from the original data OD and a method of restoring the original data OD using three pieces of distributed data SD1, SD2, and SD3 will be described.

For example, the distribution and restoration apparatus 200 stores the distributed data SD1 in the external storage device 510 and stores the distributed data SD2 and SD3 in the HDD 80. In this manner, the distribution and restoration apparatus 200 distributes three pieces of distributed data SD1 SD2, and SD3 asymmetrically in the external storage device 510 and the HDD 80, for example.

In the first embodiment, as shown in FIGS. 1 and 2, the original data OD is configured to include a total of sixteen divided blocks DB1 to DB16 connected in order. In addition, although the original data OD is configured to include a total of sixteen divided blocks DB1 to DB16 in order to simplify explanation in the first embodiment, the number of divided blocks that form the original data OD is not limited to 16.

Configuration of Distributed Data in the First Embodiment

The configuration of distributed data in the first embodiment will be described with reference to FIGS. 1 and 2. In the distributed data SD1 shown in FIGS. 1 and 2, [distribution (1) a] is a divided block DB1 of the column 1, [distribution (1) b] is an XOR-processed value of the divided block DB2 of the column 2 and the divided block DB3 of the column 3, [distribution (1) c] is an XOR-processed value of the divided block DB4 of the column 4 and the divided block DB5 of the column 5, and [distribution (1) d] is an XOR-processed value of the divided block DB6 of the column 6 and the divided block DB7 of the column 7.

Therefore, the distributed data SD1 has a configuration in which four columns [distribution (1) a], [distribution (1) b], [distribution (1) c], and [distribution (1) d] are connected in order.

Thus, the distributed data SD1 is formed by performing 2-stage convolution of the data of divided blocks corresponding to the data size of the half of the original data OD by XOR processing. Accordingly, the number of blocks (columns) of the distributed data SD1 is 4, which is ¼ of 16 that is the number of blocks (columns) of the original data OD.

Then, in the distributed data SD2 shown in FIGS. 1 and 2, [distribution (2) a] is an XOR-processed value of the divided block DB1 of the column 1 and the divided block DB2 of the column 2, [distribution (2) b] is an XOR-processed value of the divided block DB3 of the column 3 and the divided block DB4 of the column 4, [distribution (2) c] is an XOR-processed value of the divided block DB5 of the column 5 and the divided block DB6 of the column 6, and [distribution (2) d] is an XOR-processed value of the divided block DB7 of the column 7 and the divided block DB8 of the column 8.

Therefore, the distributed data SD2 has a configuration in which four columns [distribution (2) a], [distribution (2) b], [distribution (2) c], and [distribution (2) d] are connected in order.

Thus, the distributed data SD2 is formed by performing 2-stage convolution of the data of divided blocks corresponding to the data size of the half of the original data OD by XOR processing. Accordingly, the number of blocks (columns) of the distributed data SD2 is 4, which is ¼ of 16 that is the number of blocks (columns) of the original data OD.

Similarly, in the distributed data SD3 shown in FIGS. 1 and 2, [distribution (3) a] is an XOR-processed value of the divided block DB1 of the column 1 and the divided block DB9 of the column 9, [distribution (3) b] is an XOR-processed value of the divided block DB2 of the column 2 and the divided block DB10 of the column 10, [distribution (3) c] is an XOR-processed value of the divided block DB3 of the column 3 and the divided block DB11 of the column 11, [distribution (3) d] is an XOR-processed value of the divided block DB4 of the column 4 and the divided block DB12 of the column 12, [distribution (3) e] is an XOR-processed value of the divided block DB5 of the column 5 and the divided block DB13 of the column 13, [distribution (3) f] is an XOR-processed value of the divided block DB6 of the column 6 and the divided block DB14 of the column 14, [distribution (3) g] is an XOR-processed value of the divided block DB7 of the column 7 and the divided block DB15 of the column 15, and [distribution (3) h] is an XOR-processed value of the divided block DB8 of the column 8 and the divided block DB16 of the column 16.

Therefore, the distributed data SD3 has a configuration in which eight columns [distribution (3) a], [distribution (3) b], [distribution (3) c], [distribution (3) d], [distribution (3) e], [distribution (3) f], [distribution (3) g], and [distribution (3) h] are connected in order.

Thus, the distributed data SD3 is formed by performing 2-stage convolution of the data of divided blocks corresponding to the data size of the original data OD by XOR processing. Accordingly, the number of blocks (columns) of the distributed data SD1 is 8, which is ½ of 16 that is the number of blocks (columns) of the original data OD.

Method of Generating Distributed Data in the First Embodiment

A specific method of generating the distributed data SD1 SD2, and SD3 in the first embodiment will be described with reference to FIGS. 1 and 2. First, the distribution and restoration apparatus 200 divides the original data OD equally into two pieces of data. However, the distribution and restoration apparatus 200 may divide the original data OD equally into three or more pieces of data (refer to the second embodiment). For example, the distribution and restoration apparatus 200 divides the original data OD including a total of sixteen divided blocks DB1 to DB16 equally into data of the columns 1 to 8 and data of the columns 9 to 16.

The distribution and restoration apparatus 200 performs XOR processing of the data of one of the columns 1 to 8 and the data of one of the columns 9 to 16 and connects a total of eight XOR-processed pieces of data to generate the distributed data SD3.

For example, as shown in FIGS. 1 and 2, the distribution and restoration apparatus 200 generates the distributed data SD3 by connecting in order the XOR-processed data of the columns 1 and 9, the XOR-processed data of the columns 2 and 10, the XOR-processed data of the columns 3 and 11, the XOR-processed data of the columns 4 and 12, the XOR-processed data of the columns 5 and 13, the XOR-processed data of the columns 6 and 14, the XOR-processed data of the columns 7 and 15, and the XOR-processed data of the columns 8 and 16.

Then, the distribution and restoration apparatus 200 selects a combination of columns of either the data of the columns 1 to 8 or the data of the columns 9 to 16 used in XOR processing when generating the distributed data SD3. Here, in order to simplify explanation, the distribution and restoration apparatus 200 selects the data of the columns 1 to 8 as a combination of columns. However, the distribution and restoration apparatus 200 may select one piece of the data of two columns to be subjected to XOR processing when generating the distributed data SD3. For example, data of the columns 1, 10, 3, 4, 13, 6, 7, and 16 may be selected.

The distribution and restoration apparatus 200 generates two pieces of distributed data SD1 and SD2 by performing distribution processing on the combination of selected columns according to the secret sharing scheme disclosed in Japanese Patent Application No. 2011-077630 of this inventor. By the distribution processing according to the secret sharing scheme disclosed in Japanese Patent Application No. 2011-077630, the combination of columns selected by the distribution and restoration apparatus 200 (for example, the columns 1 to 8), between the pieces of data of the columns 1 to 8 and the columns 9 to 16 used in XOR processing when generating the distributed data SD3, is XOR-processed by different combinations. As a result, two pieces of distributed data SD1 and SD2 are generated.

Specifically, for example, when a combination of the columns 1 to 8 is selected, the distribution and restoration apparatus 200 uses only the column 1 for [distribution (1) a], uses an XOR-processed value of the columns 2 and 3 for [distribution (1) b], uses an XOR-processed value of the columns 4 and 5 for [distribution (1) c], and uses an XOR-processed value of the columns 6 and 7 for [distribution (1) d], and connects [distribution (1) a], [distribution (1) b], [distribution (1) c], and [distribution (1) d] in order to generate the distributed data SD1.

In addition, the distribution and restoration apparatus 200 generates the distributed data SD2 by shifting the even-numbered columns 2, 4, and 6, which are shown in the lower part of the distributed data SD1, by one column leftward with respect to the generated distributed data SD1. Therefore, when generating the distributed data SD2, the distribution and restoration apparatus 200 uses the data of the column 8, which is not used when generating the distributed data SD1, in XOR processing with the column 7.

In addition, the distribution and restoration apparatus 200 may generate the distributed data SD2 ahead of the distributed data SD1. Specifically, for example, when a combination of the columns 1 to 8 is selected, the distribution and restoration apparatus 200 uses an XOR-processed value of the columns 1 and 2 for [distribution (2) a], uses an XOR-processed value of the columns 3 and 4 for [distribution (2) b], uses an XOR-processed value of the columns 5 and 6 for [distribution (2) c], and uses an XOR-processed value of the columns 7 and 8 for [distribution (2) d], and connects [distribution (2) a], [distribution (2) b], [distribution (2) c], and [distribution (2) d] in order to generate the distributed data SD2.

In addition, the distribution and restoration apparatus 200 generates the distributed data SD1 by shifting even-numbered columns 2, 4, 6, and 8, which are shown in the lower part of the distributed data SD2, by one column rightward with respect to the generated distributed data SD2. Therefore, when generating the distributed data SD1, the distribution and restoration apparatus 200 uses only the single column 1 for [distribution (1) a] without using the data of the column 8 used when generating the distributed data SD2.

Thus, when the distribution and restoration apparatus 200 generates distributed data, the information (content) of original data can be made to be missing in the distributed data by performing 2-stage (2-row) convolution processing (XOR processing) on the data of divided blocks of the original data OD. In this manner, the distribution and restoration apparatus 200 can generate distributed data that can prevent the restoration of the original data OD from either the distributed data SD1 or the distributed data SD2 and SD3.

In addition, as the rate of the asymmetric distribution in the first embodiment, as shown in FIG. 2, the data size of the distributed data SD1 stored in the external storage device 510 is ¼ of the data size of the original data OD, and the data size of the distributed data SD2 and SD3 stored in the HDD 80 is ¾ (¼+½) of the data size of the original data OD. Accordingly, the distribution and restoration apparatus 200 can generate distributed data having asymmetric data sizes of 1:3 for the external storage device 510 and the HDD 80.

In addition, the total data size of the distributed data SD1, SD2, and SD3 is the same as the data size of the original data OD.

In addition, in respective embodiments including the present embodiment, there is no special meaning in column numbers of the original data OD arranged in respective columns (refer to FIG. 1 or 2) of the distributed data SD1, SD2, and SD3 described above. For example, the distribution and restoration apparatus 200 may generate the distributed data SD1 and SD2 using only the odd-numbered columns of the original data OD, and may generate the distributed data SD3 by arranging the odd-numbered columns in the upper part and the even-numbered columns in the lower part and performing XOR processing of respective columns. That is, the arrangement of columns of the original data OD used when the distribution and restoration apparatus 200 generates each piece of distributed data is arbitrary.

In addition, in the following explanation, in order to avoid complicating the explanation, explanation of data processing on the original data OD is omitted. However, in all drawings showing the original data, it does not matter which kind of data processing has been performed to obtain the original data OD or which kind of data processing has been performed on the original data OD in order to obtain certain data.

Therefore, the information entropy of the generated distributed data is increased by canceling the information (content) of the original data OD using the original data OD and the XOR processing in the distribution and restoration apparatus 200 in the first embodiment. For this reason, the distribution and restoration apparatus 200 can make it difficult to restore the original data OD from distributed data less than the threshold value corresponding to the number of pieces of generated distributed data. In addition, just by using the XOR processing, the distribution and restoration apparatus 200 can generate the pieces of distributed data having asymmetric data sizes compared with the conventional threshold secret sharing scheme. As a result, it is possible to increase the speed of distributed data generation processing.

As described above, since the distribution and restoration apparatus 200 of the first embodiment generates a plurality of pieces of distributed data SD1, SD2, and SD3 by performing an exclusive OR (XOR processing) according to the combination of selected divided blocks, the data size of the distributed data SD1, SD2, and SD3 can be made to be smaller than the data size of the original data OD. As a result, since it is possible to reduce the amount of memory in the distribution and restoration apparatus 200, it is possible to further increase the speed of distribution processing. In addition, the distribution and restoration apparatus 200 can safely generate the pieces of distributed data SD1, SD2, and SD3 having asymmetric data sizes.

Method of Restoring the Original Data in the First Embodiment

A specific method of restoring the original data OD in the first embodiment will be described with reference to FIGS. 3 and 4. First, the distribution and restoration apparatus 200 acquires all pieces of distributed data SD1, SD2, and SD3. Specifically, the distribution and restoration apparatus 200 accesses the external storage device 510 by the MAC/PHY 90 to acquire the distributed data SD1 and accesses the HDD 80 by the CPU 60 to acquire the distributed data SD2 and SD3.

In addition, in the drawings showing the execution sequence of the operation of the distribution and restoration apparatus 200 of the respective embodiments including the present embodiment, for example, the operation that the distribution and restoration apparatus 200 performs first is indicated as "(1)", the operation that the distribution and restoration apparatus 200 performs second is indicated as "(2)", and the operation that the distribution and restoration apparatus 200 performs in the n-th order is similarly indicated as "(n)".

In FIGS. 3 and 4, the distribution and restoration apparatus 200 acquires the column 1 of the original data OD on the basis of [distribution (1) a] of the distributed data SD1 (1), acquires the column 2 of the original data OD by XOR processing of [distribution (2) a] of the distributed data SD2 and the column 1 already acquired (2), and acquires the column 9 of the original data OD by XOR processing of [distribution (3) a] of the distributed data SD3 and the column 1 already acquired (2).

The distribution and restoration apparatus 200 acquires the column 3 of the original data OD by XOR processing of [distribution (1) b] of the distributed data SD1 and the column 2 already acquired (3), and acquires the column 10 of the original data OD by XOR processing of [distribution (3) b] of the distributed data SD3 and the column 2 already acquired (3).

The distribution and restoration apparatus 200 acquires the column 4 of the original data OD by XOR processing of [distribution (2) b] of the distributed data SD2 and the column 3 already acquired (4), and acquires the column 11 of the original data OD by XOR processing of [distribution (3) c] of the distributed data SD3 and the column 3 already acquired (4).

The distribution and restoration apparatus 200 acquires the column 5 of the original data OD by XOR processing of [distribution (1) c] of the distributed data SD1 and the column 4 already acquired (5), and acquires the column 12 of the original data OD by XOR processing of [distribution (3) d] of the distributed data SD3 and the column 4 already acquired (5).

The distribution and restoration apparatus 200 acquires the column 6 of the original data OD by XOR processing of [distribution (2) c] of the distributed data SD2 and the column 5 already acquired (6), and acquires the column 13 of the original data OD by XOR processing of [distribution (3) e] of the distributed data SD3 and the column 5 already acquired (6).

The distribution and restoration apparatus 200 acquires the column 7 of the original data OD by XOR processing of [distribution (1) d] of the distributed data SD1 and the column 6 already acquired (7), and acquires the column 14 of the original data OD by XOR processing of [distribution (3) f] of the distributed data SD3 and the column 6 already acquired (7).

The distribution and restoration apparatus 200 acquires the column 8 of the original data OD by XOR processing of [distribution (2) d] of the distributed data SD2 and the column 7 already acquired (8), and acquires the column 15 of the original data OD by XOR processing of [distribution (3) g] of the distributed data SD3 and the column 7 already acquired (8).

Finally, the distribution and restoration apparatus 200 acquires the column 16 of the original data OD by XOR processing of [distribution (3) h] of the distributed data SD3 and the column 8 already acquired (9).

The distribution and restoration apparatus 200 acquires the original data OD by connecting in order the divided blocks DB1 to DB16 of the columns 1 to 16 acquired in each operation of (1) to (9). Then, the distribution and restoration apparatus 200 ends the process of restoring the original data OD.

As described above, since the distribution and restoration apparatus 200 of the first embodiment can perform the process of restoring the original data OD at high speed using a plurality of pieces of distributed data SD1, SD2, and SD3 that are generated by performing an exclusive OR (XOR processing) according to the combination of selected divided blocks, it is possible to reduce the amount of memory in the distribution and restoration apparatus 200. In addition, the distribution and restoration apparatus 200 can restore the original data OD safely from the pieces of distributed data SD1, SD2, and SD3 having asymmetric data sizes.

(Difference Between the Distribution Processing and the Restoration Processing of the First Embodiment and Distribution Processing and Restoration Processing Disclosed in Japanese Patent Application No. 2011-077630)

Figure 51:
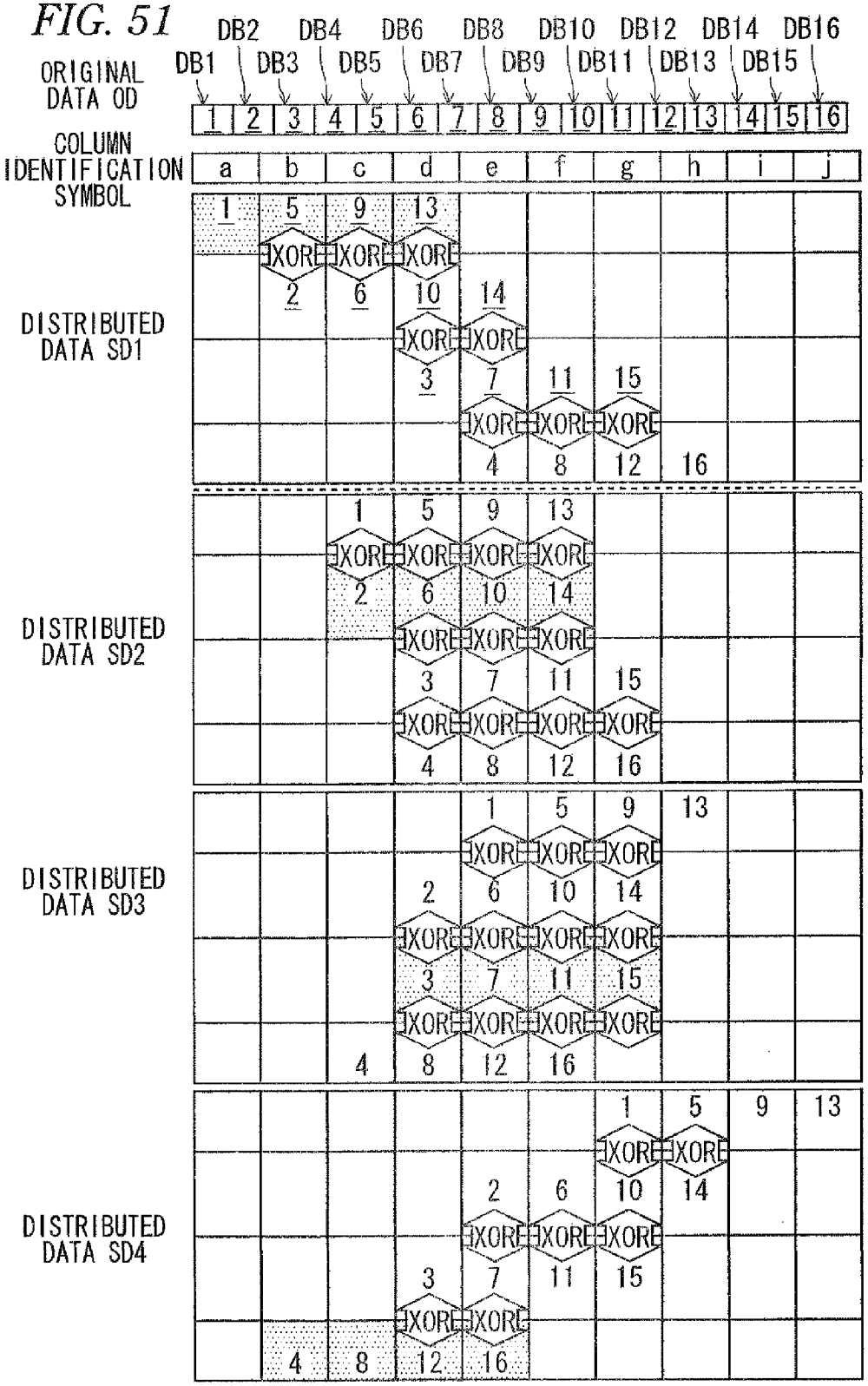
FIG. 51 is an explanatory view showing the content of distributed data having a threshold value of 4 and the number of distribution of 4 using the secret sharing scheme disclosed in Japanese Patent Application No. 2011-077630.
Figure 52:
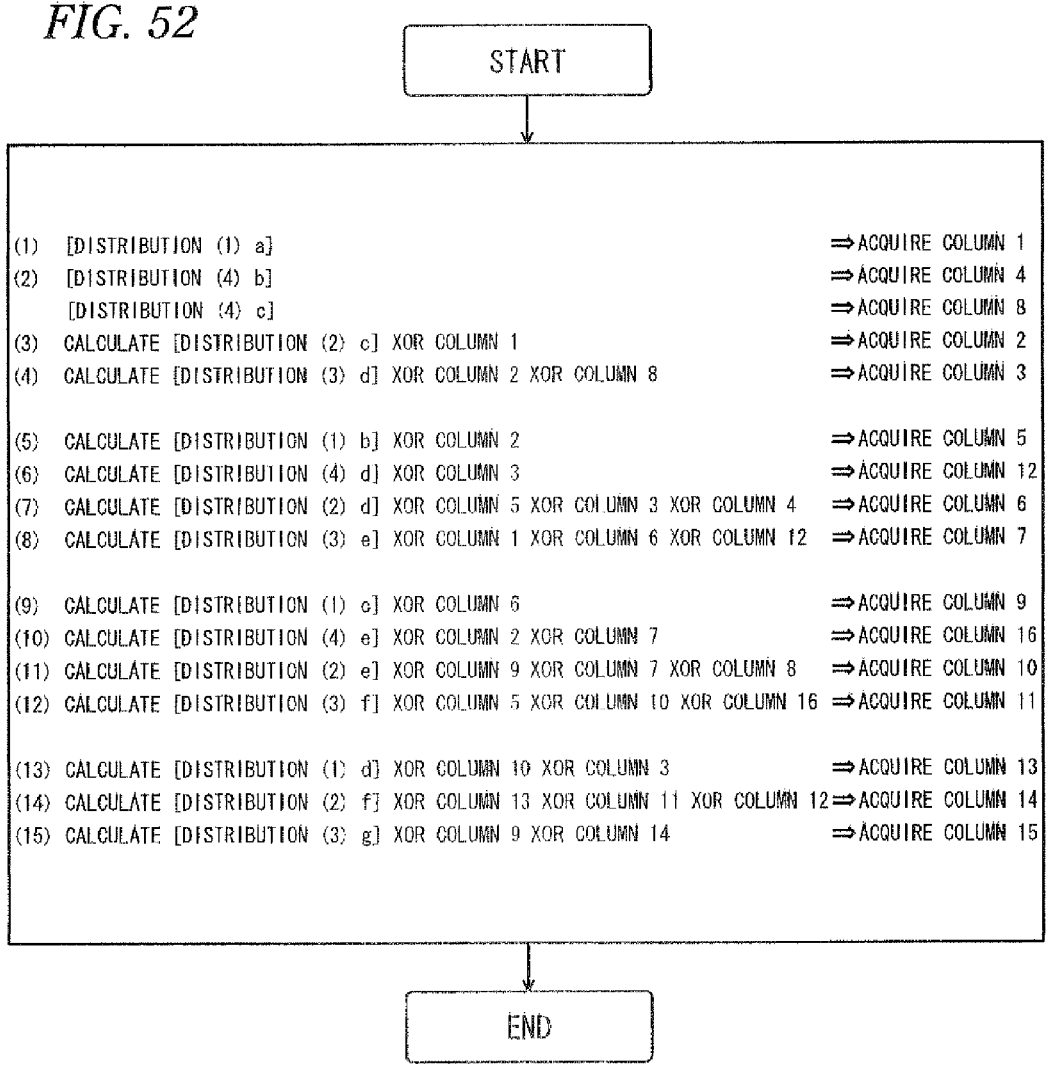
FIG. 52 is a flow chart illustrating the operation procedure for restoring the original data from four pieces of distributed data generated by the method shown in FIG. 51.

Here, the difference between the distribution processing and the restoration processing of the first embodiment and distribution processing and restoration processing in the secret sharing scheme disclosed in Japanese Patent Application No. 2011-077630 of this inventor will be described with reference to FIGS. 51 and 52. FIG. 51 is an explanatory view showing the content of distributed data having a threshold value of 4 and the number of distribution of 4 using the secret sharing scheme disclosed in Japanese Patent Application No. 2011-077630. FIG. 52 is a flow chart illustrating the operation procedure for restoring the original data from four pieces of distributed data generated by the method shown in FIG. 51.

Each piece of distributed data SD1, SD2, SD3, and SD4 shown in FIG. 51 is generated from the original data OD, which is configured to include total sixteen divided blocks DB1 to DB16 as in the first embodiment, according to the secret sharing scheme (the threshold value is 4 and the number of is distribution is 4) disclosed in Japanese Patent Application No. 2011-077630. Since the threshold value is 4, the XOR-processed value of one to four divided blocks is used in columns of each piece of distributed data, and divided blocks used in XOR processing of each column in each piece of the distributed data SD1, SD2, SD3, and SD4 are combined so as to be different from divided blocks used in XOR processing of each column of other pieces of distributed data (refer to FIG. 51).

However, also in each embodiment, divided blocks used in XOR processing of each column in each piece of distributed data are combined so as to be different from divided blocks used in XOR processing of each column of other pieces of distributed data.

Specifically, in the distributed data SD1 shown in FIG. 51, [distribution (1) a] is a divided block DB1 of the column 1, [distribution (1) b] is an XOR-processed value of the divided block DB2 of the column 2 and the divided block DB5 of the column 5, [distribution (1) c] is an XOR-processed value of the divided block DB6 of the column 6 and the divided block DB9 of the column 9, [distribution (1) d] is an XOR-processed value of the divided block DB3 of the column 3, the divided block DB10 of the column 10, and the divided block DB13 of the column 13, [distribution (1) e] is an XOR-processed value of the divided block DB4 of the column 4, the divided block DB7 of the column 7, and the divided block DB14 of the column 14, [distribution (1) f] is an XOR-processed value of the divided block DB8 of the column 8 and the divided block DB11 of the column 11, [distribution (1) g] is an XOR-processed value of the divided block DB12 of the column 12 and the divided block DB15 of the column 15, and [distribution (1) h] is a divided block DB16 of the column 16.

In addition, in the distributed data SD2 shown in FIG. 51, [distribution (2) c] is an XOR-processed value of the divided block DB1 of the column 1 and the divided block DB2 of the column 2, [distribution (2) d] is an XOR-processed value of the divided block DB5 of the column 5, the divided block DB6 of the column 6, the divided block DB3 of the column 3, and the divided block DB4 of the column 4, [distribution (2) e] is an XOR-processed value of the divided block DB9 of the column 9, the divided block DB10 of the column 10, the divided block DB7 of the column 7, and the divided block DB8 of the column 8, [distribution (2) f] is an XOR-processed value of the divided block DB13 of the column 13, the divided block DB14 of the column 14, the divided block DB11 of the column 11, and the divided block DB12 of the column 12, and [distribution (2) g] is an XOR-processed value of the divided block DB15 of the column 15 and the divided block DB16 of the column 16.

In addition, in the distributed data SD3 shown in FIG. 51, [distribution (3) c] is a divided block DB4 of the column 4, [distribution (3) d] is an XOR-processed value of the divided block DB2 of the column 2, the divided block DB3 of the column 3, and the divided block DB8 of the column 8, [distribution (3) e] is an XOR-processed value of the divided block DB1 of the column 1, the divided block DB6 of the column 6, the divided block DB7 of the column 7, and the divided block DB12 of the column 12, [distribution (3) f] is an XOR-processed value of the divided block DB5 of the column 5, the divided block DB10 of the column 10, the divided block DB11 of the column 11, and the divided block DB16 of the column 16, [distribution (3) g] is an XOR-processed value of the divided block DB9 of the column 9, the divided block DB14 of the column 14 and the divided block DB15 of the column 15, and [distribution (3) h] is a divided block DB13 of the column 13.

Finally, in the distributed data SD4 shown in FIG. 51, [distribution (4) b] is a divided block DB4 of the column 4, [distribution (4) c] is a divided block DB8 of the column 8, [distribution (4) d] is an XOR-processed value of the divided block DB3 of the column 3 and the divided block DB12 of the column 12, [distribution (4) e] is an XOR-processed value of the divided block DB2 of the column 2, the divided block DB7 of the column 7, and the divided block DB16 of the column 16, [distribution (4) f] is an XOR-processed value of the divided block DB6 of the column 6 and the divided block DB11 of the column 11, [distribution (4) g] is an XOR-processed value of the divided block DB1 of the column 1, the divided block DB10 of the column 10, and the divided block DB15 of the column 15, [distribution (4) h] is an XOR-processed value of the divided block DB5 of the column 5 and the divided block DB14 of the column 14, [distribution (4) 1] is a divided block DB9 of the column 9, and [distribution (4) j] is a divided block DB13 of the column 13.

Accordingly, when any of the distributed data SD1, SD2, SD3, and SD4 shown in FIG. 51 is set as a reference, the reference distributed data has a different configuration from the other pieces of distributed data by shifting one or two or more columns in a horizontal direction, which are used in XOR processing in the 4-stage configuration, by some columns leftward or rightward from the reference distributed data.

For example, when the distributed data SD2 is set as reference distributed data the distributed data SD1 is formed by shifting the horizontal columns (columns 1, 5, 9, and 13)

of the first stage of the distributed data SD2 leftward by two columns, shifting the horizontal columns (columns 2, 6, 10, and 14) of the second stage of the distributed data SD2 leftward by one column, and shifting the horizontal columns (columns 4, 8, 12, and 16) of the fourth stage of the distributed data SD2 rightward by one column.

Similarly, when the distributed data SD2 is set as reference distributed data, the distributed data SD3 is formed by shifting the horizontal columns (columns 1, 5, 9, and 13) of the first stage of the distributed data SD2 rightward by two columns, shifting the horizontal columns (columns 2, 6, 10, and 14) of the second stage of the distributed data SD2 rightward by one column, and shifting the horizontal columns (columns 4, 8, 12, and 16) of the fourth stage of the distributed data SD2 leftward by one column.

Similarly, when the distributed data SD2 is set as reference distributed data, the distributed data SD4 is formed by shifting the horizontal columns (columns 1, 5, 9, and 13) of the first stage of the distributed data SD2 rightward by four columns, shifting the horizontal columns (columns 2, 6, 10, and 14) of the second stage of the distributed data SD2 rightward by two columns, and shifting the horizontal columns (columns 4, 8, 12, and 16) of the fourth stage of the distributed data SD2 leftward by two columns.

In the restoration processing for restoring the original data OD from the distributed data SD1, SD2, SD3, and SD4 shown in FIG. 51, in FIG. 52, the secret sharing apparatus disclosed in Japanese Patent Application No. 2011-077630 (hereinafter, simply referred to as a "secret sharing apparatus") acquires the column 1 of the original data OD on the basis of [distribution (1) a] of the distributed data SD1 (1), acquires the column 4 of the original data OD on the basis of [distribution (4) b] of the distributed data SD4 (2), and acquires the column 8 of the original data OD on the basis of [distribution (4) c] of the distributed data SD4 (2).

The secret sharing apparatus acquires the column 2 of the original data OD by XOR processing of [distribution (2) c] of the distributed data SD2 and the column 1 already acquired (3), and acquires the column 3 of the original data OD by XOR processing of [distribution (3) d] of the distributed data SD3 and the column 2 already acquired (4).

The secret sharing apparatus acquires the column 5 of the original data OD by XOR processing of [distribution (1) b] of the distributed data SD1 and the column 2 already acquired (5), and acquires the column 12 of the original data OD by XOR processing of [distribution (4) d] of the distributed data SD4 and the column 3 already acquired (6).

The secret sharing apparatus acquires the column 6 of the original data OD by XOR processing of [distribution (2) d] of the distributed data SD2 and the columns 5, 3, and 4 already acquired (7), and acquires the column 7 of the original data OD by XOR processing of [distribution (3) e] of the distributed data SD3 and the columns 1, 6, and 12 already acquired (8).

The secret sharing apparatus acquires the column 9 of the original data OD by XOR processing of [distribution (1) c] of the distributed data SD1 and the column 6 already acquired (9), and acquires the column 16 of the original data OD by XOR processing of [distribution (4) e] of the distributed data SD4 and the columns 2 and 7 already acquired (10).

The secret sharing apparatus acquires the column 10 of the original data OD by XOR processing of [distribution (2) e] of the distributed data SD2 and the columns 9, 7, and 8 already acquired (11), and acquires the column 11 of the original data OD by XOR processing of [distribution (3) f] of the distributed data SD3 and the columns 5, 10, and 16 already acquired (12).

Finally, the secret sharing apparatus acquires the column 13 of the original data OD by XOR processing of [distribution (1) d] of the distributed data SD1 and the columns 10 and 3 already acquired (13), acquires the column 14 of the original data OD by XOR processing of [distribution (2) f] of the distributed data SD2 and the columns 13, 11, and 12 already acquired (14), and acquires the column 15 of the original data OD by XOR processing of [distribution (3) g] of the distributed data SD3 and the columns 9 and 14 already acquired (15).

That is, in the restoration processing shown in FIG. 52, divided blocks (shaded columns 1, 5, 9, and 13 in FIG. 51) of the columns in the top stage are restored in the distributed data SD1, divided blocks (shaded columns 2, 6, 10, and 14 in the same drawing) of the columns in the second stage are restored in the distributed data SD2, divided blocks (shaded columns 3, 7, 11, and 15 in the same drawing) of the columns in the third stage are restored in the distributed data SD3, and divided blocks (shaded columns 4, 8, 12, and 16 in the same drawing) of the columns in the fourth stage are restored in the distributed data SD4.

Figure 53:
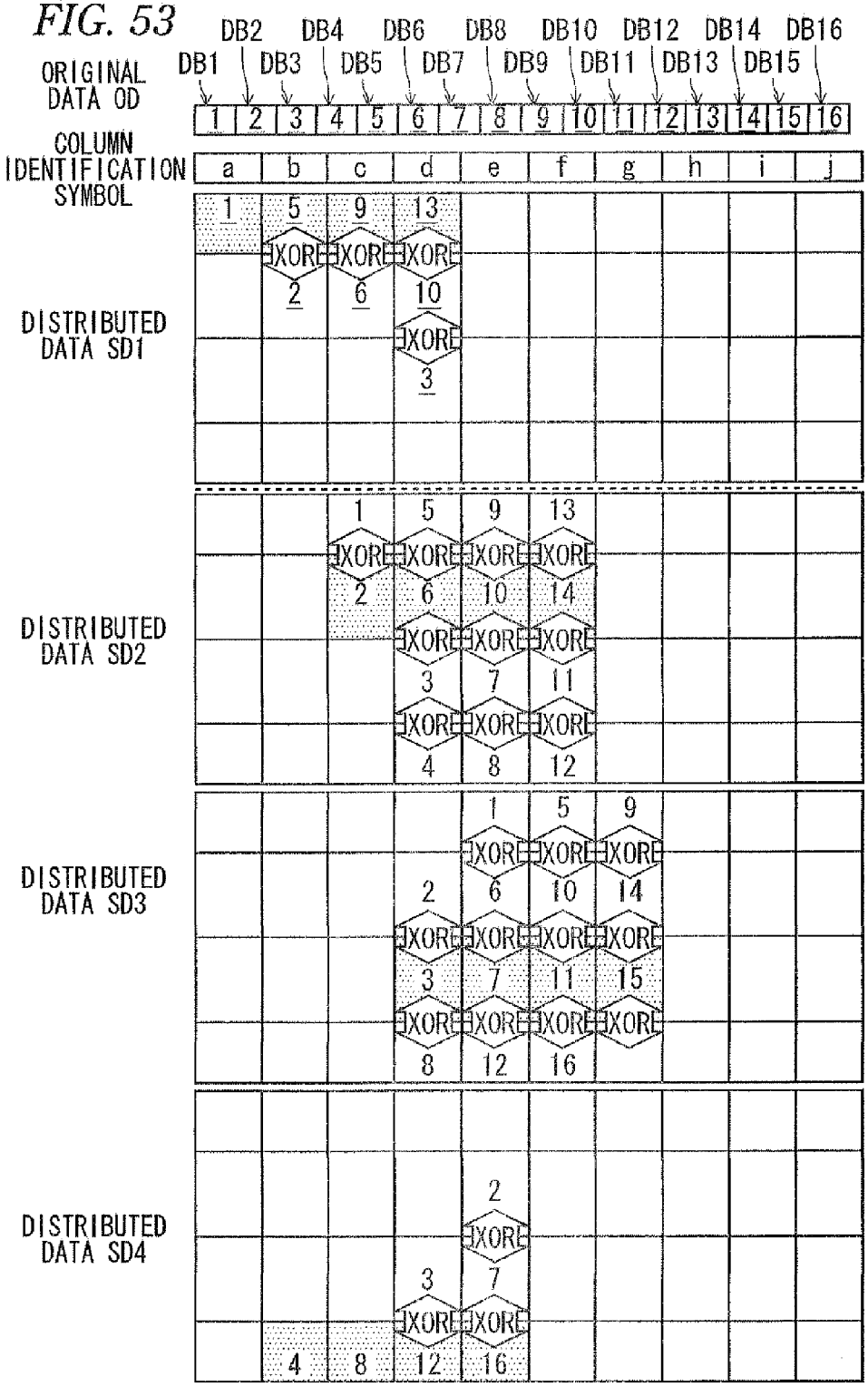
FIG. 53 is an explanatory view showing the content of distributed data from which columns unnecessary for restoration processing have been deleted from the distributed data shown in FIG. 51.

Therefore, in the restoration processing in the secret sharing scheme disclosed in Japanese Patent Application No. 2011-077630 of this inventor, restoration is possible using only the divided blocks of shaded columns among the pieces of distributed data SD1, SD2, SD3, and SD4 shown in FIG. 51, and columns not including divided blocks of columns that are not shaded are not necessary. Specifically, as shown in FIG. 53, divided blocks of columns e, f, g, and h of the distributed data SD1, a column g of the distributed data SD2, columns c and h of the distributed data SD3, and columns f, g, h, i, and j of the distributed data SD4 are not necessary. FIG. 53 is an explanatory view showing the content of distributed data from which columns unnecessary for restoration processing have been deleted from the distributed data SD1, SD2, SD3, and SD4 shown in FIG. 51.

The method of restoring the original data OD from the distributed data SD1, SD2, SD3, and SD4 shown in FIG. 53 is the same as that shown in FIG. 52. Therefore, it is preferable, from the point of view of the amount of memory and security, for the secret sharing apparatus to generate the distributed data shown in FIG. 53 instead of the distributed data shown in FIG. 51.

In addition, since the distributed data shown in FIG. 51 or 53 is a 4-column data configuration, the data size ratio of the distributed data SD1 and the distributed data SD2, SD3 and SD4 is 1:3 as for the distributed data shown in FIG. 2.

Here, the difference between the distribution processing and the restoration processing of the first embodiment and the distribution processing and the restoration processing in the secret sharing scheme disclosed in Japanese Patent Application No. 2011-077630 of this inventor will be considered. In order to restore the original data OD from the distributed data SD1, SD2, SD3, and SD4 shown in FIG. 51 or 53 generated according to the secret sharing scheme disclosed in Japanese Patent Application No. 2011-077630 of this inventor, XOR processing is required 27 times.

On the other hand, in order to restore the original data OD from the distributed data SD1, SD2, and SD3 shown in FIG. 1 or 2 generated according to the first embodiment, XOR processing is required 15 times. Therefore, according to the distribution processing and the restoration processing of the first embodiment, the distribution and restoration apparatus 200 can reduce the number of executions of XOR processing more than the secret sharing apparatus can. As a result, since it is possible to generate the distributed data having asymmetric data sizes at high speed, it is possible to restore the original data OD at high speed.

Second Embodiment

Figure 5:
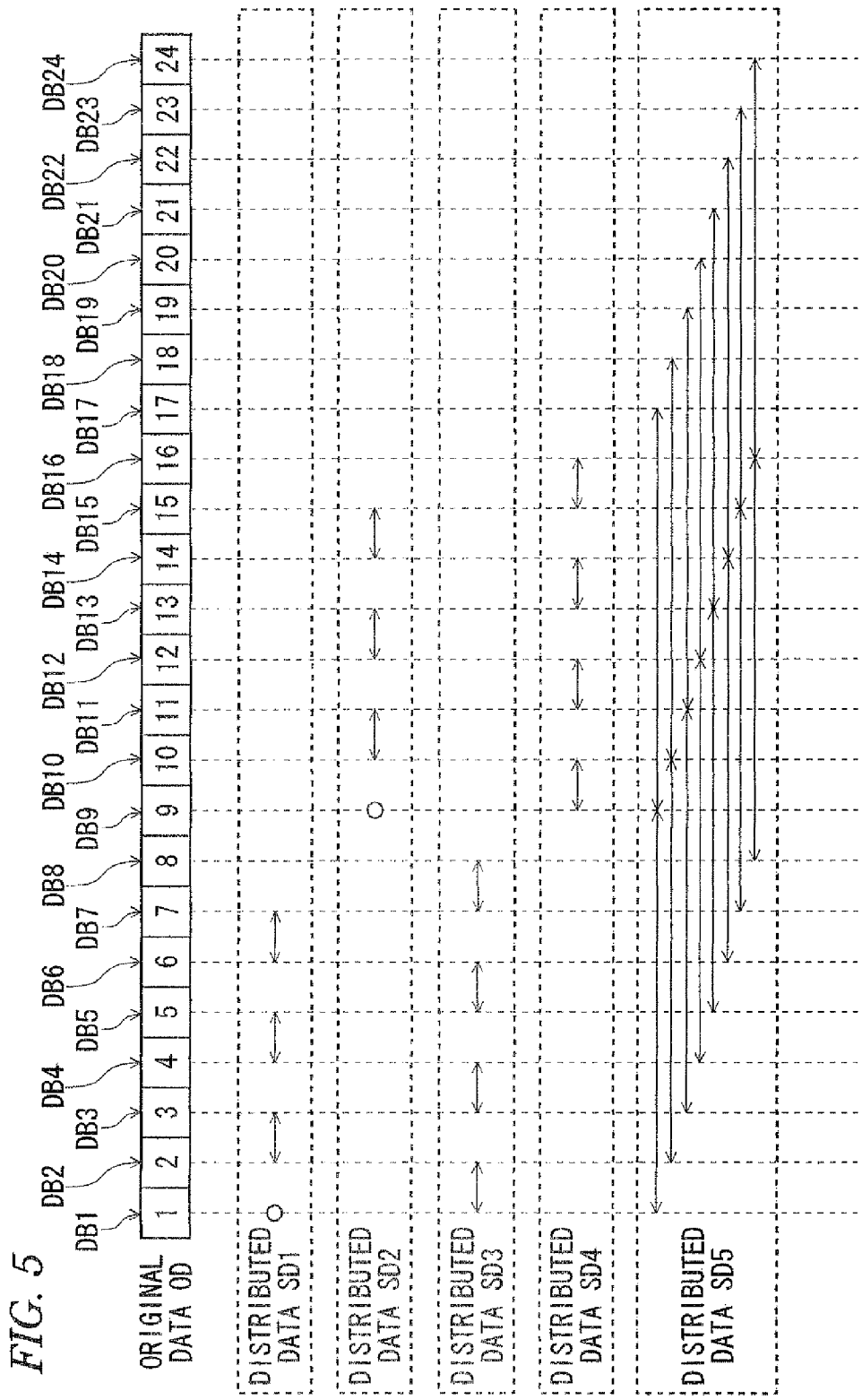
FIG. 5 is an explanatory view showing an example of a method of generating the distributed data in a second embodiment.
Figure 6:
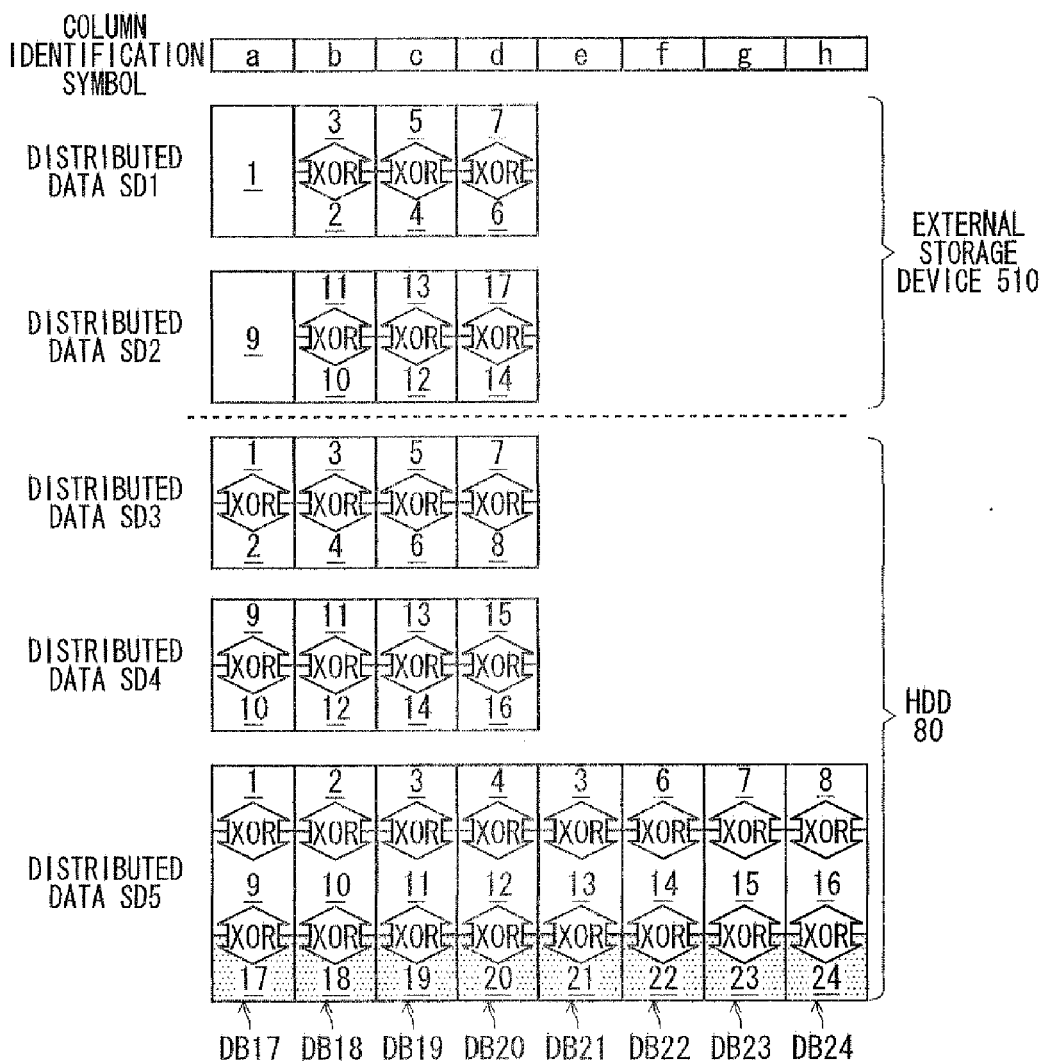
FIG. 6 is an explanatory view showing the content of the distributed data in the second embodiment.
Figure 7:
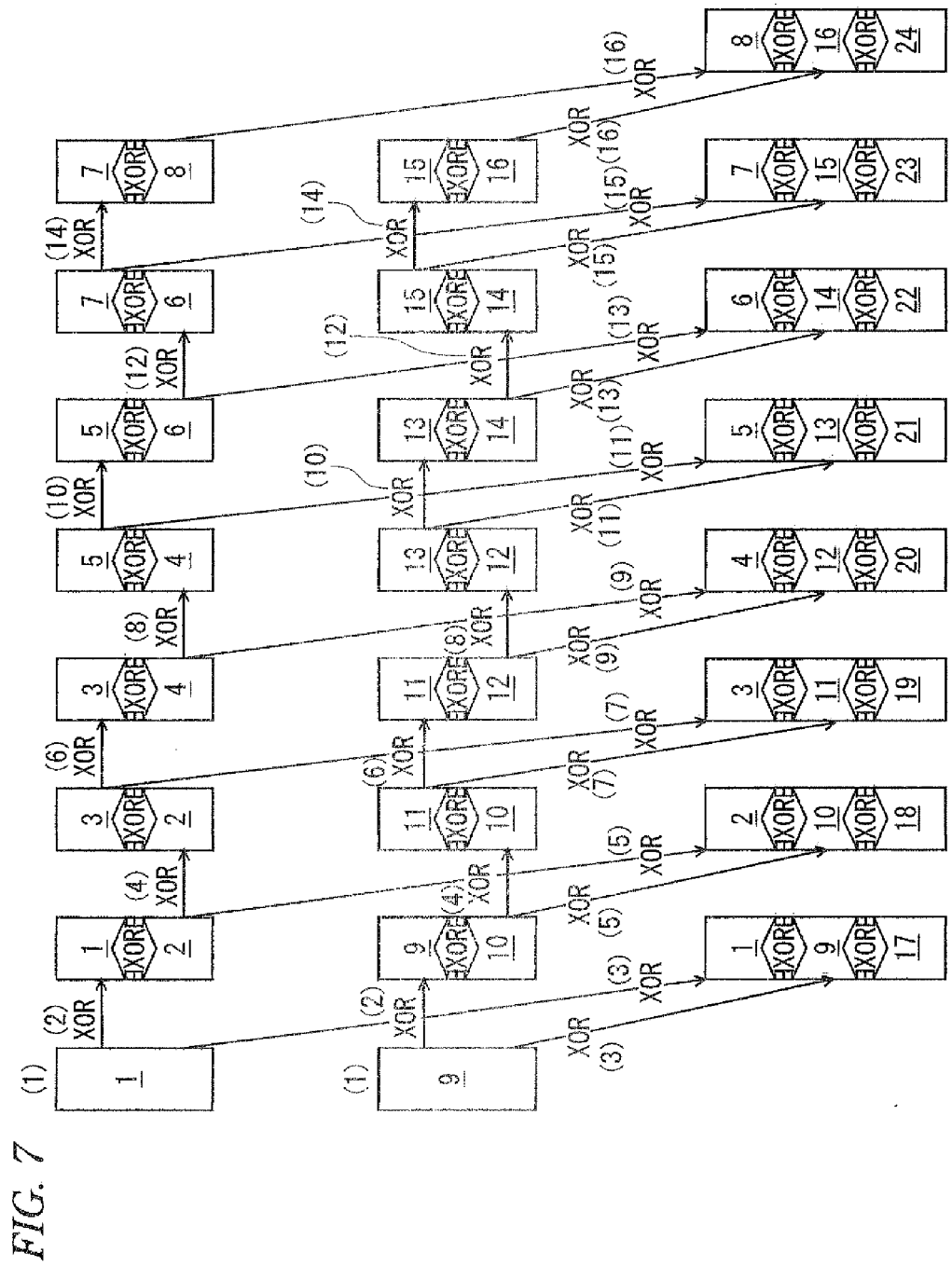
FIG. 7 is an explanatory view showing the flow to obtain each divided block of original data by XOR processing between pieces of distributed data in the second embodiment.
Figure 8:
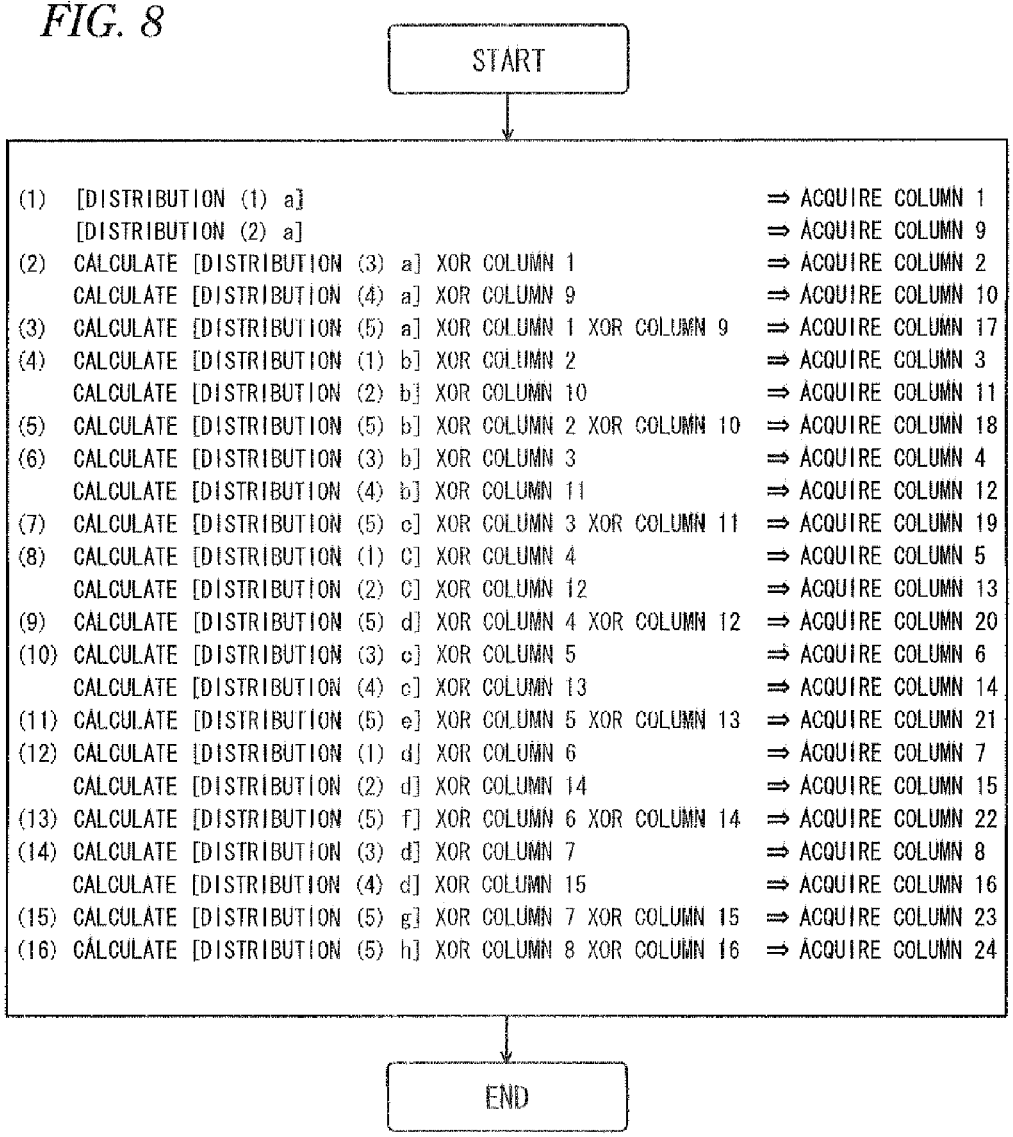
FIG. 8 is a flow chart illustrating the operation procedure in the second embodiment.

Next, a second embodiment of the distribution and restoration apparatus 200 will be described with reference to FIG. 5 to 8. FIG. 5 is an explanatory view showing an example of a method of generating the distributed data in the second embodiment. FIG. 6 is an explanatory view showing the content of distributed data in the second embodiment. FIG. 7 is an explanatory view showing the flow to obtain each divided block of original data by XOR processing of pieces of distributed data in the second embodiment. FIG. 8 is a flow chart illustrating the operation procedure in the second embodiment.

In the second embodiment, a method of generating a total of five pieces of distributed data SD1, SD2, SD3, SD4, and SD5, each of which has a smaller data size than the data size of the original data OD, from the original data OD and a method of restoring the original data OD using the five pieces of distributed data SD1, SD2, SD3, SD4, and SD5 will be described.

For example, the distribution and restoration apparatus 200 stores the distributed data SD1 and SD2 in the external storage device 510 and stores the distributed data SD2, SD4, and SD5 in the HDD 80. In this manner, the distribution and restoration apparatus 200 distributes the five pieces of distributed data SD1, SD2, SD3, SD4, and SD5 asymmetrically in the external storage device 510 and the HDD 80, for example.

In the second embodiment, as shown in FIG. 5, the original data OD is configured to include a total of twenty-four divided blocks DB1 to DB24 connected in order. In addition, although the original data OD is configured to include a total of twenty-four divided blocks DB1 to DB24 in order to simplify explanation in the second embodiment, the number of divided blocks that form the original data OD is not limited to 24. In addition, in order to avoid complicating the drawings, the configuration of the original data OD is not shown in FIG. 6.

Configuration of Distributed Data in the Second Embodiment

The configuration of distributed data in the second embodiment will be described with reference to FIGS. 5 and 6. In addition, explanation of the same contents as in the first embodiment will be omitted, and different contents will be described. Distributed data SD1 shown in FIGS. 5 and 6 is the same as the distributed data SD1 shown in FIGS. 1 and 2. In addition, distributed data SD3 shown in FIGS. 5 and 6 is the same as the distributed data SD2 shown in FIGS. 1 and 2.

In the distributed data SD2 shown in FIGS. 5 and 6, [distribution (2) a] is a divided block DB9 of the column 9, [distribution (2) b] is an XOR-processed value of the divided block DB10 of the column 10 and the divided block DB11 of the column 11, [distribution (2) c] is an XOR-processed value of the divided block DB12 of the column 12 and the divided block DB13 of the column 13, and [distribution (2) d] is an XOR-processed value of the divided block DB14 of the column 14 and the divided block DB15 of the column 15.

Therefore, the distributed data SD2 has a configuration in which four columns [distribution (2) a], [distribution (2) b], [distribution (2) c], and [distribution (2) d] are connected in order.

Thus, the distributed data SD2 is formed by performing 2-stage convolution of the data of divided blocks corresponding to the data size of ⅓ of the original data OD by XOR processing. Accordingly, the number of blocks (columns) of the distributed data SD2 is 4, which is ⅙ of 24 that is the number of blocks (columns) of the original data OD, similar to the divided data SD1.

Then, in the distributed data SD4 shown in FIGS. 5 and 6, [distribution (4) a] is an XOR-processed value of the divided block DB9 of the column 9 and the divided block DB10 of the column 10, [distribution (4) b] is an XOR-processed value of the divided block DB11 of the column 11 and the divided block DB12 of the column 12, [distribution (4) c] is an XOR-processed value of the divided block DB13 of the column 13 and the divided block DB14 of the column 14, and [distribution (4) d] is an XOR-processed value of the divided block DB15 of the column 15 and the divided block DB16 of the column 16.

Therefore, the distributed data SD4 has a configuration in which four columns [distribution (4) a], [distribution (4) b], [distribution (4)], and [distribution (4) d] are connected in order.

Thus, the distributed data SD4 is formed by performing 2-stage convolution of the data of divided blocks corresponding to the data size of ⅓ of the original data OD by XOR processing. Accordingly, the number of blocks (columns) of the distributed data SD4 is 4, which is ⅙ of 24 that is the number of blocks (columns) of the original data OD, similar to the divided data SD2.

Similarly, in the distributed data SD5 shown in FIGS. 5 and 6, [distribution (5) a] is an XOR-processed value of the divided block DB1 of the column 1, the divided block DB9 of the column 9, and the divided block DB17 of the column 17, [distribution (5) b] is an XOR-processed value of the divided block DB2 of the column 2, the divided block DB10 of the column 10, and the divided block DB18 of the column 18, [distribution (5) c] is an XOR-processed value of the divided block DB3 of the column 3, the divided block DB11 of the column 11, and the divided block DB19 of the column 19, [distribution (5) d] is an XOR-processed value of the divided block DB4 of the column 4, the divided block DB12 of the column 12, and the divided block DB20 of the column 20, [distribution (5) e] is an XOR-processed value of the divided block DB5 of the column 5, the divided block DB13 of the column 13, and the divided block DB21 of the column 21, [distribution (5) f] is an XOR-processed value of the divided block DB6 of the column 6, the divided block DB14 of the column 14, and the divided block DB22 of the column 22, [distribution (5) g] is an XOR-processed value of the divided block DB7 of the column 7, the divided block DB15 of the column 15, and the divided block DB23 of the column 23, and [distribution (5) h] is an XOR-processed value of the divided block DB8 of the column 8, the divided block DB16 of the column 16, and the divided block DB24 of the column 24.

Therefore, the distributed data SD5 has a configuration in which eight columns [distribution (5) a], [distribution (5) b], [distribution (5) c], [distribution (5) d], [distribution (5) e], [distribution (5) f], [distribution (5) g], and [distribution (5) h] are connected in order.

Thus, the distributed data SD5 is formed by performing 3-stage convolution of the data of divided blocks corresponding to the data size of the original data OD by XOR processing. Accordingly, the number of blocks (columns) of the distributed data SD1 is 8, which is ⅓ of 24 that is the number of blocks (columns) of the original data OD.

Method of Generating Distributed Data in the Second Embodiment

A specific method of generating the distributed data SD1, SD2, and SD3 in the second embodiment will be described with reference to FIGS. 5 and 6. First, the distribution and restoration apparatus 200 divides the original data OD equally into three pieces of data. However, the distribution and restoration apparatus 200 may divide the original data OD equally into four or more pieces of data. For example, the distribution and restoration apparatus 200 divides the original data OD including a total of twenty-four divided blocks DB1 to DB24 equally into data of the columns 1 to 8, data of the columns 9 to 16, and data of the columns 17 to 24.

The distribution and restoration apparatus 200 performs XOR processing of the data of one of the columns 1 to 8, the data of one of the columns 9 to 16, and the data of one of the columns 17 to 24 and connects a total of eight XOR-processed pieces of data to generate the distributed data SD5.

For example, as shown in FIGS. 5 and 6, the distribution and restoration apparatus 200 generates the distributed data SD5 by connecting in order the XOR-processed data of the columns 1, 9, and 17, the XOR-processed data of the columns 2, 10, and 18, the XOR-processed data of the columns 3, 11, and 19, the XOR-processed data of the columns 4, 12, and 20, the XOR-processed data of the columns 5, 13, and 21, the XOR-processed data of the columns 6, 14, and 22, the XOR-processed data of the columns 7, 15, and 23, and the XOR-processed data of the columns 8, 16, and 24.

Then, the distribution and restoration apparatus 200 selects a combination of two columns of the data of the columns 1 to 8, the data of the columns 9 to 16, and the data of the columns 17 to 24 used in XOR processing when generating the distributed data SD5. Here, in order to simplify explanation, the distribution and restoration apparatus 200 selects the data of the columns 1 to 8 and the data of the columns 9 to 16 as a combination of columns. However, the distribution and restoration apparatus 200 may select one piece of the data of three columns to be subjected to XOR processing when generating the distributed data SD5 and select one column combination. For example, data of the columns 1, 10, 19, 4, 13, 22, 7, and 16 may be selected as a first column combination, and data of the columns 9, 2, 3, 12, 5, 14, 15, and 24 may be selected as a second column combination.

The distribution and restoration apparatus 200 generates four pieces of distributed data SD1, SD2, SD3, and SD4 by performing distribution processing on each of the selected column combinations according to the secret sharing scheme disclosed in Japanese Patent Application No. 2011-077630 of this inventor. By the distribution processing according to the secret sharing scheme disclosed in Japanese Patent Application No. 2011-077630, each combination of columns selected by the distribution and restoration apparatus 200 (for example, the columns 1 to 8), among the pieces of data of the columns 1 to 8, the columns 9 to 16, and the columns 17 to 24 used in XOR processing when generating the distributed data SD5, is XOR-processed by different combinations. As a result, four pieces of distributed data SD1, SD2, SD3, and SD4 are generated.

Here, a method of generating two pieces of distributed data SD1 and SD3 when the distribution and restoration apparatus 200 selects a combination of columns 1 to 8, for example, will be omitted since it is the same as that in the first embodiment, and a method of generating two pieces of distributed data SD2 and SD4 when the distribution and restoration apparatus 200 selects a combination of columns 9 to 16, for example, will be described.

For example, when the combination of columns 9 to 16 is selected, the distribution and restoration apparatus 200 uses only the column 9 for [distribution (2) a], uses an XOR-processed value of the columns 10 and 11 for [distribution (2) b], uses an XOR-processed value of the columns 12 and 13 for [distribution (2) c], and uses an XOR-processed value of the columns 14 and 15 for [distribution (2) d], and connects [distribution (2) a], [distribution (2) b], [distribution (2) c], and [distribution (2) d] in order to generate the distributed data SD2.

In addition, the distribution and restoration apparatus 200 generates the distributed data SD4 by shifting even-numbered columns 10, 12, and 14, which are shown in the lower part of the distributed data SD2, by one column leftward with respect to the generated distributed data SD2. Therefore, when generating the distributed data SD4, the distribution and restoration apparatus 200 uses the data of the column 16, which is not used when generating the distributed data SD2, in XOR processing with the column 15.

In addition, the distribution and restoration apparatus 200 may generate the distributed data SD4 ahead of the distributed data SD2. Specifically, for example, when a combination of the columns 9 to 16 is selected, the distribution and restoration apparatus 200 uses an XOR-processed value of the columns 9 and 10 for [distribution (4) a], uses an XOR-processed value of the columns 11 and 12 for [distribution (4) b], uses an XOR-processed value of the columns 13 and 14 for [distribution (4) c], and uses an XOR-processed value of the columns 15 and 16 for [distribution (4) d], and connects [distribution (4) a], [distribution (4) b], [distribution (4) c], and [distribution (4) d] in order to generate the distributed data SD4.

In addition, the distribution and restoration apparatus 200 generates the distributed data SD2 by shifting even-numbered columns 10, 12, 14, and 16, which are shown in the lower part of the distributed data SD4, by one column rightward with respect to the generated distributed data SD4. Therefore, when generating the distributed data SD2, the distribution and restoration apparatus 200 uses only the single column 9 for [distribution (2) a] without using the data of the column 16 used when generating the distributed data SD4.

Thus, when the distribution and restoration apparatus 200 generates distributed data, the information (content) of original data can be made to be missing in the distributed data by performing 2-stage (2-row) convolution processing (XOR processing) on the data of divided blocks of the original data OD. In this manner, the distribution and restoration apparatus 200 can generate distributed data that can prevent the restoration of the original data OD from either the distributed data SD1 and SD2 or the distributed data SD3, SD4, and SD5.

In addition, as the rate of the asymmetric distribution in the second embodiment, as shown in FIG. 6, the data size of the distributed data SD1 and SD2 stored in the external storage device 510 is ⅔ of the data size of the original data OD, and the data size of the distributed data SD3, SD4, and SD5 stored in the HDD 80 is ⅚ (⅙+⅙+½) of the data size of the original data OD. Accordingly, the distribution and restoration apparatus 200 can generate distributed data having asymmetric data sizes of 1:2 for the external storage device 510 and the HDD 80. In addition, the total data size of the distributed data SD1, SD2, SD3, SD4, and SD5 is the same as the data size of the original data OD.

Therefore, the information entropy of the generated distributed data is increased by canceling the information (content) of the original data OD using the original data OD and the XOR processing in the distribution and restoration apparatus 200 in the second embodiment. For this reason, the distribution and restoration apparatus 200 can make it difficult to restore the original data OD from distributed data less than the threshold value corresponding to the number of pieces of generated distributed data. In addition, just by using the XOR processing, the distribution and restoration apparatus 200 can generate distributed data having asymmetric data sizes compared with the conventional threshold secret sharing scheme. As a result, it is possible to increase the speed of distributed data generation processing.

As described above, since the distribution and restoration apparatus 200 of the second embodiment generates a plurality of pieces of distributed data SD1, SD2, SD3, SD4, and SD5 by performing an exclusive OR (XOR processing) according to the combination of selected divided blocks, the data size of the distributed data SD1, SD2, SD3, SD4, and SD5 can be made to be smaller than the data size of the original data OD. As a result, since it is possible to reduce the amount of memory in the distribution and restoration apparatus 200, it is possible to further increase the speed of distribution processing. In addition, the distribution and restoration apparatus 200 can safely generate the pieces of distributed data SD1, SD2, SD3, SD4, and SD5 having asymmetric data sizes.

Method of Restoring the Original Data in the Second Embodiment

A specific method of restoring the original data OD in the second embodiment will be described with reference to FIGS. 7 and 8. First, the distribution and restoration apparatus 200 acquires all pieces of distributed data SD1, SD2, SD3, SD4, and SD5. Specifically, the distribution and restoration apparatus 200 accesses the external storage device 510 by the MAC/PHY 90 to acquire the distributed data SD1 and SD2 and accesses the HDD 80 by the CPU 60 to acquire the distributed data SD3, SD4, and SD5.

In FIGS. 7 and 8, the distribution and restoration apparatus 200 acquires the column 1 of the original data OD on the basis of [distribution (1) a] of the distributed data SD1 (1), and acquires the column 9 of the original data OD on the basis of [distribution (2) a] of the distributed data SD2 (1). The distribution and restoration apparatus 200 acquires the column 2 of the original data OD by XOR processing of [distribution (3) a] of the distributed data SD3 and the column 1 already acquired (2), and acquires the column 10 of the original data OD by XOR processing of [distribution (4) a] of the distributed data SD4 and the column 9 already acquired (2). The distribution and restoration apparatus 200 acquires the column 17 of the original data OD by XOR processing of [distribution (5) a] of the distributed data SD5 and the columns 1 and 9 already acquired (3).

The distribution and restoration apparatus 200 acquires the column 3 of the original data OD by XOR processing of [distribution (1) b] of the distributed data SD1 and the column 2 already acquired (4), and acquires the column 11 of the original data OD by XOR processing of [distribution (2) b] of the distributed data SD2 and the column 10 already acquired (4). The distribution and restoration apparatus 200 acquires the column 18 of the original data OD by XOR processing of [distribution (5) b] of the distributed data SD5 and the columns 2 and 10 already acquired (5).

The distribution and restoration apparatus 200 acquires the column 4 of the original data OD by XOR processing of [distribution (3) b] of the distributed data SD3 and the column 3 already acquired (6), and acquires the column 12 of the original data OD by XOR processing of [distribution (4) b] of the distributed data SD4 and the column 11 already acquired (6). The distribution and restoration apparatus 200 acquires the column 19 of the original data OD by XOR processing of [distribution (5) c] of the distributed data SD5 and the columns 3 and 11 already acquired (7).

The distribution and restoration apparatus 200 acquires the column 5 of the original data OD by XOR processing of [distribution (1) c] of the distributed data SD1 and the column 4 already acquired (8), and acquires the column 13 of the original data OD by XOR processing of [distribution (2) c] of the distributed data SD2 and the column 12 already acquired (8). The distribution and restoration apparatus 200 acquires the column 20 of the original data OD by XOR processing of [distribution (5) d] of the distributed data SD5 and the columns 4 and 12 already acquired (9).

The distribution and restoration apparatus 200 acquires the column 6 of the original data OD by XOR processing of [distribution (3) c] of the distributed data SD3 and the column 5 already acquired (10), and acquires the column 14 of the original data OD by XOR processing of [distribution (4) c] of the distributed data SD4 and the column 13 already acquired (10). The distribution and restoration apparatus 200 acquires the column 21 of the original data OD by XOR processing of [distribution (5) e] of the distributed data SD5 and the columns 5 and 13 already acquired (11).

The distribution and restoration apparatus 200 acquires the column 7 of the original data OD by XOR processing of [distribution (1) d] of the distributed data SD1 and the column 6 already acquired (12), and acquires the column 15 of the original data OD by XOR processing of [distribution (2) d] of the distributed data SD2 and the column 14 already acquired (12). The distribution and restoration apparatus 200 acquires the column 22 of the original data OD by XOR processing of [distribution (5) f] of the distributed data SD5 and the columns 6 and 14 already acquired (13).

The distribution and restoration apparatus 200 acquires the column 8 of the original data OD by XOR processing of [distribution (3) d] of the distributed data SD3 and the column 7 already acquired (14), and acquires the column 16 of the original data OD by XOR processing of [distribution (4) d] of the distributed data SD4 and the column 15 already acquired (14).

Finally, the distribution and restoration apparatus 200 acquires the column 23 of the original data OD by XOR processing of [distribution (5) g] of the distributed data SD5 and the columns 7 and 15 already acquired (15), and acquires the column 24 of the original data OD by XOR processing of [distribution (5) h] of the distributed data SD5 and the columns 8 and 16 already acquired (16).

The distribution and restoration apparatus 200 acquires the original data OD by connecting in order the divided blocks DB1 to DB24 of the columns 1 to 24 acquired in each operation of (1) to (16). Then, the distribution and restoration apparatus 200 ends the process of restoring the original data OD.

As described above, since the distribution and restoration apparatus 200 of the second embodiment can perform the process of restoring the original data OD at high speed using a plurality of pieces of distributed data SD1, SD2, SD3, SD4, and SD5 that are generated by performing an exclusive OR (XOR processing) according to the combination of selected divided blocks, it is possible to reduce the amount of memory in the distribution and restoration apparatus 200. In addition, the distribution and restoration apparatus 200 can restore the original data OD safely from the pieces of distributed data SD1, SD2, SD3, SD4, and SD5 having asymmetric data sizes.

Third Embodiment

Figure 9:
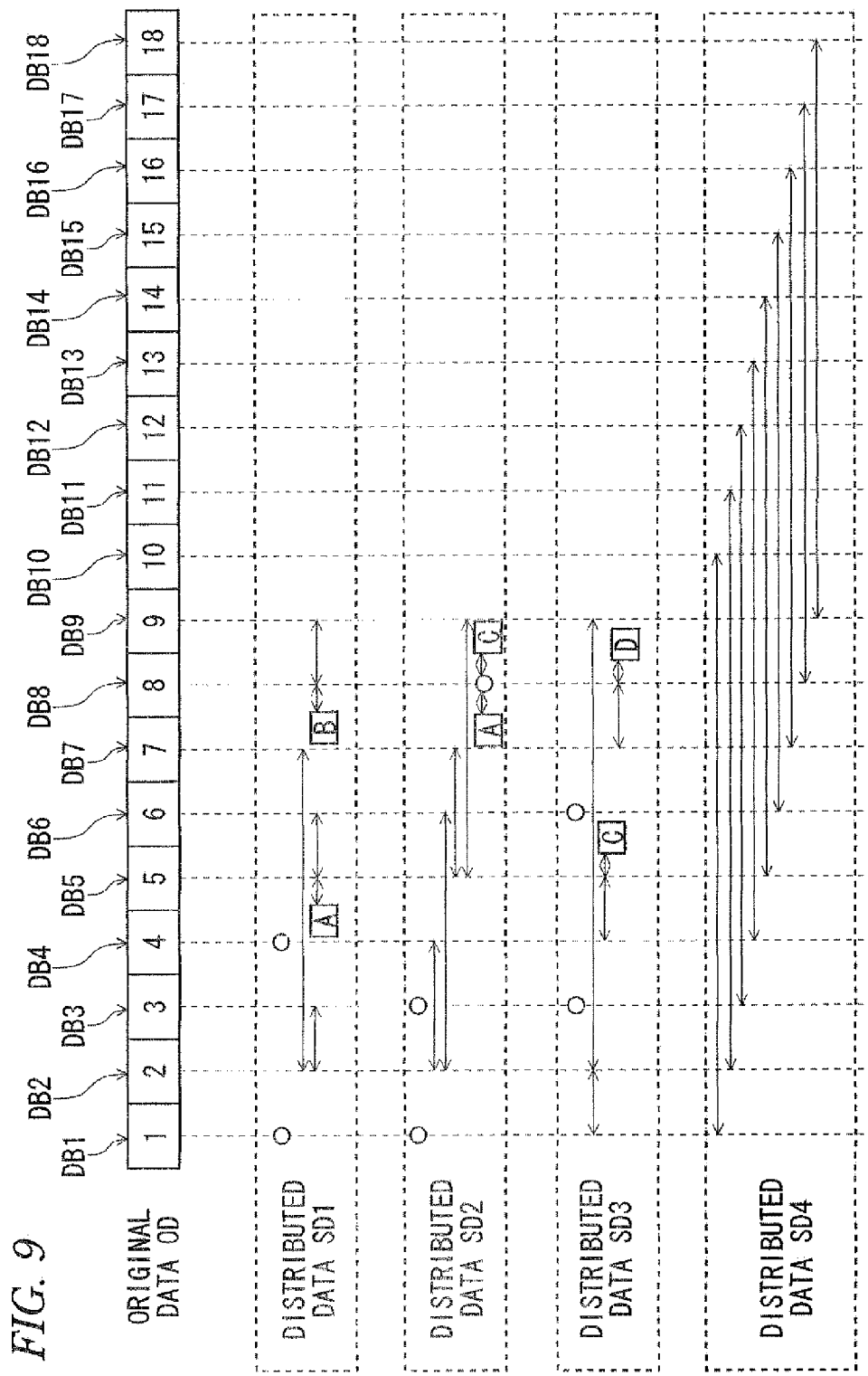
FIG. 9 is an explanatory view showing an example of a method of generating the distributed data in a third embodiment.
Figure 11:
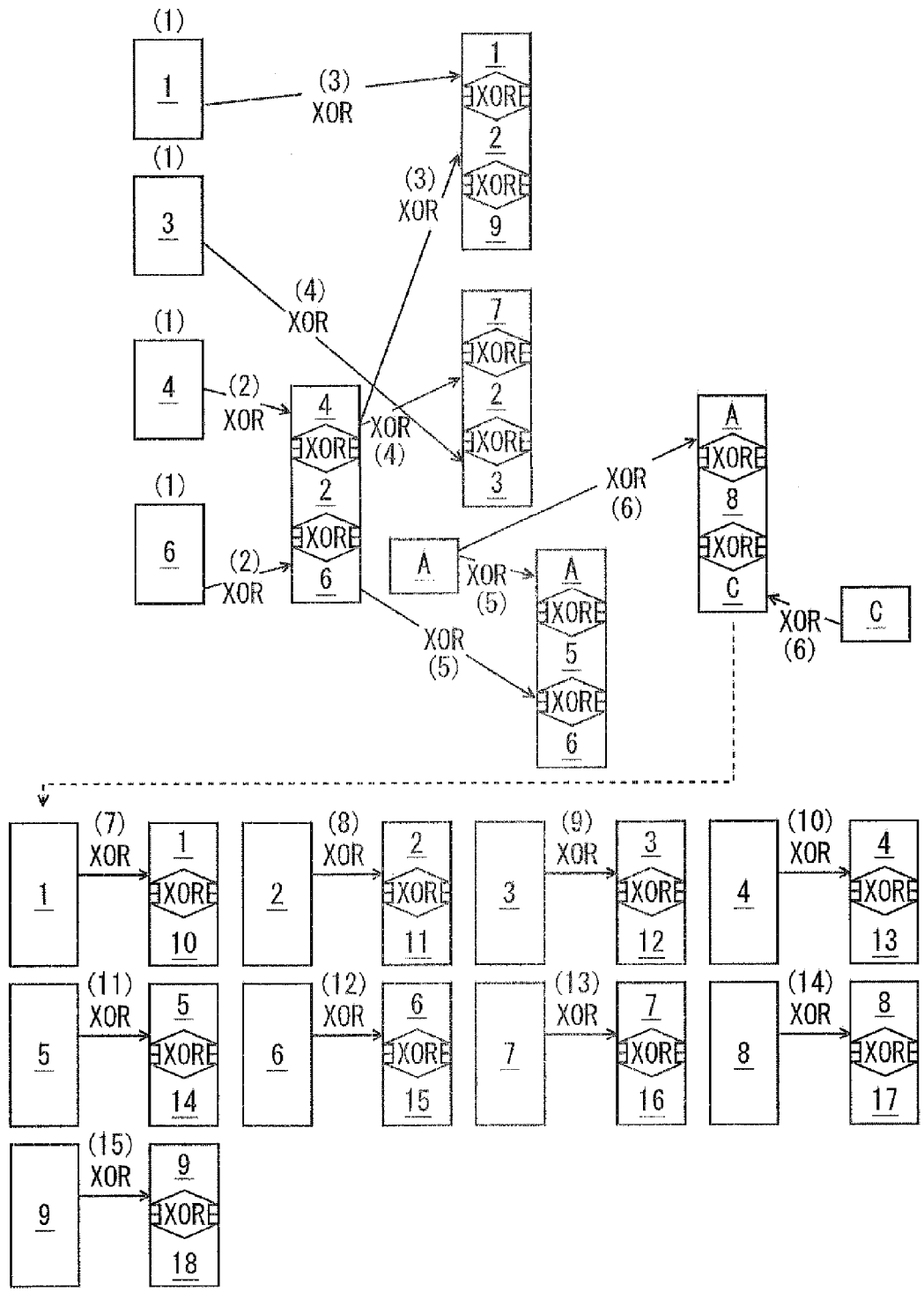
FIG. 11 is an explanatory view showing the flow to obtain each divided block of original data by XOR processing between pieces of distributed data in the third embodiment.
Figure 12:
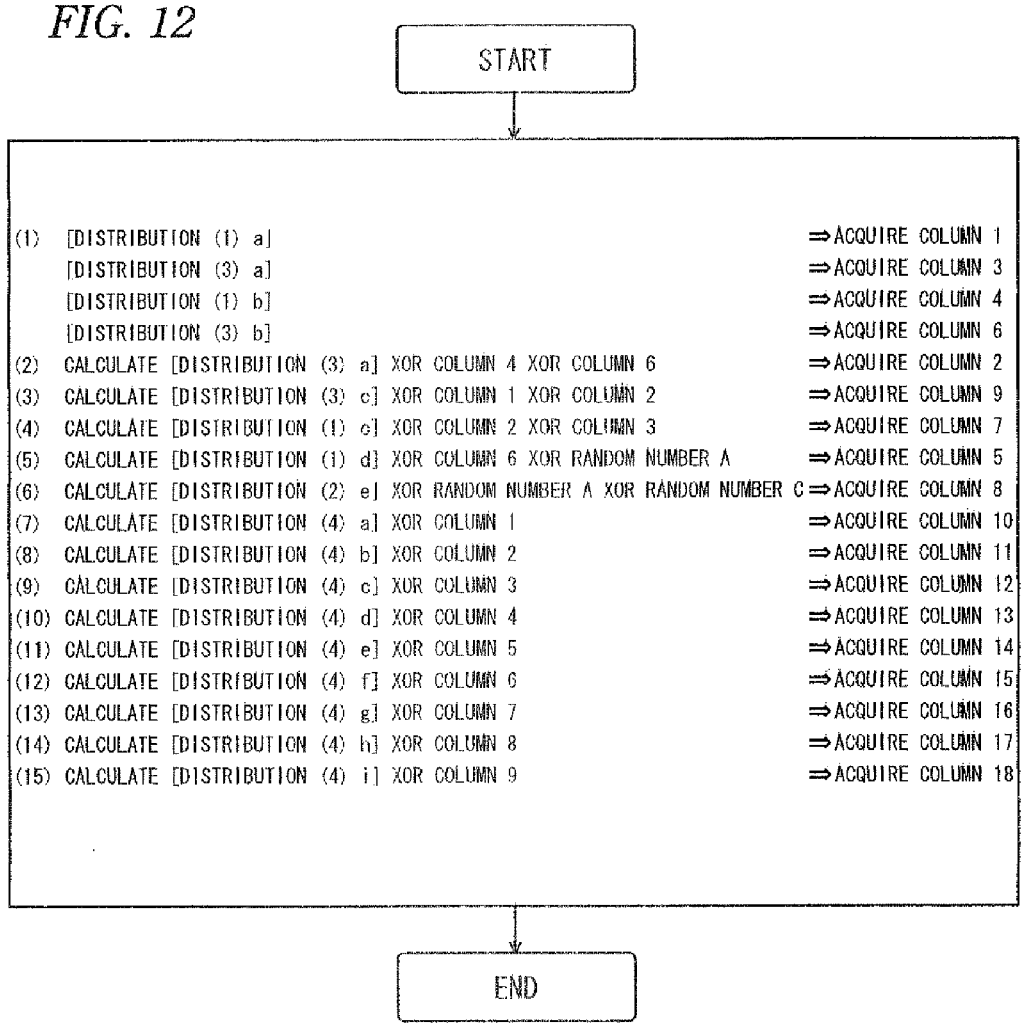
FIG. 12 is a flow chart illustrating the operation procedure in the third embodiment.

Next, a third embodiment of the distribution and restoration apparatus 200 will be described with reference to FIG. 9 to 12. FIG. 9 is an explanatory view showing an example of a method of generating the distributed data in the third embodiment. FIG. 10 is an explanatory view showing the content of distributed data in the third embodiment. FIG. 11 is an explanatory view showing the flow to obtain each divided block of original data by XOR processing of pieces of distributed data in the third embodiment. FIG. 12 is a flow chart illustrating the operation procedure in the third embodiment.

In the third embodiment, a method of generating a total of four pieces of distributed data SD1, SD2, SD3, and SD4, each of which has a smaller data size than the data size of the original data OD, from the original data OD and a method of restoring the original data OD using the four pieces of distributed data SD1, SD2, SD3, and SD4 will be described.

For example, the distribution and restoration apparatus 200 stores the distributed data SD1 in the external storage device 510 and stores the distributed data SD2, SD3, and SD4 in the HDD 80. In this manner, the distribution and restoration apparatus 200 distributes the four pieces of distributed data SD1, SD2, SD3, and SD4 asymmetrically in the external storage device 510 and the HDD 80, for example.

In the third embodiment, as shown in FIGS. 9 and 10, the original data OD is configured to include a total of eighteen divided blocks DB1 to DB18 connected in order. In addition, although the original data OD is configured to include a total of eighteen divided blocks DB1 to DB18 in order to simplify explanation in the third embodiment, the number of divided blocks that form the original data OD is not limited to 18.

Configuration of Distributed Data in the Third Embodiment

The configuration of distributed data in the third embodiment will be described with reference to FIGS. 9 and 10. In the distributed data SD1 shown in FIGS. 9 and 10, [distribution (1) a] is a divided block DB1 of the column 1, [distribution (1) b] is a divided block DB4 of the column 4, [distribution (1) c] is an XOR-processed value of the divided block DB7 of the column 7, the divided block DB2 of the column 2, and the divided block DB3 of the column 3, [distribution (1) d] is an XOR-processed value of a random number A, the divided block DB5 of the column 5, and the divided block DB6 of the column 6, and [distribution (1) e] is an XOR-processed value of a random number B, the divided block DB8 of the column 8, and the divided block DB9 of the column 9.

Therefore, the distributed data SD1 has a configuration in which five columns [distribution (1) a], [distribution (1) b], [distribution (1) c], [distribution (1) d], and [distribution (1) e] are connected in order.

Thus, the distributed data SD1 is formed by performing 3-stage convolution of the data of divided blocks corresponding to the data size of the half of the original data OD, excluding [distribution (1) a] and [distribution (1) b], by XOR processing. Accordingly, although the number of blocks (columns) of the distributed data SD1 is 5, the data size of [distribution (1) a] and [distribution (1) b] is 1/18 of the data size of the original data OD and is considered to be a negligible value. For this reason, the number of blocks (columns) of the distributed data SD1 is 3, which is 1/6 of 18 that is the number of blocks (columns) of the original data OD.

Then, in the distributed data SD2 shown in FIGS. 9 and 10, [distribution (2) b] is a value obtained by connecting the divided block DB1 of the column 1 and the divided block DB3 of the column 3 in order, [distribution (2) c] is an XOR-processed value of the divided block DB4 of the column 4, the divided block DB2 of the column 2, and the divided block DB6 of the column 6, [distribution (2) d] is an XOR-processed value of the divided block DB7 of the column 7, the divided block DB5 of the column 5, and the divided block DB9 of the column 9, and [distribution (2) e] is an XOR-processed value of the random number A, the divided block DB8 of the column 8, and the random number C.

Therefore, the distributed data SD2 has a configuration in which four columns [distribution (2) b], [distribution (2) c], [distribution (2) d], and [distribution (2) e] are connected in order.

Thus, the distributed data SD2 is formed by performing 3-stage convolution of the data of divided blocks corresponding to the data size of the half of the original data OD, excluding [distribution (2) b], by XOR processing. Accordingly, although the number of blocks (columns) of the distributed data SD2 is 4, the data size of [distribution (2) b] is 1/18 of the data size of the original data OD and is considered to be a negligible value. For this reason, the number of blocks (columns) of the distributed data SD2 is 3, which is 1/6 of 18 that is the number of blocks (columns) of the original data OD.

Then, in the distributed data SD3 shown in FIGS. 9 and 10, [distribution (3) a] is a divided block DB3 of the column 3, [distribution (3) b] is a divided block DB6 of the column 6, [distribution (3) c] is an XOR-processed value of the divided block DB1 of the column 1, the divided block DB2 of the column 2, and the divided block DB9 of the column 9, [distribution (3) d] is an XOR-processed value of the divided block DB4 of the column 4, the divided block DB5 of the column 5, and the random number C, and [distribution (3) e] is an XOR-processed value of the divided block DB7 of the column 7, the divided block DB8 of the column 8, and the random number D.

Therefore, the distributed data SD3 has a configuration in which five columns [distribution (3) a], [distribution (3) b], [distribution (3) c], [distribution (3) d], and [distribution (3) e] are connected in order.

Thus, the distributed data SD2 is formed by performing 3-stage convolution of the data of divided blocks corresponding to the data size of the half of the original data OD, excluding [distribution (3) a] and [distribution (3) b], using XOR processing. Accordingly, although the number of blocks (columns) of the distributed data SD3 is 5, the data size of [distribution (3) a] and [distribution (3) b] is 1/18 of the data size of the original data OD and is considered to be a negligible value. For this reason, the number of blocks (columns) of the distributed data SD3 is 3, which is ⅙ of 18 that is the number of blocks (columns) of the original data OD.

Similarly, in the distributed data SD5 shown in FIGS. 9 and 10, [distribution (5) a] is an XOR-processed value of the divided block DB1 of the column 1 and the divided block DB10 of the column 10, [distribution (5) b] is an XOR-processed value of the divided block DB2 of the column 2 and the divided block DB11 of the column 11, [distribution (5) c] is an XOR-processed value of the divided block DB3 of the column 3 and the divided block DB12 of the column 12, [distribution (5) d] is an XOR-processed value of the divided block DB4 of the column 4 and the divided block DB13 of the column 13, [distribution (5) e] is an XOR-processed value of the divided block DB5 of the column 5 and the divided block DB14 of the column 14, [distribution (5) f] is an XOR-processed value of the divided block DB6 of the column 6 and the divided block DB15 of the column 15, [distribution (5) g] is an XOR-processed value of the divided block DB7 of the column 7 and the divided block DB16 of the column 16, and [distribution (5) h] is an XOR-processed value of the divided block DB8 of the column 8 and the divided block DB17 of the column 17, and [distribution (5) i] is an XOR-processed value of the divided block DB9 of the column 9 and the divided block DB18 of the column 18.

Therefore, the distributed data SD5 has a configuration in which nine columns [distribution (5) a], [distribution (5) b], [distribution (5) c], [distribution (5) d], [distribution (5) e], [distribution (5) f], [distribution (5) g], [distribution (5) h], and [distribution (5) i] are connected in order.

Thus, the distributed data SD5 is formed by performing 2-stage convolution of the data of divided blocks corresponding to the data size of the original data OD by XOR processing. Accordingly, the number of blocks (columns) of the distributed data SD1 is 9, which is ½ of 18 that is the number of blocks (columns) of the original data OD.

Method of Generating Distributed Data in the Third Embodiment

A specific method of generating the distributed data SD1, SD2, SD3, and SD4 in the third embodiment will be described with reference to FIGS. 11 and 12. First, the distribution and restoration apparatus 200 divides the original data OD equally into two pieces of data. However, the distribution and restoration apparatus 200 may divide the original data OD equally into three or more pieces of data. For example, the distribution and restoration apparatus 200 divides the original data OD including a total of eighteen divided blocks DB1 to DB18 equally into data of the columns 1 to 9 and data of the columns 10 to 18.

The distribution and restoration apparatus 200 performs XOR processing of the data of one of the columns 1 to 9 and the data of one of the columns 10 to 18 and connects a total of nine XOR-processed pieces of data to generate the distributed data SD4.

For example, as shown in FIGS. 9 and 10, the distribution and restoration apparatus 200 generates the distributed data SD4 by connecting in order the XOR-processed data of the columns 1 and 10, the XOR-processed data of the columns 2 and 11, the XOR-processed data of the columns 3 and 12, the XOR-processed data of the columns 4 and 13, the XOR-processed data of the columns 5 and 14, the XOR-processed data of the columns 6 and 15, the XOR-processed data of the columns 7 and 16, the XOR-processed data of the columns 8 and 17, and the XOR-processed data of the columns 9 and 18.

Then, the distribution and restoration apparatus 200 selects a combination of columns of either the data of the columns 1 to 9 or the data of the columns 10 to 18 used in XOR processing when generating the distributed data SD4. Here, in order to simplify explanation, the distribution and restoration apparatus 200 selects the data of the columns 1 to 9 as a combination of columns. However, the distribution and restoration apparatus 200 may select a combination of columns by selecting either piece of the data of two columns subjected to XOR processing when generating the distributed data SD4. For example, data of the columns 1, 11, 3, 4, 14, 15, 7, 8, and 18 may be selected as a combination of columns.

The distribution and restoration apparatus 200 generates three pieces of distributed data SD1, SD2, and SD3 by performing distribution processing on the combination of selected columns according to the secret sharing scheme disclosed in Japanese Patent Application No. 2011-077630 of this inventor. By the distribution processing according to the secret sharing scheme disclosed in Japanese Patent Application No. 2011-077630, the combination of columns selected by the distribution and restoration apparatus 200 (for example, the columns 1 to 9), of the pieces of data of the columns 1 to 9 and the columns 10 to 18 used in XOR processing when generating the distributed data SD4, is XOR-processed by different combinations. As a result, three pieces of distributed data SD1, SD2, and SD3 are generated.

Specifically, for example, when a combination of the columns 1 to 9 is selected, the distribution and restoration apparatus 200 uses only the column 1 for [distribution (1) a], uses only the column 4 for [distribution (1) b], uses an XOR-processed value of the columns 7, 2, and 3 for [distribution (1) c], uses an XOR-processed value of the random number A and the columns 5 and 6 for [distribution (1) d], and uses an XOR-processed value of the random number B and the columns 8 and 9 for [distribution (1) e], and connects [distribution (1) a], [distribution (1) b], [distribution (1) c], [distribution (1) d], and [distribution (1) e] in order to generate the distributed data SD1.

In addition, the distribution and restoration apparatus 200 generates the distributed data SD2 by shifting the columns 1, 4, and 7 and the random numbers A and B, which are shown at the top of the distributed data SD1, by one column rightward with respect to the generated distributed data SD1 and shifting the columns 3, 6, and 9, which are shown at the bottom of the distributed data SD1, by one column leftward with respect to the generated distributed data SD1. Therefore, when generating the distributed data SD2, the distribution and restoration apparatus 200 uses the data of the random number C, which is not used when generating the distributed data SD1, in XOR processing of the random number A and the column 8, and does not use the data of the random number B used when generating the distributed data SD1.

In addition, the distribution and restoration apparatus 200 may generate the distributed data SD2 ahead of the distributed data SD1. Specifically, for example, when a combination of the columns 1 to 9 is selected, the distribution and restoration apparatus 200 uses a value obtained by connecting the columns 1 and 3 in order for [distribution (2) b], uses an XOR-processed value of the columns 4, 2, and 6 for [distribution (2) c], uses an XOR-processed value of the columns 7, 5, and 9 for [distribution (2) d], and uses an XOR-processed value of the random number A, the column 8, and the random number C for [distribution (2) e], and connects [distribution (2) b], [distribution (2) c], [distribution (2) d], and [distribution (2) e] in order to generate the distributed data SD2. Although detailed explanation is omitted, the distribution and restoration apparatus 200 generates the distributed data SD1 from the distributed data SD2 similarly (refer to FIGS. 9 and 10).

In addition, the distribution and restoration apparatus 200 generates the distributed data SD3 by shifting the columns 1, 4, and 7 and the random numbers A and B, which are shown at the top of the distributed data SD1, by two columns rightward with respect to the generated distributed data SD1 and shifting the columns 3, 6, and 9, which are shown at the bottom of the distributed data SD1, by two columns leftward with respect to the generated distributed data SD1. Therefore, when generating the distributed data SD3, the distribution and restoration apparatus 200 uses the data of the random number C, which is not used when generating the distributed data SD1, in XOR processing of the columns 4 and 5, uses the data of the random number D in XOR processing of the columns 7 and 8, and does not use the random numbers A and B used when generating the distributed data SD1.

In addition, the distribution and restoration apparatus 200 may generate the distributed data SD3 ahead of the distributed data SD1. Specifically, for example, when a combination of the columns 1 to 9 is selected, the distribution and restoration apparatus 200 uses only the column 3 for [distribution (3) a], uses only the column 6 for [distribution (3) b], uses an XOR-processed value of the columns 1, 2, and 9 for [distribution (3) c], uses an XOR-processed value of the columns 4 and 5 and the random number C for [distribution (3) d], and uses an XOR-processed value of the columns 7 and 8 and the random number D for [distribution (3) e], and connects [distribution (3) a], [distribution (3) b], [distribution (3) c], [distribution (3) d], and [distribution (3) e] in order to generate the distributed data SD3. Similarly, the distribution and restoration apparatus 200 generates the distributed data SD1 from the distributed data SD3 (refer to FIGS. 9 and 10).

Thus, when the distribution and restoration apparatus 200 generates distributed data, the information (content) of original data can be made to be missing in the distributed data by performing 3-stage (2-row) convolution processing (XOR processing) on the data of divided blocks of the original data OD. In this manner, the distribution and restoration apparatus 200 can generate distributed data that can prevent the restoration of the original data OD from either the distributed data SD1 or the distributed data SD2, SD3, and SD4.

In addition, as the rate of the asymmetric distribution in the third embodiment, as shown in FIG. 10, the data size of the distributed data SD1 stored in the external storage device 510 is ⅙ of the data size of the original data OD, and the data size of the distributed data SD2, SD3, and SD4 stored in the HDD 80 is ⅚ (⅙+⅙+½) of the data size of the original data OD. Accordingly, the distribution and restoration apparatus 200 can generate distributed data having asymmetric data sizes of 1:5 for the external storage device 510 and the HDD 80. In addition, the total data size of the distributed data SD1, SD2, SD3, and SD4 is the same as the data size of the original data OD.

Therefore, the information entropy of the generated distributed data is increased by canceling the information (content) of the original data OD using the original data OD and the XOR processing in the distribution and restoration apparatus 200 in the third embodiment. For this reason, the distribution and restoration apparatus 200 can make it difficult to restore the original data OD from distributed data less than the threshold value corresponding to the number of pieces of generated distributed data. In addition, just by using the XOR processing, the distribution and restoration apparatus 200 can generate distributed data having asymmetric data sizes compared with the conventional threshold secret sharing scheme. As a result, it is possible to increase the speed of distributed data generation processing.

As described above, since the distribution and restoration apparatus 200 of the third embodiment generates a plurality of pieces of distributed data SD1, SD2, SD3, and SD4 by performing an exclusive OR (XOR processing) according to the combination of selected divided blocks, the data size of the distributed data SD1, SD2, SD3, and SD4 can be made to be smaller than the data size of the original data OD. As a result, since it is possible to reduce the amount of memory in the distribution and restoration apparatus 200, it is possible to further increase the speed of distribution processing. In addition, the distribution and restoration apparatus 200 can safely generate the pieces of distributed data SD1, SD2, SD3, and SD4 having asymmetric data sizes.

In addition, since the distribution and restoration apparatus 200 performs XOR processing using the random number A for [distribution (1) d] of the distributed data SD1, the random number B for [distribution (1) e], the random numbers A and C for [distribution (2) e], the random number C for [distribution (3) d], and the random number D for [distribution (3) e], distributed data is encrypted. Accordingly, the security of distributed data is more improved than that of the distributed data for which no random number is used. In addition, the random numbers A, B, C, and D used when generating the distributed data are values output from the random number generation unit 40, and it is preferable to store the random numbers A, B, C, and D in the RAM 70 or the HDD 80.

Method of Restoring the Original Data in the Third Embodiment

A specific method of restoring the original data OD in the third embodiment will be described with reference to FIGS. 11 and 12. First, the distribution and restoration apparatus 200 acquires all pieces of distributed data SD1, SD2, SD3, and SD4. Specifically, the distribution and restoration apparatus 200 accesses the external storage device 510 by the MAC/PHY 90 to acquire the distributed data SD1 and accesses the HDD 80 by the CPU 60 to acquire the distributed data SD2, SD3, and SD4, and further accesses the RAM 70 or the HDD 80 by the CPU 60 to acquire the random numbers A, B, C, and D.

In FIGS. 11 and 12, the distribution and restoration apparatus 200 acquires the column 1 of the original data OD on the basis of [distribution (1) a] of the distributed data SD1 (1), acquires the column 3 of the original data OD on the basis of [distribution (3) a] of the distributed data SD3 (1), acquires the column 4 of the original data OD on the basis of [distribution (1) b] of the distributed data SD1 (1), and acquires the column 6 of the original data OD on the basis of [distribution (3) b] of the distributed data SD3 (1).

The distribution and restoration apparatus 200 acquires the column 2 of the original data OD by XOR processing of [distribution (3) a] of the distributed data SD3 and the columns 4 and 6 already acquired (2), and acquires the column 9 of the original data OD by XOR processing of [distribution (3) c] of the distributed data SD3 and the columns 1 and 2 already acquired (3).

The distribution and restoration apparatus 200 acquires the column 7 of the original data OD by XOR processing of [distribution (1) c] of the distributed data SD1 and the columns 2 and 3 already acquired (4), acquires the column 5 of the original data OD by XOR processing of [distribution (1) d] of the distributed data SD1, the column 6 already acquired, and the random number A (5), and acquires the column 8 of the original data OD by XOR processing of [distribution (2) e] of the distributed data SD2 and the random numbers A and C (6).

The distribution and restoration apparatus 200 acquires the column 10 of the original data OD by XOR processing of [distribution (4) a] of the distributed data SD4 and the column 1 already acquired (7), acquires the column 11 of the original data OD by XOR processing of [distribution (4) b] of the distributed data SD4 and the column 2 already acquired (8), and acquires the column 12 of the original data OD by XOR processing of [distribution (4) c] of the distributed data SD4 and the column 3 already acquired (9).

The distribution and restoration apparatus 200 acquires the column 13 of the original data OD by XOR processing of [distribution (4) d] of the distributed data SD4 and the column 4 already acquired (10), acquires the column 14 of the original data OD by XOR processing of [distribution (4) e] of the distributed data SD4 and the column 5 already acquired (11), and acquires the column 15 of the original data OD by XOR processing of [distribution (4) f] of the distributed data SD4 and the column 6 already acquired (12).

Finally, the distribution and restoration apparatus 200 acquires the column 16 of the original data OD by XOR processing of [distribution (4) g] of the distributed data SD4 and the column 7 already acquired (13), acquires the column 17 of the original data OD by XOR processing of [distribution (4) h] of the distributed data SD4 and the column 8 already acquired (14), and acquires the column 18 of the original data OD by XOR processing of [distribution (4) i] of the distributed data SD4 and the column 9 already acquired (15).

The distribution and restoration apparatus 200 acquires the original data OD by connecting in order the divided blocks DB1 to DB18 of the columns 1 to 18 acquired in each operation of (1) to (15). Then, the distribution and restoration apparatus 200 ends the process of restoring the original data OD.

As described above, since the distribution and restoration apparatus 200 of the third embodiment can perform the process of restoring the original data OD at high speed using a plurality of pieces of distributed data SD1, SD2, SD3, and SD4 that are generated by performing an exclusive OR (XOR processing) according to the combination of selected divided blocks, it is possible to reduce the amount of memory in the distribution and restoration apparatus 200. In addition, the distribution and restoration apparatus 200 can restore the original data OD safely from the pieces of distributed data SD1, SD2, SD3, and SD4 having asymmetric data sizes.

Fourth Embodiment

Figure 13:
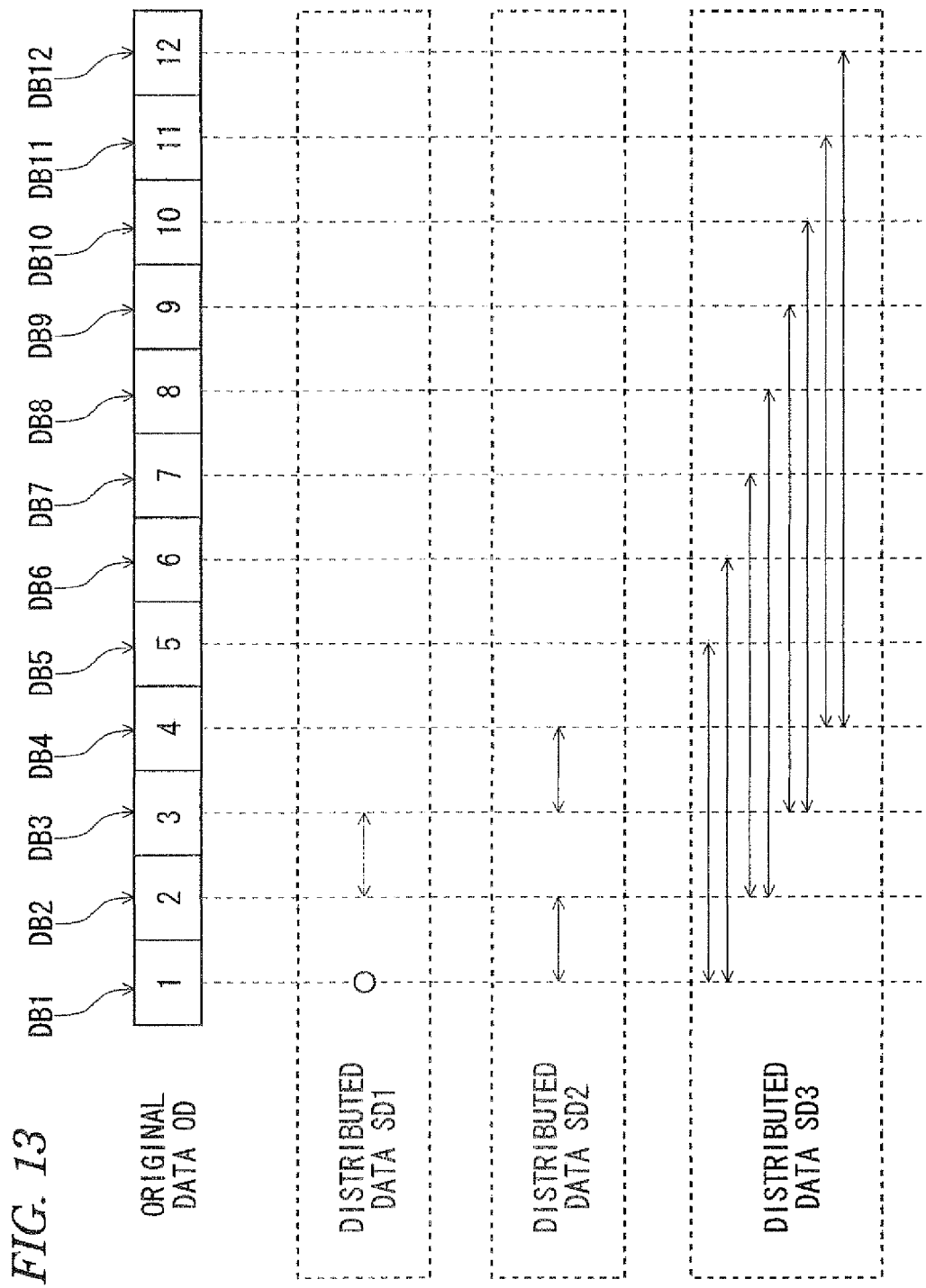
FIG. 13 is an explanatory view showing an example of a method of generating the distributed data in a fourth embodiment.
Figure 14:
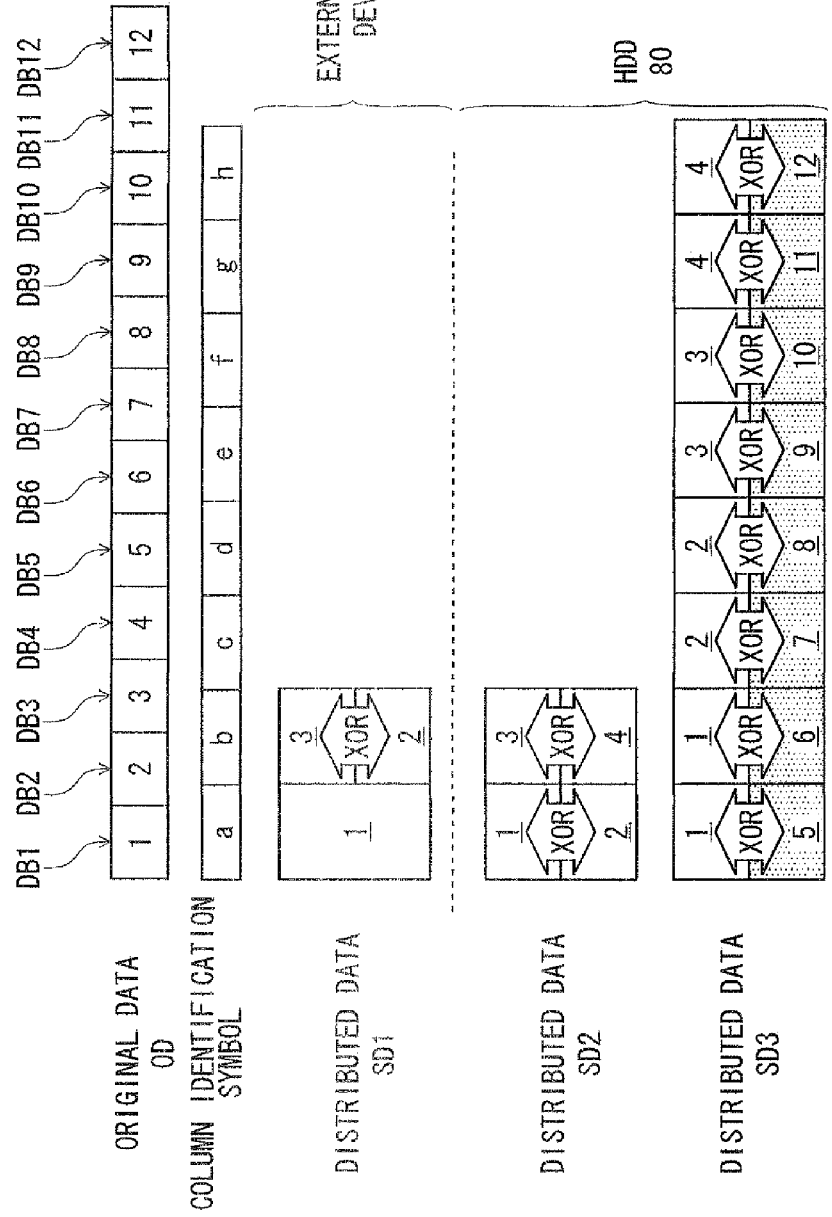
FIG. 14 is an explanatory view showing the content of the distributed data in the fourth embodiment.
Figure 15:
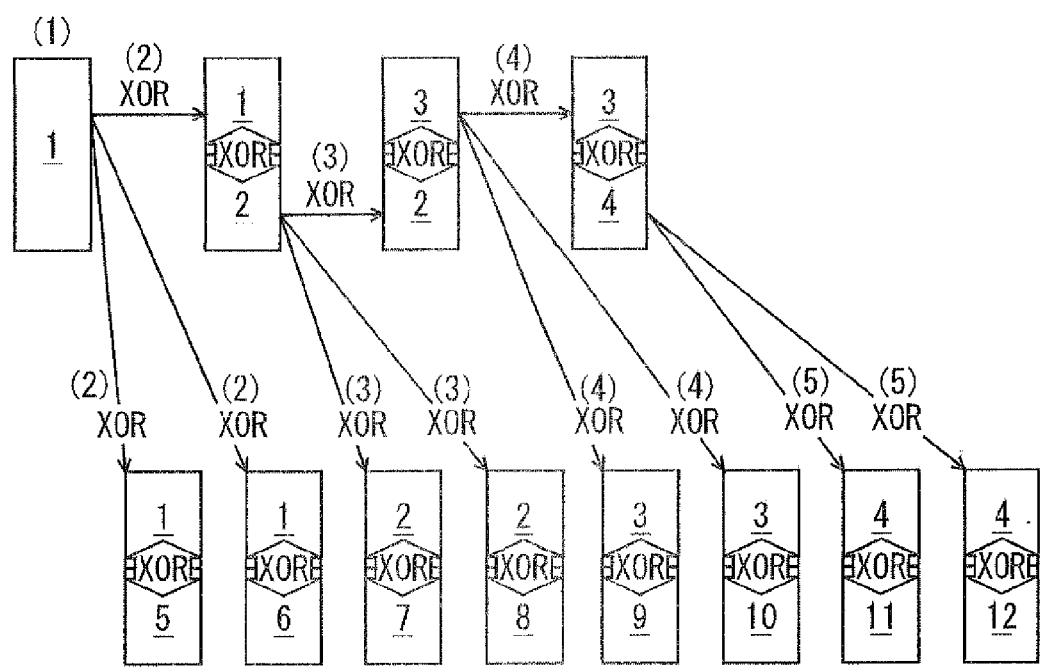
FIG. 15 is an explanatory view showing the flow to obtain each divided block of original data by XOR processing between pieces of distributed data in the fourth embodiment.
Figure 16:
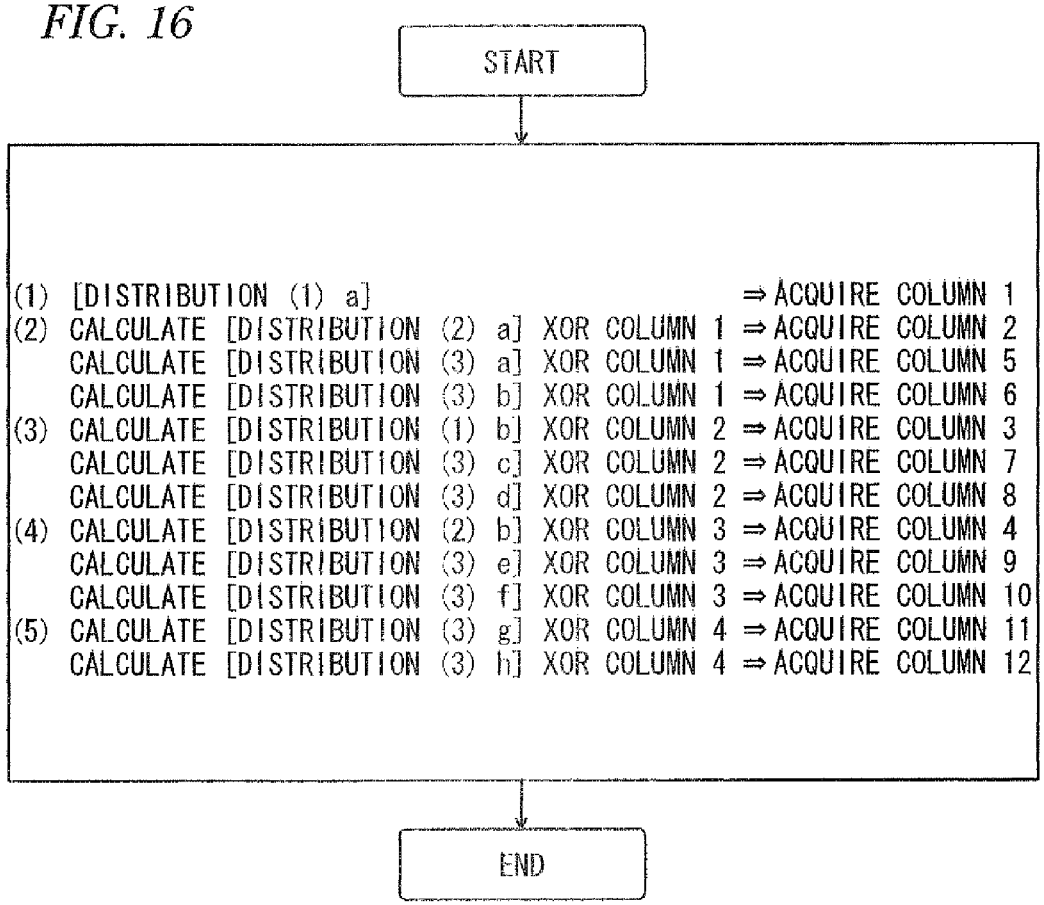
FIG. 16 is a flow chart illustrating the operation procedure in the fourth embodiment.

Next, a fourth embodiment of the distribution and restoration apparatus 200 will be described with reference to FIG. 13 to 16. FIG. 13 is an explanatory view showing an example of a method of generating the distributed data in the fourth embodiment. FIG. 14 is an explanatory view showing the content of distributed data in the fourth embodiment. FIG. 15 is an explanatory view showing the flow to obtain each divided block of original data by XOR processing of pieces of distributed data in the fourth embodiment. FIG. 16 is a flow chart illustrating the operation procedure in the fourth embodiment.

In the fourth embodiment, a method of generating a total of three pieces of distributed data SD1, SD2, and SD3, each of which has a smaller data size than the data size of the original data OD, from the original data OD and a method of restoring the original data OD using three pieces of distributed data SD1, SD2, and SD3 will be described.

For example, the distribution and restoration apparatus 200 stores the distributed data SD1 in the external storage device 510 and stores the distributed data SD2 and SD3 in the HDD 80. In this manner, the distribution and restoration apparatus 200 distributes three pieces of distributed data SD1, SD2, and SD3 asymmetrically in the external storage device 510 and the HDD 80, for example.

In the fourth embodiment, as shown in FIGS. 13 and 14, the original data OD is configured to include a total of twelve divided blocks DB1 to DB12 to connected in order. In addition, although the original data OD is configured to include a total of twelve divided blocks DB1 to DB12 in order to simplify explanation in the fourth embodiment, the number of divided blocks that form the original data OD is not limited to 12.

Configuration of Distributed Data in the Fourth Embodiment

The configuration of distributed data in the fourth embodiment will be described with reference to FIGS. 13 and 14. In the distributed data SD1 shown in FIGS. 13 and 14, [distribution (1) a] is a divided block DB1 of the column 1, and [distribution (1) b] is an XOR-processed value of the divided block DB2 of the column 2 and the divided block DB3 of the column 3.

Therefore, the distributed data SD1 has a configuration in which two columns [distribution (1) a] and [distribution (1) b] are connected in order.

Thus, the distributed data SD1 is formed by performing 2-stage convolution of the data of divided blocks corresponding to the data size of ⅓ of the original data OD by XOR processing. Accordingly, the number of blocks (columns) of the distributed data SD2 is 2, which is ⅙ of 12 that is the number of blocks (columns) of the original data OD similar to the divided data SD1.

Then, in the distributed data SD2 shown in FIGS. 13 and 14, [distribution (2) a] is an XOR-processed value of the divided block DB1 of the column 1 and the divided block DB2 of the column 2, and [distribution (2) b] is an XOR-processed value of the divided block DB3 of the column 3 and the divided block DB4 of the column 4.

Therefore, the distributed data SD2 has a configuration in which two columns [distribution (2) a] and [distribution (2) b] are connected in order.

Thus, the distributed data SD2 is formed by performing 2-stage convolution of the data of divided blocks corresponding to the data size of ⅓ of the original data OD by XOR processing. Accordingly, the number of blocks (columns) of the distributed data SD2 is 2, which is ⅙ of 12 that is the number of blocks (columns) of the original data OD.

Similarly, in the distributed data SD3 shown in FIGS. 13 and 14, [distribution (3) a] is an XOR-processed value of the divided block DB1 of the column 1 and the divided block DB5 of the column 5, [distribution (3) b] is an XOR-processed value of the divided block DB1 of the column 1 and the divided block DB6 of the column 6, [distribution (3) c] is an XOR-processed value of the divided block DB2 of the column 2 and the divided block DB7 of the column 7, [distribution (3) d] is an XOR-processed value of the divided block DB2 of the column 2 and the divided block DB8 of the column 8, [distribution (3) e] is an XOR-processed value of the divided block DB3 of the column 3 and the divided block DB9 of the column 9, [distribution (3) f] is an XOR-processed value of the divided block DB3 of the column 3 and the divided block DB10 of the column 10, [distribution (3) g] is an XOR-processed value of the divided block DB4 of the column 4 and the divided block DB11 of the column 11, and [distribution (3) h] is an XOR-processed value of the divided block DB4 of the column 4 and the divided block DB12 of the column 12.

Therefore, the distributed data SD3 has a configuration in which eight columns [distribution (3) a], [distribution (3) b], [distribution (3) c], [distribution (3) d], [distribution (3) e], [distribution (3) f], [distribution (3) g], and [distribution (3) h] are connected in order.

Thus, the data of the columns 1 to 4 is used twice in the distributed data SD3, and the distributed data SD3 is formed by performing 2-stage convolution of the data of divided blocks corresponding to the data size of the original data OD by XOR processing. Accordingly, the number of blocks (columns) of the distributed data SD3 is 8, which is ⅔ of 12 that is the number of blocks (columns) of the original data OD.

Method of Generating Distributed Data in the Fourth Embodiment

A specific method of generating the distributed data SD1, SD2, and SD3 in the fourth embodiment will be described with reference to FIGS. 13 and 14. First, the distribution and restoration apparatus 200 divides the original data OD into two pieces of data having different data sizes. For example, the distribution and restoration apparatus 200 divides the original data OD including a total of twelve divided blocks DB1 to DB12 equally into data of the columns 1 to 4 and data of the columns 5 to 12.

The distribution and restoration apparatus 200 performs XOR processing of the data of one of the columns 1 to 4 and the data of one of the columns 5 to 12 and connects a total of eight XOR-processed pieces of data to generate the distributed data SD3. In the fourth embodiment, when generating the distributed data SD3, the distribution and restoration apparatus 200 performs XOR processing with the data of one of the columns 5 to 12 using the data of the columns 1 to 4 twice.

For example, as shown in FIGS. 13 and 14, the distribution and restoration apparatus 200 generates the distributed data SD3 by connecting in order the XOR-processed data of the columns 1 and 5, the XOR-processed data of the columns 1 and 6, the XOR-processed data of the columns 2 and 7, the XOR-processed data of the columns 2 and 8, the XOR-processed data of the columns 3 and 9, the XOR-processed data of the columns 3 and 10, the XOR-processed data of the columns 4 and 11, and the XOR-processed data of the columns 4 and 12.

Then, the distribution and restoration apparatus 200 selects a combination of columns having a smaller number of data between the data of the columns 1 to 4 and the data of the columns 5 to 12 used in XOR processing when generating the distributed data SD3. That is, the distribution and restoration apparatus 200 selects a combination of the data of the columns 1 to 4.

The distribution and restoration apparatus 200 generates two pieces of distributed data SD1 and SD2 by performing distribution processing on the combination of selected columns according to the secret sharing scheme disclosed in Japanese Patent Application No. 2011-077630 of this inventor. By the distribution processing according to the secret sharing scheme disclosed in Japanese Patent Application No, 2011-077630, the combination of columns selected by the distribution and restoration apparatus 200 (for example, the columns 1 to 4), between the pieces of data of the columns 1 to 4 and the columns 5 to 12 used in XOR processing when generating the distributed data SD3, is XOR-processed by different combinations. As a result, two pieces of distributed data SD1 and SD2 are generated.

Specifically, the distribution and restoration apparatus 200 uses only the column 1 for [distribution (1) a] and uses an XOR-processed value of the columns 2 and 3 for [distribution (1) b], and connects [distribution (1) a] and [distribution (1) b] in order to generate the distributed data SD1.

In addition, the distribution and restoration apparatus 200 generates the distributed data SD2 by shifting the even-numbered column 2, which is shown in the lower part of the distributed data SD1, by one column leftward with respect to the generated distributed data SD1. Therefore, when generating the distributed data SD2, the distribution and restoration apparatus 200 uses the data of the column 4, which is not used when generating the distributed data SD1, in XOR processing with the column 3.

In addition, the distribution and restoration apparatus 200 may generate the distributed data SD2 ahead of the distributed data SD1. Specifically, the distribution and restoration apparatus 200 uses an XOR-processed value of the columns 1 and 2 for [distribution (2) a] and uses an XOR-processed value of the columns 3 and 4 for [distribution (2) b], and connects [distribution (2) a] and [distribution (2) b] in order to generate the distributed data SD2. Although detailed explanation is omitted, the distribution and restoration apparatus 200 generates the distributed data SD1 from the distributed data SD2 similarly (refer to FIGS. 13 and 14).

Thus, when the distribution and restoration apparatus 200 generates distributed data, the information (content) of original data can be made to be missing in the distributed data by performing 2-stage (2-row) convolution processing (XOR processing) on the data of divided blocks of the original data OD. In this manner, the distribution and restoration apparatus 200 can generate distributed data that can prevent the restoration of the original data OD from either the distributed data SD1 or the distributed data SD2 and SD3.

In addition, as the rate of the asymmetric distribution in the fourth embodiment, as shown in FIG. 14, the data size of the distributed data SD1 stored in the external storage device 510 is ⅙ of the data size of the original data OD, and the data size of the distributed data SD2 and SD3 stored in the HDD 80 is ⅚ (⅙+⅔) of the data size of the original data OD. Accordingly, the distribution and restoration apparatus 200 can generate distributed data having asymmetric data sizes of 1:5 for the external storage device 510 and the HDD 80. In addition, the total data size of the distributed data SD1, SD2, and SD3 is the same as the data size of the original data OD.

Therefore, the information entropy of the generated distributed data is increased by canceling the information (content) of the original data OD using the original data OD and the XOR processing in the distribution and restoration apparatus 200 in the fourth embodiment. For this reason, the distribution and restoration apparatus 200 can make it difficult to restore the original data OD from distributed data less than the threshold value corresponding to the number of pieces of generated distributed data. In addition, just by using the XOR processing, the distribution and restoration apparatus 200 can generate distributed data having asymmetric data sizes compared with the conventional threshold secret sharing scheme. As a result, it is possible to increase the speed of distributed data generation processing.

As described above, since the distribution and restoration apparatus 200 of the fourth embodiment generates a plurality of pieces of distributed data SD1, SD2, and SD3 by performing an exclusive OR (XOR processing) according to the combination of selected divided blocks, the data size of the distributed data SD1, SD2, and SD3 can be made to be smaller than the data size of the original data OD. As a result, since it is possible to reduce the amount of memory in the distribution and restoration apparatus 200, it is possible to further increase the speed of distribution processing. In addition, the distribution and restoration apparatus 200 can safely generate the pieces of distributed data SD1, SD2, and SD3 having asymmetric data sizes.

In addition, when generating distributed data, even if the distribution and restoration apparatus 200 of the fourth embodiment divides the original data OD into the data of columns having different data sizes instead of dividing the original data OD equally into the data of two or more columns as described in the first to third embodiments, it is possible to generate the distributed data having asymmetric data sizes.

Method of Restoring the Original Data in the Fourth Embodiment

A specific method of restoring the original data OD in the fourth embodiment will be described with reference to FIGS. 15 and 16. First, the distribution and restoration apparatus 200 acquires all pieces of distributed data SD1, SD2, and SD3. Specifically, the distribution and restoration apparatus 200 accesses the external storage device 510 by the MAC/PHY 90 to acquire the distributed data SD1 and accesses the HDD 80 by the CPU 60 to acquire the distributed data SD2 and SD3.

In FIGS. 15 and 16, the distribution and restoration apparatus 200 acquires the column 1 of the original data OD on the basis of [distribution (1) a] of the distributed data SD1 (1). The distribution and restoration apparatus 200 acquires the column 2 of the original data OD by XOR processing of [distribution (2) a] of the distributed data SD2 and the column 1 already acquired (2), acquires the column 5 of the original data OD by XOR processing of [distribution (3) a] of the distributed data SD3 and the column 1 already acquired (2), and acquires the column 6 of the original data OD by XOR processing of [distribution (3) b] of the distributed data SD3 and the column 1 already acquired (2).

The distribution and restoration apparatus 200 acquires the column 3 of the original data OD by XOR processing of [distribution (1) b] of the distributed data SD1 and the column 2 already acquired (3), acquires the column 7 of the original data OD by XOR processing of [distribution (3) c] of the distributed data SD3 and the column 2 already acquired (3), and acquires the column 8 of the original data OD by XOR processing of [distribution (3) d] of the distributed data SD3 and the column 2 already acquired (3).

The distribution and restoration apparatus 200 acquires the column 4 of the original data OD by XOR processing of [distribution (2) b] of the distributed data SD2 and the column 3 already acquired (4), acquires the column 9 of the original data OD by XOR processing of [distribution (3) e] of the distributed data SD3 and the column 3 already acquired (4), and acquires the column 10 of the original data OD by XOR processing of [distribution (3) f] of the distributed data SD3 and the column 3 already acquired (4).

Finally, the distribution and restoration apparatus 200 acquires the column 11 of the original data OD by XOR processing of [distribution (3) g] of the distributed data SD3 and the column 4 already acquired (5), and acquires the column 12 of the original data OD by XOR processing of [distribution (3) h] of the distributed data SD3 and the column 4 already acquired (5).

The distribution and restoration apparatus 200 acquires the original data OD by connecting in order the divided blocks DB1 to DB12 of the columns 1 to 12 acquired in each operation of (1) to (5). Then, the distribution and restoration apparatus 200 ends the process of restoring the original data OD.

As described above, since the distribution and restoration apparatus 200 of the fourth embodiment can perform the process of restoring the original data OD at high speed using a plurality of pieces of distributed data SD1, SD2, and SD3 that are generated by performing an exclusive OR (XOR processing) according to the combination of selected divided blocks, it is possible to reduce the amount of memory in the distribution and restoration apparatus 200. In addition, the distribution and restoration apparatus 200 can restore the original data OD safely from the pieces of distributed data SD1, SD2, and SD3 having asymmetric data sizes.

Fifth Embodiment

Figure 17:
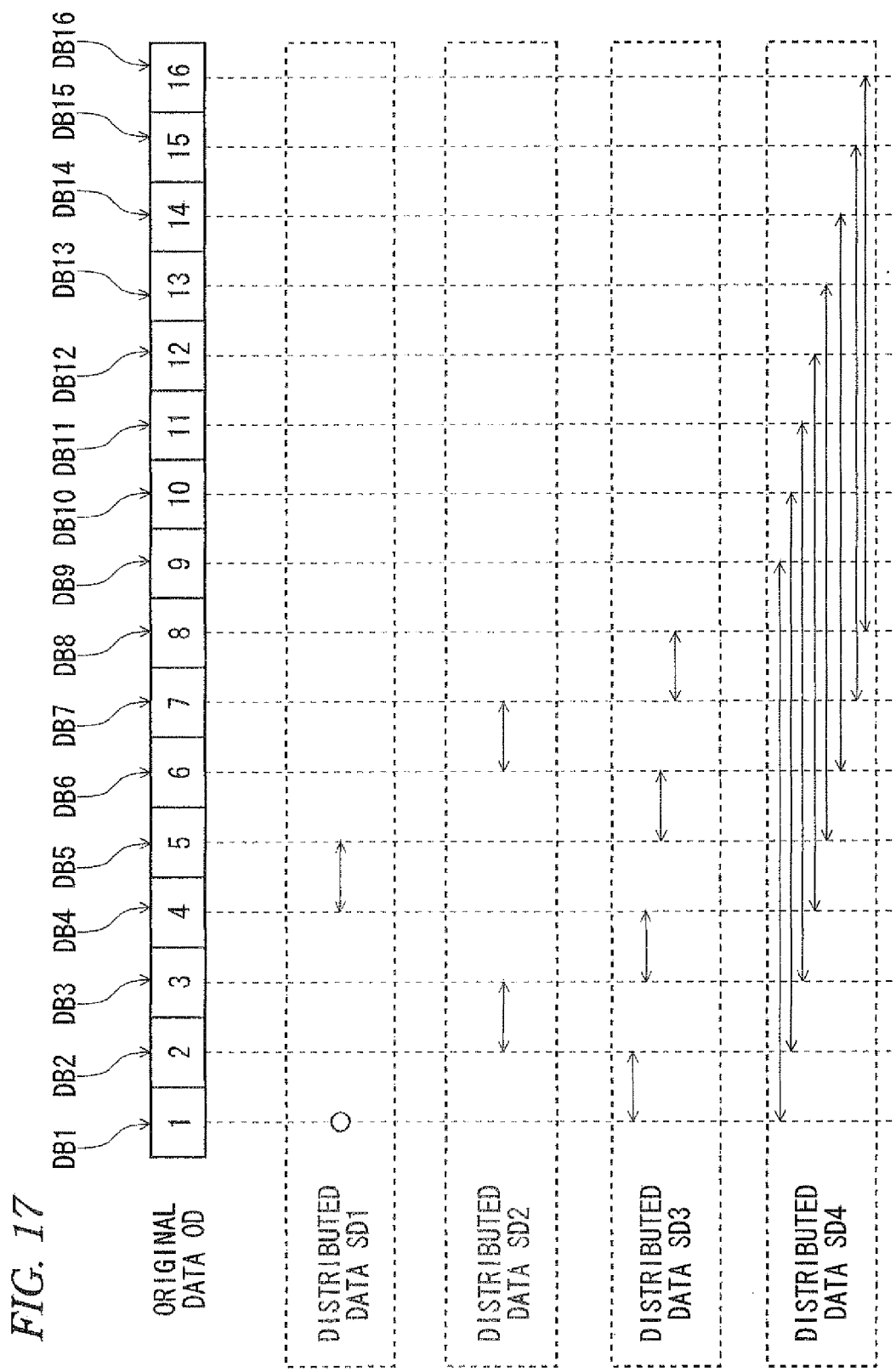
FIG. 17 is an explanatory view showing an example of a method of generating the distributed data in a fifth embodiment.
Figure 18:
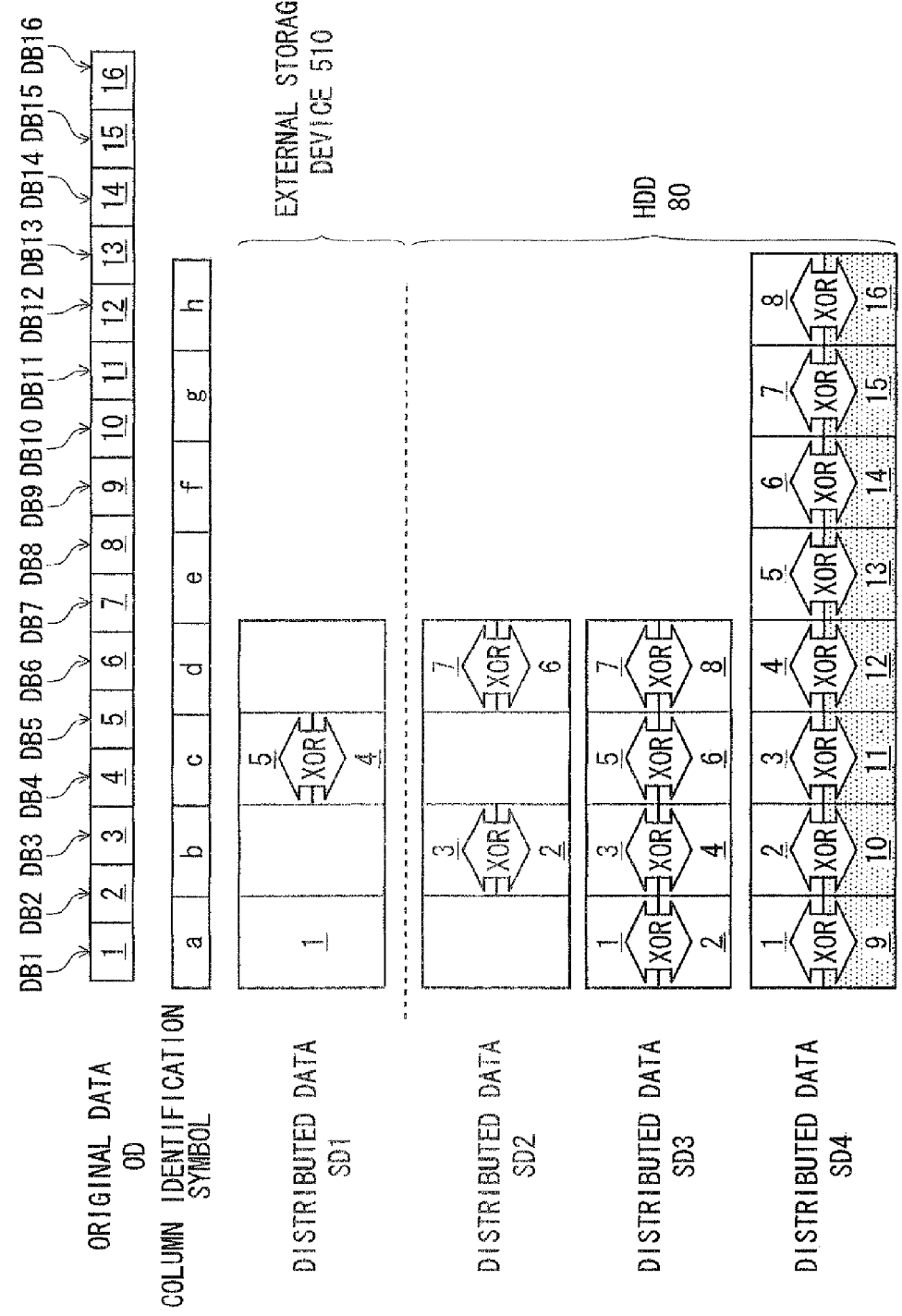
FIG. 18 is an explanatory view showing the content of the distributed data in the fifth embodiment.
Figure 19:
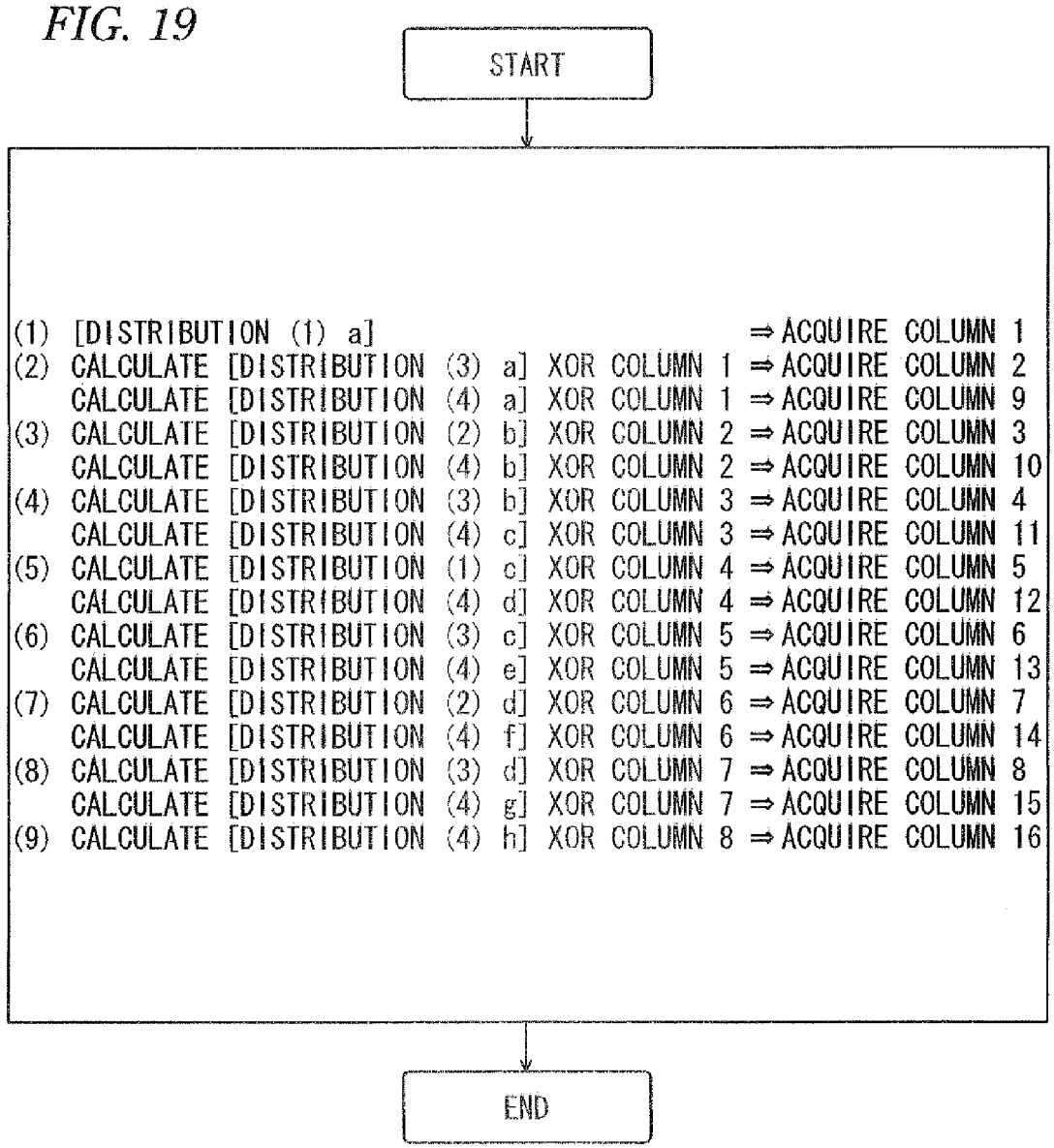
FIG. 19 is a flow chart illustrating the operation procedure in the fifth embodiment.

First, a fifth embodiment of the distribution and restoration apparatus 200 will be described with reference to FIG. 17 to 19. FIG. 17 is an explanatory view showing an example of a method of generating the distributed data in the fifth embodiment. FIG. 18 is an explanatory view showing the content of distributed data in the fifth embodiment. FIG. 19 is a flow chart illustrating the operation procedure in the fifth embodiment.

In the fifth embodiment, a method of generating a total of four pieces of distributed data SD1, SD2, SD3, and SD4, each of which has a smaller data size than the data size of the original data OD, from the original data OD and a method of restoring the original data OD using the four pieces of distributed data SD1, SD2, SD3, and SD4 will be described.

For example, the distribution and restoration apparatus 200 stores the distributed data SD1 in the external storage device 510 and stores the distributed data SD2, SD3, and SD4 in the HDD 80. In this manner, the distribution and restoration apparatus 200 distributes the four pieces of distributed data SD1, SD2, SD3, and SD4 asymmetrically in the external storage device 510 and the HDD 80, for example.

In the fifth embodiment, as shown in FIGS. 17 and 18, the original data OD is configured to include a total of sixteen divided blocks DB1 to DB16 connected in order. In addition, although the original data OD is configured to include a total of sixteen divided blocks DB1 to DB16 in order to simplify explanation in the fifth embodiment, the number of divided blocks that form the original data OD is not limited to 16.

Configuration of Distributed Data in the Fifth Embodiment

The configuration of distributed data in the fifth embodiment will be described with reference to FIGS. 17 and 18. In the distributed data SD1 shown in FIGS. 17 and 18, [distribution (1) a] is a divided block DB1 of the column 1, and [distribution (1) c] is an XOR-processed value of the divided block DB4 of the column 4 and the divided block DB5 of the column 5.

Therefore, the distributed data SD1 has a configuration in which two columns [distribution (1) a] and [distribution (1) c] are connected in order.

Thus, the distributed data SD1 is formed by performing 2-stage convolution of the data of divided blocks corresponding to the data size of ¼ of the original data OD by XOR processing. Accordingly, the number of blocks (columns) of the distributed data SD1 is 2, which is ⅛ of 16 that is the number of blocks (columns) of the original data OD.

Then, in the distributed data SD2 shown in FIGS. 17 and 18, [distribution (2) b] is an XOR-processed value of the divided block DB2 of the column 2 and the divided block DB3 of the column 3, and [distribution (2) d] is an XOR-processed value of the divided block DB6 of the column 6 and the divided block DB7 of the column 7.

Therefore, the distributed data SD2 has a configuration in which two columns [distribution (2) b] and [distribution (2) d] are connected in order.

Thus, the distributed data SD2 is formed by performing 2-stage convolution of the data of divided blocks corresponding to the data size of ¼ of the original data OD by XOR processing. Accordingly, the number of blocks (columns) of the distributed data SD2 is 2, which is ⅛ of 16 that is the number of blocks (columns) of the original data OD.

Since the distributed data SD3 shown in FIGS. 17 and 18 is the same as the distributed data SD2 in the first embodiment shown in FIGS. 1 and 2, explanation thereof will be omitted.

In addition, since the distributed data SD4 shown in FIGS. 17 and 18 is the same as the distributed data SD3 in the first embodiment shown in FIGS. 1 and 2, explanation thereof will be omitted.

Method of Generating Distributed Data in the Fifth Embodiment

A specific method of generating the distributed data SD1, SD2, SD3, and SD4 in the fifth embodiment will be described with reference to FIGS. 17 and 18. First, the distribution and restoration apparatus 200 divides the original data OD equally into two pieces of data. However, the distribution and restoration apparatus 200 may divide the original data OD equally into three or more pieces of data (refer to the second embodiment). For example, the distribution and restoration apparatus 200 divides the original data OD including a total of sixteen divided blocks DB1 to DB16 equally into data of the columns 1 to 8 and data of the columns 9 to 16.

The distribution and restoration apparatus 200 performs XOR processing of the data of one of the columns 1 to 8 and the data of one of the columns 9 to 16 and connects a total of eight XOR-processed pieces of data to generate the distributed data SD4.

For example, as shown in FIGS. 17 and 18, the distribution and restoration apparatus 200 generates the distributed data SD4 by connecting in order the XOR-processed data of the columns 1 and 9, the XOR-processed data of the columns 2 and 10, the XOR-processed data of the columns 3 and 11, the XOR-processed data of the columns 4 and 12, the XOR-processed data of the columns 5 and 13, the XOR-processed data of the columns 6 and 14, the XOR-processed data of the columns 7 and 15, and the XOR-processed data of the columns 8 and 16.

Then, the distribution and restoration apparatus 200 selects a combination of columns of either the data of the columns 1 to 8 or the data of the columns 9 to 16 used in XOR processing when generating the distributed data SD4. Here, in order to simplify explanation, the distribution and restoration apparatus 200 selects the data of the columns 1 to 8 as a combination of columns. However, the distribution and restoration apparatus 200 may select either piece of the data of two columns subjected to XOR processing when generating the distributed data SD4. For example, data of the column 1, 10, 3, 4, 13, 6, 7, and 16 may be selected.

The distribution and restoration apparatus 200 generates two pieces of distributed data (distributed data SD1 and SD2 shown in FIG. 2) in the first embodiment by performing distribution processing on the combination of selected columns according to the secret sharing scheme disclosed in Japanese Patent Application No. 2011-077630 of this inventor. By the distribution processing according to the secret sharing scheme disclosed in Japanese Patent Application No. 2011-077630, the combination of columns selected by the distribution and restoration apparatus 200 (for example, the columns 1 to 8), between the pieces of data of the columns 1 to 8 and the columns 9 to 16 used in XOR processing when generating the distributed data SD4, is XOR-processed by different combinations. As a result, two pieces of distributed data (distributed data SD1 and SD2 shown in FIG. 2) are generated.

Specifically, for example, when a combination of the columns 1 to 8 is selected, the distribution and restoration apparatus 200 uses only the column 1 for [distribution (1) a] shown in FIG. 2, uses an XOR-processed value of the columns 2 and 3 for [distribution (1) b] shown in FIG. 2, uses an XOR-processed value of the columns 4 and 5 for [distribution (1) c] shown in FIG. 2, and uses an XOR-processed value of the columns 6 and 7 for [distribution (1) d] shown in FIG. 2, and connects [distribution (1) a], [distribution (1) b], [distribution (1) c], and [distribution (1) d] shown in FIG. 2 in order to generate the distributed data (distributed data SD1 shown in FIG. 2).

In addition, the distribution and restoration apparatus 200 generates new distributed data SD1 by extracting data of some columns from the generated distributed data (distributed data SD1 shown in FIG. 2), and generates data of the remaining columns as the distributed data SD2.

Specifically, the distribution and restoration apparatus 200 generates the distributed data SD1 (refer to FIG. 18) by extracting [distribution (1) a] and [distribution (1) c] shown in FIG. 2 and connecting them in order, and generates the distributed data SD2 (refer to FIG. 18) by connecting [distribution (1) b] and [distribution (1) d] shown in FIG. 2 that are the data of the remaining columns. In addition, since the distributed data SD2 shown in FIG. 2 of two pieces of distributed data (distributed data SD1 and SD2 shown in FIG. 2) is the same as the distributed data SD3 shown in FIG. 18, explanation of the method of generating the distributed data SD3 shown in FIG. 18 will be omitted.

In addition, for the distributed data SD1 in the fifth embodiment, the distribution and restoration apparatus 200 may fill a random number or zero (0) between [distribution (1) a] and [distribution (1) c], or may fill a random number or zero (0) subsequent to [distribution (1) c]. Similarly, for the distributed data SD2 in the fifth embodiment, the distribution and restoration apparatus 200 may fill a random number or zero (0) between [distribution (2) b] and is [distribution (2) d], or may fill a random number or zero (0) before [distribution (2) b].

Thus, when the distribution and restoration apparatus 200 generates distributed data, the information (content) of original data can be made to be missing in the distributed data by performing 2-stage (2-row) convolution processing (XOR processing) on the data of divided blocks of the original data OD. In this manner, the distribution and restoration apparatus 200 can generate distributed data that can prevent the restoration of the original data OD from either the distributed data SD1 or the distributed data SD2, SD3, and SD4.

In addition, as the rate of the asymmetric distribution in the fifth embodiment, as shown in FIG. 18, the data size of the distributed data SD1 stored in the external storage device 510 is ⅛ of the data size of the original data OD, and the data size of the distributed data SD2, SD3, and SD4 stored in the HDD 80 is ⅞ (⅛+¼+½) of the data size of the original data OD. Accordingly, the distribution and restoration apparatus 200 can generate distributed data having asymmetric data sizes of 1:7 for the external storage device 510 and the HDD 80. In addition, the total data size of the distributed data SD1, SD2, SD3, and SD4 is the same as the data size of the original data OD.

Therefore, the information entropy of the generated distributed data is increased by canceling the information (content) of the original data OD using the original data OD and the XOR processing in the distribution and restoration apparatus 200 in the fifth embodiment. For this reason, the distribution and restoration apparatus 200 can make it difficult to restore the original data OD from distributed data less than the threshold value corresponding to the number of pieces of generated distributed data. In addition, just by using the XOR processing, the distribution and restoration apparatus 200 can generate distributed data having asymmetric data sizes compared with the conventional threshold secret sharing scheme. As a result, it is possible to increase the speed of distributed data generation processing.

As described above, since the distribution and restoration apparatus 200 of the fifth embodiment generates a plurality of pieces of distributed data SD1, SD2, SD3, and SD4 by performing an exclusive OR (XOR processing) according to the combination of selected divided blocks, the data size of the distributed data SD1, SD2, SD3, and SD4 can be made to be smaller than the data size of the original data OD. As a result, since it is possible to reduce the amount of memory in the distribution and restoration apparatus 200, it is possible to further increase the speed of distribution processing. In addition, the distribution and restoration apparatus 200 can safely generate the pieces of distributed data SD1, SD2, SD3, and SD4 having asymmetric data sizes.

Method of Restoring the Original Data in the Fifth Embodiment

A specific method of restoring the original data OD in the fifth embodiment will be described with reference to FIG. 19. Since the flow to obtain each divided block of original data by XOR processing of pieces of distributed data in the fifth embodiment is the same as that in the first embodiment, drawings of the flow to obtain each divided block of original data by XOR processing of pieces of distributed data in the fifth embodiment are omitted.

First, the distribution and restoration apparatus 200 acquires all pieces of distributed data SD1, SD2, SD3, and SD4. Specifically, the distribution and restoration apparatus 200 accesses the external storage device 510 by the MAC/PHY 90 to acquire the distributed data SD1 and accesses the HDD 80 by the CPU 60 to acquire the distributed data SD2, SD3, and SD4.

In FIG. 19, the distribution and restoration apparatus 200 acquires the column 1 of the original data OD on the basis of [distribution (1) a] of the distributed data SD1 (1), acquires the column 2 of the original data OD by XOR processing of [distribution (3) a] of the distributed data SD3 and the column 1 already acquired (2), and acquires the column 9 of the original data OD by XOR processing of [distribution (4) a] of the distributed data SD4 and the column 1 already acquired (2).

The distribution and restoration apparatus 200 acquires the column 3 of the original data OD by XOR processing of [distribution (2) b] of the distributed data SD2 and the column 2 already acquired (3), and acquires the column 10 of the original data OD by XOR processing of [distribution (4) b] of the distributed data SD4 and the column 2 already acquired (3).

The distribution and restoration apparatus 200 acquires the column 4 of the original data OD by XOR processing of [distribution (3) b] of the distributed data SD3 and the column 3 already acquired (4), and acquires the column 11 of the original data OD by XOR processing of [distribution (4) c] of the distributed data SD4 and the column 3 already acquired (4).

The distribution and restoration apparatus 200 acquires the column 5 of the original data OD by XOR processing of [distribution (1) c] of the distributed data SD1 and the column 4 already acquired (5), and acquires the column 12 of the original data OD by XOR processing of [distribution (4) d] of the distributed data SD4 and the column 4 already acquired (5).

The distribution and restoration apparatus 200 acquires the column 6 of the original data OD by XOR processing of [distribution (3) c] of the distributed data SD3 and the column 5 already acquired (6), and acquires the column 13 of the original data OD by XOR processing of [distribution (4) e] of the distributed data SD4 and the column 5 already acquired (6).

The distribution and restoration apparatus 200 acquires the column 7 of the original data OD by XOR processing of [distribution (2) d] of the distributed data SD2 and the column 6 already acquired (7), and acquires the column 14 of the original data OD by XOR processing of [distribution (4) f] of the distributed data SD4 and the column 6 already acquired (7).

The distribution and restoration apparatus 200 acquires the column 8 of is the original data OD by XOR processing of [distribution (3) d] of the distributed data SD3 and the column 7 already acquired (8), and acquires the column 15 of the original data OD by XOR processing of [distribution (4) g] of the distributed data SD4 and the column 7 already acquired (8).

Finally, the distribution and restoration apparatus 200 acquires the column 16 of the original data OD by XOR processing of [distribution (4) h] of the distributed data SD4 and the column 8 already acquired (9).

The distribution and restoration apparatus 200 acquires the original data OD by connecting in order the divided blocks DB1 to DB16 of the columns 1 to 16 acquired in each operation of (1) to (9). Then, the distribution and restoration apparatus 200 ends the process of restoring the original data OD.

As described above, since the distribution and restoration apparatus 200 of the fifth embodiment can perform the process of restoring the original data OD at high speed using a plurality of pieces of distributed data SD1, SD2, SD3, and SD4 that are generated by performing an exclusive OR (XOR processing) according to the combination of selected divided blocks, it is possible to reduce the amount of memory in the distribution and restoration apparatus 200. In addition, the distribution and restoration apparatus 200 can restore the original data OD safely from the pieces of distributed data SD1, SD2, SD3, and SD4 having asymmetric data sizes.

Sixth Embodiment

Figure 20:
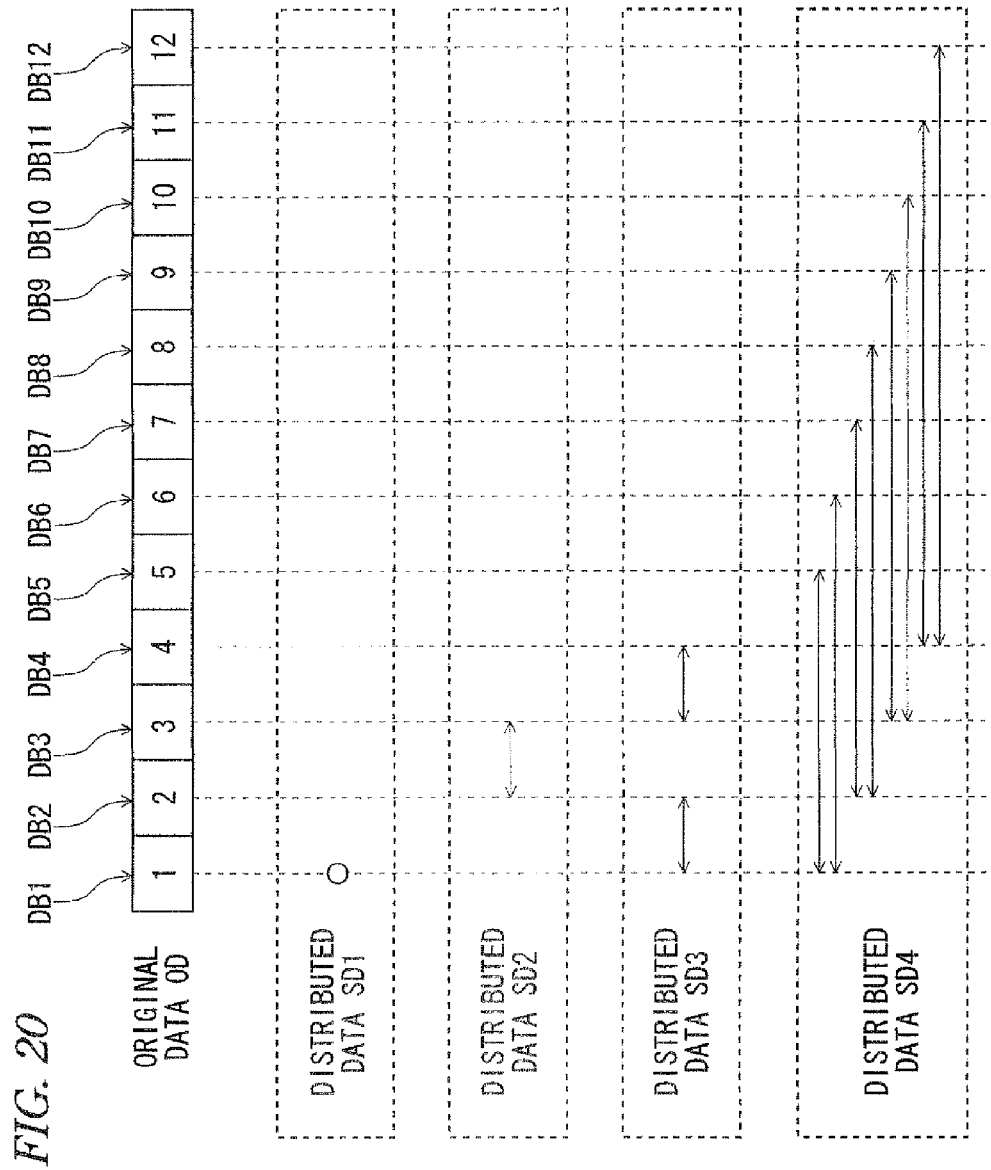
FIG. 20 is an explanatory view showing an example of a method of generating the distributed data in a sixth embodiment.
Figure 21:
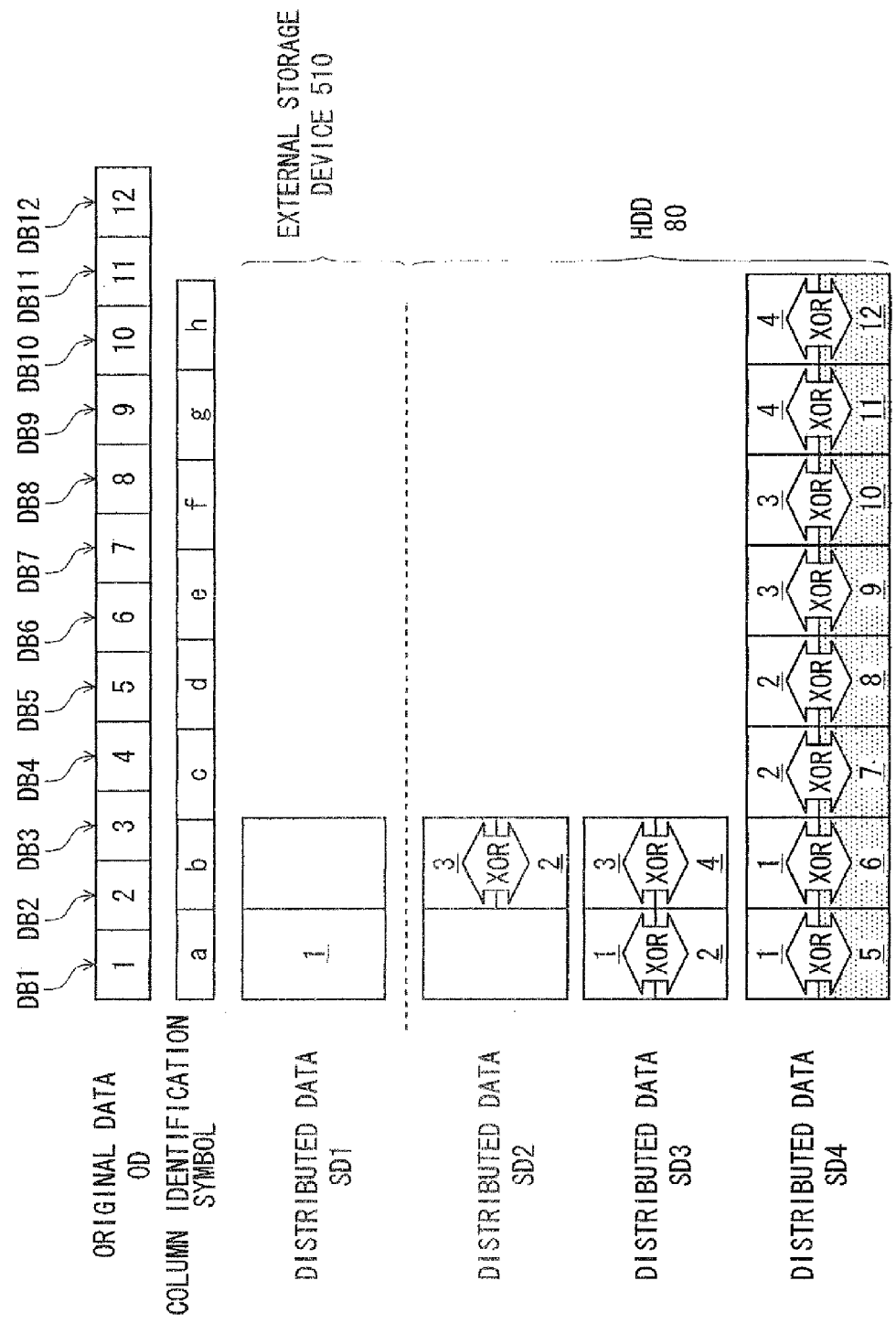
FIG. 21 is an explanatory view showing the content of the distributed data in the sixth embodiment.
Figure 22:
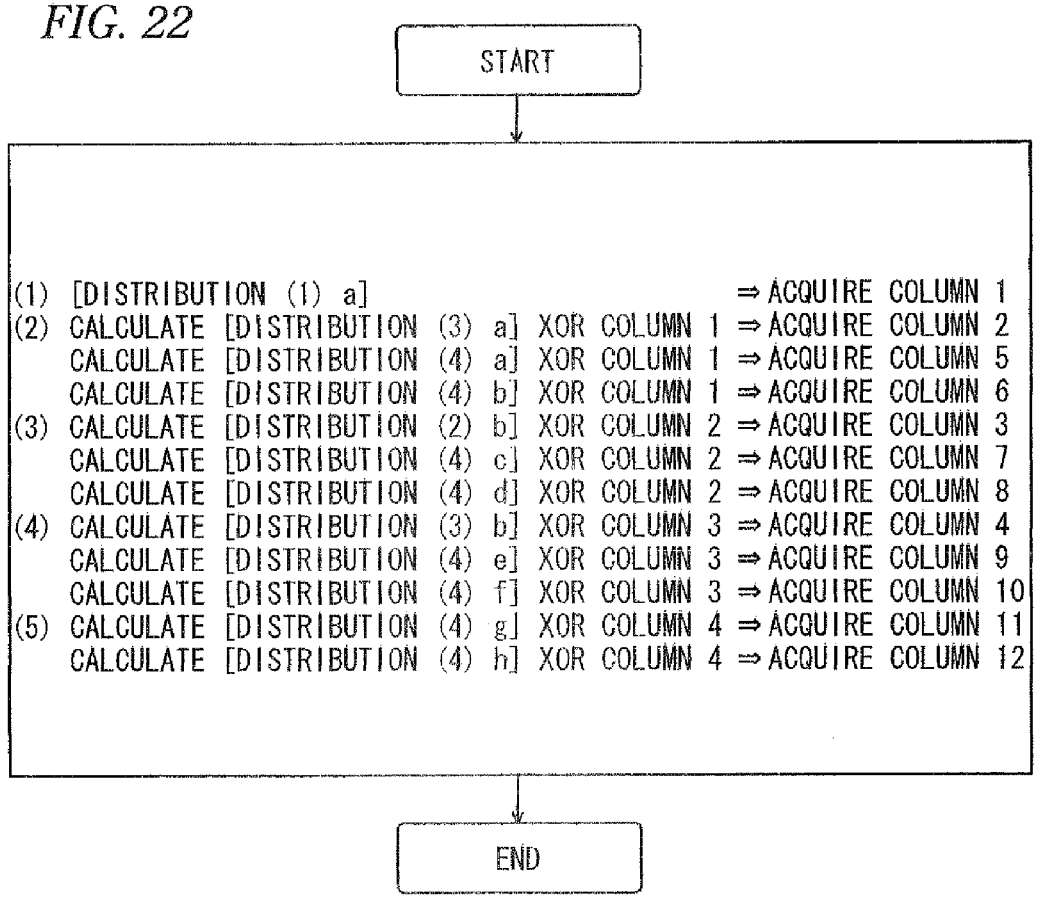
FIG. 22 is a flow chart illustrating the operation procedure in the sixth embodiment.

First, a sixth embodiment of the distribution and restoration apparatus 200 will be described with reference to FIG. 20 to 22. FIG. 20 is an explanatory view showing an example of a method of generating the distributed data in the sixth embodiment. FIG. 21 is an explanatory view showing the content of distributed data in the sixth embodiment. FIG. 22 is a flow chart illustrating the operation procedure in the sixth embodiment.

In the sixth embodiment, a method of generating a total of four pieces of distributed data SD1, SD2, SD3, and SD4, each of which has a smaller data size than the data size of the original data OD, from the original data OD and a method of restoring the original data OD using the four pieces of distributed data SD1, SD2, SD3, and SD4 will be described.

For example, the distribution and restoration apparatus 200 stores the distributed data SD1 in the external storage device 510 and stores the distributed data SD2, SD3, and SD4 in the HDD 80. In this manner, the distribution and restoration apparatus 200 distributes the four pieces of distributed data SD1, SD2, SD3, and SD4 asymmetrically in the external storage device 510 and the HDD 80, for example.

In the sixth embodiment, as shown in FIGS. 20 and 21, the original data OD is configured to include a total of twelve divided blocks DB1 to DB12 connected in order. In addition, although the original data OD is configured to include a total of twelve divided blocks DB1 to DB12 in order to simplify explanation in the sixth embodiment, the number of divided blocks that form the original data OD is not limited to 12.

Configuration of Distributed Data in the Sixth Embodiment

The configuration of distributed data in the sixth embodiment will be described with reference to FIGS. 20 and 21. In the distributed data SD1 shown in FIGS. 20 and 21, [distribution (1) a] is a divided block DB1 of the column 1.

Therefore, the distributed data SD1 is formed by the data of one column [distribution (1) a].

Thus, the distributed data SD1 is formed by performing 2-stage convolution of the data of divided blocks corresponding to the data size of 1/6 of the original data OD by XOR processing. Accordingly, the number of blocks (columns) of the distributed data SD1 is 1, which is 1/12 of 12 that is the number of blocks (columns) of the original data OD.

Then, in the distributed data SD2 shown in FIGS. 17 and 18, [distribution (2) b] is an XOR-processed value of the divided block DB2 of the column 2 and the divided block DB3 of the column 3.

Therefore, the distributed data SD2 is formed by the data of one column [distribution (2) b].

Thus, the distributed data SD2 is formed by performing 2-stage convolution of the data of divided blocks corresponding to the data size of 1/6 of the original data OD by XOR processing. Accordingly, the number of blocks (columns) of the distributed data SD2 is 1, which is 1/12 of 12 that is the number of blocks (columns) of the original data OD.

Since the distributed data SD3 shown in FIGS. 17 and 18 is the same as the distributed data SD2 in the fourth embodiment shown in FIGS. 13 and 14, explanation thereof will be omitted.

In addition, since the distributed data SD4 shown in FIGS. 17 and 18 is the same as the distributed data SD3 in the fourth embodiment shown in FIGS. 13 and 14, explanation thereof will be omitted.

Method of Generating Distributed Data in the Sixth Embodiment

A specific method of generating the distributed data SD1, SD2, SD3, and SD4 in the sixth embodiment will be described with reference to FIGS. 20 and 21. First, the distribution and restoration apparatus 200 divides the original data OD into two pieces of data having different data sizes. For example, the distribution and restoration apparatus 200 divides the original data OD including a total of twelve divided blocks DB1 to DB12 equally into data of the columns 1 to 4 and data of the columns 5 to 12.

The distribution and restoration apparatus 200 performs XOR processing of the data of one of the columns 1 to 4 and the data of one of the columns 5 to 12 and connects a total of eight XOR-processed pieces of data to generate the distributed data SD4. In the sixth embodiment, when generating the distributed data SD4, the distribution and restoration apparatus 200 performs XOR processing with the data of one of the columns 5 to 12 using the data of the columns 1 to 4 twice.

For example, as shown in FIGS. 20 and 21, the distribution and restoration apparatus 200 generates the distributed data SD4 by connecting in order the XOR-processed data of the columns 1 and 5, the XOR-processed data of the columns 1 and 6, the XOR-processed data of the columns 2 and 7, the XOR-processed data of the columns 2 and 8, the XOR-processed data of the columns 3 and 9, the XOR-processed data of the columns 3 and 10, the XOR-processed data of the columns 4 and 11, and the XOR-processed data of the columns 4 and 12.

Then, the distribution and restoration apparatus 200 selects a combination of columns having a smaller number of data between the data of the columns 1 to 4 and the data of the columns 5 to 12 used in XOR processing when generating the distributed data SD4. That is, the distribution and restoration apparatus 200 selects a combination of the data of the columns 1 to 4.

The distribution and restoration apparatus 200 generates two pieces of distributed data (distributed data SD1 and SD2 shown in FIG. 14) in the fourth embodiment by performing distribution processing on the combination of selected columns according to the secret sharing scheme disclosed in Japanese Patent Application No. 2011-077630 of this inventor. By the distribution processing according to the secret sharing scheme disclosed in Japanese Patent Application No. 2011-077630, the combination of columns selected by the distribution and restoration apparatus 200 (for example, the columns 1 to 4), between the pieces of data of the columns 1 to 4 and the columns 5 to 12 used in XOR processing when generating the distributed data SD4, is XOR-processed by different combinations. As a result, two pieces of distributed data (distributed data SD1 and SD2 shown in FIG. 14) are generated.

Specifically, for example, when a combination of the columns 1 to 4 is selected, the distribution and restoration apparatus 200 uses only the column 1 for [distribution (1) a] shown in FIG. 14 and uses an XOR-processed value of the columns 2 and 3 for [distribution (1) b] shown in FIG. 14, and connects [distribution (1) a] and [distribution (1) b] shown in FIG. 14 in order to generate the distributed data (distributed data SD1 shown in FIG. 14).

In addition, the distribution and restoration apparatus 200 generates new distributed data SD1 (refer to FIG. 21) by extracting data of some columns from the generated distributed data (distributed data SD1 shown in FIG. 14), and generates data of the remaining columns as the distributed data SD2 (refer to FIG. 21).

Specifically, the distribution and restoration apparatus 200 generates the distributed data SD1 (refer to FIG. 21) by extracting [distribution (1) a] shown in FIG. 14, and generates the distributed data SD2 (refer to FIG. 21) formed by [distribution (1) b] shown in the FIG. 14 that is the data of the remaining columns. In addition, since the distributed data SD2 shown in FIG. 14 of two pieces of distributed data (distributed data SD1 and SD2 shown in FIG. 14) is the same as the distributed data SD3 shown in FIG. 21, explanation of the method of generating the distributed data SD3 shown in FIG. 21 will be omitted.

In addition, for the distributed data SD1 in the sixth embodiment, the distribution and restoration apparatus 200 may fill a random number or zero (0) subsequent to [distribution (1) a]. Similarly, for the distributed data SD2 in the sixth embodiment, the distribution and restoration apparatus 200 may fill a random number or zero (0) before [distribution (2) b].

Thus, when the distribution and restoration apparatus 200 generates distributed data, the information (content) of original data can be made to be missing in the distributed data by performing 2-stage (2-row) convolution processing (XOR processing) on the data of divided blocks of the original data OD. In this manner, the distribution and restoration apparatus 200 can generate distributed data that can prevent the restoration of the original data OD from either the distributed data SD1 or the distributed data SD2 SD3, and SD4.

In addition, as the rate of the asymmetric distribution in the sixth embodiment, as shown in FIG. 21, the data size of the distributed data SD1 stored in the external storage device 510 is $\frac{1}{12}$ of the data size of the original data OD, and the data size of the distributed data SD2, SD3, and SD4 stored in the HDD 80 is $\frac{11}{12}$ ($\frac{1}{12}+\frac{1}{6}+\frac{2}{3}$) of the data size of the original data OD. Accordingly, the distribution and restoration apparatus 200 can generate distributed data having asymmetric data sizes of 1:11 for the external storage device 510 and the HDD 80. In addition, the total data size of the distributed data SD1, SD2, SD3, and SD4 is the same as the data size of the original data OD.

Therefore, the information entropy of the generated distributed data is increased by canceling the information (content) of the original data OD using the original data OD and the XOR processing in the distribution and restoration apparatus 200 in the sixth embodiment. For this reason, the distribution and restoration apparatus 200 can make it difficult to restore the original data OD from distributed data less than the threshold value corresponding to the number of pieces of generated distributed data. In addition, just by using the XOR processing, the distribution and restoration apparatus 200 can generate distributed data having asymmetric data sizes compared with the conventional threshold secret sharing scheme. As a result, it is possible to increase the speed of distributed data generation processing.

As described above, since the distribution and restoration apparatus 200 of the sixth embodiment generates a plurality of pieces of distributed data SD1, SD2, SD3, and SD4 by performing an exclusive OR (XOR processing) according to the combination of selected divided blocks, the data size of the distributed data SD1, SD2, SD3, and SD4 can be made to be smaller than the data size of the original data OD. As a result, since it is possible to reduce the amount of memory in the distribution and restoration apparatus 200, it is possible to further increase the speed of distribution processing. In addition, the distribution and restoration apparatus 200 can safely generate the pieces of distributed data SD1, SD2, SD3, and SD4 having asymmetric data sizes.

Method of Restoring the Original Data in the Sixth Embodiment

A specific method of restoring the original data OD in the sixth embodiment will be described with reference to FIG. 22. Since the flow to obtain each divided block of original data by XOR processing of pieces of distributed data in the sixth embodiment is the same as that in the fourth embodiment, drawings of the flow to obtain each divided block of original data by XOR processing of pieces of distributed data in the sixth embodiment are omitted.

First, the distribution and restoration apparatus 200 acquires all pieces of distributed data SD1, SD2, SD3, and SD4. Specifically, the distribution and restoration apparatus 200 accesses the external storage device 510 by the MAC/PHY 90 to acquire the distributed data SD1 and accesses the HDD 80 by the CPU 60 to acquire the distributed data SD2, SD3, and SD4.

In FIG. 22, the distribution and restoration apparatus 200 acquires the column 1 of the original data OD on the basis of [distribution (1) a] of the distributed data SD1 (1).

The distribution and restoration apparatus 200 acquires the column 2 of the original data OD by XOR processing of [distribution (3) a] of the distributed data SD3 and the column 1 already acquired (2), acquires the column 5 of the original data OD by XOR processing of [distribution (4) a] of the distributed data SD4 and the column 1 already acquired (2), and acquires the column 6 of the original data OD by XOR processing of [distribution (4) b] of the distributed data SD4 and the column 1 already acquired (2).

The distribution and restoration apparatus 200 acquires the column 3 of the original data OD by XOR processing of [distribution (2) b] of the distributed data SD2 and the column 2 already acquired (3), acquires the column 7 of the original data OD by XOR processing of [distribution (4) c] of the distributed data SD4 and the column 2 already acquired (3), and acquires the column 8 of the original data OD by XOR processing of [distribution (4) d] of the distributed data SD4 and the column 2 already acquired (3).

The distribution and restoration apparatus 200 acquires the column 4 of the original data OD by XOR processing of [distribution (3) b] of the distributed data SD3 and the column 3 already acquired (4), acquires the column 9 of the original data OD by XOR processing of [distribution (4) e] of the distributed data SD4 and the column 3 already acquired (4), and acquires the column 10 of the original data OD by XOR processing of [distribution (4) f] of the distributed data SD4 and the column 4 already acquired (4).

Finally, the distribution and restoration apparatus 200 acquires the column 11 of the original data OD by XOR processing of [distribution (4) g] of the distributed data SD4 and the column 4 already acquired (5), and acquires the column 12 of the original data OD by XOR processing of [distribution (4) h] of the distributed data SD4 and the column 4 already acquired (5).

The distribution and restoration apparatus 200 acquires the original data OD by connecting in order the divided blocks DB1 to DB12 of the columns 1 to 12 acquired in each operation of (1) to (5). Then, the distribution and restoration apparatus 200 ends the process of restoring the original data OD.

As described above, since the distribution and restoration apparatus 200 of the sixth embodiment can perform the process of restoring the original data OD at high speed using a plurality of pieces of distributed data SD1, SD2, SD3, and SD4 that are generated by performing an exclusive OR (XOR processing) according to the combination of selected divided blocks, it is possible to reduce the amount of memory in the distribution and restoration apparatus 200. In addition, the distribution and restoration apparatus 200 can restore the original data OD safely from the pieces of distributed data SD1, SD2, SD3, and SD4 having asymmetric data sizes.

Seventh Embodiment

Figure 23:
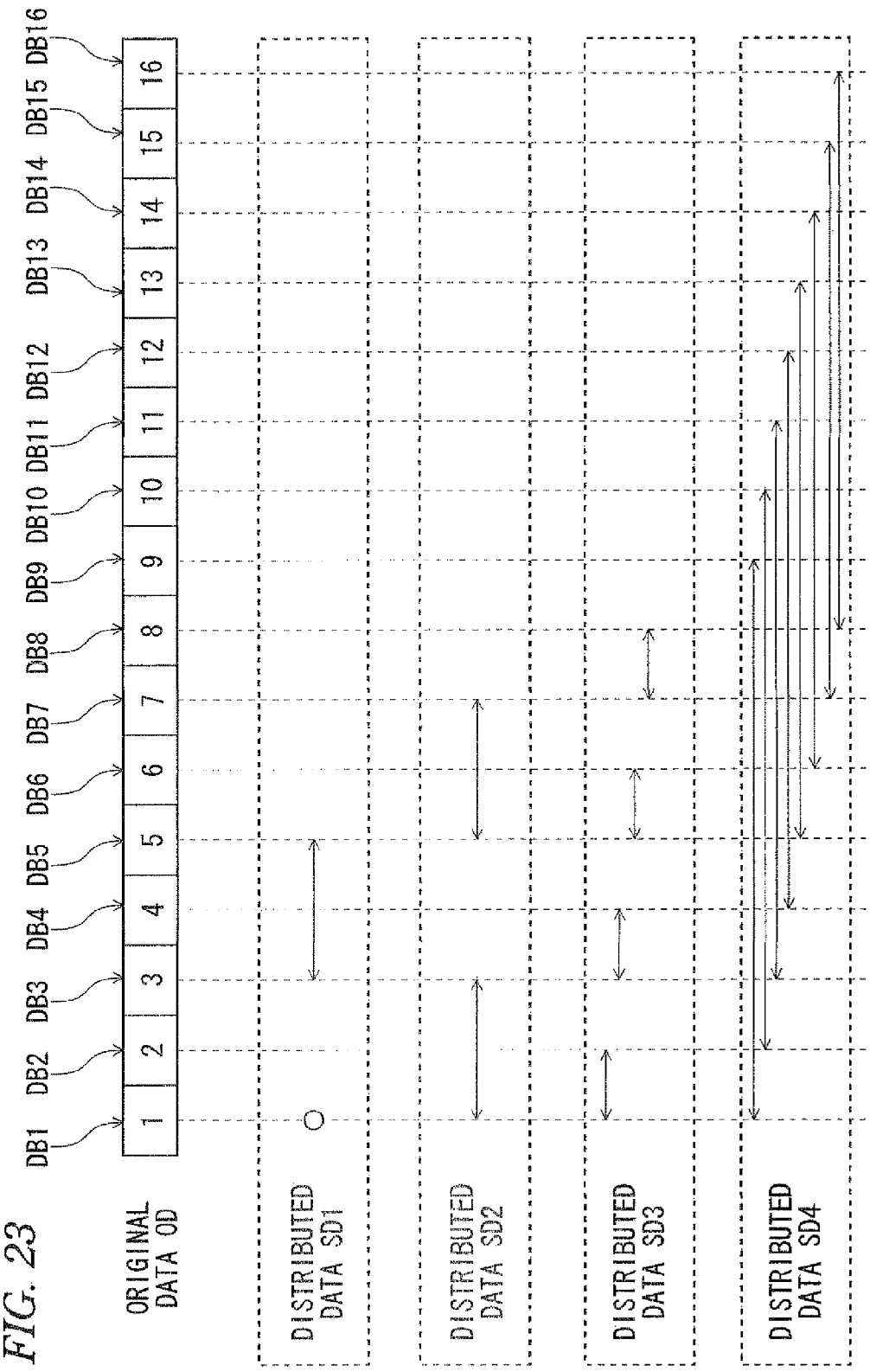
FIG. 23 is an explanatory view showing an example of a method of generating the distributed data in a seventh embodiment.
Figure 24:
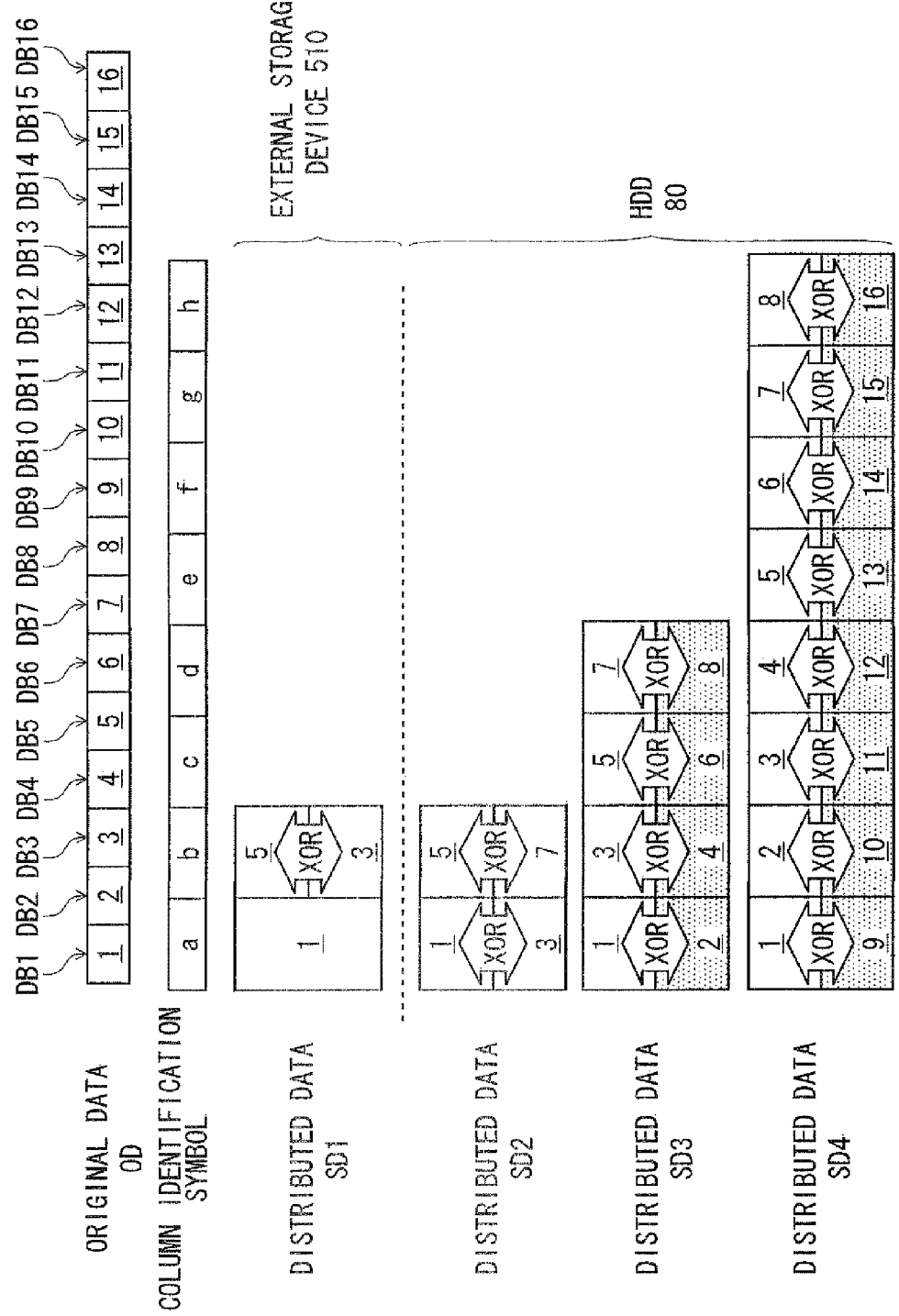
FIG. 24 is an explanatory view showing the content of the distributed data in the seventh embodiment.
Figure 25:
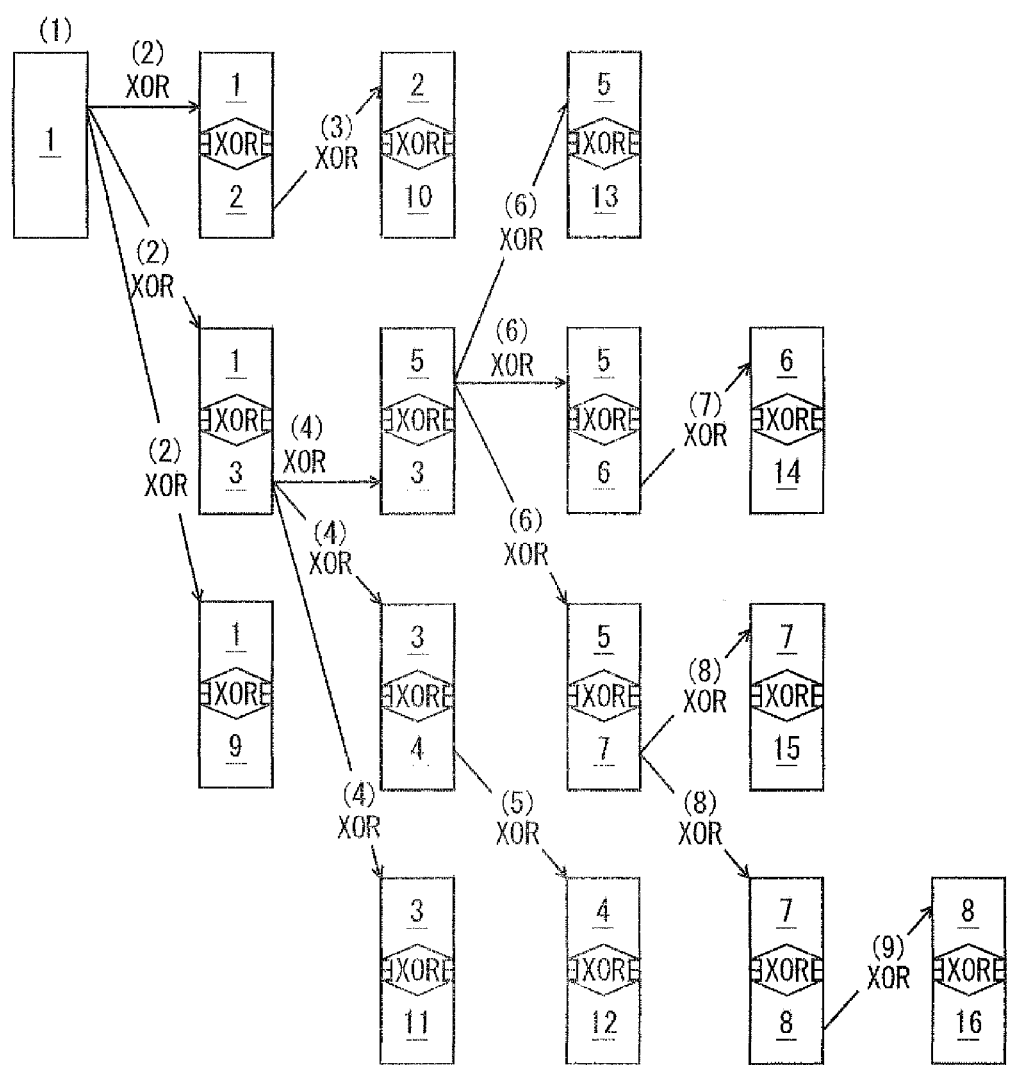
FIG. 25 is an explanatory view showing the flow to obtain each divided block of original data by XOR processing between pieces of distributed data in the seventh embodiment.
Figure 26:
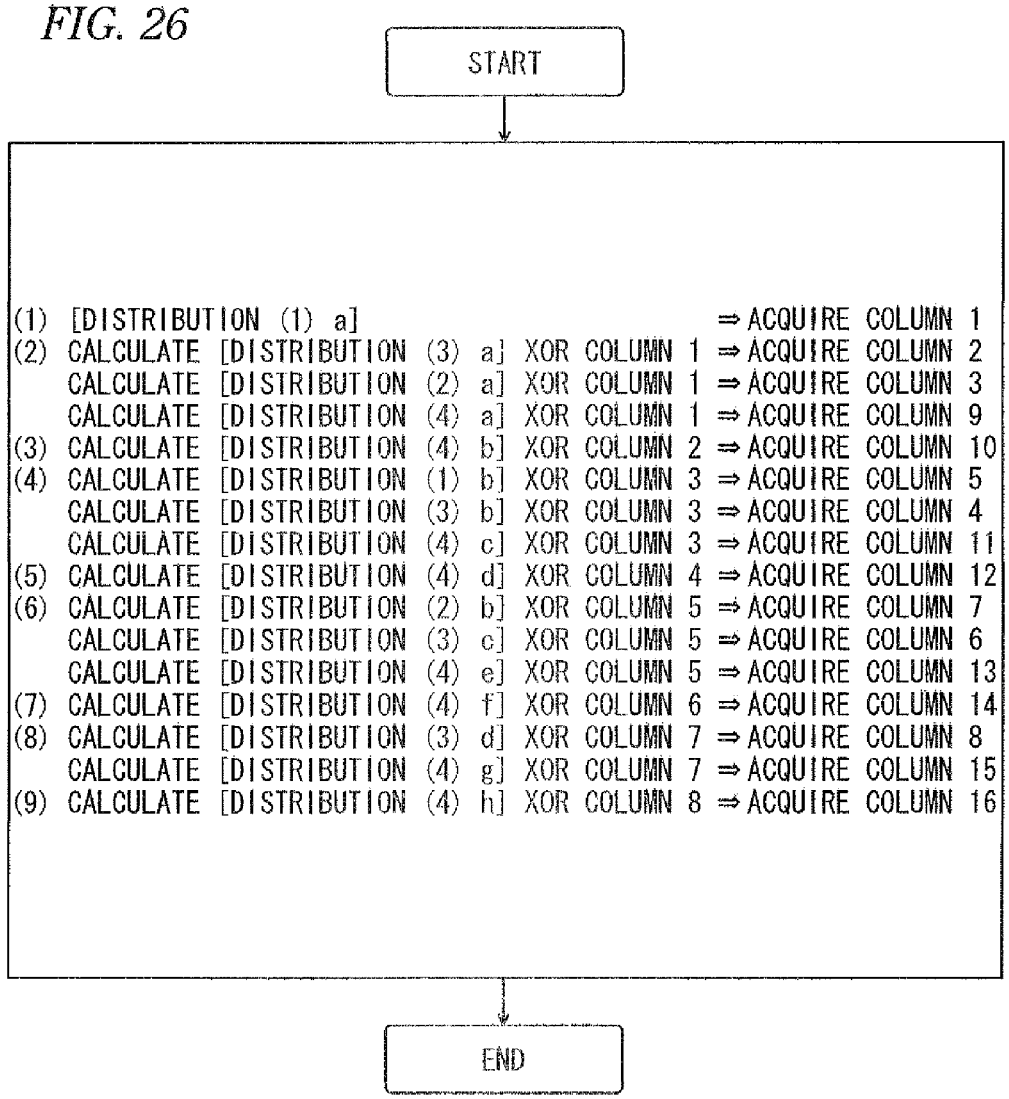
FIG. 26 is a flow chart illustrating the operation procedure in the seventh embodiment.

First, a seventh embodiment of the distribution and restoration apparatus 200 will be described with reference to FIG. 23 to 26. FIG. 23 is an explanatory view showing an example of a method of generating the distributed data in the seventh embodiment. FIG. 24 is an explanatory view showing the content of distributed data in the seventh embodiment. FIG. 25 is an explanatory view showing the flow to obtain each divided block of original data by XOR processing of pieces of distributed data in the seventh embodiment. FIG. 26 is a flow chart illustrating the operation procedure in the seventh embodiment.

In the seventh embodiment, a method of generating a total of four pieces of distributed data SD1, SD2, SD3, and SD4, each of which has a smaller data size than the data size of the original data OD, from the original data OD and a method of restoring the original data OD using the four pieces of distributed data SD1, SD2, SD3, and SD4 will be described.

For example, the distribution and restoration apparatus 200 stores the distributed data SD1 in the external storage device 510 and stores the distributed data SD2, SD3, and SD4 in the HDD 80. In this manner, the distribution and restoration apparatus 200 distributes the four pieces of distributed data SD1, SD2, SD3, and SD4 asymmetrically in the external storage device 510 and the HDD 80, for example.

In the seventh embodiment, as shown in FIGS. 23 and 24, the original data OD is configured to include a total of sixteen divided blocks DB1 to DB16 connected in order. In addition, although the original data OD is configured to include a total of sixteen divided blocks DB1 to DB16 in order to simplify explanation in the seventh embodiment, the number of divided blocks that form the original data OD is not limited to 16.

Configuration of Distributed Data in the Seventh Embodiment

The configuration of distributed data in the seventh embodiment will be described with reference to FIGS. 23 and 24. In the distributed data SD1 shown in FIGS. 23 and 24, [distribution (1) a] is a divided block DB1 of the column 1, and [distribution (1) b] is an XOR-processed value of the divided block DB3 of the column 3 and the divided block DB5 of the column 5.

Therefore, the distributed data SD1 has a configuration in which two columns [distribution (1) a] and [distribution (1) b] are connected in order.

Thus, the distributed data SD1 is formed by performing 2-stage convolution of the data of divided blocks corresponding to the data size of ¼ of the original data OD by XOR processing. Accordingly, the number of blocks (columns) of the distributed data SD1 is 2, which is ⅛ of 16 that is the number of blocks (columns) of the original data OD.

Then, in the distributed data SD2 shown in FIGS. 23 and 24, [distribution (2) a] is an XOR-processed value of the divided block DB1 of the column 1 and the divided block DB3 of the column 3, and [distribution (2) b] is an XOR-processed value of the divided block DB5 of the column 5 and the divided block DB7 of the column 7.

Therefore, the distributed data SD2 has a configuration in which two columns [distribution (2) a] and [distribution (2) b] are connected in order.

Thus, the distributed data SD2 is formed by performing 2-stage convolution of the data of divided blocks corresponding to the data size of ¼ of the original data OD by XOR processing. Accordingly, the number of blocks (columns) of the distributed data SD2 is 2, which is ⅛ of 16 that is the number of blocks (columns) of the original data OD.

Since the distributed data SD3 shown in FIGS. 23 and 24 is the same as the distributed data SD2 in the first embodiment shown in FIGS. 1 and 2, explanation thereof will be omitted.

In addition, since the distributed data SD4 shown in FIGS. 23 and 24 is the same as the distributed data SD3 in the first embodiment shown in FIGS. 1 and 2, explanation thereof will be omitted.

Method of Generating Distributed Data in the Seventh Embodiment

A specific method of generating the distributed data SD1, SD2, SD3, and SD4 in the seventh embodiment will be described with reference to FIGS. 23 and 24. First, the distribution and restoration apparatus 200 divides the original data OD equally into two pieces of data. However, the distribution and restoration apparatus 200 may divide the original data OD equally into three or more pieces of data (refer to the second embodiment). For example, the distribution and restoration apparatus 200 divides the original data OD including a total of sixteen divided blocks DB1 to DB16 equally into data of the columns 1 to 8 and data of the columns 9 to 16.

The distribution and restoration apparatus 200 performs XOR processing of the data of one of the columns 1 to 8 and the data of one of the columns 9 to 16 and connects a total of eight XOR-processed pieces of data to generate the distributed data SD4.

For example, as shown in FIGS. 23 and 24, the distribution and restoration apparatus 200 generates the distributed data SD4 by connecting in order the XOR-processed data of the columns 1 and 9, the XOR-processed data of the columns 2 and 10, the XOR-processed data of the columns 3 and 11, the XOR-processed data of the columns 4 and 12, the XOR-processed data of the columns 5 and 13, the XOR-processed data of the columns 6 and 14, the XOR-processed data of the columns 7 and 15, and the XOR-processed data of the columns 8 and 16.

Then, the distribution and restoration apparatus 200 selects a combination of columns of either the data of the columns 1 to 8 or the data of the columns 9 to 16 used in XOR processing when generating the distributed data SD4. Here, in order to simplify explanation, the distribution and restoration apparatus 200 selects the data of the columns 1 to 8 as a combination of columns. However, the distribution and restoration apparatus 200 may select either piece of the data of two columns subjected to XOR processing when generating the distributed data SD4. For example, data of to the columns 1, 10, 3, 4, 13, 6, 7, and 16 may be selected.

The distribution and restoration apparatus 200 generates two pieces of distributed data (distributed data SD1 and SD2 shown in FIG. 2) by performing distribution processing on the combination of selected columns according to the secret sharing scheme disclosed in Japanese Patent Application No. 2011-077630 of this inventor. By the distribution processing according to the secret sharing scheme disclosed in Japanese Patent Application No. 2011-077630, the combination of columns selected by the distribution and restoration apparatus 200 (for example, the columns 1 to 8), between the pieces of data of the columns 1 to 8 and the columns 9 to 16 used in XOR processing when generating the distributed data SD4, is XOR-processed by different combinations. As a result, two pieces of distributed data (distributed data SD1 and SD2 shown in FIG. 2) are generated.

Specifically, for example, when a combination of the columns 1 to 8 is selected, the distribution and restoration apparatus 200 uses only the column 1 for [distribution (1) a] shown in FIG. 2, uses an XOR-processed value of the columns 2 and 3 for [distribution (1) b] shown in FIG. 2, uses an XOR-processed value of the columns 4 and 5 for [distribution (1) c] shown in FIG. 2, and uses an XOR-processed value of the columns 6 and 7 for [distribution (1) d] shown in FIG. 2, and connects [distribution (1) a], [distribution (1) b], [distribution (1) c], and [distribution (1) d] shown in FIG. 2 in order to generate the distributed data (distributed data SD1 shown in FIG. 2).

In addition, the distribution and restoration apparatus 200 generates new distributed data SD1 (refer to FIG. 24) by extracting data of some columns from the generated distributed data (distributed data SD1 shown in FIG. 2) and changing the extracted data of some columns to data of other columns, and changes data of some of the remaining columns to data of other columns and generates the result as the distributed data SD2 (refer to FIG. 24).

Specifically, the distribution and restoration apparatus 200 generates the distributed data SD1 (refer to FIG. 24) by extracting [distribution (1) a] and [distribution (1) c] shown in FIG. 2, changing the column 4 of [distribution (1) a] to the column 3, and connecting them in order, and generates the distributed data SD2 (refer to FIG. 24) by changing the column 2 of the data [distribution (1) b] of the remaining column to the column 1, changing the column 6 of the data [distribution (1) d] of the column 5, and connecting them in order. In addition, since the distributed data SD2 shown in FIG. 2 of two pieces of distributed data (distributed data SD1 and SD2 shown in FIG. 2) is the same as the distributed data SD3 shown in FIG. 24, explanation of the method of generating the distributed data SD3 shown in FIG. 24 will be omitted.

Thus, when the distribution and restoration apparatus 200 generates distributed data, the information (content) of original data can be made to be missing in the distributed data by performing 2-stage (2-row) convolution processing (XOR processing) on the data of divided blocks of the original data OD. In this manner, the distribution and restoration apparatus 200 can generate distributed data that can prevent the restoration of the original data OD from either the distributed data SD1 or the distributed data SD2, SD3, and SD4.

In addition, as the rate of the asymmetric distribution in the seventh embodiment, as shown in FIG. 24, the data size of the distributed data SD1 stored in the external storage device 510 is ⅛ of the data size of the original data OD, and the data size of the distributed data SD2, SD3, and SD4 stored in the HDD 80 is ⅞ (⅛+¼+½) of the data size of the original data OD. Accordingly, the distribution and restoration apparatus 200 can generate distributed data having asymmetric data sizes of 1:7 for the external storage device 510 and the HDD 80. In addition, the total data size of the distributed data SD1, SD2, SD3, and SD4 is the same as the data size of the original data OD.

Therefore, the information entropy of the generated distributed data is increased by canceling the information (content) of the original data OD using the original data OD and the XOR processing in the distribution and restoration apparatus 200 in the seventh embodiment. For this reason, the distribution and restoration apparatus 200 can make it difficult to restore the original data OD from distributed data less than the threshold value corresponding to the number of pieces of generated distributed data. In addition, just by using the XOR processing, the distribution and restoration apparatus 200 can generate distributed data having asymmetric data sizes compared with the conventional threshold secret sharing scheme. As a result, it is possible to increase the speed of distributed data generation processing.

As described above, since the distribution and restoration apparatus 200 of the seventh embodiment generates a plurality of pieces of distributed data SD1, SD2, SD3, and SD4 by performing an exclusive OR (XOR processing) according to the combination of selected divided blocks, the data size of the distributed data SD1, SD2, SD3, and SD4 can be made to be smaller than the data size of the original data OD. As a result, since it is possible to reduce the amount of memory in the distribution and restoration apparatus 200, it is possible to further increase the speed of distribution processing. In addition, the distribution and restoration apparatus 200 can safely generate the pieces of distributed data SD1, SD2, SD3, and SD4 having asymmetric data sizes.

Method of Restoring the Original Data in the Seventh Embodiment

A specific method of restoring the original data OD in the seventh embodiment will be described with reference to FIGS. 25 and 26. First, the distribution and restoration apparatus 200 acquires all pieces of distributed data SD1, SD2, SD3, and SD4. Specifically, the distribution and restoration apparatus 200 accesses the external storage device 510 by the MAC/PHY 90 to acquire the distributed data SD1 and accesses the HDD 80 by the CPU 60 to acquire the distributed data SD2, SD3, and SD4.

In FIG. 26, the distribution and restoration apparatus 200 acquires the column 1 of the original data OD on the basis of [distribution (1) a] of the distributed data SD1 (1), acquires the column 2 of the original data OD by XOR processing of [distribution (3) a] of the distributed data SD3 and the column 1 already acquired (2), acquires the column 3 of the original data OD by XOR processing of [distribution (2) a] of the distributed data SD2 and the column 1 already acquired (2), and acquires the column 9 of the original data OD by XOR processing of [distribution (4) a] of the distributed data SD4 and the column 1 already acquired (2).

The distribution and restoration apparatus 200 acquires the column 10 of the original data OD by XOR processing of [distribution (4) b] of the distributed data SD4 and the column 2 already acquired (3).

The distribution and restoration apparatus 200 acquires the column 5 of the original data OD by XOR processing of [distribution (1) b] of the distributed data SD1 and the column 3 already acquired (4), acquires the column 4 of the original data OD by XOR processing of [distribution (3) b] of the distributed data SD3 and the column 3 already acquired (4), and acquires the column 11 of the original data OD by XOR processing of [distribution (4) c] of the distributed data SD4 and the column 3 already acquired (4).

The distribution and restoration apparatus 200 acquires the column 12 of the original data OD by XOR processing of [distribution (4) d] of the distributed data SD4 and the column 4 already acquired (5).

The distribution and restoration apparatus 200 acquires the column 7 of the original data OD by XOR processing of [distribution (2) b] of the distributed data SD2 and the column 5 already acquired (6), acquires the column 6 of the original data OD by XOR processing of [distribution (3) c] of the distributed data SD3 and the column 5 already acquired (6), and acquires the column 13 of the original data OD by XOR processing of [distribution (4) 3] of the distributed data SD4 and the column 5 already acquired (6).

The distribution and restoration apparatus 200 acquires the column 14 of the original data OD by XOR processing of [distribution (4) f] of the distributed data SD4 and the column 6 already acquired (7).

The distribution and restoration apparatus 200 acquires the column 8 of the original data OD by XOR processing of [distribution (3) d] of the distributed data SD3 and the column 7 already acquired (8), and acquires the column 15 of the original data OD by XOR processing of [distribution (4) g] of the distributed data SD4 and the column 7 already acquired (8).

Finally, the distribution and restoration apparatus 200 acquires the column 16 of the original data OD by XOR processing of [distribution (4) h] of the distributed data SD4 and the column 8 already acquired (9).

The distribution and restoration apparatus 200 acquires the original data OD by connecting in order the divided blocks DB1 to DB16 of the columns 1 to 16 acquired in each operation of (1) to (9). Then, the distribution and restoration apparatus 200 ends the process of restoring the original data OD.

As described above, since the distribution and restoration apparatus 200 of the seventh embodiment can perform the process of restoring the original data OD at high speed using a plurality of pieces of distributed data SD1, SD2, SD3, and SD4 that are generated by performing an exclusive OR (XOR processing) according to the combination of selected divided blocks, it is possible to reduce the amount of memory in the distribution and restoration apparatus 200. In addition, the distribution and restoration apparatus 200 can restore the original data OD safely from the pieces of distributed data SD1, SD2, SD3, and SD4 having asymmetric data sizes.

Eighth Embodiment

Figure 27:
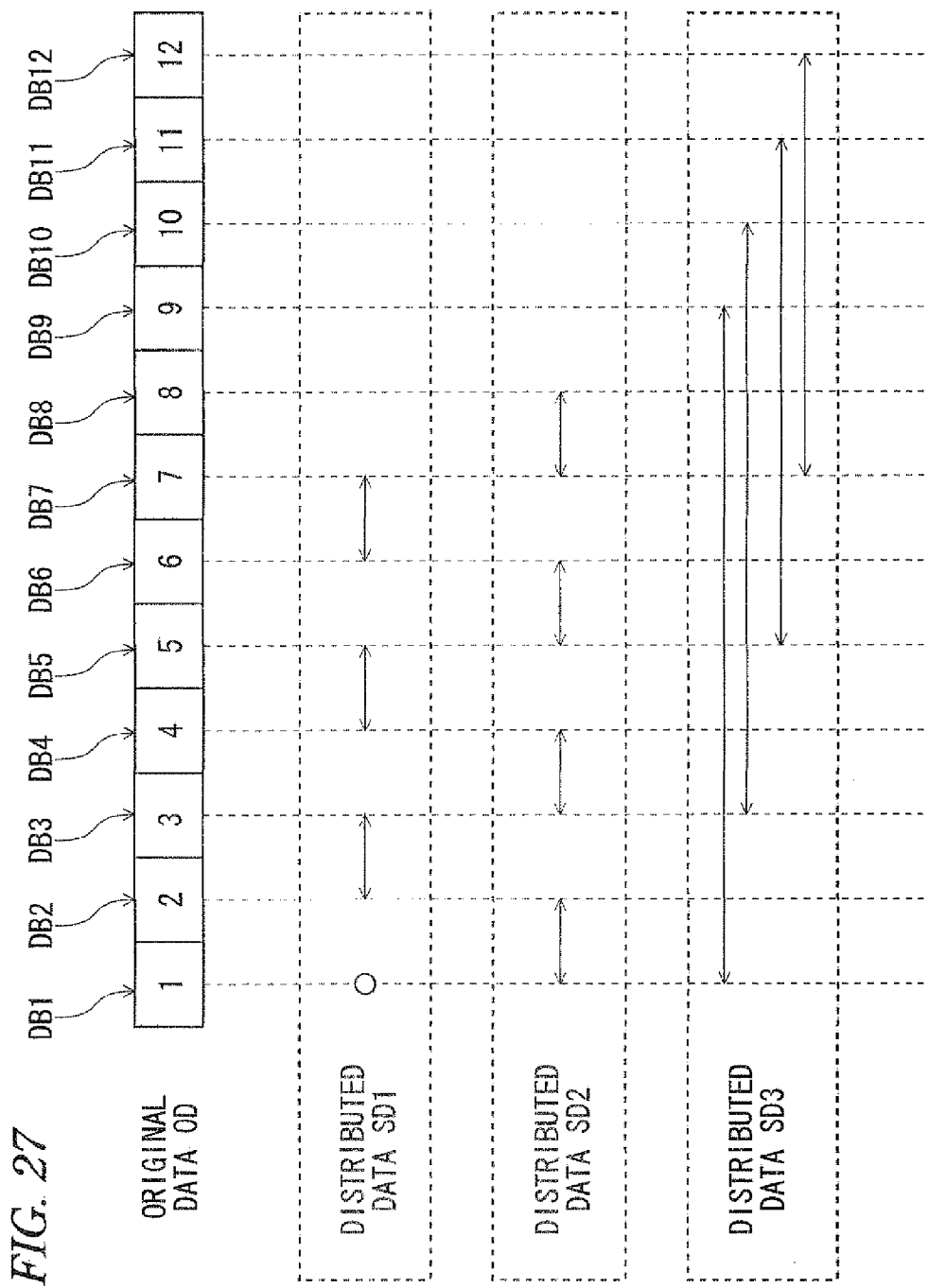
FIG. 27 is an explanatory view showing an example of a method of generating the distributed data in an eighth embodiment.
Figure 28:
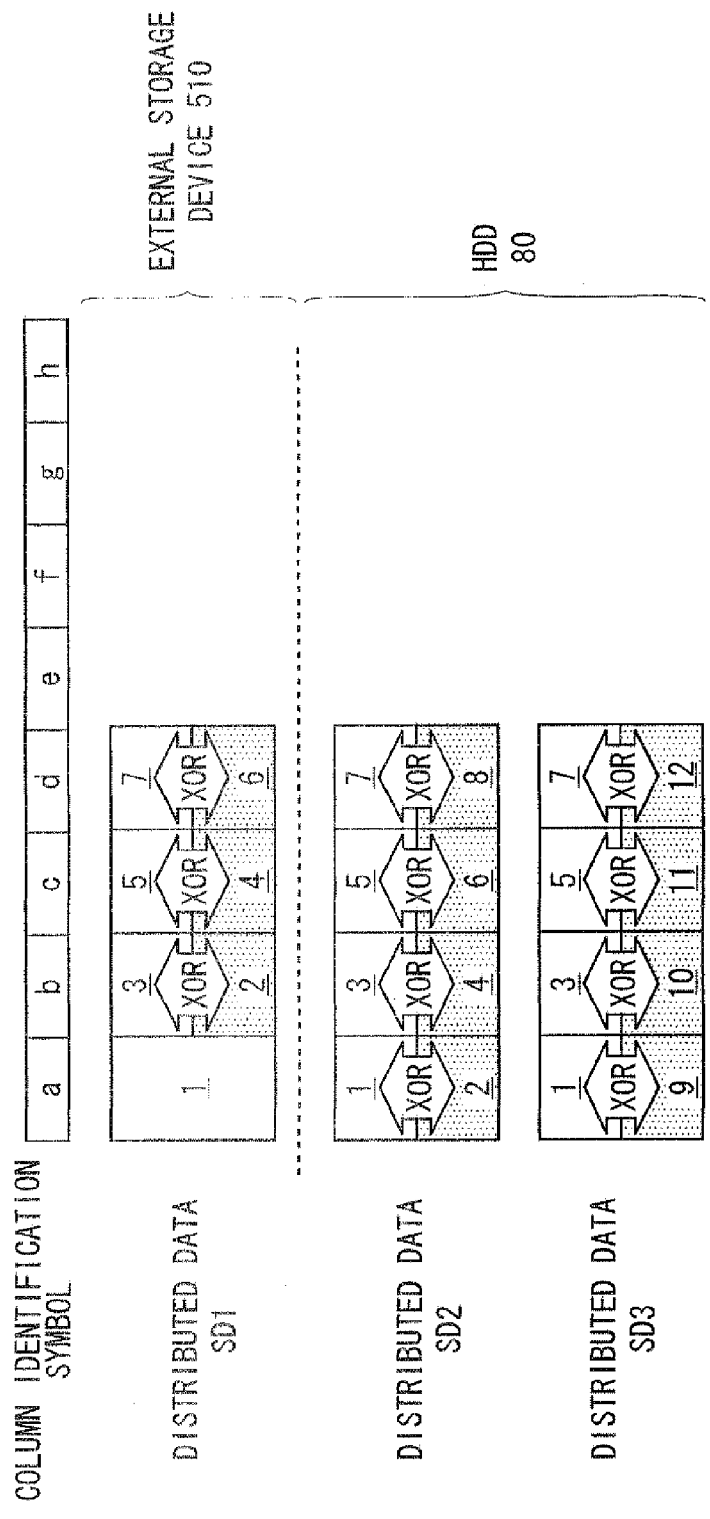
FIG. 28 is an explanatory view showing the content of the distributed data in the eighth embodiment.
Figure 29:
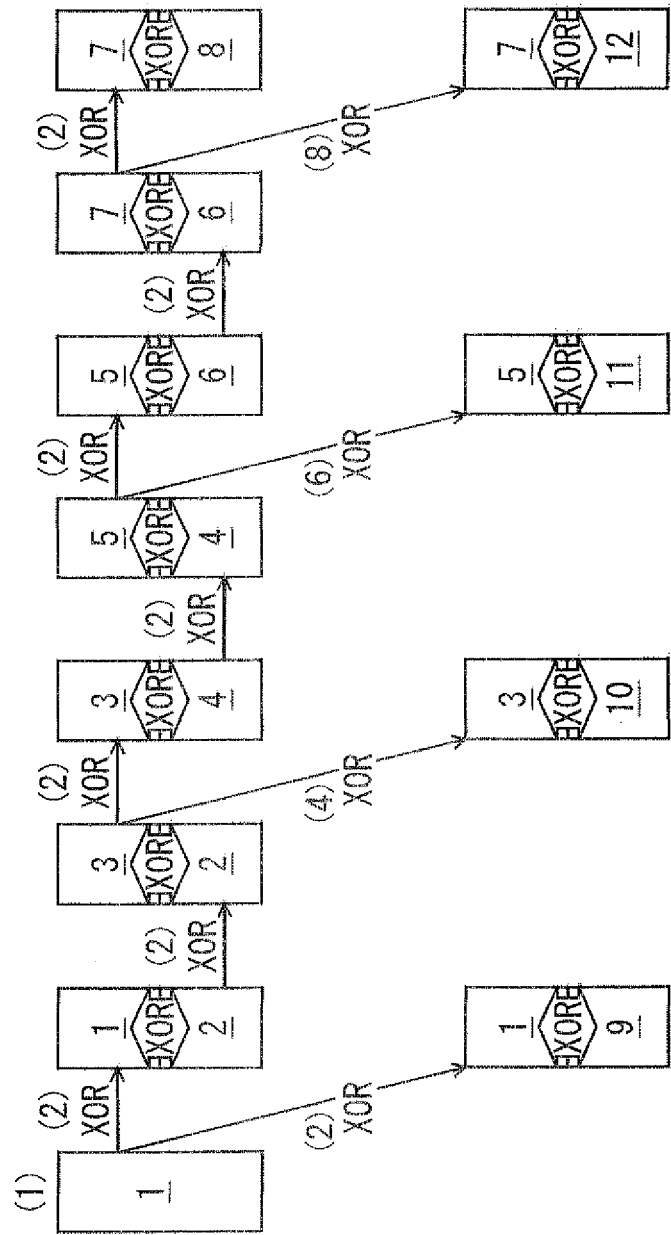
FIG. 29 is an explanatory view showing the flow to obtain each divided block of original data by XOR processing between pieces of distributed data in the eighth embodiment.
Figure 30:
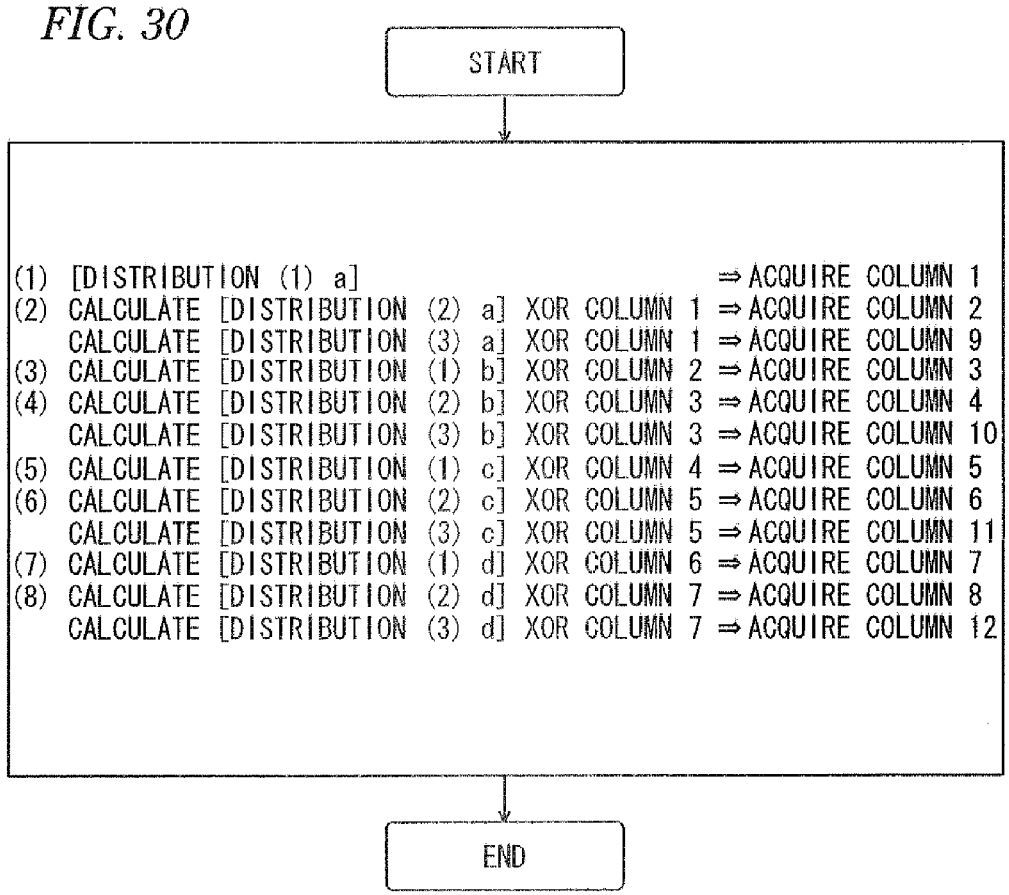
FIG. 30 is a flow chart illustrating the operation procedure in the eighth embodiment.

First, an eighth embodiment of the distribution and restoration apparatus 200 will be described with reference to FIG. 27 to 30. FIG. 27 is an explanatory view showing an example of a method of generating the distributed data in the eighth embodiment. FIG. 28 is an explanatory view showing the content of distributed data in the eighth embodiment. FIG. 29 is an explanatory view showing the flow to obtain each divided block of original data by XOR processing of pieces of distributed data in the eighth embodiment. FIG. 30 is a flow chart illustrating the operation procedure in the eighth embodiment.

In the eighth embodiment, a method of generating a total of three pieces of distributed data SD1, SD2, and SD3, each of which has a smaller data size than the data size of the original data OD, from the original data OD and a method of restoring the original data OD using three pieces of distributed data SD1, SD2, and SD3 will be described.

For example, the distribution and restoration apparatus 200 stores the distributed data SD1 in the external storage device 510 and stores the distributed data SD2 and SD3 in the HDD 80. In this manner, the distribution and restoration apparatus 200 distributes three pieces of distributed data SD1, SD2, and SD3 asymmetrically in the external storage device 510 and the HDD 80, for example.

In the eighth embodiment, as shown in FIGS. 27 and 28, the original data OD is configured to include a total of twelve divided blocks DB1 to DB12 connected in order. In addition, although the original data OD is configured to include a total of twelve divided blocks DB1 to DB12 in order to simplify explanation in the eighth embodiment, the number of divided blocks that form the original data OD is not limited to 12.

Configuration of Distributed Data in the Eighth Embodiment

The configuration of distributed data in the eighth embodiment will be described with reference to FIGS. 27 and 28. Distributed data SD1 shown in FIGS. 27 and 28 is the same as the distributed data SD1 shown in FIGS. 1 and 2. Distributed data SD2 shown in FIGS. 27 and 28 is the same as the distributed data SD2 shown in FIGS. 1 and 2.

In the distributed data SD3 shown in FIGS. 27 and 28, [distribution (3) a] is an XOR-processed value of the divided block DB1 of the column 1 and the divided block DB9 of the column 9, [distribution (3) b] is an XOR-processed value of the divided block DB3 of the column 3 and the divided block DB10 of the column 10, [distribution (3) c] is an XOR-processed value of the divided block DB5 of the column 5 and the divided block DB11 of the column 11, and [distribution (3) d] is an XOR-processed value of the divided block DB7 of the column 7 and the divided block DB12 of the column 12.

Therefore, the distributed data SD3 has a configuration in which four columns [distribution (3) a], [distribution (3) b], [distribution (3) c], and [distribution (3) d] are connected in order.

Thus, the distributed data SD3 is formed by performing two-stage convolution of the data of divided blocks corresponding to the data size of ⅔ of the original data OD by XOR processing. Accordingly, similar to the distributed data SD1 and SD2, the number of blocks (columns) of the distributed data SD3 is 4, which is ⅓ of 12 that is the number of blocks (columns) of the original data OD.

Method of Generating Distributed Data in the Eighth Embodiment

A specific method of generating the distributed data SD1, SD2, and SD3 in the eighth embodiment will be described with reference to FIGS. 27 and 28. First, the distribution and restoration apparatus 200 divides the original data OD into two pieces of data having different data sizes. For example, the distribution and restoration apparatus 200 divides the original data OD including a total of twelve divided blocks DB1 to DB12 equally into data of the columns 1 to 8 and data of the columns 9 to 12.

The distribution and restoration apparatus 200 generates two pieces of distributed data SD1 and SD2 by performing distribution processing on data of some columns of the data of the columns 1 to 8 or data of the columns 9 to 12 according to the secret sharing scheme disclosed in Japanese Patent Application No. 2011-077630 of this inventor. Here, two pieces of distributed data SD1 and SD2 are generated by performing distribution processing on the data of the columns 1 to 8 according to the secret sharing scheme disclosed in Japanese Patent Application No. 2011-077630 of this inventor.

Then, the distribution and restoration apparatus 200 selects a combination of columns of one piece of the data of the columns 1 to 8 used as objects to be subjected to XOR processing when generating the distributed data SD1 or the distributed data SD2. Here, in order to simplify explanation, the distribution and restoration apparatus 200 selects the data of the columns 1, 3, 5, and 7 as a combination of columns. However, the distribution and restoration apparatus 200 may select the columns 1, 4, 6, and 8 or may select the columns 2, 4, 6, and 8, for example.

The distribution and restoration apparatus 200 generates the distributed data SD3 by XOR processing of a combination of columns selected as objects to be subjected to XOR processing when generating the distributed data SD1 or the distributed data SD2 and a combination of columns (columns 9 to 12) not used when generating the distributed data SD1 and SD2.

Specifically, for example, when the columns 1, 3, 5, and 7 are selected as objects to be subjected to XOR processing when generating the distributed data SD1 or the distributed data SD2, the distribution and restoration apparatus 200 uses an XOR-processed value of the columns 1 and 9 for [distribution (3) a], uses an XOR-processed value of the columns 3 and 10 for [distribution (3) b], uses an XOR-processed value of the columns 5 and 11 for [distribution (3) c], and uses an XOR-processed value of the columns 7 and 12 for [distribution (3) d], and connects [distribution (3) a], [distribution (3) b], [distribution (3) c], and [distribution (3) d] in order to generate the distributed data SD3.

Thus, when the distribution and restoration apparatus 200 generates distributed data, the information (content) of original data can be made to be missing in the distributed data by performing 2-stage (2-row) convolution processing (XOR processing) on the data of divided blocks of the original data OD. In this manner, the distribution and restoration apparatus 200 can generate distributed data that can prevent the restoration of the original data OD from either the distributed data SD1 or the distributed data SD2 and SD3.

In addition, as the rate of the asymmetric distribution in the eighth embodiment, as shown in FIG. 28, the data size of the distributed data SD1 stored in the external storage device 510 is ⅓ of the data size of the original data OD, and the data size of the distributed data SD2 and SD3 stored in the HDD 80 is ⅔ (⅓+⅓) of the data size of the original data OD. Accordingly, the distribution and restoration apparatus 200 can generate distributed data having asymmetric data sizes of 1:2 for the external storage device 510 and the HDD 80. In addition, the total data size of the distributed data SD1, SD2, and SD3 is the same as the data size of the original data OD.

Therefore, the information entropy of the generated distributed data is is increased by canceling the information (content) of the original data OD using the original data OD and the XOR processing in the distribution and restoration apparatus 200 in the eighth embodiment. For this reason, the distribution and restoration apparatus 200 can make it difficult to restore the original data OD from distributed data less than the threshold value corresponding to the number of pieces of generated distributed data. In addition, just by using the XOR processing, the distribution and restoration apparatus 200 can generate distributed data having asymmetric data sizes compared with the conventional threshold secret sharing scheme. As a result, it is possible to increase the speed of distributed data generation processing.

As described above, since the distribution and restoration apparatus 200 of the eighth embodiment generates a plurality of pieces of distributed data SD1, SD2, and SD3 by performing an exclusive OR (XOR processing) according to the combination of selected divided blocks, the data size of the distributed data SD1, SD2, and SD3 can be made to be smaller than the data size of the original data OD. As a result, since it is possible to reduce the amount of memory in the distribution and restoration apparatus 200, it is possible to further increase the speed of distribution processing. In addition, the distribution and restoration apparatus 200 can safely generate the pieces of distributed data SD1, SD2, and SD3 having asymmetric data sizes.

Method of Restoring the Original Data in the Eighth Embodiment

A specific method of restoring the original data OD in the eighth embodiment will be described with reference to FIGS. 29 and 30. First, the distribution and restoration apparatus 200 acquires all pieces of distributed data SD1, SD2, and SD3. Specifically, the distribution and restoration apparatus 200 accesses the external storage device 510 by the MAC/PHY 90 to acquire the distributed data SD1 and accesses the HDD 80 by the CPU 60 to acquire the distributed data SD2 and SD3, In FIGS. 29 and 30, the distribution and restoration apparatus 200 acquires the column 1 of the original data OD on the basis of [distribution (1) a] of the distributed data SD1 (1), acquires the column 2 of the original data OD by XOR processing of [distribution (2) a] of the distributed data SD2 and the column 1 already acquired (2), and acquires the column 9 of the original data OD by XOR processing of [distribution (3) a] of the distributed data SD3 and the column 1 already acquired (2).

The distribution and restoration apparatus 200 acquires the column 3 of the original data OD by XOR processing of [distribution (1) b] of the distributed data SD1 and the column 2 already acquired (3).

The distribution and restoration apparatus 200 acquires the column 4 of the original data OD by XOR processing of [distribution (2) b] of the distributed data SD2 and the column 3 already acquired (4), and acquires the column 10 of the original data OD by XOR processing of [distribution (3) b] of the distributed data SD3 and the column 3 already acquired (4).

The distribution and restoration apparatus 200 acquires the column 5 of is the original data OD by XOR processing of [distribution (1) c] of the distributed data SD1 and the column 4 already acquired (5).

The distribution and restoration apparatus 200 acquires the column 6 of the original data OD by XOR processing of [distribution (2) c] of the distributed data SD2 and the column 5 already acquired (6), and acquires the column 11 of the original data OD by XOR processing of [distribution (3) c] of the distributed data SD3 and the column 5 already acquired (6).

The distribution and restoration apparatus 200 acquires the column 7 of the original data OD by XOR processing of

[distribution (1) d] of the distributed data SD1 and the column 6 already acquired (7).

Finally, the distribution and restoration apparatus 200 acquires the column 8 of the original data OD by XOR processing of [distribution (2) d] of the distributed data SD2 and the column 7 already acquired (8), and acquires the column 12 of the original data OD by XOR processing of [distribution (3) d] of the distributed data SD3 and the column 7 already acquired (8).

The distribution and restoration apparatus 200 acquires the original data OD by connecting in order the divided blocks DB1 to DB12 of the columns 1 to 12 acquired in each operation of (1) to (8). Then, the distribution and restoration apparatus 200 ends the process of restoring the original data OD.

As described above, since the distribution and restoration apparatus 200 of the eighth embodiment can perform the process of restoring the original data OD at high speed using a plurality of pieces of distributed data SD1, SD2, and SD3 that are generated by performing an exclusive OR (XOR processing) according to the combination of selected divided blocks, it is possible to reduce the amount of memory in the distribution and restoration apparatus 200. In addition, the distribution and restoration apparatus 200 can restore the original data OD safely from the pieces of distributed data SD1, SD2, and SD3 having asymmetric data sizes.

Ninth Embodiment

Figure 31:
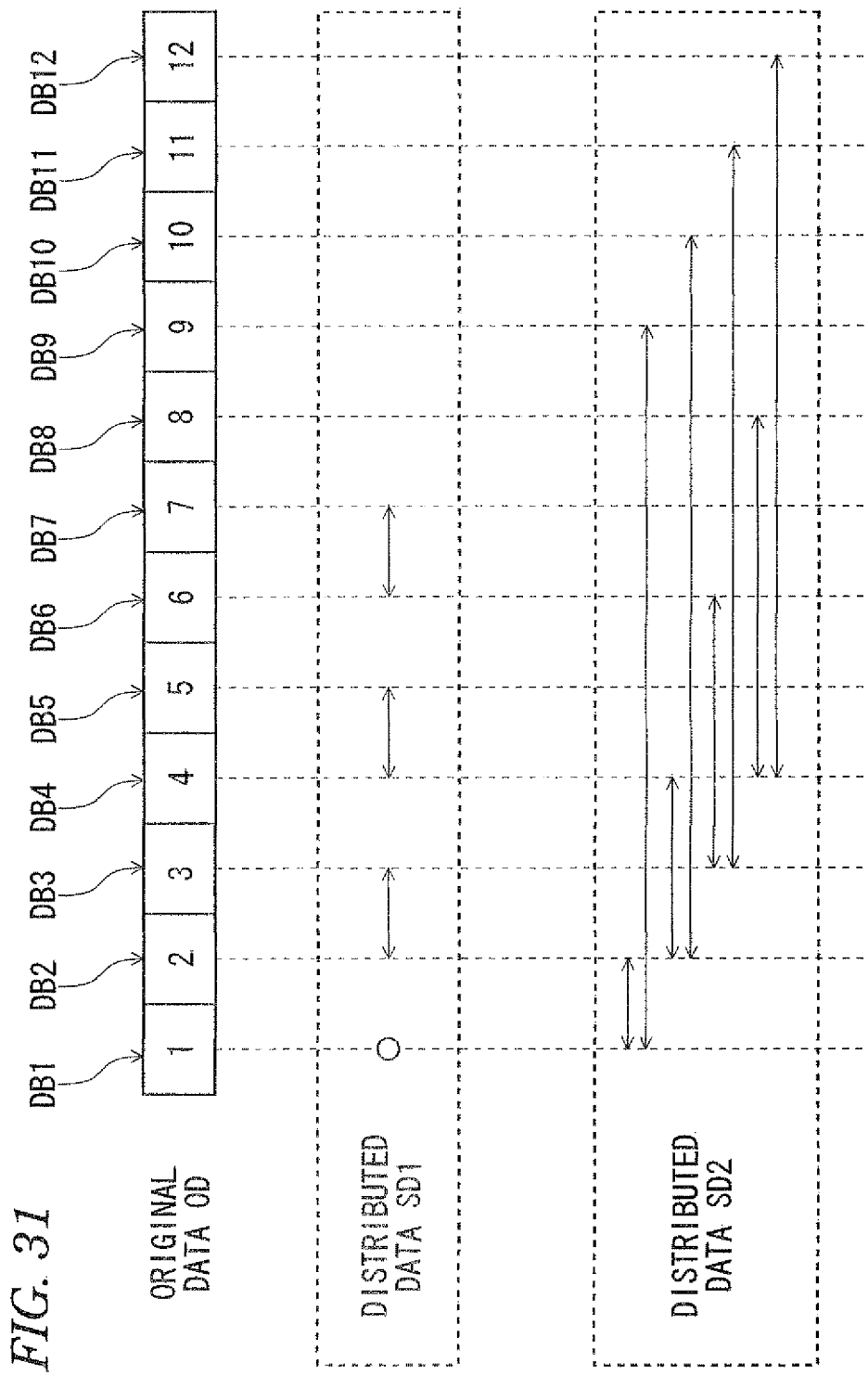
FIG. 31 is an explanatory view showing an example of a method of generating the distributed data in a ninth embodiment.
Figure 32:
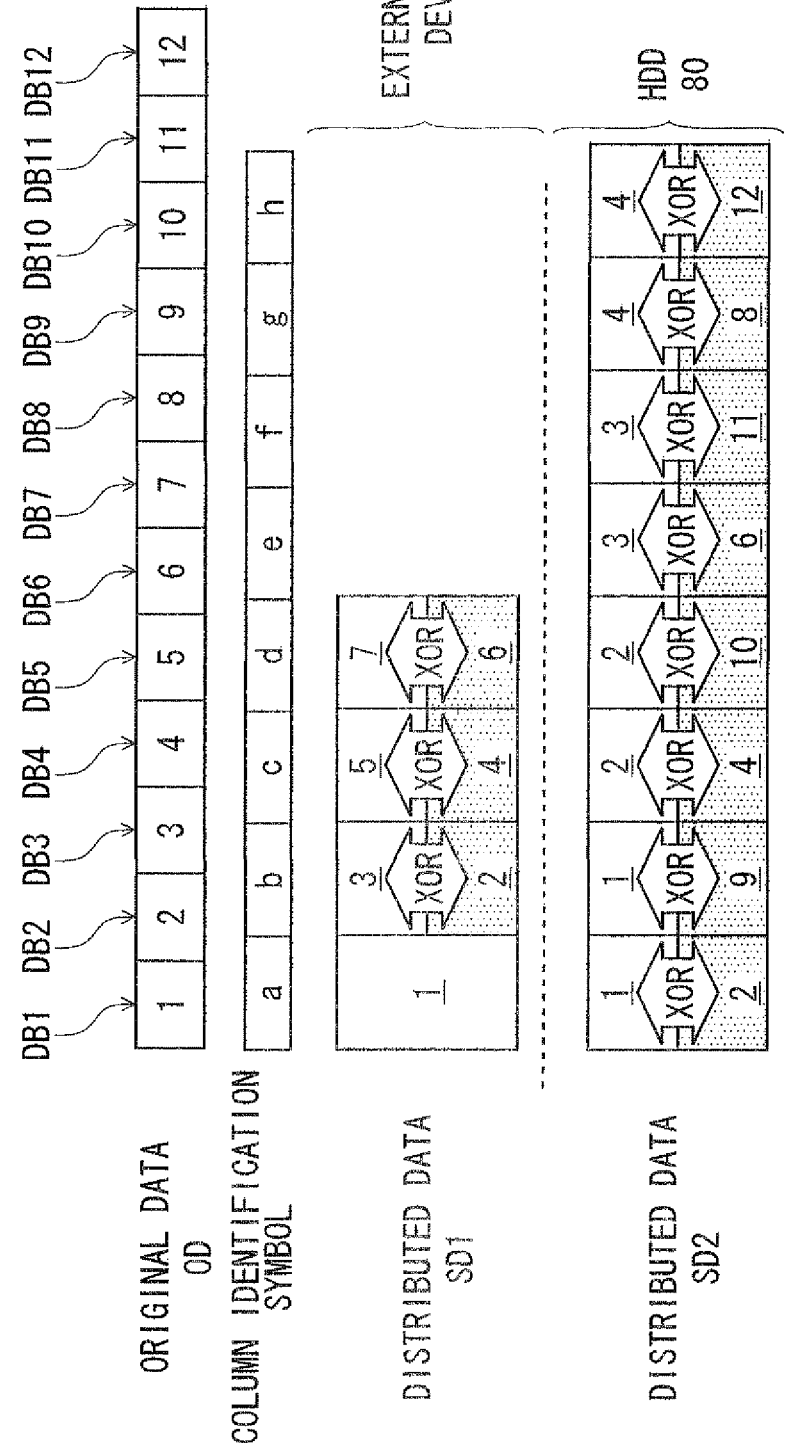
FIG. 32 is an explanatory view showing the content of the distributed data in the ninth embodiment.
Figure 33:
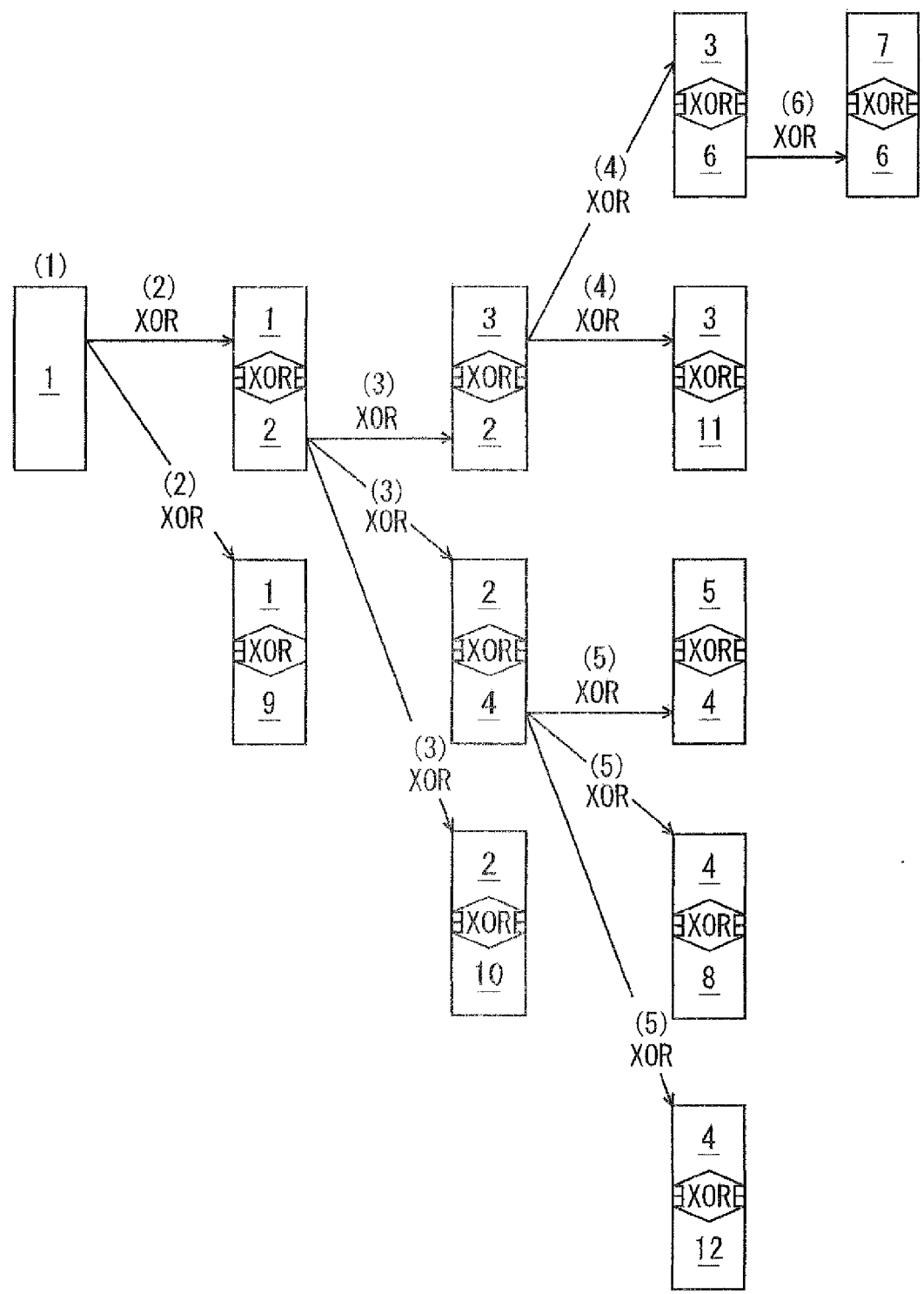
FIG. 33 is an explanatory view showing the flow to obtain each divided block of original data by XOR processing between pieces of distributed data in the ninth embodiment.
Figure 34:
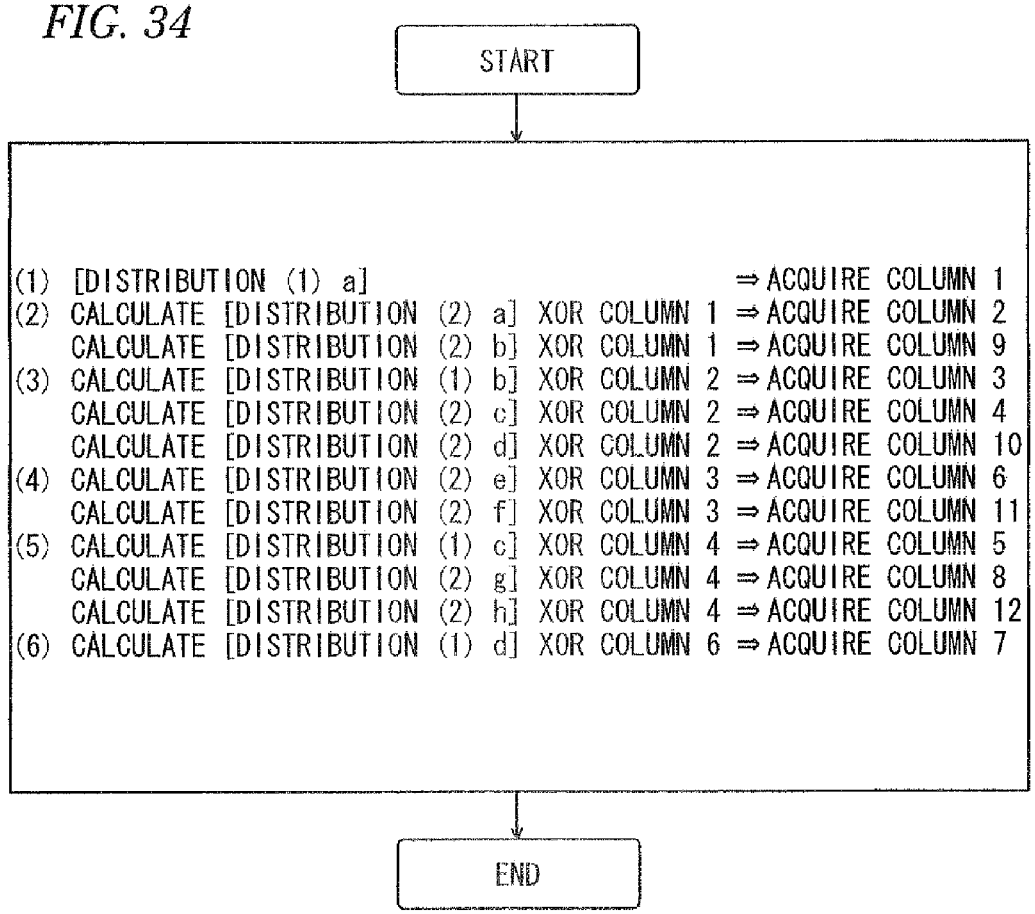
FIG. 34 is a flow chart illustrating the operation procedure in the ninth embodiment.

First, a ninth embodiment of the distribution and restoration apparatus 200 will be described with reference to FIG. 31 to 34. FIG. 31 is an explanatory view showing an example of a method of generating the distributed data in the ninth embodiment. FIG. 32 is an explanatory view showing the content of distributed data in the ninth embodiment. FIG. 33 is an explanatory view showing the flow to obtain each divided block of original data by XOR processing of pieces of distributed data in the ninth embodiment. FIG. 34 is a flow chart illustrating the operation procedure in the ninth embodiment.

In the ninth embodiment, a method of generating a total of two pieces of distributed data SD1 and SD2, each of which has a smaller data size than the data size of the original data OD, from the original data OD and a method of restoring the original data OD using two pieces of distributed data SD1 and SD2 will be described.

For example, the distribution and restoration apparatus 200 stores the distributed data SD1 in the external storage device 510 and stores the distributed data SD2 in the HDD 80. In this manner, the distribution and restoration apparatus 200 distributes two pieces of distributed data SD1 and SD2, which have different data sizes, asymmetrically in the external storage device 510 and the HDD 80, for example.

In the ninth embodiment, as shown in FIGS. 31 and 32, the original data OD is configured to include a total of twelve divided blocks DB1 to DB12 connected in order. In addition, although the original data OD is configured to include a total of twelve divided blocks DB1 to DB12 in order to simplify explanation in the ninth embodiment, the number of divided blocks that form the original data OD is not limited to 12.

Configuration of Distributed Data in the Ninth Embodiment

The configuration of distributed data in the ninth embodiment will be described with reference to FIGS. 31 and 32. Distributed data SD1 shown in FIGS. 31 and 32 is the same as the distributed data SD1 shown in FIGS. 1 and 2.

In the distributed data SD2 shown in FIGS. 27 and 28, [distribution (2) a] is an XOR-processed value of the divided block DB1 of the column 1 and the divided block DB2 of the column 2, [distribution (2) b] is an XOR-processed value of the divided block DB1 of the column 1 and the divided block DB9 of the column 9, [distribution (2) c] is an XOR-processed value of the divided block DB2 of the column 2 and the divided block DB4 of the column 4, [distribution (2) d] is an XOR-processed value of the divided block DB2 of the column 2 and the divided block DB10 of the column 10, [distribution (2) e] is an XOR-processed value of the divided block DB3 of the column 3 and the divided block DB6 of the column 6, [distribution (2) f] is an XOR-processed value of the divided block DB3 of the column 3 and the divided block DB11 of the column 11, [distribution (2) g] is an XOR-processed value of the divided block DB4 of the column 4 and the divided block DB8 of the column 8, and [distribution (2) h] is an XOR-processed value of the divided block DB4 of the column 4 and the divided block DB12 of the column 12.

Therefore, the distributed data SD2 has a configuration in which eight columns [distribution (2) a], [distribution (2) b], [distribution (2) c], [distribution (2) d], [distribution (2) e], [distribution (2) f], [distribution (2) g], and [distribution (2) h] are connected in order.

Thus, the data of the columns 1 to 4 is used twice in the distributed data SD2, and the distributed data SD2 is formed by performing two-stage convolution of the data of divided blocks corresponding to the data size of the original data OD by XOR processing. Accordingly, the number of blocks (columns) of the distributed data SD2 is 8, which is ⅔ of 12 that is the number of blocks (columns) of the original data OD.

Method of Generating Distributed Data in the Ninth Embodiment

A specific method of generating the distributed data SD1, SD2, and SD3 in the ninth embodiment will be described with reference to FIGS. 31 and 32. First, the distribution and restoration apparatus 200 divides the original data OD into two pieces of data having different data sizes. For example, the distribution and restoration apparatus 200 divides the original data OD including a total of twelve divided blocks DB1 to DB12 equally into data of the columns 1 to 8 and data of the columns 9 to 12.

The distribution and restoration apparatus 200 generates two pieces of distributed data (distributed data SD1 and SD2 shown in FIG. 28) by performing distribution processing on data of some columns of the data of the columns 1 to 8 or data of some columns of the data of the columns 9 to 12 according to the secret sharing scheme disclosed in Japanese Patent Application No. 2011-077630 of this inventor. Here, two pieces of distributed data (distributed data SD1 and SD2 shown in FIG. 28) are generated by performing distribution processing on the data of the columns 1 to 8 according to the secret sharing scheme disclosed in Japanese Patent Application No. 2011-077630 of this inventor. In addition, since the distributed data SD1 in the ninth embodiment is the same as the distributed data SD1 (refer to FIG. 28) in the eighth embodiment, explanation of the method of generating the distributed data SD1 in the ninth embodiment will be omitted.

Then, the distribution and restoration apparatus 200 selects a combination of columns of one piece of the data of the columns 1 to 8 used as objects to be subjected to XOR processing when generating the distributed data SD1 or the distributed data SD2 shown in FIG. 28. Here, in order to simplify explanation, the distribution and restoration apparatus 200 selects the data of the columns 1, 3, 5, and 7 as a combination of columns. However, the distribution and restoration apparatus 200 may select the columns 1, 4, 6, and 8 or may select the columns 2, 4, 6, and 8, for example.

The distribution and restoration apparatus 200 generates the distributed data SD3 shown in FIG. 28 by XOR processing of a combination of columns selected as objects to be subjected to XOR processing when generating the distributed data SD1 or the distributed data SD2 shown in FIG. 28 and a combination of columns (columns 9 to 12) not used when generating the distributed data SD1 and SD2 shown in FIG. 28.

Specifically, for example, when the columns 1, 3, 5, and 7 are selected as objects to be subjected to XOR processing when generating the distributed data SD1 or the distributed data SD2 shown in FIG. 28, the distribution and restoration apparatus 200 uses an XOR-processed value of the columns 1 and 9 for [distribution (3) a], uses an XOR-processed value of the columns 3 and 10 for [distribution (3) b], uses an XOR-processed value of the columns 5 and 11 for [distribution (3) c], and uses an XOR-processed value of the columns 7 and 12 for [distribution (1) d], and connects [distribution (3) a], [distribution (3) b], [distribution (3) c], and [distribution (3) d] in order to generate the distributed data SD3 shown in FIG. 28.

In addition, the distribution and restoration apparatus 200 generates new distributed data SD2 by connecting the generated distributed data SD2 and distributed data SD3 shown in FIG. 28 and changes data of some columns of the data of the columns connected in order to the data of other columns (refer to FIG. 32).

Specifically, the distribution and restoration apparatus 200 changes the column 3 of [distribution (2) b] of the distributed data SD2 shown in FIG. 28 to the column 2, changes the column 5 of [distribution (2) c] of the distributed data SD2 shown in the same drawing to the column 3, changes the column 7 of [distribution (2) d] of the distributed data SD2 shown in the same drawing to the column 4, changes the column 3 of [distribution (3) b] of the distributed data SD3 shown in the same drawing to the column 2, changes the column 5 of [distribution (3) c] of the distributed data SD3 shown in the same drawing to the column 3, and changes the column 7 of [distribution (3) d] of the distributed data SD3 shown in the same drawing to the column 4, In this manner, the distribution and restoration apparatus 200 generates the distributed data SD2 shown in FIG. 32 as the distributed data SD2 in the ninth embodiment.

Thus, when the distribution and restoration apparatus 200 generates distributed data, the information (content) of original data can be made to be missing in the distributed data by performing 2-stage (2-row) convolution processing (XOR processing) on the data of divided blocks of the original data OD. In this manner, the distribution and restoration apparatus 200 can generate distributed data that can prevent the restoration of the original data OD from either the distributed data SD1 or the distributed data SD2.

In addition, as the rate of the asymmetric distribution in the ninth embodiment, as shown in FIG. 32, the data size of the distributed data SD1 stored in the external storage device 510 is ⅓ of the data size of the original data OD, and the data size of the distributed data SD2 stored in the HDD 80 is ⅔ of the data size of the original data OD. Accordingly, the distribution and restoration apparatus 200 can generate distributed data having asymmetric data sizes of 1:2 for the external storage device 510 and the HDD 80. In addition, the total data size of the distributed data SD1 and SD2 is the same as the data size of the original data OD.

Therefore, the information entropy of the generated distributed data is increased by canceling the information (content) of the original data OD using the original data OD and the XOR processing in the distribution and restoration apparatus 200 in the ninth embodiment. For this reason, the distribution and restoration apparatus 200 can make it difficult to restore the original data OD from distributed data less than the threshold value corresponding to the number of pieces of generated distributed data. In addition, just by using the XOR processing, the distribution and restoration apparatus 200 can generate distributed data having asymmetric data sizes compared with the conventional threshold secret sharing scheme. As a result, it is possible to increase the speed of distributed data generation processing.

As described above, since the distribution and restoration apparatus 200 of the ninth embodiment generates a plurality of pieces of distributed data SD1 and SD2 by performing an exclusive OR (XOR processing) according to the combination of selected divided blocks, the data size of the distributed data SD1 and SD2 can be made to be smaller than the data size of the original data OD. As a result, since it is possible to reduce the amount of memory in the distribution and restoration apparatus 200, it is possible to further increase the speed of distribution processing. In addition, the distribution and restoration apparatus 200 can safely generate the pieces of distributed data SD1 and SD2 having asymmetric data sizes.

Method of Restoring the Original Data in the Ninth Embodiment

A specific method of restoring the original data OD in the ninth embodiment will be described with reference to FIGS. 33 and 34. First, the distribution and restoration apparatus 200 acquires all pieces of distributed data SD1 and SD2. Specifically, the distribution and restoration apparatus 200 accesses the external storage device 510 by the MAC/PHY 90 to acquire the distributed data SD1 and accesses the HDD 80 by the CPU 60 to acquire the distributed data SD2.

In FIGS. 33 and 34, the distribution and restoration apparatus 200 acquires the column 1 of the original data OD on the basis of [distribution (1) a] of the distributed data SD1 (1), acquires the column 2 of the original data OD by XOR processing of [distribution (2) a] of the distributed data SD2 and the column 1 already acquired (2), and acquires the column 9 of the original data OD by XOR processing of [distribution (2) b] of the distributed data SD2 and the column 1 already acquired (2).

The distribution and restoration apparatus 200 acquires the column 3 of the original data OD by XOR processing of [distribution (1) b] of the distributed data SD1 and the column 2 already acquired (3), acquires the column 4 of the original data OD by XOR processing of [distribution (2) c] of the distributed data SD2 and the column 2 already acquired (3), and acquires the column 10 of the original data OD by XOR processing of [distribution (2) d] of the distributed data SD2 and the column 2 already acquired (3).

The distribution and restoration apparatus 200 acquires the column 6 of the original data OD by XOR processing of [distribution (2) e] of the distributed data SD2 and the column 3 already acquired (4), and acquires the column 11 of the original data OD by XOR processing of [distribution (2) f] of the distributed data SD2 and the column 3 already acquired (4).

The distribution and restoration apparatus 200 acquires the column 5 of the original data OD by XOR processing of [distribution (1) c] of the distributed data SD1 and the column 4 already acquired (5), acquires the column 8 of the original data OD by XOR processing of [distribution (2) g] of the distributed data SD2 and the column 4 already acquired (5), and acquires the column 12 of the original data OD by XOR processing of [distribution (2) h] of the distributed data SD2 and the column 4 already acquired (5).

Finally, the distribution and restoration apparatus 200 acquires the column 7 of the original data OD by XOR processing of [distribution (1) d] of the distributed data SD1 and the column 6 already acquired (8).

The distribution and restoration apparatus 200 acquires the original data OD by connecting in order the divided blocks DB1 to DB12 of the columns 1 to 12 acquired in each operation of (1) to (6). Then, the distribution and restoration apparatus 200 ends the process of restoring the original data OD.

As described above, since the distribution and restoration apparatus 200 of the ninth embodiment can perform the process of restoring the original data OD at high speed using a plurality of pieces of distributed data SD1 and SD2 that are generated by performing an exclusive OR (XOR processing) according to the combination of selected divided blocks, it is possible to reduce the amount of memory in the distribution and restoration apparatus 200. In addition, the distribution and restoration apparatus 200 can restore the original data OD safely from the pieces of distributed data SD1 and SD2 having asymmetric data sizes.

Tenth Embodiment

Figure 35:
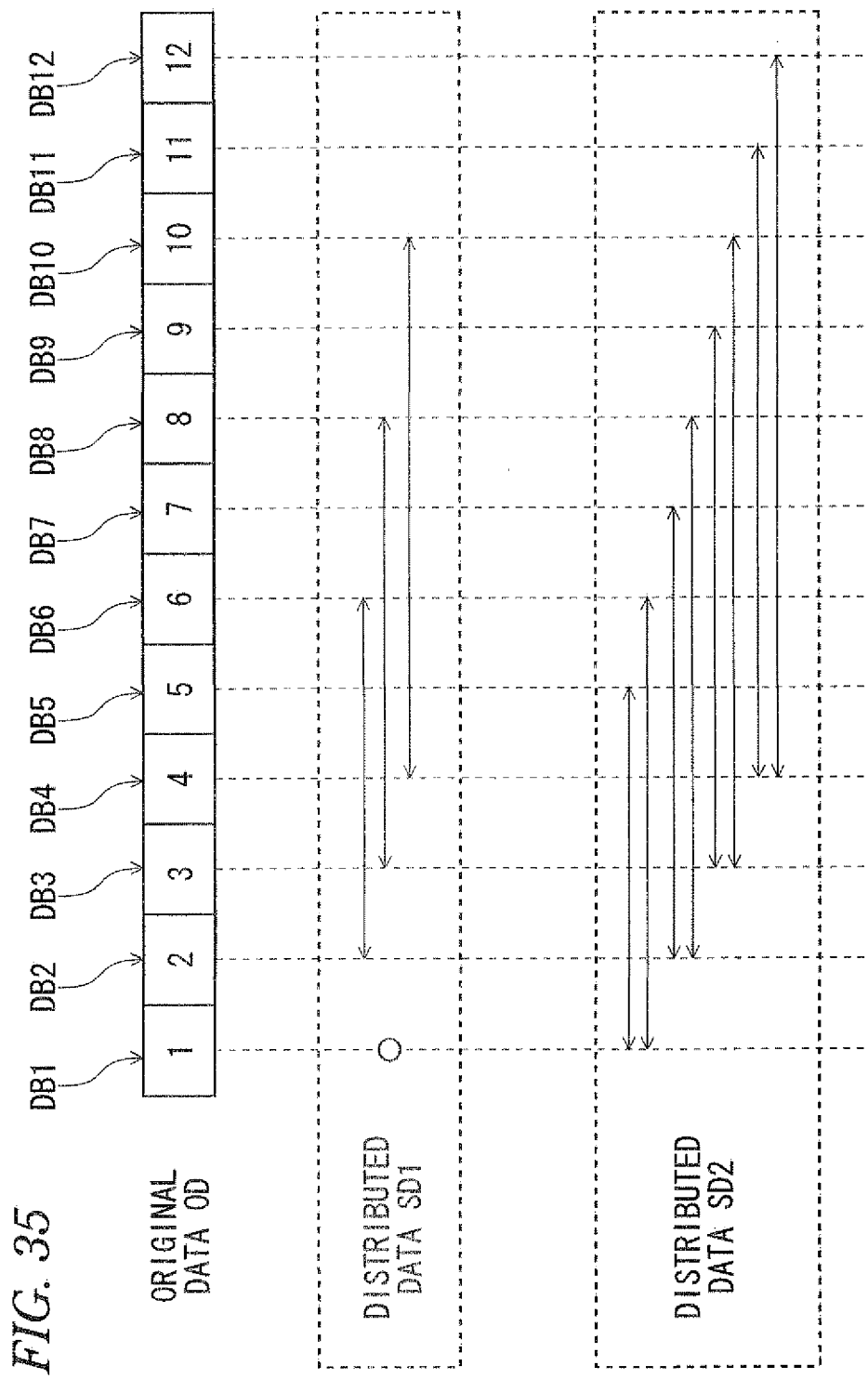
FIG. 35 is an explanatory view showing an example of a method of generating the distributed data in a tenth embodiment.
Figure 36:
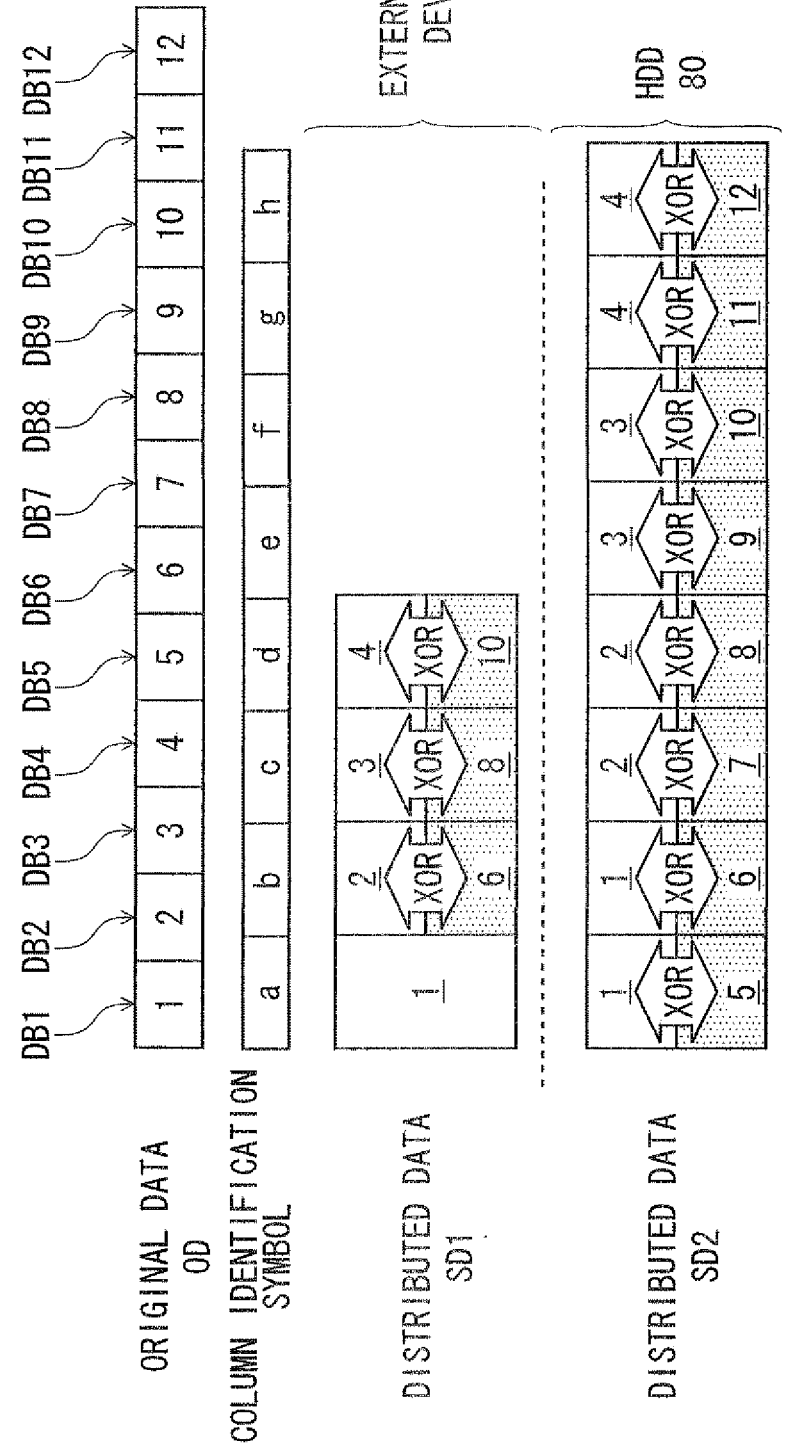
FIG. 36 is an explanatory view showing the content of the distributed data in the tenth embodiment.
Figure 37:
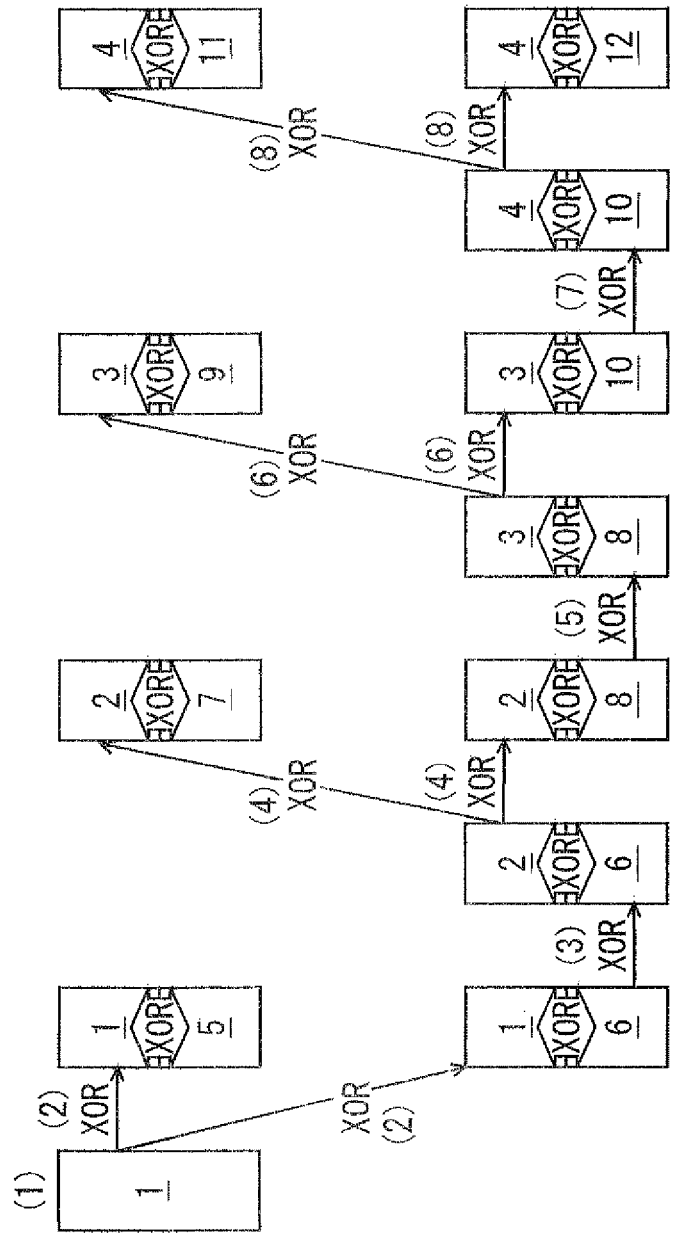
FIG. 37 is an explanatory view showing the flow to obtain each divided block of original data by XOR processing between pieces of distributed data in the tenth embodiment.
Figure 38:
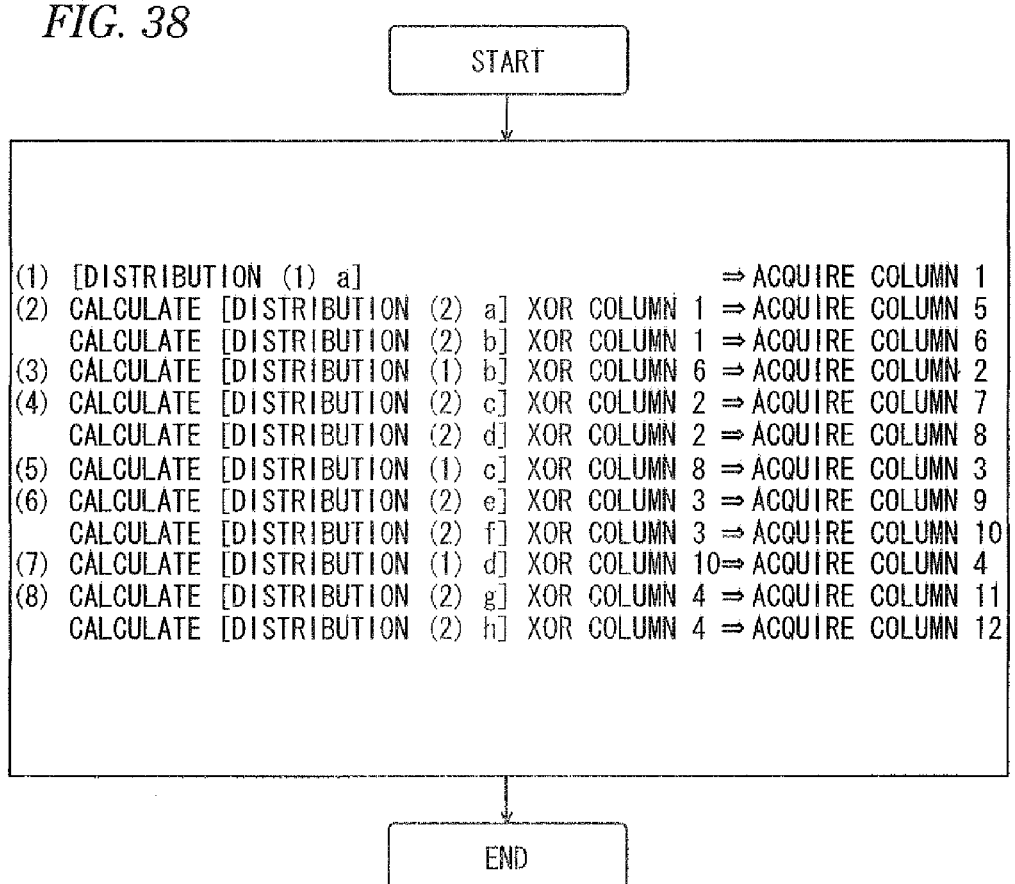
FIG. 38 is a flow chart illustrating the operation procedure in the tenth embodiment.

First, a tenth embodiment of the distribution and restoration apparatus 200 will be described with reference to FIG. 35 to 38. FIG. 35 is an explanatory view showing an example of a method of generating the distributed data in the tenth embodiment. FIG. 36 is an explanatory view showing the content of distributed data in the tenth embodiment. FIG. 37 is an explanatory view showing the flow to obtain each divided block of original data by XOR processing of pieces of distributed data in the tenth embodiment. FIG. 38 is a flow chart illustrating the operation procedure in the tenth embodiment.

In the tenth embodiment, a method of generating a total of two pieces of distributed data SD1 and SD2, each of which has a smaller data size than the data size of the original data OD, from the original data OD and a method of restoring the original data OD using two pieces of distributed data SD1 and SD2 will be described.

For example, the distribution and restoration apparatus 200 stores the distributed data SD1 in the external storage device 510 and stores the distributed data SD2 in the HDD 80. In this manner, the distribution and restoration apparatus 200 distributes two pieces of distributed data SD1 and SD2, which have different data sizes, asymmetrically in the external storage device 510 and the HDD 80, for example.

In the tenth embodiment, as shown in FIGS. 35 and 36, the original data OD is configured to include a total of twelve divided blocks DB1 to DB12 connected in order. In addition, although the original data OD is configured to include the twelve divided blocks DB1 to DB12 in order to simplify explanation in the tenth embodiment, the number of divided blocks that form the original data OD is not limited to 12.

Configuration of Distributed Data in the Tenth Embodiment

The configuration of distributed data in the tenth embodiment will be described with reference to FIGS. 35 and 36. In the distributed data SD1 shown in FIGS. 35 and 36, [distribution (1) a] is a divided block DB1 of the column 1, [distribution (1) b] is an XOR-processed value of the divided block DB2 of the column 2 and the divided block DB6 of the column 6, [distribution (1) c] is an XOR-processed value of the divided block DB3 of the column 3 and the divided block DB8 of the column 8, and [distribution (1) d] is an XOR-processed value of the divided block DB4 of the column 4 and the divided block DB10 of the column 10. Therefore, the distributed data SD1 has a configuration in which four columns [distribution (1) a], [distribution (1) b], [distribution (1) c], and [distribution (1) d] are connected in order.

Thus, the distributed data SD1 is formed by performing 2-stage convolution of the data of divided blocks corresponding to ⅔ of the data size of the original data OD by XOR processing. Accordingly, the number of blocks (columns) of the distributed data SD1 is 4, which is ⅓ of 12 that is the number of blocks (columns) of the original data OD.

In the distributed data SD2 shown in FIGS. 35 and 36, [distribution (2) a] is an XOR-processed value of the divided block DB1 of the column 1 and the divided block DB5 of the column 5, [distribution (2) b] is an XOR-processed value of the divided block DB1 of the column 1 and the divided block DB6 of the column 6, [distribution (2) c] is an XOR-processed value of the divided block DB2 of the column 2 and the divided block DB7 of the column 7, [distribution (2) d] is an XOR-processed value of the divided block DB2 of the column 2 and the divided block DB8 of the column 8, [distribution (2) e] is an XOR-processed value of the divided block DB3 of the column 3 and the divided block DB9 of the column 9, [distribution (2) f] is an XOR-processed value of the divided block DB3 of the column 3 and the divided block DB10 of the column 10, [distribution (2) g] is an XOR-processed value of the divided block DB4 of the column 4 and the divided block DB11 of the column 11, and [distribution (2) h] is an XOR-processed value of the divided block DB4 of the column 4 and the divided block DB12 of the column 12.

Therefore, the distributed data SD2 has a configuration in which eight columns [distribution (2) a], [distribution (2) b], [distribution (2) c], [distribution (2) d], [distribution (2) e], [distribution (2) f], [distribution (2) g], and [distribution (2) h] are connected in order.

Thus, the data of the columns 1 to 4 is used twice in the distributed data SD2, and the distributed data SD2 is formed by performing 2-stage convolution of the data of divided blocks corresponding to the data size of the original data OD by XOR processing. Accordingly, the number of blocks (columns) of the distributed data SD2 is 8, which is ⅔ of 12 that is the number of blocks (columns) of the original data OD.

Method of Generating Distributed Data in the Tenth Embodiment

A specific method of generating the distributed data SD1 and SD2 in the tenth embodiment will be described with reference to FIGS. 35 and 36. First, the distribution and restoration apparatus 200 generates two pieces of distributed data SD1 and SD2 (refer to FIG. 32) according to the method described in the ninth embodiment. Here, explanation of the method described in the ninth embodiment will be omitted.

Then, for the generated distributed data SD1 and SD2 shown in FIG. 32, the distribution and restoration apparatus 200 changes data of some columns of the data of the columns of the distributed data SD1 and SD2 to data of other columns, thereby generating new distributed data SD1 and SD2 (refer to FIG. 36).

Specifically, the distribution and restoration apparatus 200 changes the column 3 of [distribution (1) b] of the distributed data SD1 shown in FIG. 32 to the column 6, changes the column 4 of [distribution (1) c] of the distributed data SD1 shown in the same drawing to the column 3, changes the column 5 of [distribution (1) c] of the distributed data SD1 shown in the same drawing to the column 8, changes the column 6 of [distribution (1) d] of the distributed data SD1 shown in the same drawing to the column 4, and changes the column 7 of [distribution (1) d] of the distributed data SD1 shown in the same drawing to the column 10. In this manner, the distribution and restoration apparatus 200 generates the distributed data SD1 shown in FIG. 36 as the distributed data SD1 in the tenth embodiment.

In addition, the distribution and restoration apparatus 200 changes the column 2 of [distribution (2) a] of the distributed data SD2 shown in FIG. 32 to the column 5, changes the column 9 of [distribution (2) b] of the distributed data SD1 shown in the same drawing to the column 6, changes the column 4 of [distribution (2) c] of the distributed data SD2 shown in the same drawing to the column 7, changes the column 10 of [distribution (2) d] of the distributed data SD2 shown in the same drawing to the column 8, changes the column 6 of [distribution (2) e] of the distributed data SD2 shown in the same drawing to the column 9, changes the column 11 of [distribution (2) f] of the distributed data SD2 shown in the same drawing to the column 10, and changes the column 8 of [distribution (2) g] of the distributed data SD2 shown in the same drawing to the column 11. In this manner, the distribution and restoration apparatus 200 generates the distributed data SD2 shown in FIG. 36 as the distributed data SD2 in the tenth embodiment.

Thus, when the distribution and restoration apparatus 200 generates distributed data, the information (content) of original data can be made to be missing in the distributed data by performing 2-stage (2-row) convolution processing (XOR processing) on the data of divided blocks of the original data OD. In this manner, the distribution and restoration apparatus 200 can generate distributed data that can prevent the restoration of the original data OD from either the distributed data SD1 or the distributed data SD2.

In addition, as the rate of the asymmetric distribution in the tenth embodiment, as shown in FIG. 36, the data size of the distributed data SD1 stored in the external storage device 510 is ⅓ of the data size of the original data OD, and the data size of the distributed data SD2 stored in the HDD 80 is ⅔ of the data size of the original data OD. Accordingly, the distribution and restoration apparatus 200 can generate distributed data having asymmetric data sizes of 1:2 for the external storage device 510 and the HDD 80. In addition, the total data size of the distributed data SD1 and SD2 is the same as the data size of the original data OD.

Therefore, the information entropy of the generated distributed data is increased by canceling the information (content) of the original data OD using the original data OD and XOR processing in the distribution and restoration apparatus 200 in the tenth embodiment. For this reason, the distribution and restoration apparatus 200 can make it difficult to restore the original data OD from distributed data less than the threshold value corresponding to the number of pieces of generated distributed data. In addition, just by using the XOR processing, the distribution and restoration apparatus 200 can generate distributed data having asymmetric data sizes compared with the conventional threshold secret sharing scheme. As a result, it is possible to increase the speed of distributed data generation processing.

As described above, since the distribution and restoration apparatus 200 of the tenth embodiment generates a plurality of pieces of distributed data SD1 and SD2 by performing an exclusive OR (XOR processing) according to the combination of selected divided blocks, the data size of the distributed data SD1 and SD2 can be made to be smaller than the data size of the original data OD. As a result, since it is possible to reduce the amount of memory in the distribution and restoration apparatus 200, it is possible to further increase the speed of distribution processing. In addition, the distribution and restoration apparatus 200 can safely generate the pieces of distributed data SD1 and SD2 having asymmetric data sizes.

Method of Restoring the Original Data in the Tenth Embodiment

A specific method of restoring the original data OD in the tenth embodiment will be described with reference to FIGS. 37 and 38. First, the distribution and restoration apparatus 200 acquires all pieces of distributed data SD1 and SD2. Specifically, the distribution and restoration apparatus 200 accesses the external storage device 510 by the MAC/PHY 90 to acquire the distributed data SD1 and accesses the HDD 80 by the CPU 60 to acquire the distributed data SD2.

In FIGS. 37 and 38, the distribution and restoration apparatus 200 acquires the column 1 of the original data OD on the basis of [distribution (1) a] of the distributed data SD1 (1), acquires the column 5 of the original data OD by XOR processing of [distribution (2) a] of the distributed data SD2 and the column 1 already acquired (2), and acquires the column 6 of the original data OD by XOR processing of [distribution (2) b] of the distributed data SD2 and the column 1 already acquired (2).

The distribution and restoration apparatus 200 acquires the column 2 of the original data OD by XOR processing of [distribution (1) b] of the distributed data SD1 and the column 6 already acquired (3), acquires the column 7 of the original data OD by XOR processing of [distribution (2) c] of the distributed data SD2 and the column 2 already acquired (4), and acquires the column 8 of the original data OD by XOR processing of [distribution (2) d] of the distributed data SD2 and the column 2 already acquired (4).

The distribution and restoration apparatus 200 acquires the column 3 of the original data OD by XOR processing of [distribution (1) c] of the distributed data SD1 and the column 8 already acquired (5), acquires the column 9 of the original data OD by XOR processing of [distribution (2) e] of the distributed data SD2 and the column 3 already acquired (6), and acquires the column 10 of the original data OD by XOR processing of [distribution (2) f] of the distributed data SD2 and the column 3 already acquired (6).

Finally, the distribution and restoration apparatus 200 acquires the column 4 of the original data OD by XOR processing of [distribution (1) d] of the distributed data SD1 and the column 10 already acquired (7), acquires the column 11 of the original data OD by XOR processing of [distribution (2) g] of the distributed data SD2 and the column 4 already acquired (8), and acquires the column 12 of the original data OD by XOR processing of [distribution (2) h] of the distributed data SD2 and the column 4 already acquired (8).

The distribution and restoration apparatus 200 acquires the original data OD by connecting in order the divided blocks DB1 to DB12 of the columns 1 to 12 acquired in each operation of (1) to (8). Then, the distribution and restoration apparatus 200 ends the process of restoring the original data OD.

As described above, since the distribution and restoration apparatus 200 of the tenth embodiment can perform the process of restoring the original data OD at high speed using a plurality of pieces of distributed data SD1 and SD2 that are generated by performing an exclusive OR (XOR processing) according to the combination of selected divided blocks, it is possible to reduce the amount of memory in the distribution and restoration apparatus 200. In addition, the distribution and restoration apparatus 200 can restore the original data OD safely from the pieces of distributed data SD1 and SD2 having asymmetric data sizes.

Eleventh Embodiment

Figure 39:
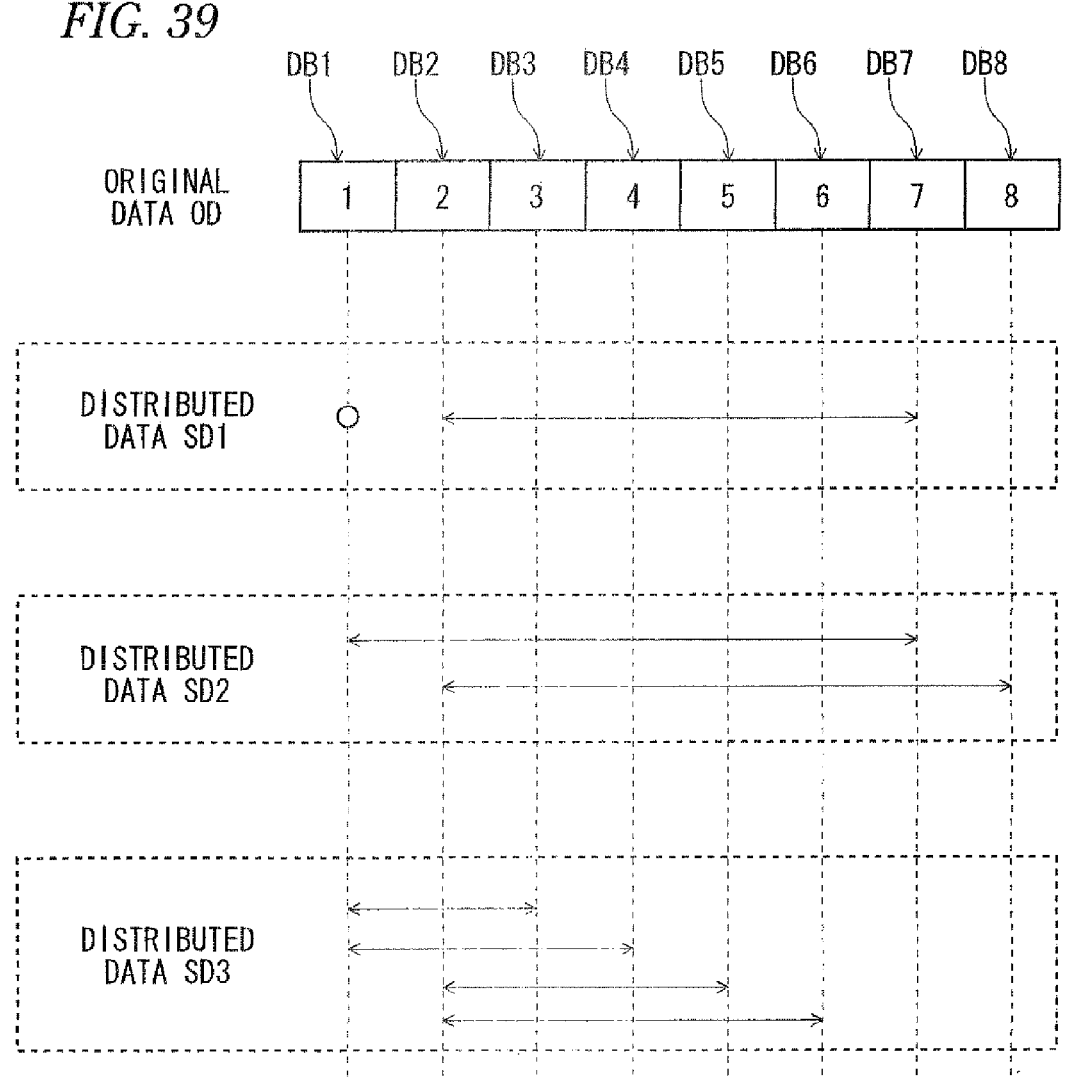
FIG. 39 is an explanatory view showing an example of a method of generating the distributed data in an eleventh embodiment.
Figure 40:
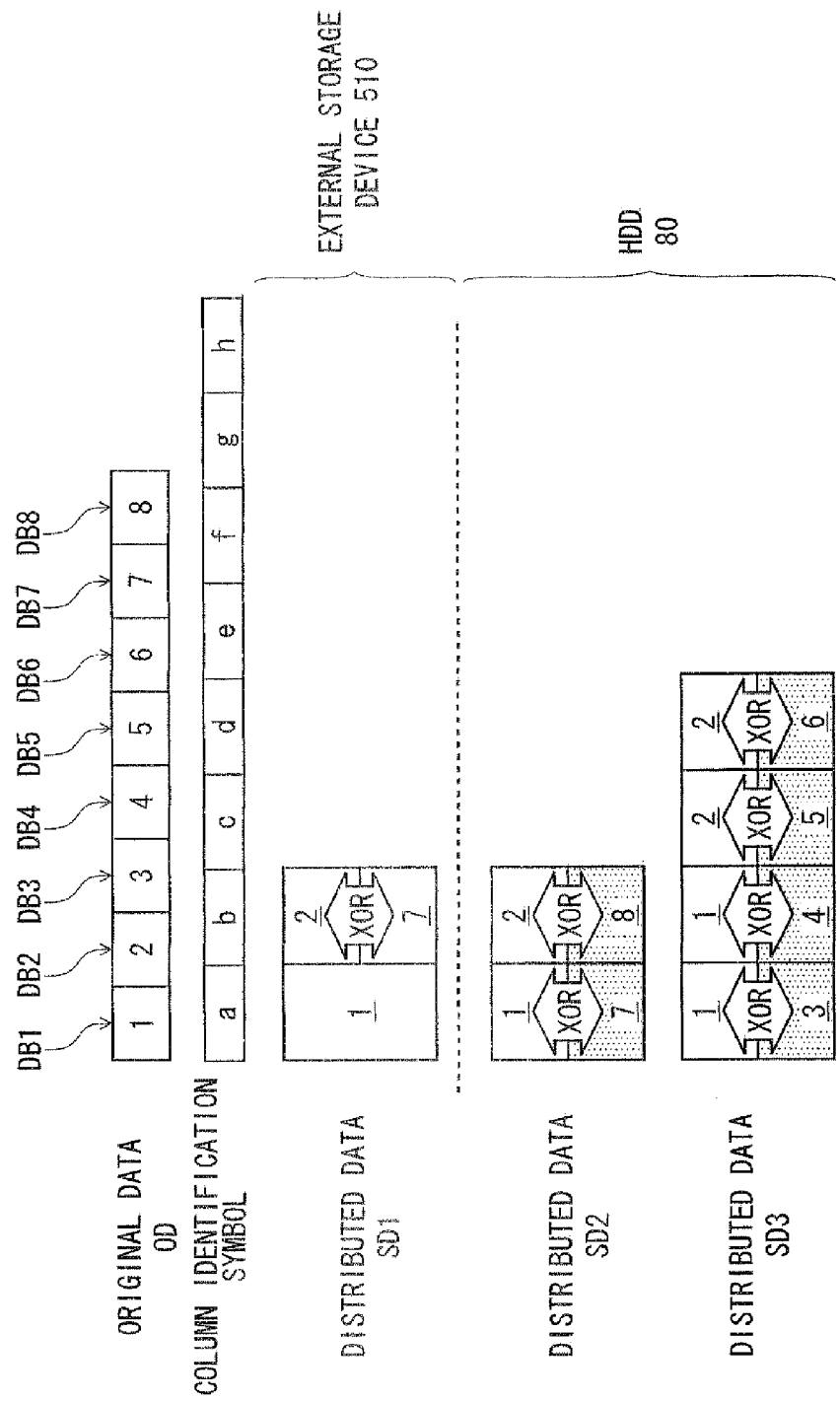
FIG. 40 is an explanatory view showing the content of the distributed data in the eleventh embodiment.
Figure 41:
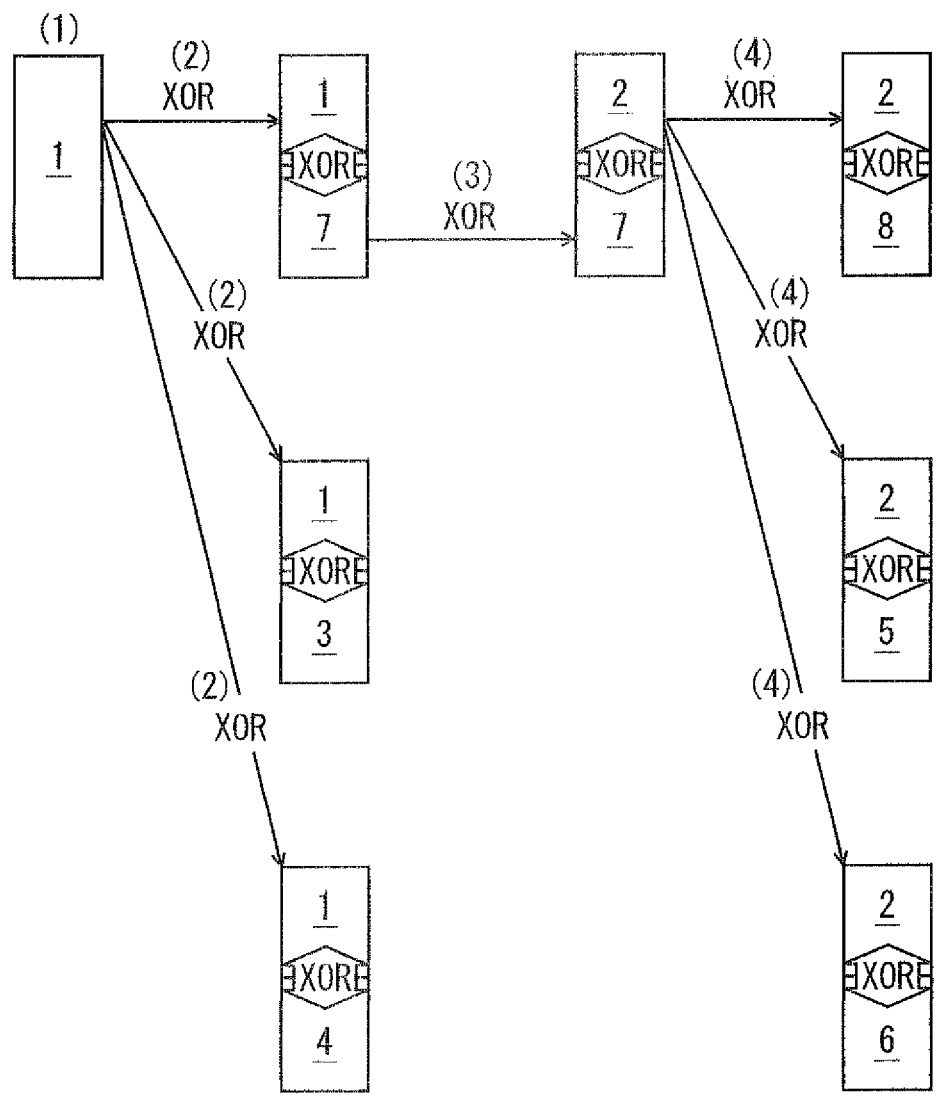
FIG. 41 is an explanatory view showing the flow to obtain each divided block of original data by XOR processing between pieces of distributed data in the eleventh embodiment.
Figure 42:
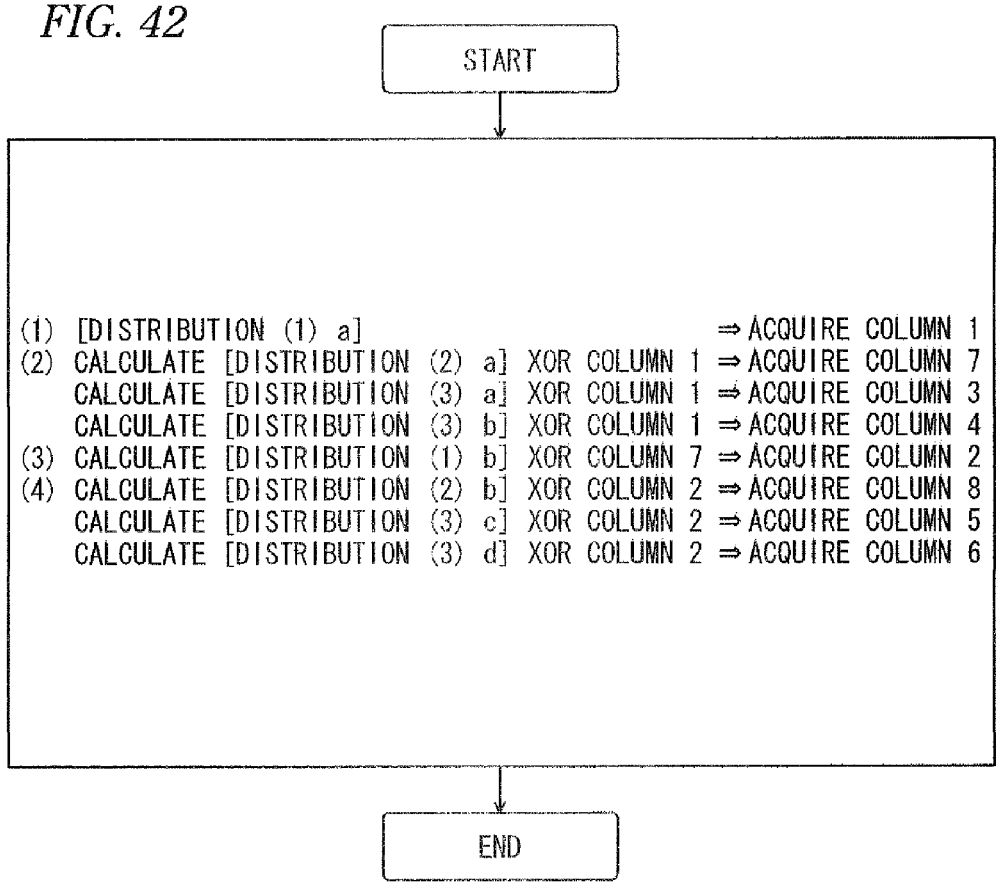
FIG. 42 is a flow chart illustrating the operation procedure in the eleventh embodiment.

First, an eleventh embodiment of the distribution and restoration apparatus 200 will be described with reference to FIG. 39 to 42. FIG. 39 is an explanatory view showing an example of a method of generating the distributed data in the eleventh embodiment. FIG. 40 is an explanatory view showing the content of distributed data in the eleventh embodiment. FIG. 41 is an explanatory view showing the flow to obtain each divided block of original data by XOR processing between pieces of distributed data in the eleventh embodiment. FIG. 42 is a flow chart illustrating the operation procedure in the eleventh embodiment.

In the eleventh embodiment, a method of generating a total of three pieces of distributed data SD1, SD2, and SD3, each of which has a smaller data size than the data size of the original data OD, from the original data OD and a method of restoring the original data OD using three pieces of distributed data SD1, SD2, and SD3 will be described.

For example, the distribution and restoration apparatus 200 stores the distributed data SD1 in the external storage device 510 and stores the distributed data SD2 and SD3 in the HDD 80. In this manner, the distribution and restoration apparatus 200 distributes three pieces of distributed data SD1, SD2, and SD3 asymmetrically in the external storage device 510 and the HDD 80, for example.

In the eleventh embodiment, as shown in FIGS. 39 and 40, the original data OD is configured to include a total of eight divided blocks DB1 to DB8 connected in order. In addition, although the original data OD is configured to include a total of eight divided blocks DB1 to DB12 in order to simplify explanation in the eleventh embodiment, the number of divided blocks that form the original data OD is not limited to 8.

Configuration of Distributed Data in the Eleventh Embodiment

The configuration of distributed data in the eleventh embodiment will be described with reference to FIGS. 39 and 40. In the distributed data SD1 shown in FIGS. 39 and 40, [distribution (1) a] is a divided block DB1 of the column 1, and [distribution (1) b] is an XOR-processed value of the divided block DB2 of the column 2 and the divided block DB7 of the column 7.

Therefore, the distributed data SD1 has a configuration in which two columns [distribution (1) a] and [distribution (1) b] are connected in order.

Thus, the distributed data SD1 is formed by performing 2-stage convolution of the data of divided blocks corresponding to the data size of ⅓ of the original data OD by XOR processing. Accordingly, the number of blocks (columns) of the distributed data SD1 is 2, which is ¼ of 8 that is the number of blocks (columns) of the original data OD.

Then, in the distributed data SD2 shown in FIGS. 39 and 40, [distribution (2) a] is an XOR-processed value of the divided block DB1 of the column 1 and the divided block DB7 of the column 7, and [distribution (2) b] is an XOR-processed value of the divided block DB2 of the column 2 and the divided block DB8 of the column 8.

Therefore, the distributed data SD2 has a configuration in which two columns [distribution (2) a] and [distribution (2) b] are connected in order.

Thus, the distributed data SD2 is formed by performing two-stage convolution of the data of divided blocks corresponding to the data size of ⅓ of the original data OD by XOR processing. Accordingly, the number of blocks (columns) of the distributed data SD2 is 2, which is ¼ of 8 that is the number of blocks (columns) of the original data OD.

Similarly, in the distributed data SD3 shown in FIGS. 39 and 40, [distribution (3) a] is an XOR-processed value of the divided block DB1 of the column 1 and the divided block DB3 of the column 3, [distribution (3) b] is an XOR-processed value of the divided block DB1 of the column 1 and the divided block DB4 of the column 4, [distribution (3) c] is an XOR-processed value of the divided block DB2 of the column 2 and the divided block DB5 of the column 5, and [distribution (3) d] is an XOR-processed value of the divided block DB2 of the column 2 and the divided block DB6 of the column 6.

Therefore, the distributed data SD3 has a configuration in which four columns [distribution (3) a], [distribution (3) b], [distribution (3) c], and [distribution (3) d] are connected in order.

Thus, the distributed data SD3 is formed by performing 2-stage convolution of the data of divided blocks corresponding to the data size of the original data OD by XOR processing. Accordingly, the number of blocks (columns) of the distributed data SD1 is 4, which is ½ of 8 that is the number of blocks (columns) of the original data OD.

Method of Generating Distributed Data in the Eleventh Embodiment

A specific method of generating the distributed data SD1, SD2, and SD3 in the eleventh embodiment will be described with reference to FIGS. 39 and 40. First, the distribution and restoration apparatus 200 divides the original data OD equally into two pieces of data. For example, the distribution and restoration apparatus 200 divides the original data OD including a total of eight divided blocks DB1 to DB8 equally into data of the columns 1, 2, 7, and 8 and data of the columns 3 to 6.

The distribution and restoration apparatus 200 performs XOR processing of the data of one of the columns 1, 2, 7, and 8 and the data of one of the columns 3 to 6 and connects a total of four XOR-processed pieces of data to generate distributed data.

For example, the distribution and restoration apparatus 200 generates distributed data by connecting XOR-processed data of the columns 1 and 3, XOR-processed data of the columns 2 and 4, XOR-processed data of the columns 7 and 5, and XOR-processed data of the columns 8 and 6 in order. In addition, the distribution and restoration apparatus 200 generates new distributed data SD3 (refer to drawing 40) by changing data of some columns of the generated distributed data into data of other columns.

Specifically, the distribution and restoration apparatus 200 changes the column 2 of the XOR-processed data of the columns 2 and 4 to the column 1, changes the column 7 of the XOR-processed data of the columns 7 and 5 to the column 2, and changes the column 8 of the XOR-processed data of the columns 8 and 6 to the column 2. Accordingly, the distribution and restoration apparatus 200 uses an XOR-processed value of the columns 1 and 3 for [distribution (2) a], uses an XOR-processed value of the columns 1 and 4 for [distribution (2) b], uses an XOR-processed value of the columns 2 and 5 for [distribution (2) c], and uses an XOR-processed value of the columns 2 and 6 for [distribution (2) d], and connects [distribution (2) a], [distribution (2) b], [distribution (2) c], and [distribution (2) d] in order to generate the distributed data SD2.

Then, the distribution and restoration apparatus 200 selects a combination of columns of either the data of the columns 1, 2, 7, and 8 or the data of the columns 3 to 6 used in XOR processing when generating the distributed data SD3. Here, in order to simplify explanation, the distribution and restoration apparatus 200 selects the data of the columns 1, 2, 7, and 8 as a combination of columns. However, the distribution and restoration apparatus 200 may select the columns 3 to 6.

The distribution and restoration apparatus 200 generates two pieces of distributed data SD1 and SD2 by performing distribution processing on the combination of selected columns according to the secret sharing scheme disclosed in Japanese Patent Application No. 2011-077630 by this inventor. By the distribution processing according to the secret sharing scheme disclosed in Japanese Patent Application No. 2011-077630, the combination of columns selected by the distribution and restoration apparatus 200 (for example, the columns 1, 2, 7, and 8), among the pieces of data of the columns 1, 2, 7, 8, and 3 to 6 used in XOR processing when generating the distributed data SD3, is XOR-processed by different combinations. As a result, two pieces of distributed data SD1 and SD2 are generated.

Specifically, for example, when a combination of the columns 1, 2, 7, and 8 is selected, the distribution and restoration apparatus 200 uses only the column 1 for [distribution (1) a] and uses an XOR-processed value of the columns 2 and 7 for [distribution (1) b], and connects [distribution (1) a], [distribution (1) b], [distribution (1) c], and [distribution (1) d] in order to generate the distributed data SD1.

In addition, the distribution and restoration apparatus 200 generates the distributed data SD2 by shifting the column 7, which is shown in the lower part of the distributed data SD1, by one column leftward with respect to the generated distributed data SD1. Therefore, when generating the distributed data SD2, the distribution and restoration apparatus 200 uses the data of the column 8, which is not used when generating the distributed data SD1, in XOR processing with the column 2.

In addition, the distribution and restoration apparatus 200 may generate the distributed data SD2 ahead of the distributed data SD1. Specifically, for example, when a combination of the columns 1, 2, 7, and 8 is selected, the distribution and restoration apparatus 200 uses an XOR-processed value of the columns 1 and 7 for [distribution (2) a] and uses an XOR-processed value of the columns 2 and 8 for [distribution (2) b], and connects [distribution (2) a] and [distribution (2) b] in order to generate the distributed data SD2.

In addition, the distribution and restoration apparatus 200 generates the distributed data SD1 by shifting the columns 7 and 8, which are shown in the lower part of the distributed data SD2, by one column rightward with respect to the generated distributed data SD2. Therefore, when generating the distributed data SD1, the distribution and restoration apparatus 200 uses only the single column 1 for [distribution (1) a] without using the data of the column 8 used when generating the distributed data SD2.

Thus, when the distribution and restoration apparatus 200 generates distributed data, the information (content) of original data can be made to be missing in the distributed data by performing 2-stage (2-row) convolution processing (XOR processing) on the data of divided blocks of the original data OD. In this manner, the distribution and restoration apparatus 200 can generate distributed data that can prevent the restoration of the original data OD from either the distributed data SD1 or the distributed data SD2 and SD3.

In addition, as the rate of the asymmetric distribution in the eleventh embodiment, as shown in FIG. 40, the data size of the distributed data SD1 stored in the external storage device 510 is ¼ of the data size of the original data OD, and the data size of the distributed data SD2 and SD3 stored in the HDD 80 is ¾ (¼+½) of the data size of the original data OD. Accordingly, the distribution and restoration apparatus 200 can generate distributed data having asymmetric data sizes of 1:3 for the external storage device 510 and the HDD 80. In addition, the total data size of the distributed data SD1, SD2, and SD3 is the same as the data size of the original data OD.

Therefore, the information entropy of the generated distributed data is increased by canceling the information (content) of the original data OD using the original data OD and XOR processing in the distribution and restoration apparatus 200 in the eleventh embodiment. For this reason, the distribution and restoration apparatus 200 can make it difficult to restore the original data OD from distributed data less than the threshold value corresponding to the number of pieces of generated distributed data. In addition, just by using the XOR processing, the distribution and restoration apparatus 200 can generate distributed data having asymmetric data sizes compared with the conventional threshold secret sharing scheme. As a result, it is possible to increase the speed of distributed data generation processing.

As described above, since the distribution and restoration apparatus 200 of the eleventh embodiment generates a plurality of pieces of distributed data SD1, SD2, and SD3 by performing an exclusive OR (XOR processing) according to the combination of selected divided blocks, the data size of the distributed data SD1, SD2, and SD3 can be made to be smaller than the data size of the original data OD. As a result, since it is possible to reduce the amount of memory in the distribution and restoration apparatus 200, it is possible to further increase the speed of distribution processing. In addition, the distribution and restoration apparatus 200 can safely generate the pieces of distributed data SD1, SD2, and SD3 having asymmetric data sizes.

Method of Restoring the Original Data in the Eleventh Embodiment

A specific method of restoring the original data OD in the eleventh embodiment will be described with reference to FIGS. 41 and 42. First, the distribution and restoration apparatus 200 acquires all pieces of distributed data SD1, SD2, and SD3. Specifically, the distribution and restoration apparatus 200 accesses the external storage device 510 by the MAC/PHY 90 to acquire the distributed data SD1 and accesses the HDD 80 by the CPU 60 to acquire the distributed data SD2 and SD3.

In FIGS. 41 and 42, the distribution and restoration apparatus 200 acquires the column 1 of the original data OD on the basis of [distribution (1) a] of the distributed data SD1 (1), The distribution and restoration apparatus 200 acquires the column 7 of the original data OD by XOR processing of [distribution (2) a] of the distributed data SD2 and the column 1 already acquired (2), acquires the column 3 of the original data OD by XOR processing of [distribution (3) a] of the distributed data SD3 and the column 1 already acquired (2), and acquires the column 4 of the original data OD by XOR processing of [distribution (3) b] of the distributed data SD3 and the column 1 already acquired (2).

The distribution and restoration apparatus 200 acquires the column 2 of the original data OD by XOR processing of [distribution (1) b] of the distributed data SD1 and the column 7 already acquired (3).

Finally, the distribution and restoration apparatus 200 acquires the column 8 of the original data OD by XOR processing of [distribution (2) b] of the distributed data SD2 and the column 2 already acquired (4), acquires the column 5 of the original data OD by XOR processing of [distribution (3) c] of the distributed data SD3 and the column 2 already acquired (4), and acquires the column 6 of the original data OD by XOR processing of [distribution (3) d] of the distributed data SD3 and the column 2 already acquired (4).

The distribution and restoration apparatus 200 acquires the original data OD by connecting in order the divided blocks DB1 to DB8 of the columns 1 to 8 acquired in each operation of (1) to (4). Then, the distribution and is restoration apparatus 200 ends the process of restoring the original data OD.

As described above, since the distribution and restoration apparatus 200 of the eleventh embodiment can perform the process of restoring the original data OD at high speed using a plurality of pieces of distributed data SD1, SD2, and SD3 generated by performing an exclusive OR (XOR processing) according to the combination of selected divided blocks, it is possible to reduce the amount of memory in the distribution and restoration apparatus 200. In addition, the distribution and restoration apparatus 200 can restore the original data OD safely from the pieces of distributed data SD1, SD2, and SD3 having asymmetric data sizes.

Twelfth Embodiment

Figure 43:
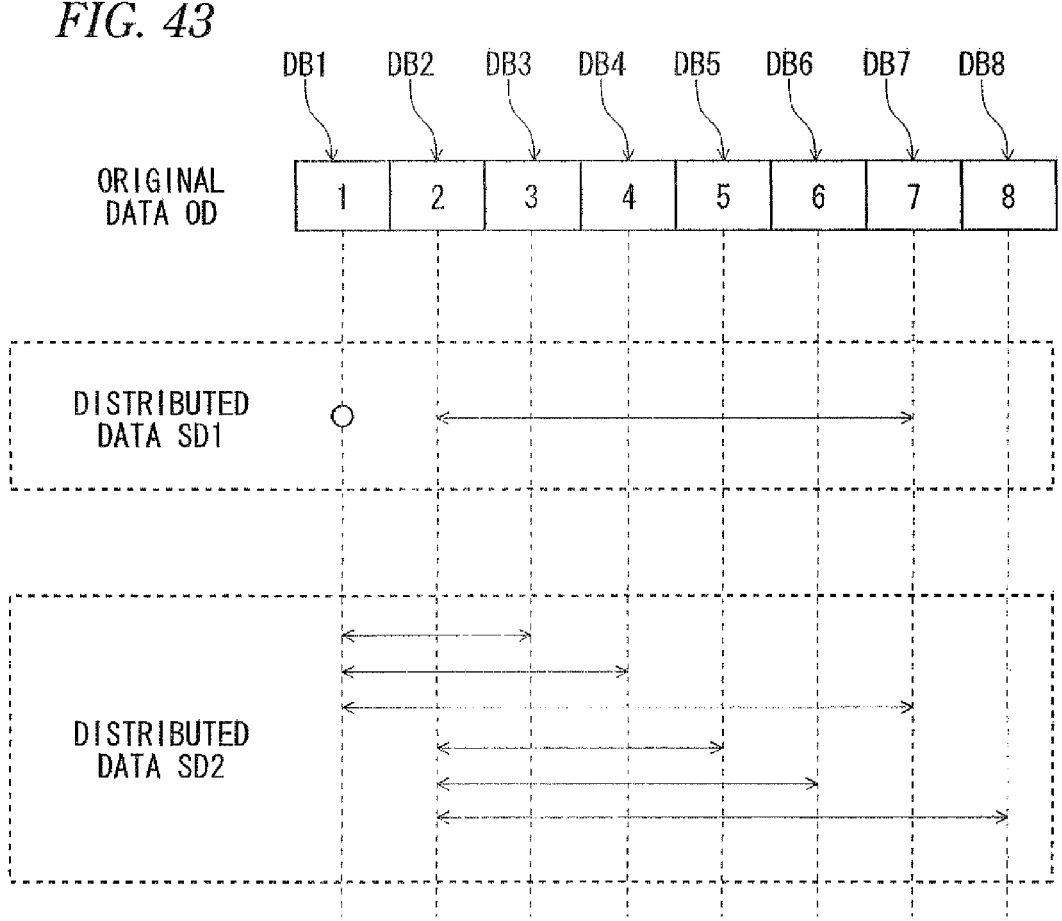
FIG. 43 is an explanatory view showing an example of a method of generating the distributed data in a twelfth embodiment.
Figure 44:
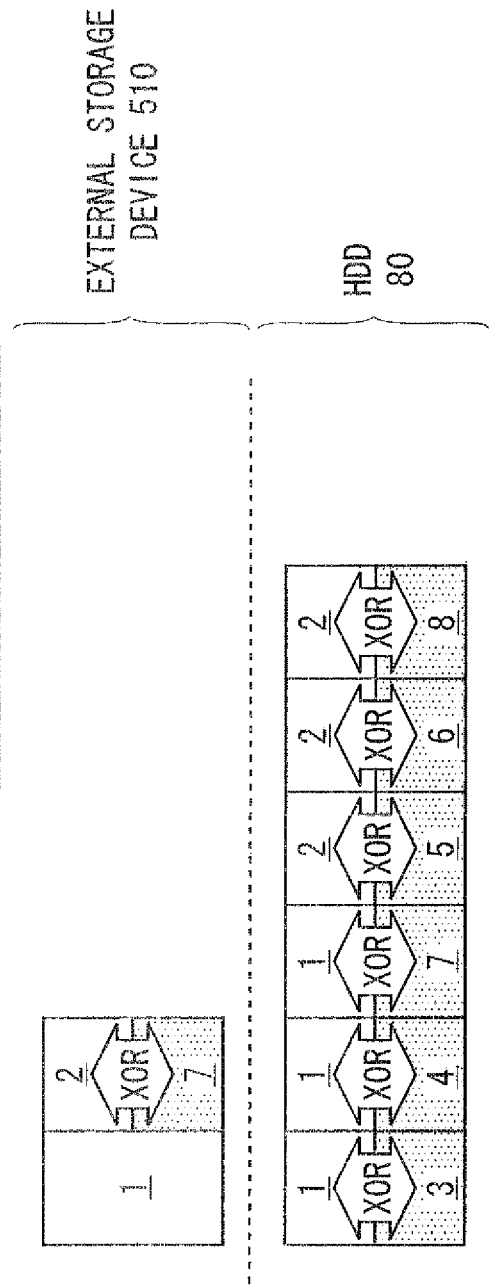
FIG. 44 is an explanatory view showing the content of the distributed data in the twelfth embodiment.
Figure 45:
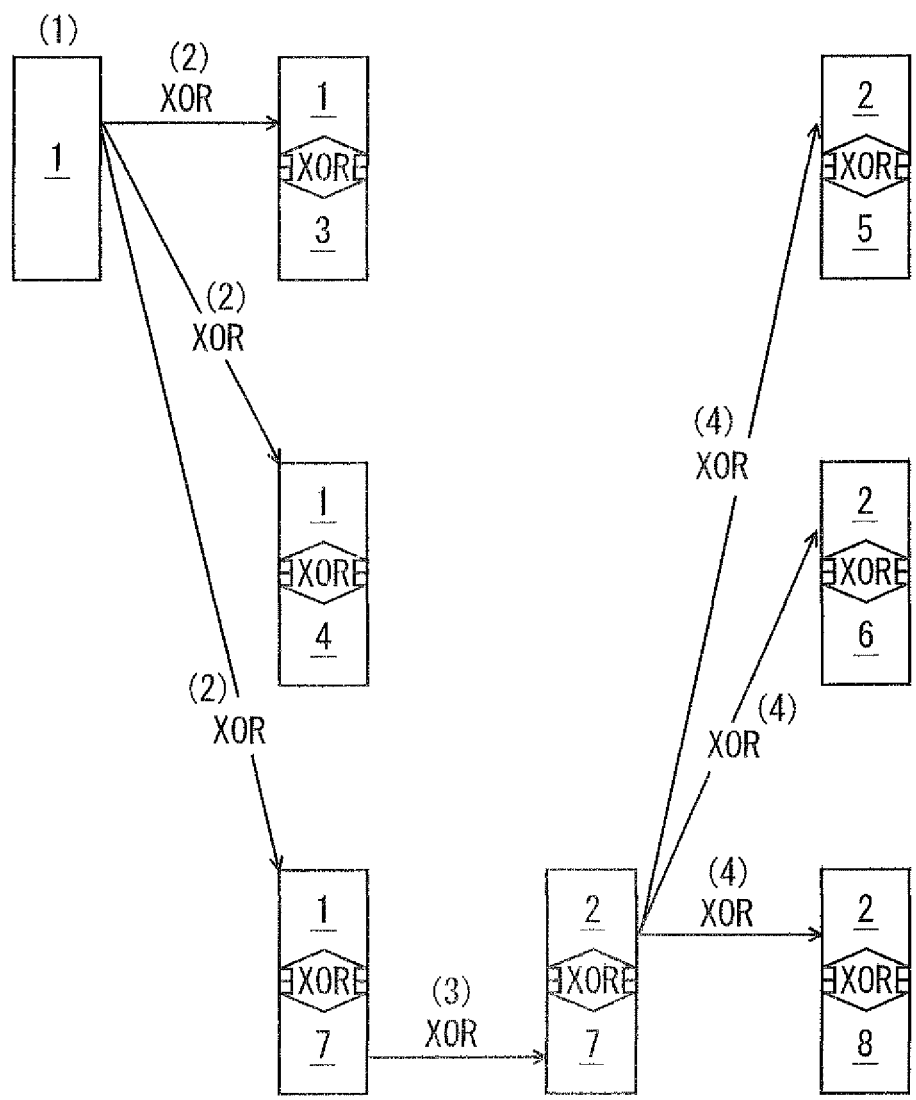
FIG. 45 is an explanatory view showing the flow to obtain each divided block of original data by XOR processing between pieces of distributed data in the twelfth embodiment.
Figure 46:
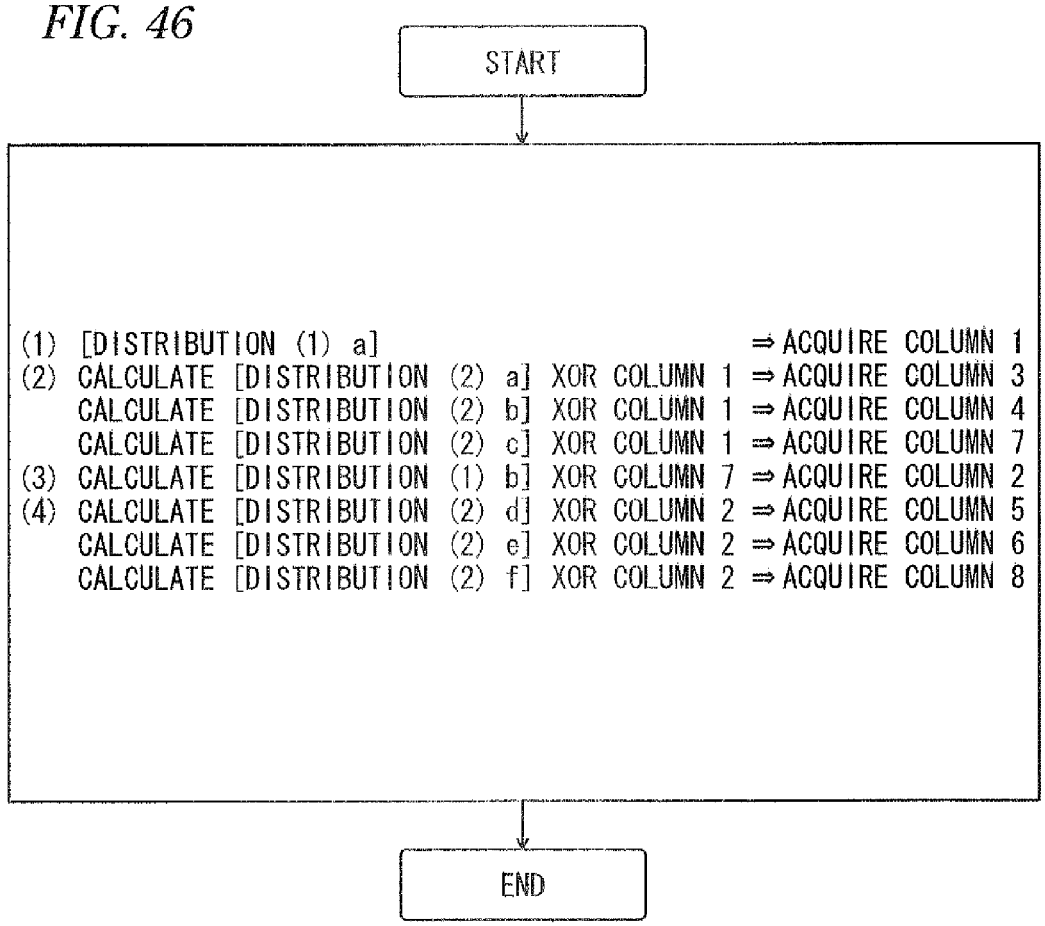
FIG. 46 is a flow chart illustrating the operation procedure in the twelfth embodiment.

First, a twelfth embodiment of the distribution and restoration apparatus 200 will be described with reference to FIG. 43 to 46. FIG. 43 is an explanatory view showing an example of a method of generating the distributed data in the twelfth embodiment. FIG. 44 is an explanatory view showing the content of distributed data in the twelfth embodiment. FIG. 45 is an explanatory view showing the flow to obtain each divided block of original data by XOR processing between pieces of distributed data in the twelfth embodiment. FIG. 46 is a flow chart illustrating the operation procedure in the twelfth embodiment.

In the twelfth embodiment, a method of generating a total of two pieces of distributed data SD1 and SD2, each of which has a smaller data size than the data size of the original data OD, from the original data OD and a method of restoring the original data OD using two pieces of distributed data SD1 and SD2 will be described.

For example, the distribution and restoration apparatus 200 stores the distributed data SD1 in the external storage device 510 and stores the distributed data SD2 in the HDD 80. In this manner, the distribution and restoration apparatus 200 distributes two pieces of distributed data SD1 and SD2 asymmetrically in the external storage device 510 and the HDD 80, for example.

In the twelfth embodiment, as shown in FIGS. 43 and 44, the original data OD is configured to include a total of eight divided blocks DB1 to DB8 connected in order. In addition, although the original data OD is configured to include a total of eight divided blocks DB1 to DB8 in order to simplify explanation in the twelfth embodiment, the number of divided blocks that form the original data OD is not limited to 8.

Configuration of Distributed Data in the Twelfth Embodiment

The configuration of distributed data in the twelfth embodiment will be described with reference to FIGS. 43 and 44. Distributed data SD1 shown in FIGS. 43 and 44 is the same as the distributed data SD1 shown in FIGS. 39 and 40.

Then, in the distributed data SD2 shown in FIGS. 43 and 44, [distribution (2) a] is an XOR-processed value of the divided block DB1 of the column 1 and the divided block DB3 of the column 3, [distribution (2) b] is an XOR-processed value of the divided block DB1 of the column 1 and the divided block DB4 of the column 4, [distribution (2) c] is an XOR-processed value of the divided block DB1 of the column 1 and the divided block DB7 of the column 7, [distribution (2) d] is an XOR-processed value of the divided block DB2 of the column 2 and the divided block DB5 of the column 5, [distribution (2) e] is an XOR-processed value of the divided block DB2 of the column 2 and the divided block DB6 of the column 6, and [distribution (2) f] is an XOR-processed value of the divided block DB2 of the column 2 and the divided block DB8 of the column 8.

Therefore, the distributed data SD2 has a configuration in which six columns [distribution (2) a], [distribution (2) b], [distribution (2) c], [distribution (2) d], [distribution (2) e], and [distribution (2) f] are connected in order.

Thus, the data of the column 1 and the data of the column 2 are used twice in the distributed data SD2, and the distributed data SD2 is formed by performing two-stage convolution of the data of divided blocks corresponding to the data size of the original data OD by XOR processing. Accordingly, the number of blocks (columns) of the distributed data SD2 is 6, which is ¾ of 8 that is the number of blocks (columns) of the original data OD.

Method of Generating Distributed Data in the Twelfth Embodiment

A specific method of generating the distributed data SD1 and SD2 in the twelfth embodiment will be described with reference to FIGS. 43 and 43. First, the distribution and restoration apparatus 200 generates three pieces of distributed data SD1, SD2, and SD3 (refer to FIG. 40) according to the method described in the twelfth embodiment. Here, explanation of the method described in the eleventh embodiment will be omitted. In addition, since the distributed data SD1 shown in FIG. 40 and the distributed data SD1 shown in FIG. 44 are the same, explanation of the method of generating the distributed data SD1 (refer to FIG. 44) in the twelfth embodiment will be omitted.

Then, the distribution and restoration apparatus 200 generates the distributed data SD2 in the twelfth embodiment by connecting the generated distributed data SD2 and SD3 shown in FIG. 40 to rearrange the columns (refer to FIG. 44).

Specifically, the distribution and restoration apparatus 200 uses an XOR-processed value of the columns 1 and 3 for [distribution (2) a], uses an XOR-processed value of the columns 1 and 4 for [distribution (2) b], uses an XOR-processed value of the columns 1 and 7 for [distribution (2) c], uses an XOR-processed value of the columns 2 and 5 for [distribution (2) d], uses an XOR-processed value of the columns 2 and 6 for [distribution (2) e], and uses an XOR-processed value of the columns 2 and 8 for [distribution (2) f], and connects [distribution (2) a], [distribution (2) b], [distribution (2) c], [distribution (2) d], [distribution (2) e], and [distribution (2) f] in order to generate the distributed data SD2 (refer to FIG. 44).

Thus, when the distribution and restoration apparatus 200 generates distributed data, the information (content) of original data can be made to be missing in the distributed data by performing 2-stage (2-row) convolution processing (XOR processing) on the data of divided blocks of the original data OD and connecting a plurality of pieces of distributed data in order. In this manner, the distribution and restoration apparatus 200 can generate distributed data that can prevent the restoration of the original data OD from either the distributed data SD1 or the distributed data SD2.

In addition, as the rate of the asymmetric distribution in the twelfth embodiment, as shown in FIG. 44, the data size of the distributed data SD1 stored in the external storage device 510 is ¼ of the data size of the original data OD, and the data size of the distributed data SD2 stored in the HDD 80 is ¾ of the data size of the original data OD. Accordingly, the distribution and restoration apparatus 200 can generate distributed data having asymmetric data sizes of 1:3 for the external storage device 510 and the HDD 80. In addition, the total data size of the distributed data SD1 and SD2 is the same as the data size of the original data OD.

Therefore, the information entropy of the generated distributed data is increased by canceling the information (content) of the original data OD using the original data OD and XOR processing in the distribution and restoration apparatus 200 in the twelfth embodiment. For this reason, the distribution and restoration apparatus 200 can make it difficult to restore the original data OD from distributed data less than the threshold value corresponding to the number of pieces of generated distributed data. In addition, just by using the XOR processing, the distribution and restoration apparatus 200 can generate distributed data having asymmetric data sizes compared with the conventional threshold secret sharing scheme. As a result, it is possible to increase the speed of distributed data generation processing.

As described above, since the distribution and restoration apparatus 200 of the twelfth embodiment generates a plurality of pieces of distributed data SD1 and SD2 by performing an exclusive OR (XOR processing) according to the combination of selected divided blocks, the data size of the distributed data SD1 and SD2 can be made to be smaller than the data size of the original data OD. As a result, since it is possible to reduce the amount of memory in the distribution and restoration apparatus 200, it is possible to further increase the speed of distribution processing. In addition, the distribution and restoration apparatus 200 can safely generate the pieces of distributed data SD1 and SD2 having asymmetric data sizes.

Method of Restoring the Original Data in the Twelfth Embodiment

A specific method of restoring the original data OD in the twelfth embodiment will be described with reference to FIGS. 45 and 46. First, the distribution and restoration apparatus 200 acquires all pieces of distributed data SD1 and SD2. Specifically, the distribution and restoration apparatus 200 accesses the external storage device 510 by the MAC/PHY 90 to acquire the distributed data SD1 and accesses the HDD 80 by the CPU 60 to acquire the distributed data SD2.

In FIGS. 45 and 46, the distribution and restoration apparatus 200 acquires the column 1 of the original data OD on the basis of [distribution (1) a] of the distributed data SD1 (1).

The distribution and restoration apparatus 200 acquires the column 3 of the original data OD by XOR processing of [distribution (2) a] of the distributed data SD2 and the column 1 already acquired (2), acquires the column 4 of the original data OD by XOR processing of [distribution (2) b] of the distributed data SD2 and the column 1 already acquired (2), and acquires the column 7 of the original data OD by XOR processing of [distribution (2) c] of the distributed data SD2 and the column 1 already acquired (2).

The distribution and restoration apparatus 200 acquires the column 2 of the original data OD by XOR processing of [distribution (1) b] of the distributed data SD1 and the column 7 already acquired (3).

Finally, the distribution and restoration apparatus 200 acquires the column 5 of the original data OD by XOR processing of [distribution (2) d] of the distributed data SD2 and the column 2 already acquired (4), acquires the column 6 of the original data OD by XOR processing of [distribution (2) e] of the distributed data SD2 and the column 2 already acquired (4), and acquires the column 8 of the original data OD by XOR processing of [distribution (2) f] of the distributed data SD2 and the column 2 already acquired (4).

The distribution and restoration apparatus 200 acquires the original data OD by connecting in order the divided blocks DB1 to DB8 of the columns 1 to 8 acquired in each operation of (1) to (4). Then, the distribution and restoration apparatus 200 ends the process of restoring the original data OD.

As described above, since the distribution and restoration apparatus 200 of the twelfth embodiment can perform the process of restoring the original data OD at high speed using a plurality of pieces of distributed data SD1 and SD2 that are generated by performing an exclusive OR (XOR processing) according to the combination of selected divided blocks, it is possible to reduce the amount of memory in the distribution and restoration apparatus 200. In addition, the distribution and restoration apparatus 200 can restore the original data OD safely from the pieces of distributed data SD1 and SD2 having asymmetric data sizes.

Thirteenth Embodiment

Figure 47:
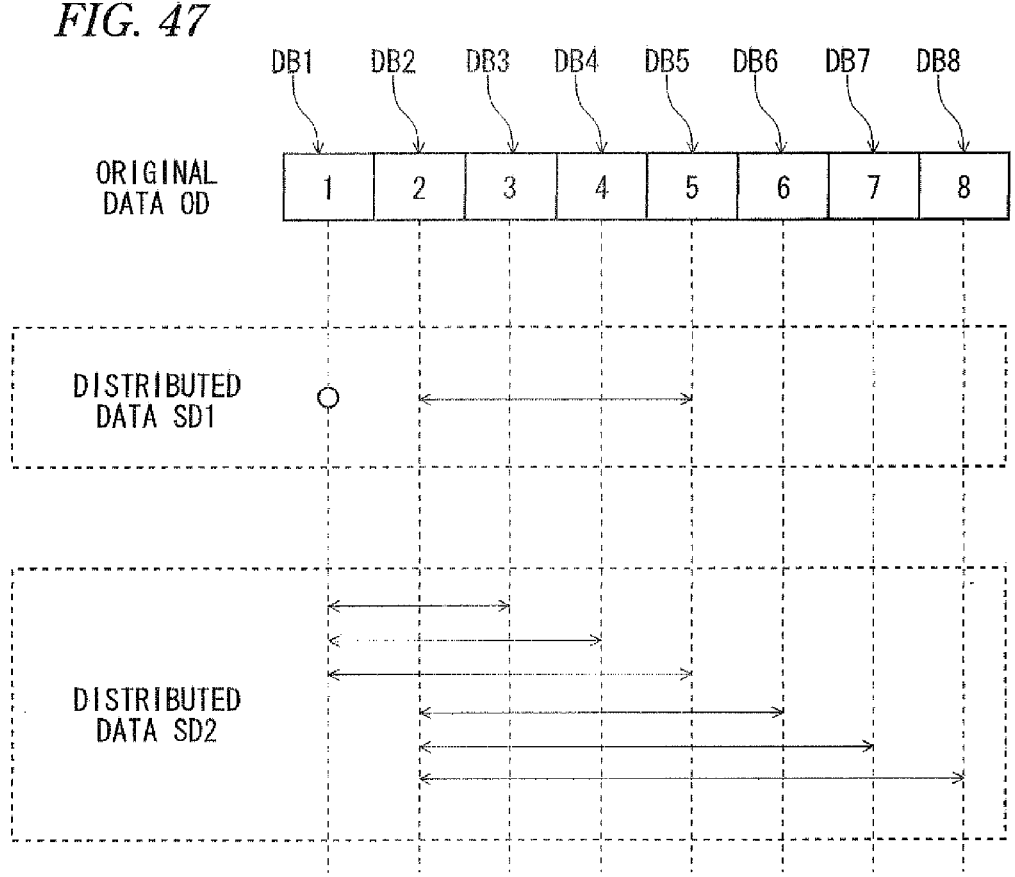
FIG. 47 is an explanatory view showing an example of a method of generating the distributed data in a thirteenth embodiment.
Figure 48:
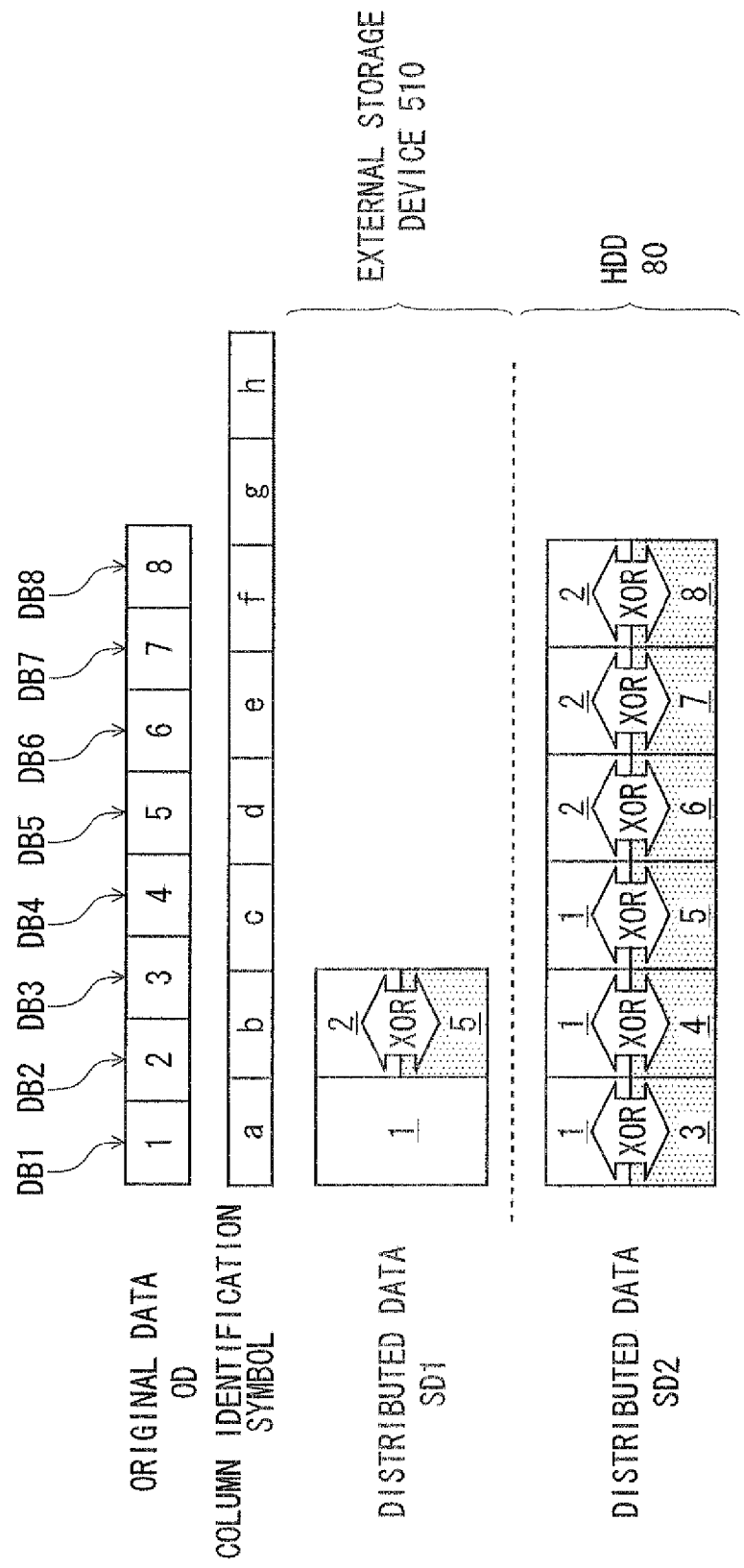
FIG. 48 is an explanatory view showing the content of the distributed data in the thirteenth embodiment.
Figure 49:
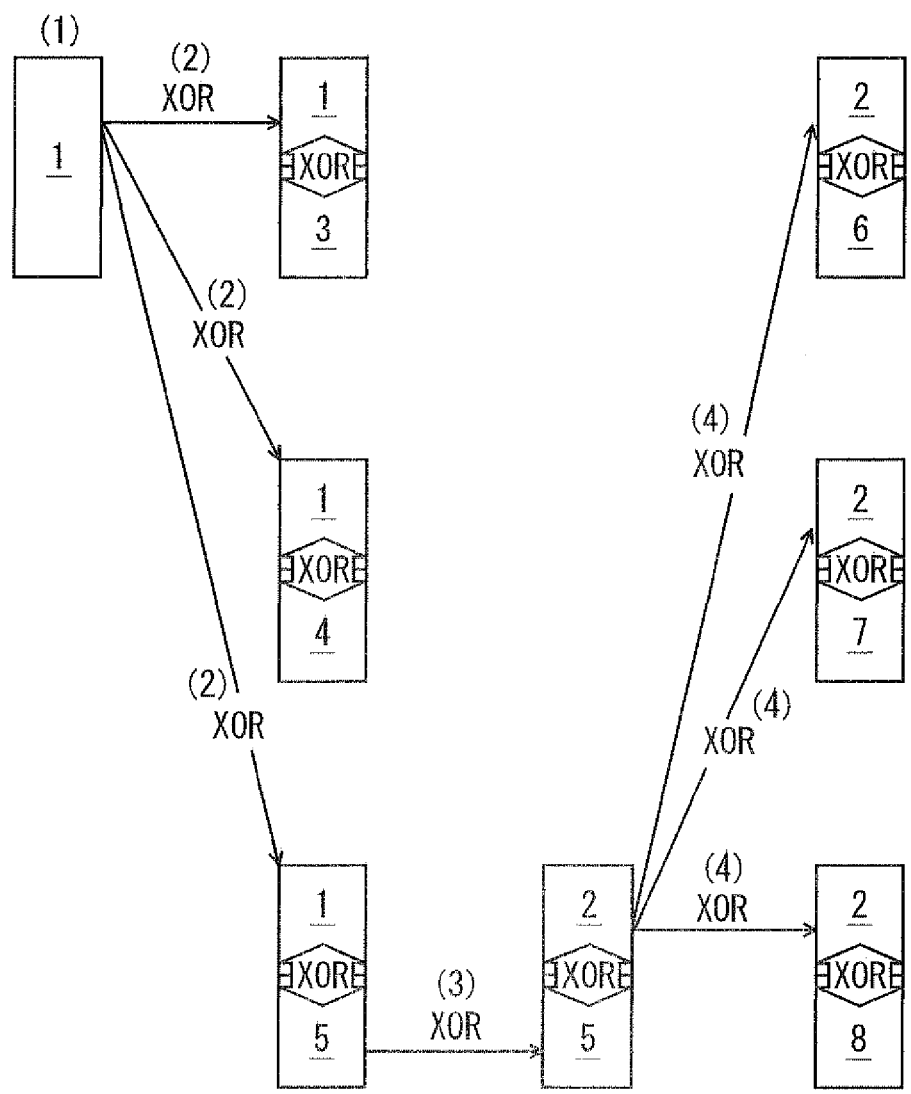
FIG. 49 is an explanatory view showing the flow to obtain each divided block of original data by XOR processing between pieces of distributed data in the thirteenth embodiment.
Figure 50:
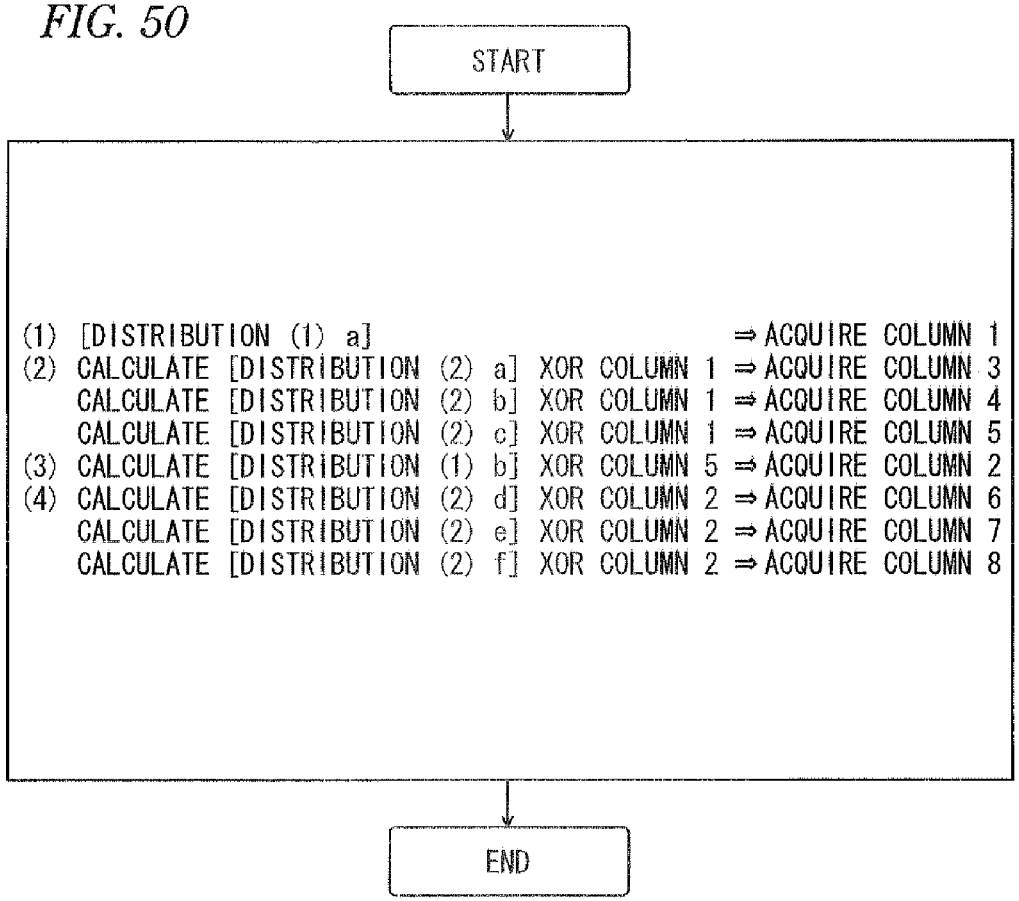
FIG. 50 is a flow chart illustrating the operation procedure in the thirteenth embodiment.

First, a thirteenth embodiment of the distribution and restoration apparatus 200 will be described with reference to FIG. 47 to 50. FIG. 47 is an explanatory view showing an example of a method of generating the distributed data in the thirteenth embodiment. FIG. 48 is an explanatory view showing the content of distributed data in the thirteenth embodiment. FIG. 49 is an explanatory view showing the flow to obtain each divided block of original data by XOR processing between pieces of distributed data in the thirteenth embodiment. FIG. 50 is a flow chart illustrating the operation procedure in the thirteenth embodiment.

In the thirteenth embodiment, a method of generating a total of two pieces of distributed data SD1 and SD2, each of which has a smaller data size than the data size of the original data OD, from the original data OD and a method of restoring the original data OD using two pieces of distributed data SD1 and SD2 will be described.

For example, the distribution and restoration apparatus 200 stores the distributed data SD1 in the external storage device 510 and stores the distributed data SD2 in the HDD 80. In this manner, the distribution and restoration apparatus 200 distributes two pieces of distributed data SD1 and SD2 asymmetrically in the external storage device 510 and the HDD 80, for example.

In the thirteenth embodiment, as shown in FIGS. 47 and 48, the original data OD is configured to include a total of eight divided blocks DB1 to DB8 connected in order. In addition, although the original data OD is configured to include a total of eight divided blocks DB1 to DB8 in order to simplify explanation in the thirteenth embodiment, the number of divided blocks that form the original data OD is not limited to 8.

Configuration of Distributed Data in the Thirteenth Embodiment

The configuration of distributed data in the thirteenth embodiment will be described with reference to FIGS. 47 and 48. In the distributed data SD1 shown in FIGS. 47 and 48, [distribution (1) a] is a divided block DB1 of the column 1, and [distribution (1) b] is an XOR-processed value of the divided block DB2 of the column 2 and the divided block DB5 of the column 5. Therefore, the distributed data SD1 has a configuration in which two columns [distribution (1) a] and [distribution (1) b] are connected in order.

Thus, the distributed data SD1 is formed by performing 2-stage convolution of the data of divided blocks corresponding to ½ of the data size of the original data OD by XOR processing. Accordingly, the number of blocks (columns) of the distributed data SD1 is 2, which is ¼ of 8 that is the number of blocks (columns) of the original data OD.

Then, in the distributed data SD2 shown in FIGS. 47 and 48, [distribution (2) a] is an XOR-processed value of the divided block DB1 of the column 1 and the divided block DB3 of the column 3, [distribution (2) b] is an XOR-processed value of the divided block DB1 of the column 1 and the divided block DB4 of the column 4, [distribution (2) c] is an XOR-processed value of the divided block DB1 of the column 1 and the divided block DB5 of the column 5, [distribution (2) d] is an XOR-processed value of the divided block DB2 of the column 2 and the divided block DB6 of the column 6, [distribution (2) e] is an XOR-processed value of the divided block DB2 of the column 2 and the divided block DB7 of the column 7, and [distribution (2) f] is an XOR-processed value of the divided block DB2 of the column 2 and the divided block DB8 of the column 8.

Therefore, the distributed data SD2 has a configuration in which six columns [distribution (2) a], [distribution (2) b], [distribution (2) c], [distribution (2) d], [distribution (2) e], and [distribution (2) f] are connected in order.

Thus, the data of the column 1 and the data of the column 2 are used twice in the distributed data SD2, and the distributed data SD2 is formed by performing two-stage convolution of the data of divided blocks corresponding to the data size of the original data OD by XOR processing. Accordingly, the number of blocks (columns) of the distributed data SD2 is 6, which is ¾ of 8 that is the number of blocks (columns) of the original data OD.

Method of Generating Distributed Data in the Thirteenth Embodiment

A specific method of generating the distributed data SD1 and SD2 in the thirteenth embodiment will be described with reference to FIGS. 47 and 48. First, the distribution and restoration apparatus 200 generates two pieces of distributed data SD1 and SD2 (refer to FIG. 44) according to the method described in the twelfth embodiment. Here, explanation of the method described in the twelfth embodiment will be omitted.

The distribution and restoration apparatus 200 generates new distributed data SD1 (refer to FIG. 48) by changing data of some columns of the distributed data SD1 shown in FIG. 44 to data of other columns.

Specifically, the distribution and restoration apparatus 200 generates the distributed data SD1 in the thirteenth embodiment by changing the column 7 of [distribution (1) b] of the distributed data SD1 shown in FIG. 44 to the column 5 (refer to FIG. 48).

Then, the distribution and restoration apparatus 200 generates new distributed data SD2 by changing data of some columns of the distributed data SD2 shown in FIG. 44 to data of other columns (refer to FIG. 48).

Specifically, the distribution and restoration apparatus 200 generates the distributed data SD2 by changing the column 7 of [distribution (2) c] of the distributed data SD2 shown in FIG. 44 to the column 5, changing the column 5 of [distribution (2) d] of the distributed data SD2 shown in the same drawing to the column 6, and changing the column 6 of [distribution (2) e] of the distributed data SD2 shown in the same drawing to the column 7 (refer to FIG. 48).

Thus, when the distribution and restoration apparatus 200 generates distributed data, the information (content) of original data can be made to be missing in the distributed data by performing 2-stage (2-row) convolution processing (XOR processing) on the data of divided blocks of the original data OD and changing the data of columns, which are used as objects to be subjected to XOR processing, to data of other columns. In this manner, the distribution and restoration apparatus 200 can generate distributed data that can prevent the restoration of the original data OD from either the distributed data SD1 or the distributed data SD2.

In addition, as the rate of the asymmetric distribution in the thirteenth embodiment, as shown in FIG. 48, the data size of the distributed data SD1 stored in the external storage device 510 is ¼ of the data size of the original data OD, and the data size of the distributed data SD2 stored in the HDD 80 is ¾ of the data size of the original data OD, Accordingly, the distribution and restoration apparatus 200 can generate distributed data having asymmetric data sizes of 1:3 for the external storage device 510 and the HDD 80. In addition, the total data size of the distributed data SD1 and SD2 is the same as the data size of the original data OD.

Therefore, the information entropy of the generated distributed data is increased by canceling the information (content) of the original data OD using the original data OD and XOR processing in the distribution and restoration apparatus 200 in the thirteenth embodiment. For this reason, the distribution and restoration apparatus 200 can make it difficult to restore the original data OD from distributed data less than the threshold value corresponding to the number of pieces of generated distributed data. In addition, just by using the XOR processing, the distribution and restoration apparatus 200 can generate distributed data having asymmetric data sizes compared with the conventional threshold secret sharing scheme. As a result, it is possible to increase the speed of distributed data generation processing.

As described above, since the distribution and restoration apparatus 200 of the thirteenth embodiment generates a plurality of pieces of distributed data SD1 and SD2 by performing an exclusive OR (XOR processing) according to the combination of selected divided blocks, the data size of the distributed data SD1 and SD2 can be made to be smaller than the data size of the original data OD. As a result, since it is possible to reduce the amount of memory in the distribution and restoration apparatus 200, it is possible to further increase the speed of distribution processing. In addition, the distribution and restoration apparatus 200 can safely generate the pieces of distributed data SD1 and SD2 having asymmetric data sizes.

Method of Restoring the Original Data in the Thirteenth Embodiment

A specific method of restoring the original data OD in the thirteenth embodiment will be described with reference to FIGS. 49 and 50, First, the distribution and restoration apparatus 200 acquires all pieces of distributed data SD1 and SD2. Specifically, the distribution and restoration apparatus 200 accesses the external storage device 510 by the MAC/PHY 90 to acquire the distributed data SD1 and accesses the HDD 80 by the CPU 60 to acquire the distributed data SD2.

In FIGS. 49 and 50, the distribution and restoration apparatus 200 acquires the column 1 of the original data OD on the basis of [distribution (1) a] of the distributed data SD1 (1).

The distribution and restoration apparatus 200 acquires the column 3 of the original data OD by XOR processing of [distribution (2) a] of the distributed data SD2 and the column 1 already acquired (2), acquires the column 4 of the original data OD by XOR processing of [distribution (2) b] of the distributed data SD2 and the column 1 already acquired (2), and acquires the column 5 of the original data OD by XOR processing of [distribution (2) c] of the distributed data SD2 and the column 1 already acquired (2).

The distribution and restoration apparatus 200 acquires the column 2 of the original data OD by XOR processing of [distribution (1) b] of the distributed data SD1 and the column 5 already acquired (3).

Finally, the distribution and restoration apparatus 200 acquires the column 6 of the original data OD by XOR processing of [distribution (2) d] of the distributed data SD2 and the column 2 already acquired (4), acquires the column 7 of the original data OD by XOR processing of [distribution (2) e] of the distributed data SD2 and the column 2 already acquired (4), and acquires the column 8 of the original data OD by XOR processing of [distribution (2) f] of the distributed data SD2 and the column 2 already acquired (4).

The distribution and restoration apparatus 200 acquires the original data OD by connecting in order the divided blocks DB1 to DB8 of the columns 1 to 8 acquired in each operation of (1) to (4). Then, the distribution and restoration apparatus 200 ends the process of restoring the original data OD.

As described above, since the distribution and restoration apparatus 200 of the thirteenth embodiment can perform the process of restoring the original data OD at high speed using a plurality of pieces of distributed data SD1 and SD2 that are generated by performing an exclusive OR (XOR processing) according to the combination of selected divided blocks, it is possible to reduce the amount of memory in the distribution and restoration apparatus 200. In addition, the distribution and restoration apparatus 200 can restore the original data OD safely from the pieces of distributed data SD1 and SD2 having asymmetric data sizes.

As described above, the distribution and restoration apparatus 200 in each embodiment can set the rate of asymmetric distribution (for example, 1:2, 1:3, 1:5, 1:7, and 1:11) freely to generate the distributed data.

Although the various embodiments have been described with reference to the drawings, it is needless to say that the present invention is not limited to these examples. It is apparent to those skilled in the art that various changes and modifications of the various embodiments and combinations of the various embodiments can be made within the range defined in the appended claims, and it should be understood undoubtedly that they also belong to the technical range of the present invention.

The present invention is useful as a distribution apparatus, a restoration apparatus, a distribution method and a restoration method to perform safely and quickly the processing for generating a plurality of pieces of distributed data from original data or the processing for restoring the original data from the plurality of pieces of distributed data.

The present application is based on Japanese patent application No. 2012-098145 filed on Apr. 23, 2012, and the contents of the patent application are incorporated herein by reference.

REFERENCE SIGNS LIST

1: application
2: distribution and restoration module
3: storage unit
10: distribution processing request unit
20: restoration processing request unit
30: distribution processing unit
40: random number generation unit
50: restoration processing unit
60: CPU
70: RAM
80: HDD
90: MAC/PHY
100: arithmetic processing unit
200: distribution and restoration apparatus
510, 520, 530: external storage device

What is claimed is:

1. A distribution apparatus configured to perform a distribution operation of secret data with increased security and to enable a restoration operation of the secret data with increased security by generating a plurality of distributed data based on a plurality of divided blocks, including first divided blocks and second divided blocks, divided from the secret data, the distribution apparatus comprising:

an arithmetic processor configured to perform arithmetic processing on at least two of the plurality of the divided blocks, the arithmetic processing being defined by performing an arithmetic operation by:
(i) first performing the arithmetic processing on a predetermined divided block and another one of the divided blocks to produce a first operation result, and
(ii) then performing the arithmetic processing on the first operation result and the another one of the divided blocks to produce a second operation result equivalent to the predetermined divided block, wherein:

the arithmetic processor is configured to generate at least first distributed data and second distributed data by performing the arithmetic processing on at least two divided blocks included in the first divided blocks or the second divided blocks, the first distributed data includes a result of the arithmetic processing on at least two divided blocks included in the first divided blocks, the second distributed data includes a result of the arithmetic processing on at least one of the first divided blocks and at least one of the second divided blocks, the second distributed data being larger than the first distributed data, the first distributed data and the second distributed data having a characteristic to enable the secret data to be restored only by performing a restoration operation including processing together both the first distributed data and the second distributed data, and the distribution apparatus further comprises a transmitter configured to improve security of the distribution operation and the restoration operation by distributing the first distributed data to a first apparatus and the second distributed data to a second apparatus.

2. The distribution apparatus according to claim 1, wherein the second divided blocks are used only for generating the second distributed data.

3. The distribution apparatus according to claim 1, wherein the arithmetic processor is configured to generate new distributed data by dividing some of the distributed data.

4. The distribution apparatus according to claim 1, wherein the arithmetic processor is configured to generate new distributed data by changing a combination of the divided blocks in the distributed data.

5. The distribution apparatus according to claim 1, wherein the first distributed data further includes a result of the arithmetic processing on at least one of the first divided blocks and a random number.

6. The distribution apparatus according to claim 1, wherein a piece of the distributed data corresponds to one of the divided blocks.

7. The distribution apparatus according to claim 1, further comprising:
a storage configured to store the second distributed data; and
a communication controller configured to store the first distributed data in an external device connected to the distribution apparatus through a network.

8. The distribution apparatus according to claim 1, further comprising:
a storage configured to store the distributed data; and
a communication controller configured to acquire a speed of communication with an external device connected to the distribution apparatus through a network,
wherein, on the basis of a reading speed or a writing speed with respect to the storage and the speed of communication with the external device, the arithmetic processor is configured to store the second distributed data in the storage when the reading speed or the writing speed is higher than the speed of communication, and
the communication controller is configured to store the first distributed data in the external device.

9. The distribution apparatus according to claim 1, wherein a combination of divided blocks in the first distributed data includes divided blocks used in the first distributed data and the second distributed data, and a combination of divided blocks in the second distributed data includes divided blocks used in the first distributed data and the second distributed data and divided blocks used only in the second distributed data.

10. The distribution apparatus according to claim 1, wherein the arithmetic processor performs the arithmetic processing on a combination of divided blocks to generate the first distributed data,
the arithmetic processor further performs the arithmetic processing on another combination of divided blocks, being different from the combination of divided blocks, to generate the second distributed data.

11. The distribution apparatus according to claim 1, wherein the arithmetic processor further generates third distributed data including a result of the arithmetic processing on at least two divided blocks, being different from at least one of the two divided blocks used for generating the first distributed data, included in the first divided blocks.

12. The distribution apparatus according to claim 1, the arithmetic processing comprises an XOR operation.

13. The distribution apparatus according to claim 1, the arithmetic processing is defined by performing arithmetic processing by:
(i) first performing a modular arithmetic operation on a multiplication of a predetermined divided block and another one of the divided blocks to produce a first operation result, and
(ii) then performing the modular arithmetic operation on a multiplication of the first operation result and the inverse of the another one of the divided blocks to produce a second operation result that is equivalent to the predetermined divided block.

14. A restoration apparatus configured to perform a restoration operation to restore secret data with increased security using a plurality of distributed data generated based on a plurality of divided blocks, including first divided blocks and second divided blocks, divided from the secret data, comprising:
an arithmetic processor that receives at least first distributed data from a first device and second distributed data from a second device to improve security of the restoration operation, the first distributed data and the second distributed data having a characteristic to enable the secret data to be restored only by performing a restoration operation including processing together both the first distributed data and the second distributed data, the second distributed data being larger than the first distributed data, the arithmetic processor being configured to perform arithmetic processing on at least two of the plurality of the divided blocks, being defined by performing an arithmetic operation by:
(i) first performing the arithmetic processing on a predetermined divided block and another one of the divided blocks to produce a first operation result, and
(ii) then performing the arithmetic processing on the first operation result and the another one of the divided blocks to produce a second operation result equivalent to the predetermined divided block, wherein the arithmetic processor is configured to acquire all of the divided blocks by performing the arithmetic processing between at least the first distributed data received from the first device and the second distributed data received from the second device, and that connects all of the acquired divided blocks in order to restore the secret data, the first distributed data includes a result of arithmetic processing by at least one of the other devices on at least two divided blocks included in the first divided blocks, and the second distributed data includes a result of arithmetic processing by at least one of the other devices on at least one of the first divided blocks and at least one of the second divided blocks.

15. A distribution method in a distribution apparatus configured to perform a distribution operation of secret data with increased security and to enable a restoration operation of the secret data with increased security by generating a plurality of distributed data based on a plurality of divided blocks, including first divided blocks and second divided blocks, divided from the secret data, the distribution method comprising:

dividing the secret data to the plurality of divided blocks;
performing arithmetic processing on at least two of the plurality of divided blocks, the arithmetic processing being defined by performing an arithmetic operation by:
(i) first performing the arithmetic processing on a predetermined divided block and another one of the divided blocks to produce a first operation result, and (ii) then performing the arithmetic processing on the first operation result and the another one of the divided blocks to produce a second operation result equivalent to the predetermined divided block;
generating at least first distributed data and second distributed data by performing the arithmetic processing, and
improving security of the distribution operation by distributing at least the first distributed data to a first apparatus and the second distributed data to a second apparatus;
wherein the first distributed data includes a result of the arithmetic processing on at least two divided blocks included in the first divided blocks and
the second distributed data includes a result of the arithmetic processing on at least one of the first divided blocks and at least one of the second divided blocks, the second distributed data being larger than the first distributed data, the first distributed data and the second distributed data having a characteristic to enable the secret data to be restored only by performing a restoration operation including processing together both the first distributed data and the second distributed data.

16. A restoration method in a restoration apparatus configured to perform a restoration operation to restore secret data with increased security using a plurality of distributed data generated based on a plurality of divided blocks, including first divided blocks and second divided blocks, divided from the secret data, comprising:

receiving at least first distributed data from a first apparatus and second distributed data from a second apparatus to improve the security of the restoration operation, the first distributed data and the second distributed data having a characteristic to enable the secret data to be restored only by performing a restoration operation including processing together both the first distributed data and the second distributed data, the second distributed data being larger than the first distributed data;
performing arithmetic processing on at least two of the plurality of the divided blocks, the arithmetic processing being defined by performing an arithmetic operation by:
(i) first performing the arithmetic processing on a predetermined divided block and another one of the divided blocks to produce a first operation result, and (ii) then performing the arithmetic processing on the first operation result and the another one of the divided blocks to produce a second operation result equivalent to the predetermined divided block;
acquiring all of the divided blocks by performing the arithmetic processing between at least the first distributed data and the second distributed data; and
restoring the secret data by connecting all of the acquired divided blocks,
wherein the first distributed data includes a result of arithmetic processing by at least one of the other devices on at least two divided blocks included in the first divided blocks, and
the second distributed data includes a result of arithmetic processing by at least one of the other devices on at least one of the first divided blocks and at least one of the second divided blocks.

17. A distribution and restoration system, comprising:

a distribution processor configured to perform a distribution operation of secret data with increased security and to enable a restoration operation of the secret data with increased security by generating a plurality of distributed data based on a plurality of divided blocks, including first divided blocks and second divided blocks, divided from the secret data; and
a restoration processor configured to acquire at least a part of the plurality of distributed data from the distribution processor and to restore the secret data with increased security using the plurality of distributed data generated based on the plurality of divided blocks,
wherein each of the distribution processor and the restoration processor has an arithmetic processor configured to perform arithmetic processing on at least two of the plurality of the divided blocks, the arithmetic processing being defined by performing an arithmetic operation by:
(i) first performing the arithmetic processing on a predetermined divided block and another one of the divided blocks to produce a first operation result, and
(ii) then performing the arithmetic processing on the first operation result and the another one of the divided blocks to produce a second operation result equivalent to the predetermined divided block, wherein
the arithmetic processor of the distribution processor is configured to generate at least first distributed data and second distributed data by performing the arithmetic processing, the second distributed data being larger than the first distributed data, the first distributed data and the second distributed data having a characteristic to enable the secret data to be restored only by performing a restoration operation including processing together both the first distributed data and the second distributed data,
the arithmetic processor of the restoration processor is configured to acquire all of the divided blocks by performing the arithmetic processing between at least the first distributed data and the second distributed data, and configured to connect all of the acquired divided blocks in order to restore the secret data,
the first distributed data includes a result of the arithmetic processing on at least two divided blocks included in the first divided blocks, the second distributed data includes a result of the arithmetic processing on at least one of the first divided blocks and at least one of the second divided blocks, and the distribution processor further comprises a transmitter configured to improve security of the distribution operation and the restoration operation by distributing the first distributed data to a first apparatus and the second distributed data to a second apparatus.

* * * * *